(12) United States Patent
Fields, Jr. et al.

(10) Patent No.: US 7,480,772 B2
(45) Date of Patent: *Jan. 20, 2009

(54) DATA PROCESSING SYSTEM AND METHOD FOR EFFICIENT COMMUNICATION UTILIZING AN TN AND TEN COHERENCY STATES

(75) Inventors: James Stephen Fields, Jr., Austin, TX (US); Benjiman Lee Goodman, Cedar Park, TX (US); Guy Lynn Guthrie, Austin, TX (US); William John Starke, Round Rock, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/835,984

(22) Filed: Aug. 8, 2007

(65) Prior Publication Data

US 2008/0040556 A1   Feb. 14, 2008

Related U.S. Application Data

(63) Continuation of application No. 11/055,476, filed on Feb. 10, 2005, now Pat. No. 7,454,577.

(51) Int. Cl.
*G06F 12/00* (2006.01)
(52) U.S. Cl. ................. 711/144; 711/119; 711/141
(58) Field of Classification Search ............ None
See application file for complete search history.

(56) References Cited

U.S. PATENT DOCUMENTS 5,852,716 A * 12/1998 Hagersten ............ 709/201
6,438,653 B1 * 8/2002 Akashi et al. ............ 711/128
6,606,676 B1    8/2003 Deshpande et al.
7,096,323 B1    8/2006 Conway et al.
7,162,590 B2    1/2007 Pruvost et al.
7,389,388 B2 * 6/2008 Cantin et al. ............ 711/144
2003/0009637 A1   1/2003 Arimilli et al.
2003/0097529 A1   5/2003 Arimilli et al.
2003/0154350 A1   8/2003 Edirisooriya et al.
2006/0224833 A1  10/2006 Guthrie et al.

OTHER PUBLICATIONS

Patterson and Hennessy; Computer Architecture—A Quantative Approach; 1996; Morgan Kaufmann Publishers; 2nd edition, p. 75.

* cited by examiner

*Primary Examiner*—Reginald G Bragdon
*Assistant Examiner*—Shawn X Gu
(74) *Attorney, Agent, or Firm*—Diana R. Gerhardt; Dillon & Yudell LLP

(57) ABSTRACT

A cache coherent data processing system includes at least first and second coherency domains each including at least one processing unit. The first coherency domain includes a first cache memory and a second cache memory, and the second coherency domain includes a remote coherent cache memory. The first cache memory includes a cache controller, a data array including a data storage location for caching a memory block, and a cache directory. The cache directory includes a tag field for storing an address tag in association with the memory block and a coherency state field associated with the tag field and the data storage location. The coherency state field has a plurality of possible states including a state that indicates that the memory block is possibly shared with the second cache memory in the first coherency domain and cached only within the first coherency domain.

7 Claims, 80 Drawing Sheets

DATA PROCESSING SYSTEM AND METHOD FOR EFFICIENT COMMUNICATION UTILIZING AN TN AND TEN COHERENCY STATES

CROSS-REFERENCE TO RELATED APPLICATIONS

The present application is a continuation of U.S. patent application Ser. No. 11/055,476, filed on Feb. 10, 2005, and entitled "Data Processing System and Method for Efficient Communication Utilizing an Tn and Ten Coherency States" which is also related to the following applications, which are assigned to the assignee of the present invention and incorporated herein by reference in their entireties:
(1) U.S. patent application Ser. No. 11/055,483;
(2) U.S. patent application Ser. No. 11/055,524;
(3) U.S. patent application Ser. No. 11/055,640;
(4) U.S. Pat. No. 7,366,844;
(5) U.S. patent application Ser. No. 11/055,402; and
(6) U.S. patent application Ser. No. 11/054,820.

BACKGROUND OF THE INVENTION

1. Technical Field

The present invention relates in general to data processing and, in particular, to data processing in a cache coherent data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines of each cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requester and/or the recipients of a memory access request.

Heretofore, cache coherency protocols have generally assumed that to maintain cache coherency a global broadcast of coherency messages had to be employed. That is, that all coherency messages must be received by all cache hierarchies in an SMP computer system. The present invention recognizes, however, that the requirement of global broadcast of coherency messages creates a significant impediment to the scalability of SMP computer systems and, in particular, consumes an increasing amount of the bandwidth of the system interconnect as systems scale.

SUMMARY OF THE INVENTION

In view of the foregoing and other shortcomings in the art, the present invention provides an improved cache coherent data processing system and method of data processing in a cache coherent data processing system.

In one embodiment, a cache coherent data processing system includes at least first and second coherency domains. A master performs a first broadcast of an operation within the cache coherent data processing system that is limited in scope of transmission to the first coherency domain. The master receives a response of the first coherency domain to the first broadcast of the operation. If the response indicates the operation cannot be serviced in the first coherency domain alone, the master increases the scope of transmission by performing a second broadcast of the operation in both the first and second coherency domains. If the response indicates the operation can be serviced in the first coherency domain, the master refrains from performing the second broadcast, so that communication bandwidth utilized to service the operation is reduced.

In another embodiment, a cache coherent data processing system includes at least first and second coherency domains, and a memory block is stored in a system memory in association with a domain indicator indicating whether or not the memory block is cached, if at all, only within the first coherency domain. A master in the first coherency domain determines whether or not a scope of broadcast transmission of an operation should extend beyond the first coherency domain by reference to the domain indicator stored in the cache and then performs a broadcast of the operation within the cache coherent data processing system in accordance with the determination.

In another embodiment, a cache coherent data processing system includes a plurality of processing units each having at least an associated cache, a system memory, and a memory controller that is coupled to and controls access to the system memory. The system memory includes a plurality of storage locations for storing a memory block of data, where each of the plurality of storage locations is sized to store a sub-block of data. The system memory further includes metadata storage for storing metadata, such as a domain indicator, describing the memory block. In response to a failure of a storage location for a particular sub-block among the plurality of sub-blocks, the memory controller overwrites at least a portion of the metadata in the metadata storage with the particular sub-block of data.

In another embodiment, a cache coherent data processing system includes at least first and second coherency domains each including at least one processing unit and a cache memory. The cache memory includes a cache controller, a data array including a data storage location for caching a memory block, and a cache directory. The cache directory includes a tag field for storing an address tag in association with the memory block and a coherency state field associated with the tag field and the data storage location. The coherency state field has a plurality of possible states including a state that indicates that the address tag is valid, that the storage location does not contain valid data, and that the memory block is possibly cached outside of the first coherency domain.

In yet another embodiment, a cache coherent data processing system includes a memory controller of a system memory that receives first and second castout operations both specifying a same address. In response to receiving said first and second castout operations, the memory controller performs a single update to the system memory.

In still another embodiment, a cache coherent data processing system includes at least first and second coherency domains each including at least one processing unit. The first coherency domain includes a first cache memory and a second cache memory, and the second coherency domain includes a remote coherent cache memory. The first cache memory includes a cache controller, a data array including a data storage location for caching a memory block, and a cache directory. The cache directory includes a tag field for storing an address tag in association with the memory block and a coherency state field associated with the tag field and the data storage location. The coherency state field has a plurality of possible states including a state that indicates that the memory block is possibly shared with the second cache memory in the first coherency domain and cached only within the first coherency domain.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

I. Exemplary Data Processing System

Figure 1:
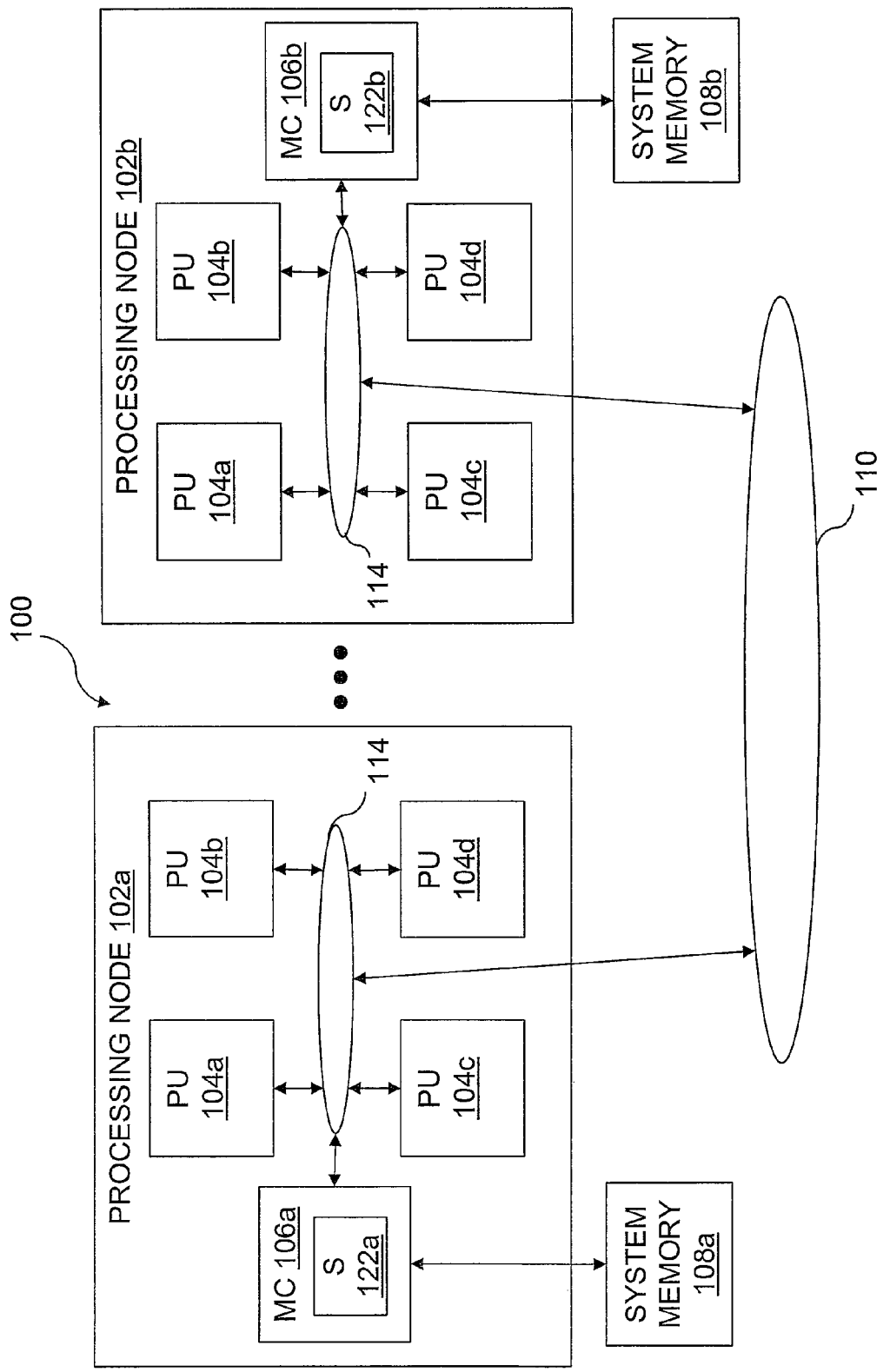
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect. On exemplary embodiment of system interconnect 110 may be found in above-referenced U.S. patent application Ser. No. 11/055,476.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches.

The devices attached to each local interconnect 114 include not only processing units 104, but also one or more memory controllers 106, each providing an interface to a respective system memory 108. Data and instructions residing in system memories 108 can generally be accessed and modified by a processor core in any processing unit 104 in any processing node 102 of data processing system 100. In alternative embodiments of the invention, one or more memory controllers 106 (and system memories 108) can be coupled to system interconnect 110 rather than a local interconnect 114, or alternatively, integrated within another device such as a processing unit 104.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
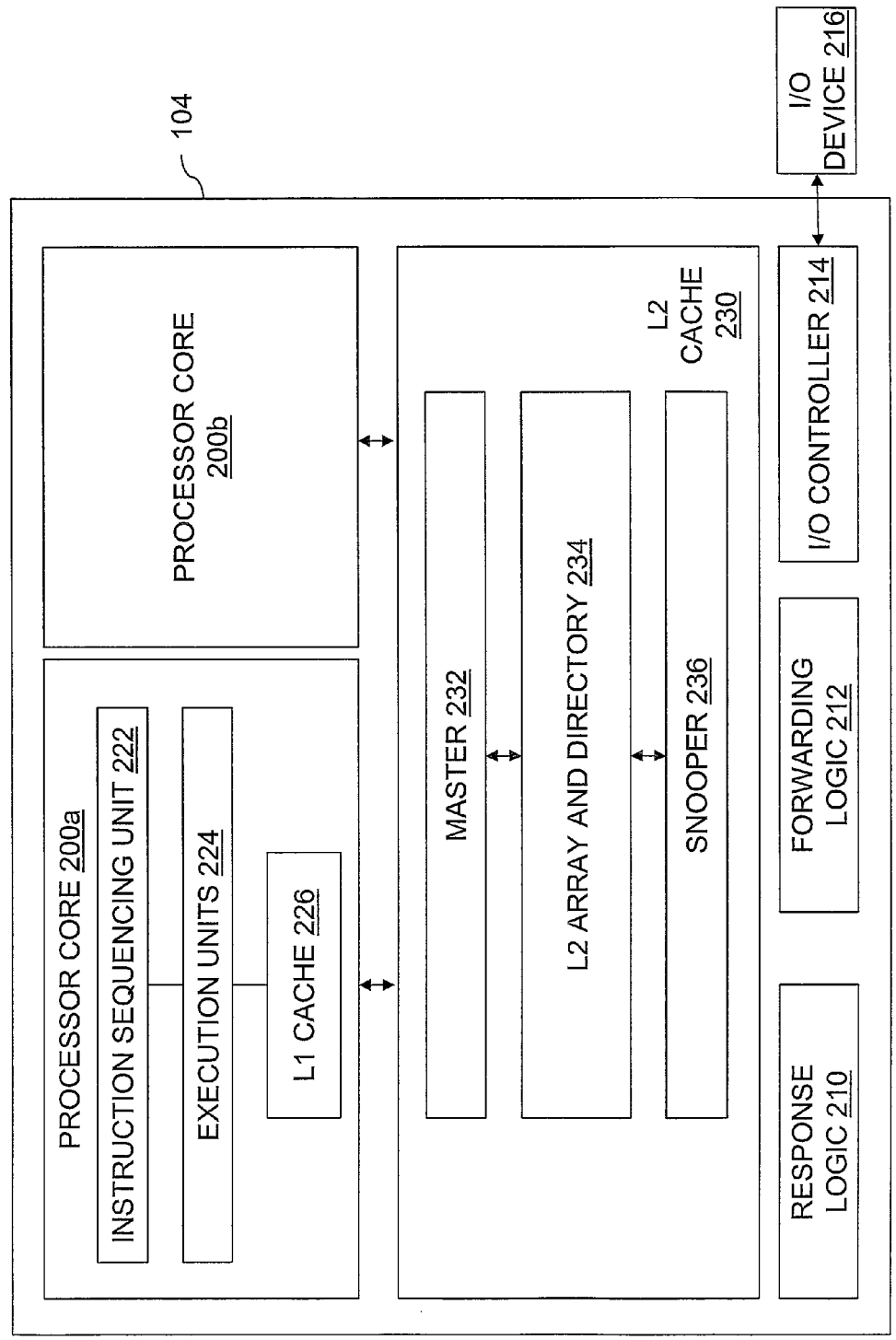
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 222 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level volatile memory hierarchy having at its lowest level shared system memories 108, and at its upper levels one or more levels of cache memory, which in the illustrative embodiment include a store-through level one (L1) cache 226 within each processor core 200 and a level two (L2) cache 230 shared by all processor cores 200a, 200b of the processing unit 104. L2 cache 230 includes an L2 array and directory 234, a master 232 and a snooper 236. Master 232 initiates transactions on local interconnect 114 and system interconnect 110 and accesses L2 array and directory 234 in response to memory access (and other) requests received from the associated processor cores 200. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an instance of response logic 210, which as discussed further below, implements a portion of the distributed coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. As discussed further below, an I/O controller 214 may issue read and write operations on its local interconnect 114 and system interconnect 110, for example, in response to requests by its attached I/O device(s) 216.

Figure 3:
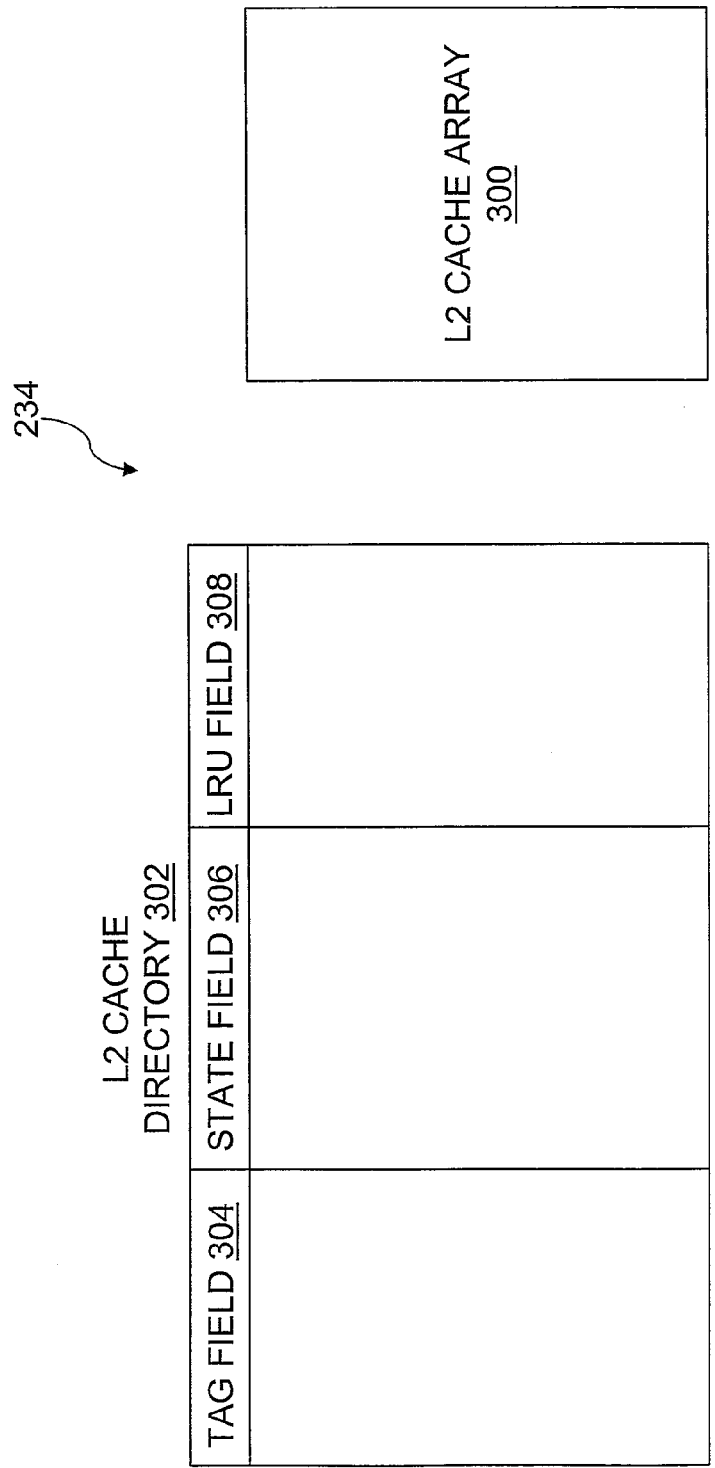
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

II. Exemplary Operations and Cache Coherency Protocol

Figure 4:
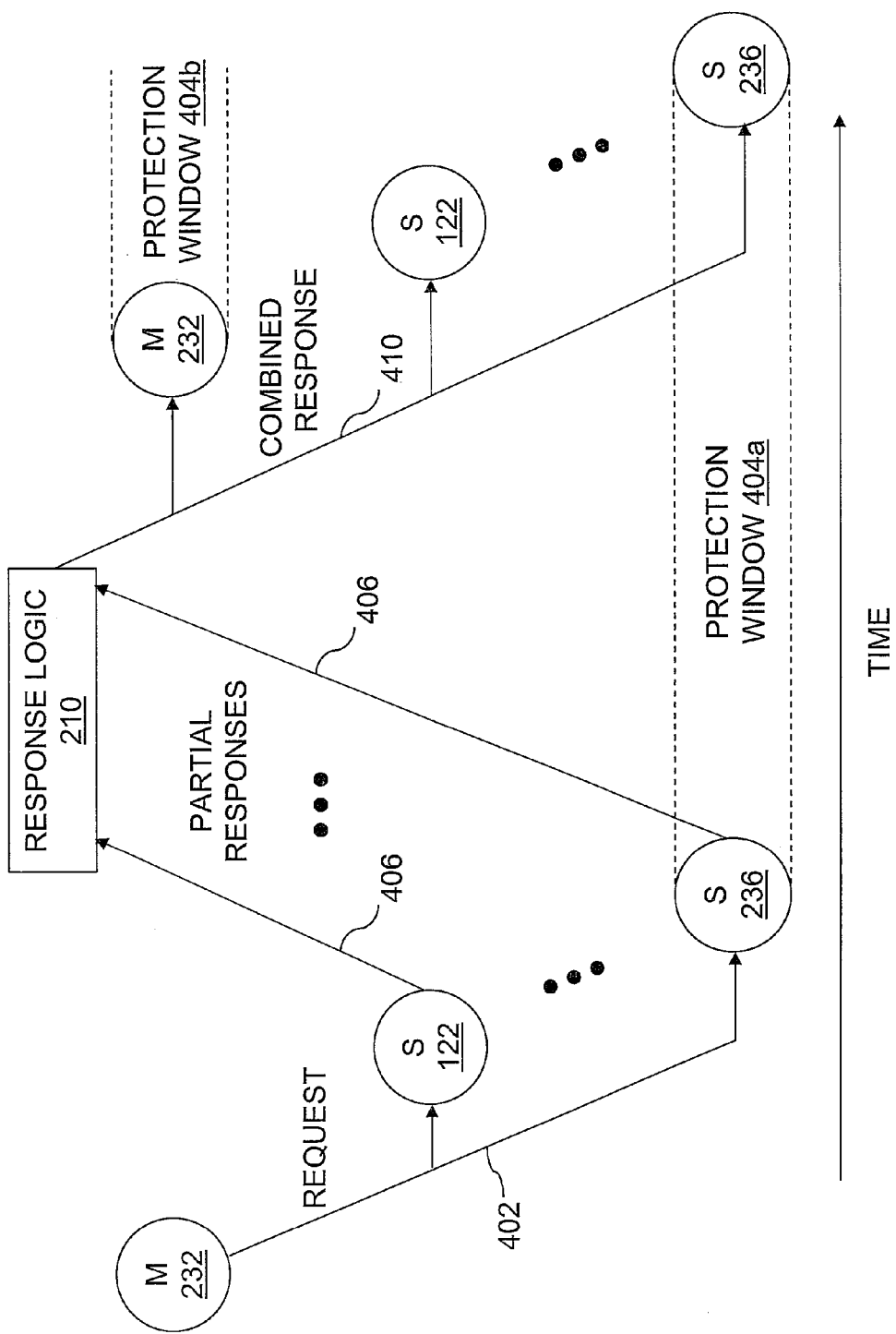
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on an interconnect 110, 114. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 122a, 122b of memory controllers 106a, 106b (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. In response to request 402, each snooper 122, 236 receiving request 402 provides a respective partial response 406 representing the response of at least that snooper to request 402. A snooper 122 within a memory controller 106 determines the partial response 406 to provide based, for example, whether the snooper 122 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the cache state associated with the request address in L2 cache directory 302.

The partial responses of snoopers 122 and 236 are logically combined either in stages or all at once by one or more instances of response logic 210 to determine a system-wide combined response (CR) 410 to request 402. Response logic 210 provides combined response 410 to master 232 and each snooper 122, 236 via its local interconnect 114 and system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" operations invalidating the requested memory block in one or more L2 caches 230 are required.

In response to receipt of combined response 410, one or more of master 232 and snoopers 122, 236 typically perform one or more operations in order to service request 402. These operations may include supplying data to master 232, invalidating or otherwise updating the coherency state of data cached in one or more L2 caches 230, performing castout operations, writing back data to a system memory 108, etc. As discussed further below, if required by request 402, a requested or target memory block may be transmitted to or from master 232 before or after the generation of combined response 410 by response logic 210.

In the following description, partial response of a snooper 122, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 106 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Although other indicators may be utilized to designate an HPC for a memory block, a preferred embodiment of the present invention designates the HPC, if any, for a memory block utilizing selected cache coherency state(s) within the L2 cache directory 302 of an L2 cache 230. In this preferred embodiment, the set of cache coherency states, in addition to providing (1) an indication of whether the cache is the HPC for a memory block, also indicate (2) whether the cached copy is unique (i.e., is the only cached copy) among caches at that memory hierarchy level, (3) whether and when the cache can provide a copy of the memory block to a master of a request, and (4) whether the cached image of the memory block is consistent with the corresponding memory block in the LPC. These four attributes can be expressed, for example, in a variant of the well-known MESI (Modified, Exclusive, Shared, Invalid) protocol summarized below in Table II.

TABLE II

| Cache state | HPC? | Unique? | Data source? | Consistent with LPC? | Legal concurrent states |
|---|---|---|---|---|---|
| M | yes | yes | yes, before CR | no | I (& LPC) |
| Me | yes | yes | yes, before CR | yes | I (& LPC) |
| T | yes | unknown | yes, after CR if none provided before CR | no | Sr, S, I, (& LPC) |
| Te | yes | unknown | yes, after CR if none provided before CR | yes | Sr, S, I (& LPC) |
| Sr | no | unknown | yes, before CR | unknown | T, Te, S, I (& LPC) |
| S | no | unknown | no | unknown | T, Te, Sr, S, I (& LPC) |
| I | no | n/a | no | n/a | M, Me, T, Te, Sr, S, I (& LPC) |

A. Master Operation

With reference now generally to FIGS. 5-17, several high level logical flowcharts depicting the logical steps involved in servicing requests of processor cores 200 and I/O controllers 214 are given. In particular, FIGS. 5-10 depict the various processes within masters of the requests, and FIGS. 11-17 illustrate operations involved with communicating and servicing the requests via local and system interconnects 114, 110. As logical flowcharts, it should be understood that these figures are not intended to convey a strict chronology of operations and that many of the illustrated operations may be performed concurrently or in a different order than that shown.

Figure 5:
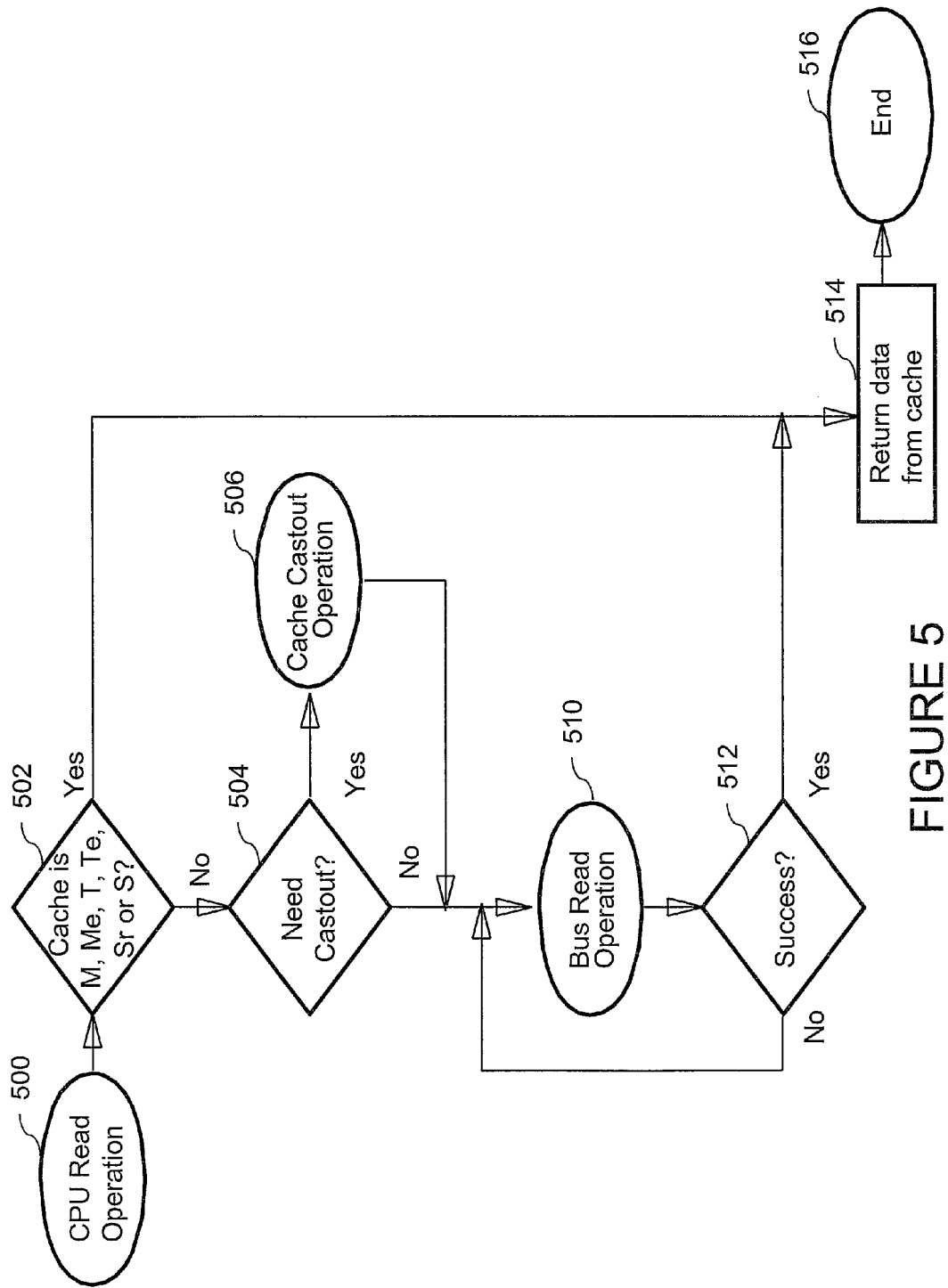
FIG. 5 is a high level logical flowchart of an exemplary method of servicing a read request by a processor core.

Referring first to FIG. 5, there is depicted a high level logical flowchart of an exemplary method of servicing a read request by a processor core. As shown, the process begins at block 500, which represents a master 232 of an L2 cache 230 receiving from an associated processor core 200 a read request specifying a requested memory block. In response to receipt of the read request, master 232 determines at block 502 whether or not the requested memory block is held in L2 cache directory 302 in any of the M, Me, T, Te, Sr or S states. If so, master 232 accesses its L2 cache array 300 to obtain the requested memory block and supplies the requested memory block to the requesting processor core 200, as shown at block 514. The process thereafter terminates at block 516.

Returning to block 502, in response to a determination to the requested memory block is not held in L2 directory 302 in any of the M, Me, T, Te, S, or Sr states, a determination is next made at block 504 whether or not a castout of an existing cache line is required to accommodate the requested memory block in L2 cache 230. If so, a master 232 initiates a cache castout operation, as indicated at block 506 and described in greater detail below with reference to FIG. 10. Concurrently, master 232 issues a bus read operation on interconnects 110, 114, as illustrated at block 510 and as described in greater detail below with reference to FIG. 11A. If the combined response (CR) of the bus read operation does not indicate a "success" at block 512, the bus read operation is repeated at block 510 until a CR indicating "success" is received. If the CR of the bus read operation indicates "success", the master 232 receives the requested memory block and returns the requested memory block (or at least a portion thereof) to the requesting processor core at block 514. The process thereafter terminates at block 516.

Figure 6:
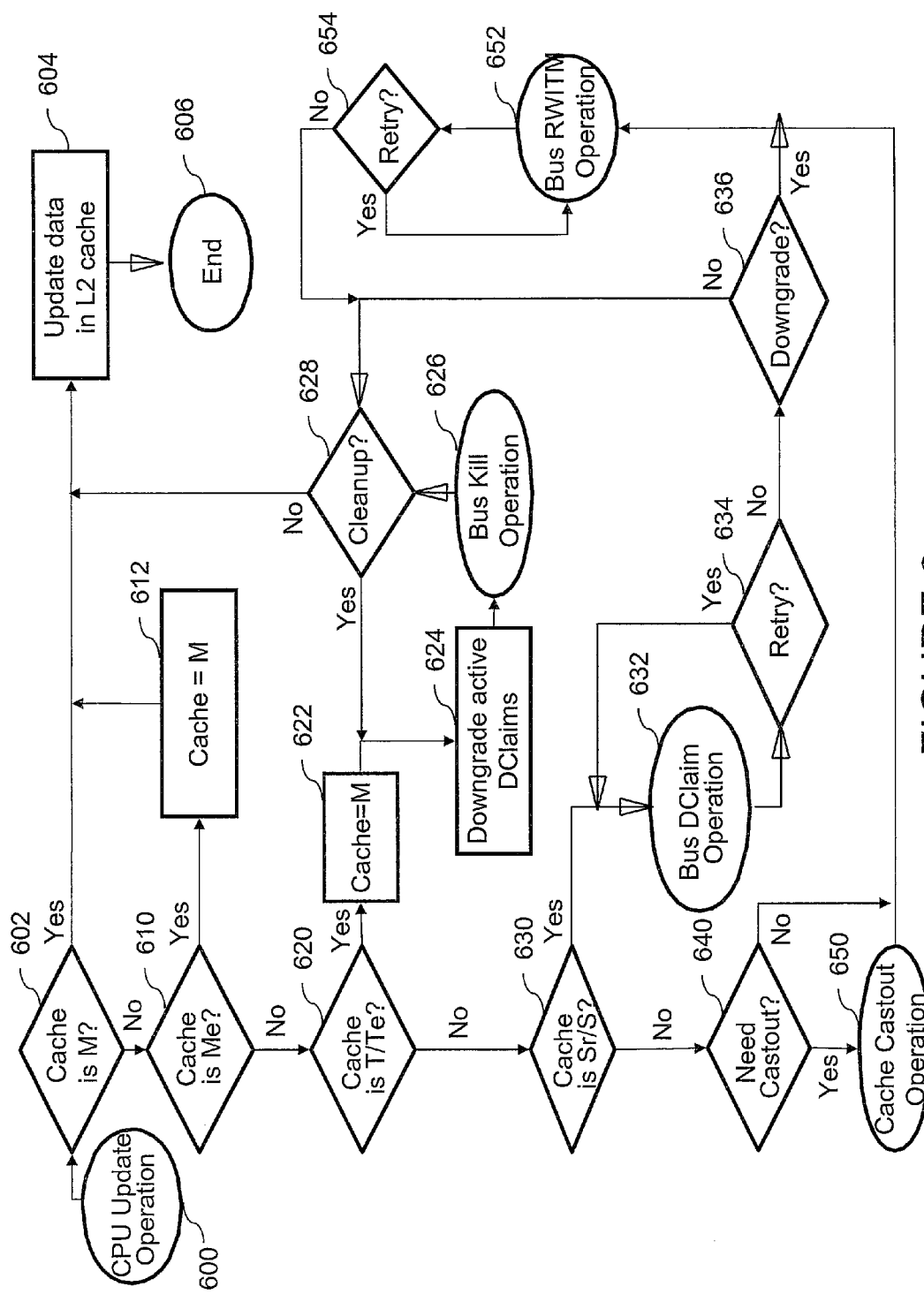
FIG. 6 is a high level logical flowchart of an exemplary method of servicing an update request by a processor core.

With reference now to FIG. 6, there is illustrated a high level logical flowchart of an exemplary method of servicing an update request by a processor core. The process begins at block 600 in response to receipt by an L2 cache 230 of an update request by an associated one of the processor cores 200 within the same processing unit 104. In response to the receipt of the update request, master 232 of the L2 cache 230 accesses L2 cache directory 302 to determine if the memory block referenced by the request address specified by the update request is cached within L2 cache 230 in M state, as shown at block 602. If so, the master 232 updates the memory block in L2 cache 232 with the new data supplied by the processor core 200, as illustrated at block 604. Thereafter, the update process ends at block 606.

As shown at blocks 610-612, if L2 cache directory 302 instead indicates that L2 cache 230 holds the specified memory block in the Me state, master 232 updates the state field 306 for the requested memory block to M state in addition to updating the memory block as shown at block 604. Thereafter, the process terminates at block 606.

As depicted at block 620, if the L2 cache directory 302 indicates that L2 cache 230 holds the requested memory block in either of the T or Te states, meaning that the L2 cache 230 is the HPC for the requested memory block and the requested memory block may possibly be held in one or more other L2 caches 230, master 232 must gain exclusive access to the requested memory block in order to perform the requested update to the memory block. The process by which master 232 gains exclusive access to the requested memory block is shown at blocks 622-628.

According to this process, master 232 updates the state of the requested memory block in the associated state field 306 of L2 cache directory 302 to the M state, as depicted at block 622. This upgrade in cache state is permissible without first informing other L2 caches 230 because, as the HPC, the L2 cache 230 has the authority to award itself exclusive access to the requested memory block. As illustrated at block 624, master 232 provides "downgrade" partial responses to competing DClaim operations, if any, by which other masters are seeking ownership of the requested memory block. These partial responses indicate that the other requesters must reissue any such competing requests as bus RWITM operations. In addition, as depicted at block 626, master 232 issues a bus kill operation on interconnects 110, 114 to invalidate any other cached copies of the memory block, as described in greater detail below with reference to FIG. 14. Master 232 next determines at block 628 whether or not the CR for the bus kill operation indicates that the bus kill operation successfully invalidated all other cached copies of the requested memory block or whether additional "cleanup" (i.e., invalidation of other cached copies) is required. If the CR indicates that additional cleanup is not required, the process proceeds to block 604, which has been described. If the CR indicates that additional cleanup is required, the process returns to block 624, which has been described.

Referring now to block 630, if the access to L2 cache directory 302 indicates that the requested memory block is held in the Sr or S states, L2 cache 230 is not the HPC for the requested memory block, and master 232 must gain ownership of the requested memory block from the HPC, if any, or in the absence of an HPC, the LPC, prior to updating the memory block. Accordingly, master 232 issues a bus DClaim operation on interconnects 110, 114, as depicted at block 632 and as described below with respect to FIG. 13. Master 232 next determines at blocks 634-636 whether or not the CR for the bus DClaim operation indicates that it succeeded, should be retried, or was "downgraded" to a RWITM operation. If the CR indicates that the bus DClaim operation should be retried, the process reissues a bus DClaim operation at block 632. If the CR indicates that the bus DClaim operation has been downgraded, master 232 issues a bus RWITM operation, as shown at block 652. As shown at block 654, master 232 reissues the bus RWITM operation at block 652 until a CR other than "retry" is received.

Following receipt of a CR to the bus RWITM operation other than "retry" at block 654 or in response to a determination at blocks 634-636 that the CR to the bus DClaim operation is not "retry" or "downgrade", master 232 additionally determines whether the CR indicates that one or more snoopers 236 have not invalidated a cached copy of the requested memory block. If so, cleanup operations are required, and the process passes to block 624, 626 and 628, which have been described. If, however, cleanup is not required, master 232 can now update the memory block, as depicted at block 604. Thereafter, the process ends at block 606.

With reference now to block 640, if a negative determination is made at blocks 602, 610, 620 and 630, L2 cache 230 does not hold a valid copy of the requested memory block. Accordingly, as indicated at blocks 640 and 650, L2 cache 230 performs a cache castout operation if needed to allocate a cache line for the requested memory block. Thereafter, master 232 initiates a bus RWITM operation on interconnects 110, 114 to obtain exclusive access to the requested memory block, as illustrated at block 652 and following blocks and as described above.

Figure 7:
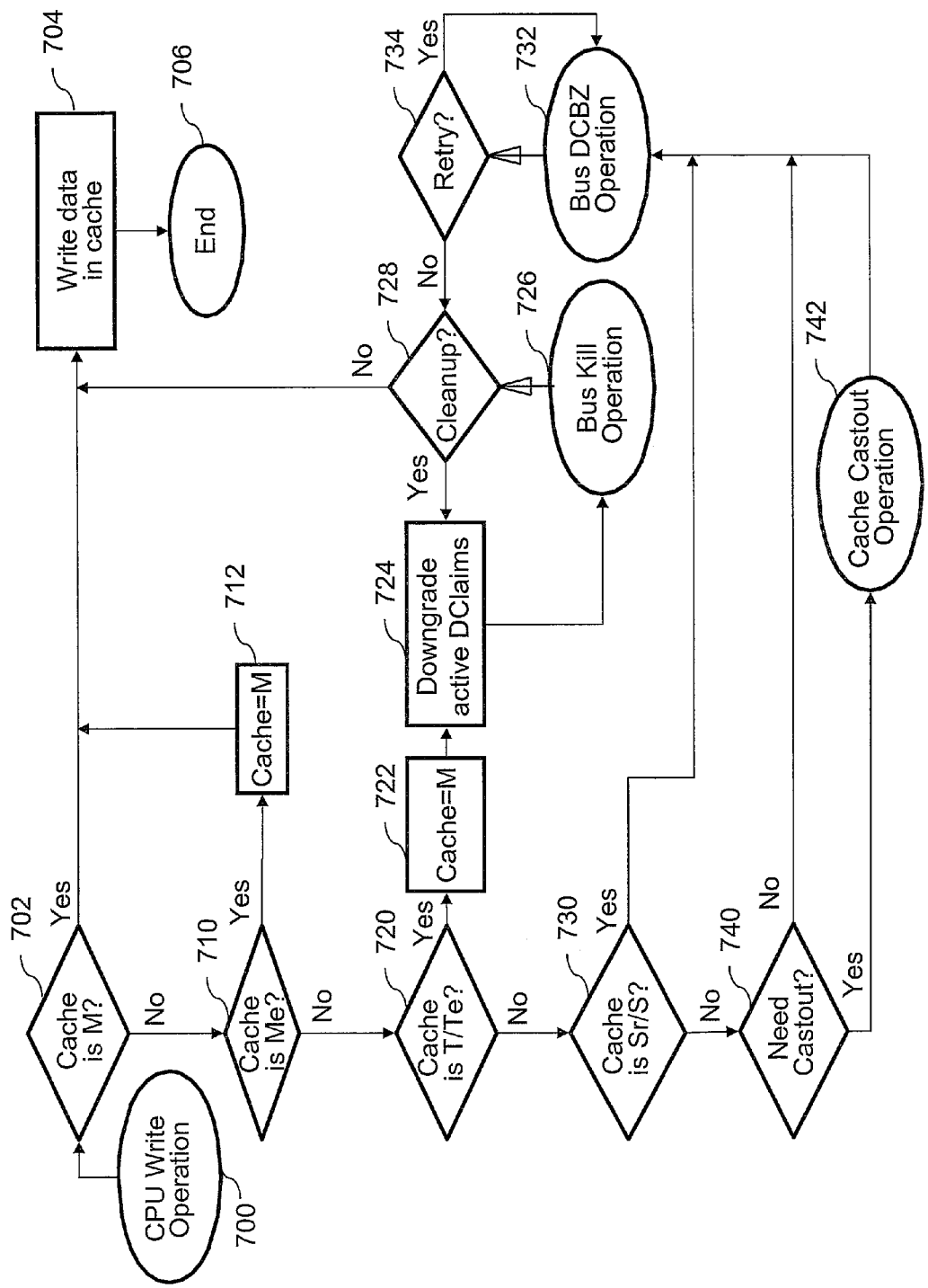
FIG. 7 is a high level logical flowchart of an exemplary method of servicing a write request by a processor core.

Referring now to FIG. 7, there is illustrated a high level logical flowchart of an exemplary method of servicing a write request by a processor core. The process begins at block 700 in response to receipt by an L2 cache 230 of a write request by an associated one of the processor cores 200 within the same processing unit 104. In response to the receipt of the write request, master 232 of the L2 cache 230 accesses its L2 cache directory 302 to determine if the memory block referenced by the request address specified by the update request is cached within L2 cache 230 in M state, as shown at block 702. If so, the master 232 writes the data supplied by the processor core 200 into L2 cache array 300, as illustrated at block 704. Thereafter, the process ends at block 706.

As shown at blocks 710-712, if L2 cache directory 302 instead indicates that L2 cache 230 holds the specified memory block in the Me state, master 232 updates the state field 306 for the requested memory block to M state in addition to writing the memory block as shown at block 704. Thereafter, the process terminates at block 706.

As depicted at block 720, if L2 cache directory 302 indicates that L2 cache 230 holds the requested memory block in either of the T or Te states, meaning that the L2 cache 230 is the HPC for the requested memory block and the requested memory block may possibly be held in one or more other L2 caches 230, master 232 must gain exclusive access to the requested memory block in order to perform the requested write to the memory block. The process by which master 232 gains exclusive access to the requested memory block is shown at blocks 722-728.

According to this process, master 232 updates the state of the requested memory block in the associated state field 306 of L2 cache directory 302 to the M state, as depicted at block 722. As illustrated at block 724, master 232 provides "downgrade" partial responses to competing DClaim operations to force other requesters for the memory block to reissue any such competing requests as bus RWITM operations. In addition, as depicted at block 726, master 232 issues a bus kill operation on interconnects 110, 114 to invalidate any other cached copies of the memory block, as described in greater detail below with reference to FIG. 14. Master 232 next determines at block 728 whether or not the CR for the bus kill operation indicates that the bus kill operation successfully invalidated all other cached copies of the requested memory block or whether additional "cleanup" (i.e., invalidation of other cached copies) is required. If the CR indicates that additional cleanup is not required, the process proceeds to block 704, which has been described. If the CR indicates that additional cleanup is required, the process returns to block 724, which has been described.

Referring now to block 730, if the access to L2 cache directory 302 indicates that the requested memory block is held in the Sr or S states, L2 cache 230 is not the HPC for the requested memory block, and master 232 must gain ownership of the requested memory block from the HPC, if any, or in the absence of an HPC, the LPC, prior to writing the memory block. Accordingly, master 232 issues a bus DCBZ operation on interconnects 110, 114, as depicted at block 732 and as described below with respect to FIG. 15. As shown at block 734, master 232 reissues the bus DCBZ operation at block 732 until a CR other than "retry" is received. Following receipt of a CR to the bus DCBZ operation other than "retry" at block 734, the process passes to block 728 and following blocks, which have been described.

With reference now to block 740, if a negative determination is made at blocks 702, 710, 720 and 730, L2 cache 230 does not hold a valid copy of the requested memory block. Accordingly, as indicated at block 740 and 742, L2 cache 230 performs a cache castout operation if needed to allocate a cache line for the requested memory block. Thereafter, master 232 initiates a bus DCBZ operation on interconnects 110, 114, as illustrated at block 732 and following blocks and as described above.

Figure 8:
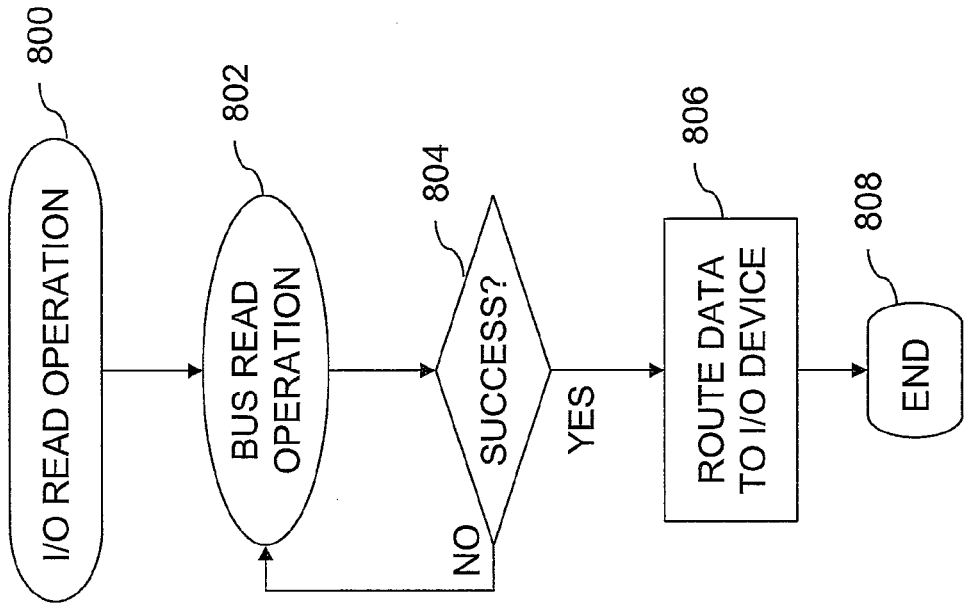
FIG. 8 is a high level logical flowchart of an exemplary method of performing an I/O read operation.

With reference now to FIG. 8, there is depicted a high level logical flowchart of an exemplary method of performing an I/O read operation. As shown, the process begins at block 800 in response to receipt by an I/O controller 214 of a processing unit 104 of an I/O read request by an attached I/O device 216. In response to receipt of the I/O read request, I/O controller 214 issues a bus read operation on system interconnect 110 via local interconnect 114, as depicted at block 802 and described below with reference to FIG. 11A. As indicated at block 804, I/O controller 214 continues to issue the bus read operation until a CR is received indicating "success". Once the bus read operation succeeds, I/O controller 214 routes the data received in response to the bus read operation to the requesting I/O device 216, as illustrated at block 806. The process thereafter terminates at block 808.

Figure 9A:
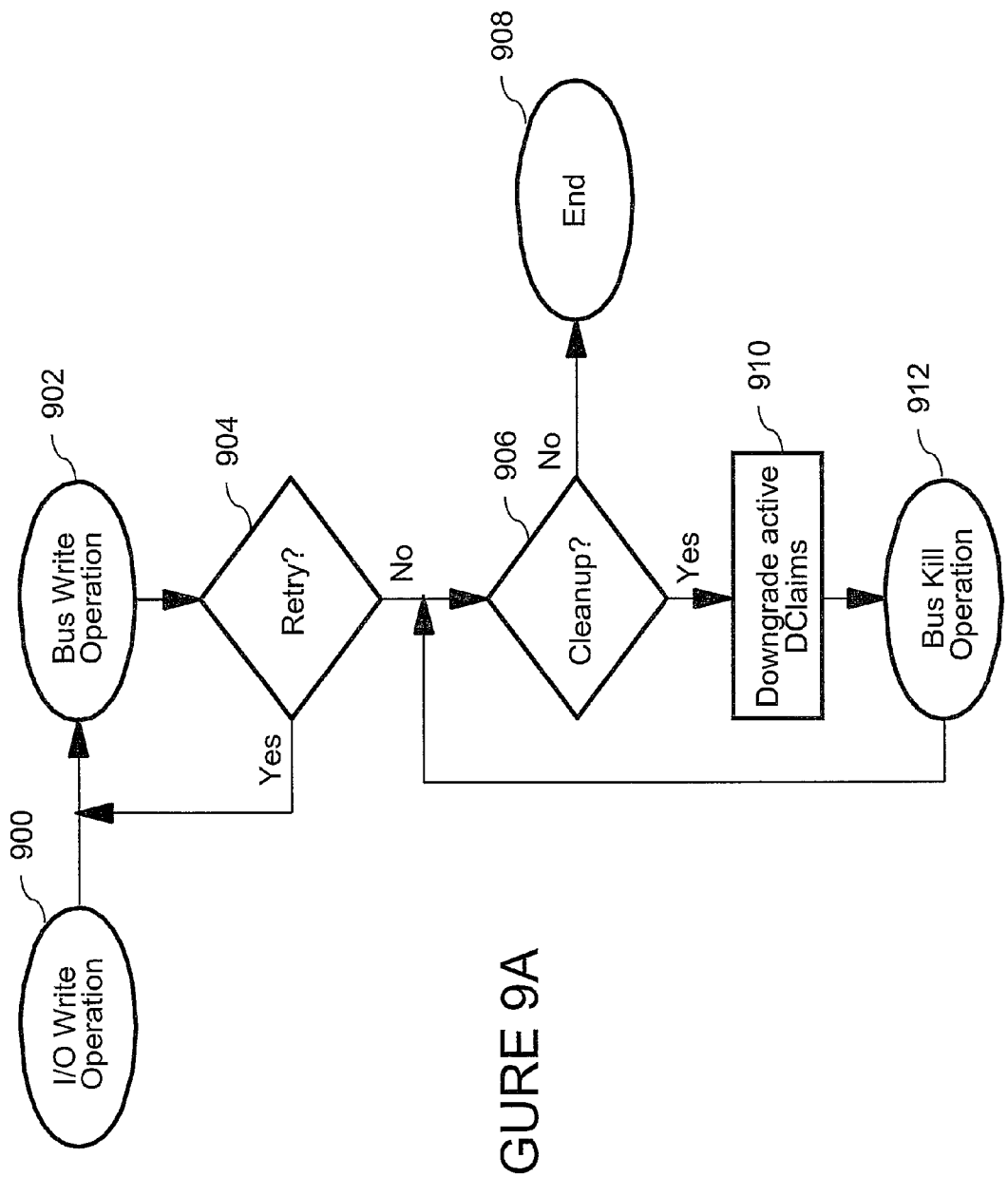
FIG. 9A is a high level logical flowchart of an exemplary method of performing an I/O write operation.

Referring now to FIG. 9A, there is depicted a high level logical flowchart of an exemplary method of performing an I/O write operation. As shown, the process begins at block 900 in response to receipt by an I/O controller 214 of a processing unit 104 of an I/O write request by an attached I/O device 216. In response to receipt of the I/O write request, I/O controller 214 issues a bus write operation on system interconnect 110 via local interconnect 114, as depicted at block 902 and described below with reference to FIG. 17A. As indicated at block 904, I/O controller 214 continues to issue the bus write operation until a CR other than "retry" is received.

If the CR indicates that no other snooper 236 holds a valid copy of the requested memory block, the process passes from block 904 to block 906 and ends at block 908. If, however, I/O controller 214 determines at block 906 that the CR indicates that at least one stale cached copy of the requested memory block may remain, I/O controller 214 performs "cleanup" by downgrading any conflicting DClaim operations snooped on local interconnect 114, as shown at block 910, and issuing bus kill operations, as depicted at block 912, until a CR is received at block 906 indicating that no stale copies of the requested memory block remain in data processing system 100. Once cleanup operations are complete, the process ends at block 908.

Figure 9B:
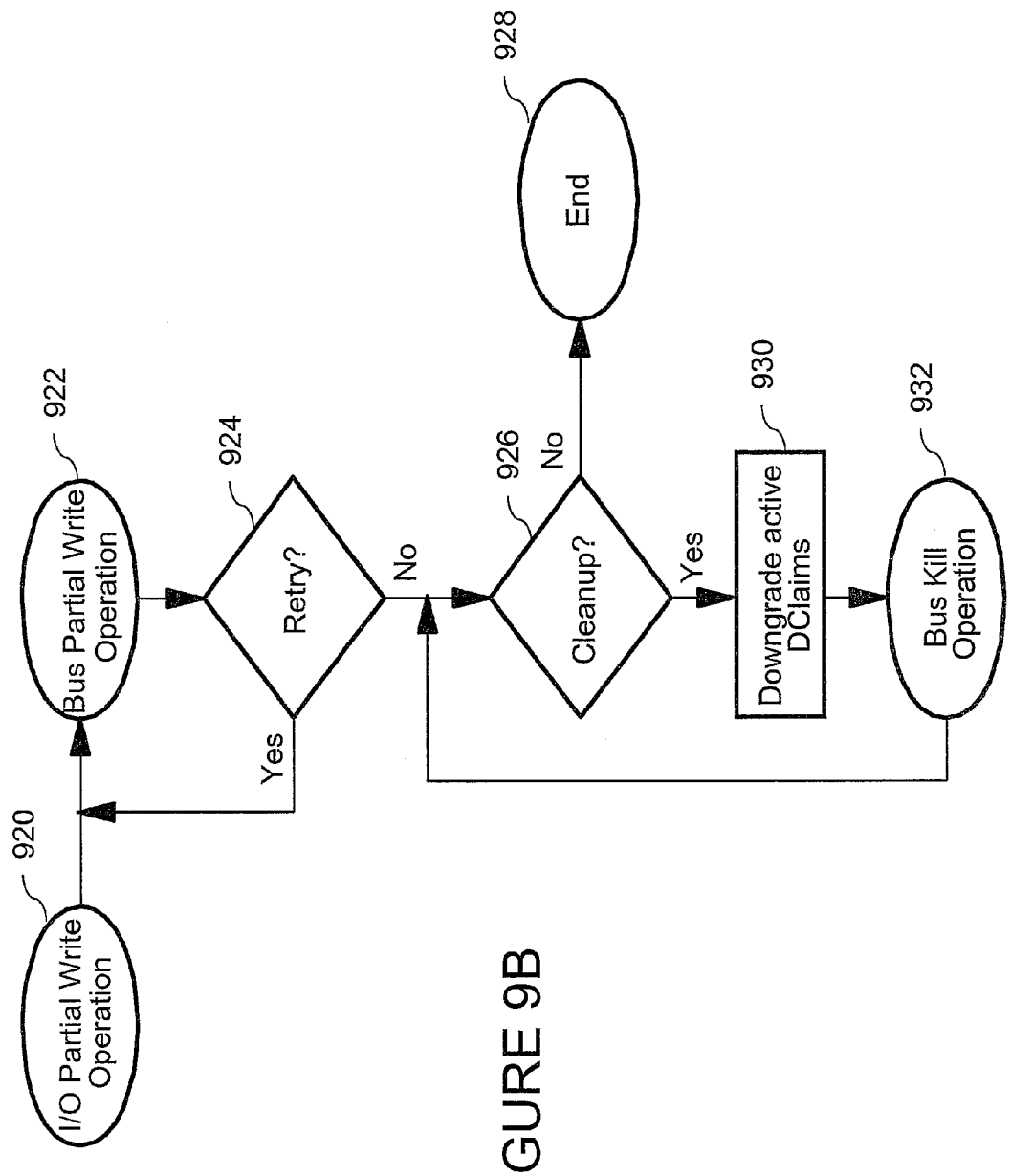
FIG. 9B is a high level logical flowchart of an exemplary method of performing an I/O partial write operation.

With reference now to FIG. 9B, there is illustrated a high level logical flowchart of an exemplary method of performing an I/O partial write operation in accordance with the present invention. As shown, the process begins at block 920 in response to receipt by the I/O controller 214 of a processing unit 104 of an I/O partial write request (i.e., a request to write a portion of a memory block) by an attached I/O device 216. In response to receipt of the I/O partial write request, I/O controller 214 issues a bus partial write operation on system interconnect 110 via local interconnect 114, as depicted at block 922 and described below with reference to FIG. 17B. As indicated at block 924, I/O controller 214 continues to issue the bus partial write operation until a CR other than "retry" is received.

If the CR indicates that no other snooper holds a valid copy of the requested memory block, the process passes from block 924 to block 926 and ends at block 928. If, however, I/O controller 214 determines at block 926 that the CR indicates that at least one stale cached copy of the requested memory block may remain, I/O controller 214 performs "cleanup" by downgrading any conflicting DClaim operations, as shown at block 930, and issuing bus kill operations, as depicted at block 932, until a CR is received at block 926 indicating that no stale cached copies of the requested memory block remain in data processing system 100. Once cleanup operations are complete, the process ends at block 928.

Figure 10:
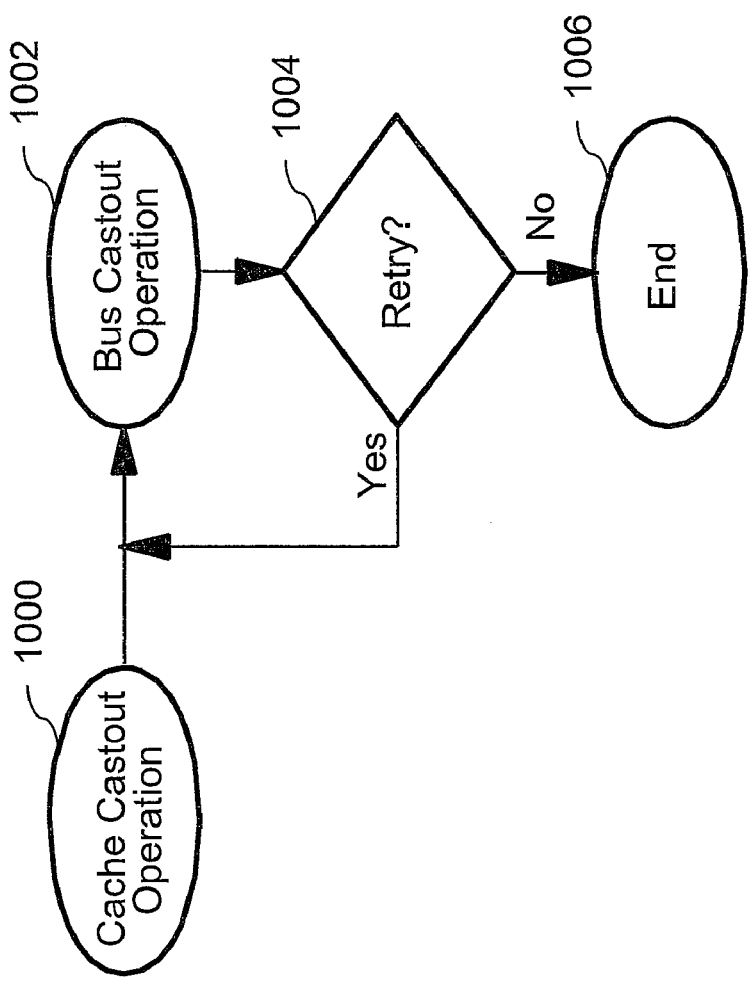
FIG. 10 is a high level logical flowchart of an exemplary method of performing a cache castout operation.

With reference now to FIG. 10, there is illustrated a high level logical flowchart of an exemplary method by which an L2 cache 230 performs a cache castout operation. The illustrated process begins at block 1000 when an L2 cache 230 determines that a castout of a cache line is needed, for example, at block 506 of FIG. 5, block 650 of FIG. 6, or block 742 of FIG. 7. To perform the castout operation, the L2 cache 230 issues a bus castout operation on system interconnect 110 via local interconnect 114, as shown at block 1002. As indicated at block 1004, the L2 cache 230 issues the bus castout operation until a CR other than "retry" is received. Thereafter, the process ends at block 1006.

Because snoopers 122, 236 all have limited resources for handling the CPU and I/O requests described above, several different levels of partial responses and corresponding CRs are possible. For example, if a snooper 122 within a memory controller 106 that is responsible for a requested memory block has a queue available to handle a request, the snooper 122 may respond with a partial response indicating that it is able to serve as the LPC for the request. If, on the other hand, the snooper 122 has no queue available to handle the request, the snooper 122 may respond with a partial response indicating that is the LPC for the memory block, but is unable to currently service the request.

Similarly, a snooper 236 in an L2 cache 230 may require an available instance of snoop logic 236 and access to L2 cache directory 302 in order to handle a request. Absence of access to either (or both) of these resources results in a partial response (and corresponding CR) signaling an inability to service the request due to absence of a required resource.

Hereafter, a snooper 122, 236 providing a partial response indicating that the snooper has available all internal resources required to service a request, if required, is said to "affirm" the request. For snoopers 236, partial responses affirming a snooped operation preferably indicate the cache state of the requested or target memory block at that snooper 236. A snooper 236 providing a partial response indicating that the snooper 236 does not have available all internal resources required to service the request may be said to be "possibly hidden." Such a snooper 236 is "possibly hidden" because the snooper 236, due to lack of an available instance of snoop logic or access to L2 cache directory 302, cannot "affirm" the request in sense defined above and has, from the perspective of other masters 232 and snoopers 122, 236, an unknown coherency state.

B. Interconnect Operations

Referring now to FIGS. 11-17, there are depicted high level logical flowcharts depicting the manner in which operations on local interconnect 114 and/or system interconnect 110 are serviced in one implementation of data processing system 100. Even though interconnects 110, 114 are not necessarily bused interconnects, such operations are termed "bus operations" (e.g., bus read operation, bus write operation, etc.) herein to distinguish them from cache or CPU (processor) operations.

Figure 11A:
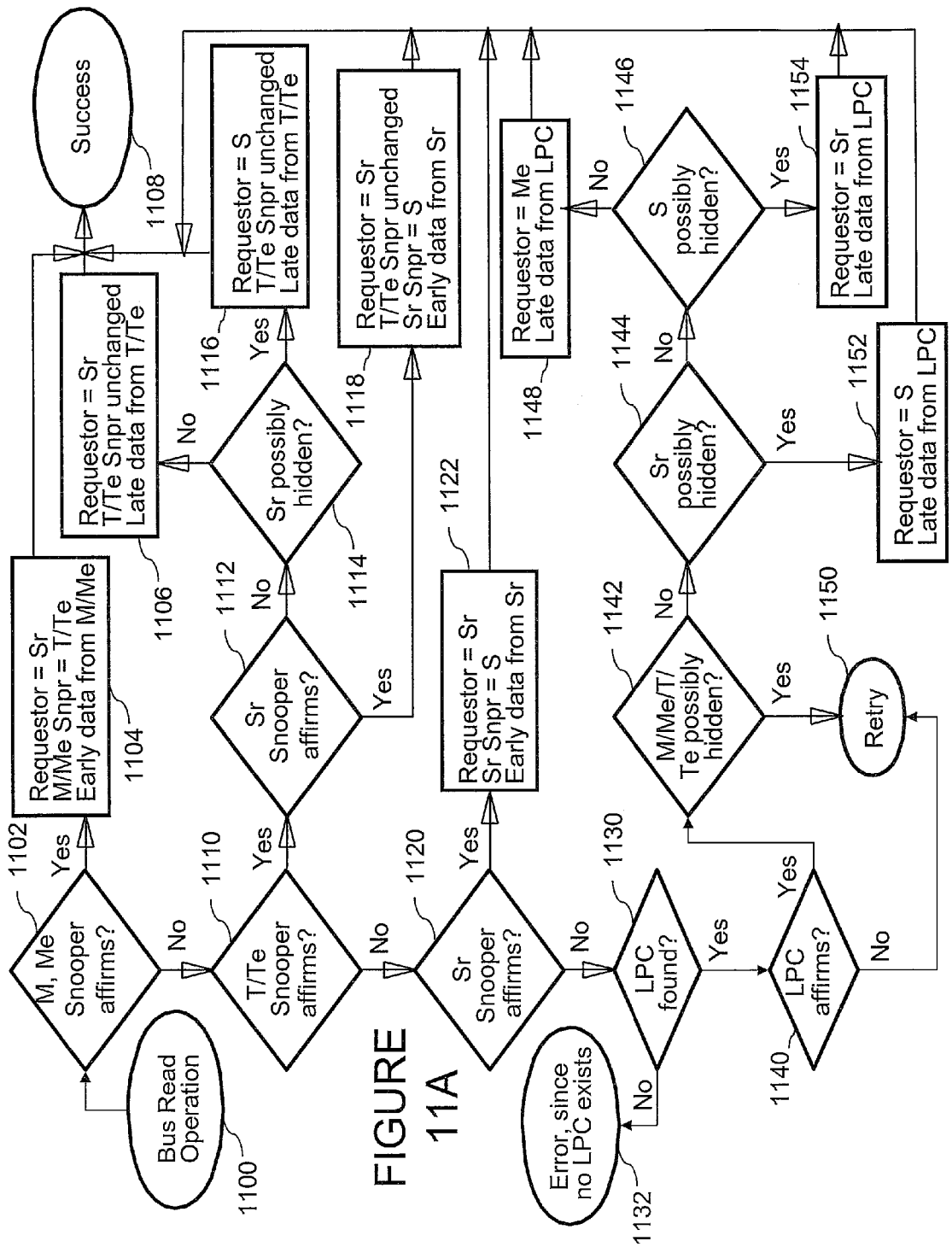
FIG. 11A is a high level logical flowchart of an exemplary method of performing a bus read operation.

Referring specifically to FIG. 11A, there is depicted a high level logical flowchart of an exemplary method of performing a bus read operation. The process begins at block 1100, for example, at block 510 of FIG. 5, with a master 232 of an L2 cache 230 issuing a bus read operation on interconnects 110, 114. As described above with respect to FIG. 4, the operations performed by the various snoopers 122, 236 in response to the bus read operation depend upon the partial responses and CR for the bus read operation. The various partial responses that snoopers 122, 236 may provide to distributed response logic 210 are represented in FIG. 11A by the outcomes of decision blocks 1102, 1110, 1112, 1114, 1120, 1130, 1140, 1142 1144 and 1146. These partial responses in turn determine the CR for the bus read operation.

If a snooper 236 affirms the bus read operation with a partial response indicating that the L2 cache 230 containing the snooper 236 holds the requested memory block in either of the M or Me states as shown at block 1102, the process proceeds from block 1102 to block 1104. Block 1104 indicates the operations of the master in the requesting L2 cache 230 and the affirming L2 cache 230 in response to the request. In particular, the snooper 236 in the affirming L2 cache 230 updates the cache state of the requested memory block from M to T or from Me to Te. In addition, the snooper 236 in the affirming L2 cache 230 may initiate transmission of the requested memory block to the requesting L2 cache 230 prior to receipt of the CR (i.e., provides "early" data). Upon receipt, the master 232 in the requesting L2 cache 230 places the requested memory block in L2 cache array 300 in the Sr state. The process ends with distributed response logic 210 generating a CR indicating "success", as depicted at block 1108.

If, on the other hand, a snooper 236 affirms the bus read operation with a partial response indicating that the L2 cache 230 containing the snooper 236 holds the requested memory block in either of the T or Te states (block 1110) and an Sr snooper 236 also affirms the bus read operation (block 1112), the process passes to block 1118. Block 1118 represents the Sr snooper 236 updating the cache state of the requested memory block to S and initiating transmission of the requested memory block to the requesting L2 cache 230 prior to receipt of the CR (i.e., provides "early" data). Upon receipt, the master 232 in the requesting L2 cache 230 places the requested memory block in L2 cache array 300 in the Sr state. The process ends with distributed response logic 210 generating a CR indicating "success", as depicted at block 1108.

If the complex of partial responses includes a T or Te snooper 236 affirming the bus read operation, no Sr snooper 236 affirming the bus read operation, and a snooper 236 providing an partial response (e.g., a type of retry) that indicates an Sr snooper 236 may be possibly hidden, the process passes to block 1116. Block 1116 represents the T or Te snooper 236 that affirmed the bus read operation initiating transmission of the requested memory block to the requesting L2 cache 230 after receipt of the CR (i.e., provides "late" data) and retaining the requested memory block in the T or Te state. Upon receipt, the master 232 in the requesting L2 cache 230 places the requested memory block in L2 cache directory 300 in the S state (since an Sr snooper 236 may be hidden and only one Sr snooper 236 is permitted for the requested memory block). The process ends with distributed response logic 210 generating a CR indicating "success", as depicted at block 1108.

If the complex of partial responses includes a T or Te snooper 236 affirming the bus read operation, no Sr snooper 236 affirming the bus read operation, and no snooper 236 providing a partial response that may possibly hide a Sr snooper 236, the process passes to block 1106. Block 1106 represents the T or Te snooper 236 that affirmed the bus read operation initiating transmission of the requested memory block to the requesting L2 cache 230 after receipt of the CR (i.e., provides "late" data) and retaining the requested memory block in the T or Te state. Upon receipt, the master 232 in the requesting L2 cache 230 places the requested memory block in L2 cache array 300 in the Sr state (since no other Sr snooper 236 exists for the requested memory block). The process ends with distributed response logic 210 generating a CR indicating "success", as depicted at block 1108.

Referring now to block 1120, if no M, Me, T or Te snooper 236 affirms the bus read operation, but an Sr snooper 236 affirms the bus read operation, the bus read operation is serviced in accordance with block 1122. In particular, the Sr snooper 236 affirming the bus read operation initiates transmission of the requested memory block to the requesting L2 cache 230 prior to receipt of CR and updates the state of the requested memory block in its L2 cache directory 302 to the S state. The master 232 in the requesting L2 cache 230 places the requested memory block in L2 cache array 300 in the Sr state. The process ends with distributed response logic 210 generating a CR indicating "success", as depicted at block 1108.

Turning now to block 1130, if no M, Me, T, Te or Sr snooper 236 affirms the bus read operation, and further, if no snooper 122 provides a partial response indicating that it is responsible (i.e., the LPC) for the requested memory block, an error occurs causing processing to halt, as depicted at block 1132. If, on the other hand, no M, Me, T, Te or Sr snooper 236 affirms the bus read operation and a snooper 122 provides a partial response indicating that it is responsible (i.e., the LPC) for the requested memory block but does not affirm the bus read operation (block 1140), response logic 210 generates a CR indicating "retry", as depicted at block 1150. As indicated by decision block 1142, response logic 210 similarly generates a "retry" CR at block 1150 if a memory controller snooper 122 affirms the bus read operation and an L2 cache snooper 236 provides a partial response indicating that it may hold the requested memory block in one of the M, Me, T, or Te states but cannot affirm the bus read operation.

With reference now to block 1144, if no M, Me, T, Te or Sr snooper 236 affirms the bus read operation, no M, Me, T, Te snooper 236 is possibly hidden, a snooper 122 affirms the bus read operation, and a Sr snooper 236 may be possibly hidden, response logic 210 generates a CR indicating "success", as depicted at block 1108. In response to the CR, the affirming LPC snooper 122 provides the requested memory block to the requesting L2 cache 230, which then holds the requested memory block in the S state, as depicted at block 1152. Assuming these same conditions except for the absence of a possibly hidden Sr snooper 236, the requesting L2 cache 230 obtains the requested memory block in a state reflecting whether or not an S snooper 236 is possibly hidden. If the partial responses indicate that an S snooper 236 is not possibly hidden, the requesting L2 cache 236 obtains the requested memory block in the Me state, as depicted at block 1148. If no snooper 236 provides a partial response indicating an S snooper may be hidden, the requesting L2 cache 230 holds the requested memory block in the Sr state, as shown at block 1154.

Figure 12A:
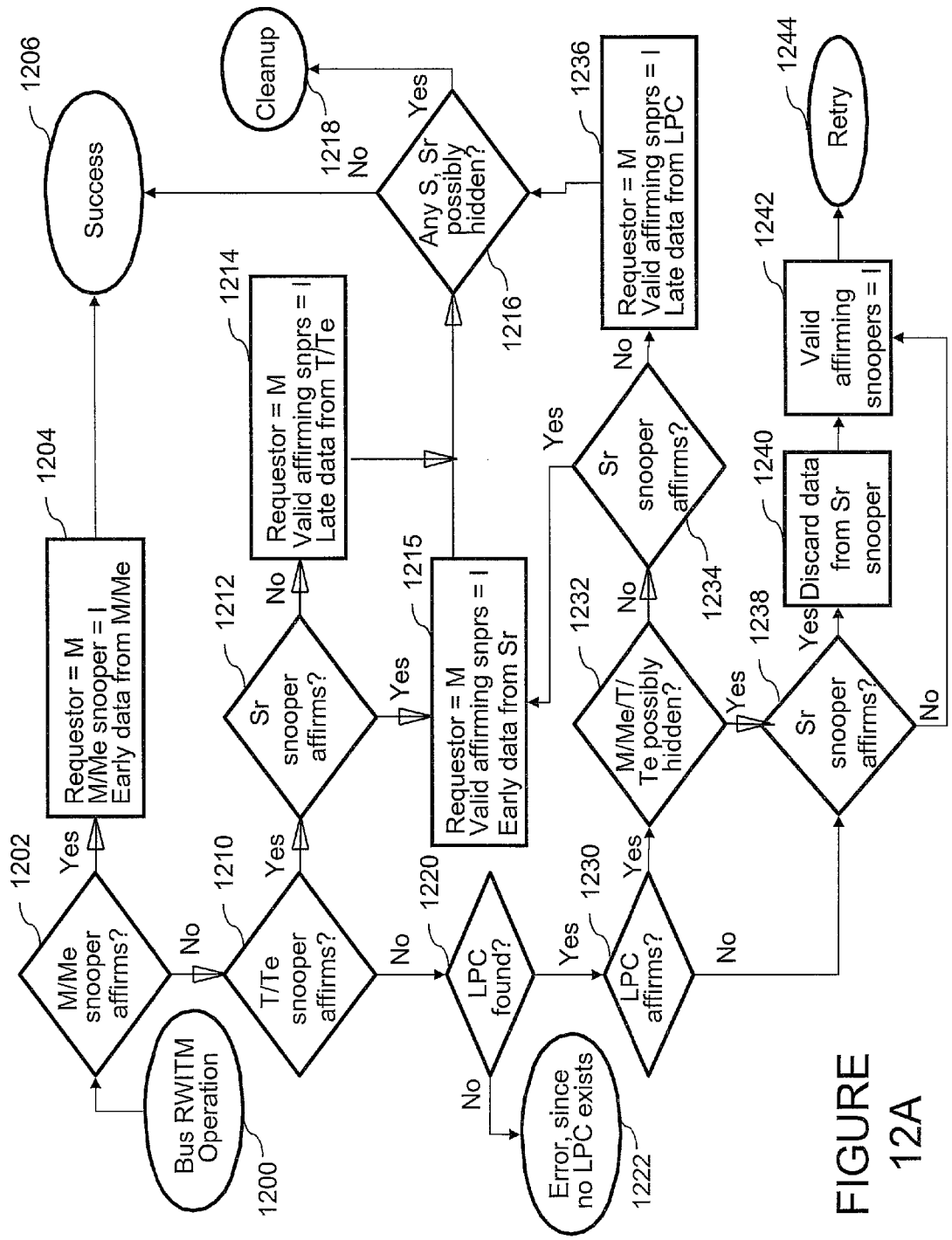
FIG. 12A is a high level logical flowchart of an exemplary method of performing a bus RWITM operation.

With reference now to FIG. 12A, there is illustrated a high level logical flowchart of an exemplary method of performing a bus RWITM operation. The process begins at block 1200, for example, with a master 232 of an L2 cache 230 issuing a bus RWITM operation on interconnects 110, 114 at block 652 of FIG. 6. As described above with respect to FIG. 4, the operations performed by the various snoopers 122, 236 in response to the bus RWITM operation depend upon the partial responses and CR for the bus RWITM operation. The various partial responses that snoopers 122, 236 may provide to distributed response logic 210 are represented in FIG. 12A by the outcomes of decision blocks 1202, 1210, 1212, 1220, 1230, 1232, 1234 and 1238. These partial responses in turn determine the CR for the bus RWITM operation.

If a snooper 236 affirms the bus RWITM operation with a partial response indicating that the L2 cache 230 containing the snooper 236 holds the requested memory block in either the M or Me state as shown at block 1202, the process proceeds from block 1202 to block 1204. Block 1204 indicates the operations of the requesting L2 cache 230 and the affirming L2 cache 230 in response to the request. In particular, the snooper 236 in the affirming L2 cache 230 updates the cache state of the requested memory block from the M state to the I state and may initiate transmission of the requested memory block to the requesting L2 cache 230 prior to receipt of the CR (i.e., provides "early" data). Upon receipt, the master 232 in the requesting L2 cache 230 places the requested memory block in L2 cache array 300 in the M state. The process ends with distributed response logic 210 generating a CR indicating "success", as depicted at block 1206.

If, on the other hand, a snooper 236 affirms the bus RWITM operation with a partial response indicating that the L2 cache 230 containing the snooper 236 holds the requested memory block in either the T or Te state as shown at block 1210 and no Sr snooper 236 affirms the bus RWITM operation as shown at block 1212, the process passes to block 1214. Block 1214 represents the T or Te snooper 236 that affirmed the bus RWITM request initiating transmission of the requested memory block to the requesting L2 cache 230 in response to receipt of the CR (i.e., provides "late" data). In response to receipt of the requested memory block, the master 232 in the requesting L2 cache 230 holds the cache state of the requested memory block to the M state. All affirming snoopers 236 update their respective cache states for the requested memory block to I. As indicated at block 1216 and as described below, the CR generated by distributed response logic 210 depends upon whether the partial responses indicate that an S or Sr snooper 236 is possibly hidden.

Returning to blocks 1210 and 1212, if the complex of partial responses includes a T or Te snooper 236 and an Sr snooper 236 affirming the bus RWITM operation, the process passes to block 1215. Block 1215 represents the Sr snooper 236 that affirmed the bus RWITM request initiating transmission of the requested memory block to the requesting L2 cache 230 prior to receipt of the CR (i.e., providing "early" data). In response to receipt of the requested memory block, the master 232 in the requesting L2 cache 230 holds the cache state of the requested memory block to the M state. All affirming snoopers 236 update their respective cache states for the requested memory block to I.

As further illustrated at blocks 1216 and 1218, the data transfer to the requesting L2 cache is permitted even in the presence of partial response(s) indicating the presence of a possibly hidden S or Sr snooper 236. If no hidden S or Sr snoopers 236 exist, the process ends with distributed response logic 210 generating a CR indicating success, as depicted at block 1206. If, on the other hand, at least one partial response indicating the presence of a possibly hidden S or Sr snooper 236 was given in response to the bus RWITM operation, distributed response logic 210 generates a CR indicating "cleanup", meaning that the requesting L2 cache 230 must issue one or more bus kill operations to invalidate the requested memory block in any such hidden S or Sr snooper 236, as described above with respect to blocks 628, 624 and 626 of FIG. 6.

Turning now to block 1220, if no M, Me, T, or Te snooper 236 affirms the bus RWITM operation, and further, if no snooper 122 provides a partial response indicating that it is responsible (i.e., the LPC) for the requested memory block, an error occurs causing processing to halt, as depicted at block 1222. If, on the other hand, no M, Me, T, or Te snooper 236 affirms the bus RWITM operation and a snooper 122 provides a partial response indicating that it is responsible (i.e., the LPC) for the requested memory block but does not affirm the bus RWITM operation (block 1230), the bus RWITM operation is handled in accordance with blocks 1238, 1240, 1242 and 1244.

In particular, blocks 1238-1240 depict that if the complex of partial responses includes an Sr snooper 236 affirming the bus RWITM request and thus providing early data, the requesting L2 cache 230 discards the copy of the requested memory block provided by the Sr snooper 236 in response to the CR. The copy of the requested memory block is discarded because no HPC is available to mediate the transfer of HPC status to the requesting master 232. In addition, as shown at blocks 1242 and 1244, each affirming snooper 236 invalidates the requested memory block in its respective L2 cache directory 302 (block 1242), and response logic 210 generates a CR indicating "retry" (block 1244). As indicated by decision block 1232, the bus RWITM operation is also handled in accordance with blocks 1238-1244 if a memory controller snooper 122 affirms the bus RWITM operation (block 1230) and an L2 cache snooper 236 provides a partial response indicating that a M, Me, T, or Te snooper 236 may be possibly hidden.

With reference now to block 1234, if no M, Me, T, or Te snooper 236 affirms the bus RWITM operation or is possibly hidden, a snooper 122 affirms the bus RWITM operation, and a Sr snooper 236 affirms the bus RWITM operation, the bus RWITM operation is serviced in accordance with block 1215, which is described above. Assuming these same conditions except for the absence of an Sr snooper 236 affirming the request, the bus RWITM operation is serviced in accordance with block 1236 and following blocks. In particular, in response to the CR, the LPC snooper 122 provides the requested memory block to the requesting L2 cache 230, which obtains the requested memory block in the M state, and all affirming snoopers 236 invalidate their respective copies of the requested memory block, if any. If the partial responses indicate an S or Sr snooper 236 is possibly hidden (block 1216), the requesting L2 cache 236 receives a "cleanup" CR indicating that it must invalidate any other valid cached copies of the requested memory block (block 1218). If no S or Sr snoopers 236 are possibly hidden by incomplete partial responses, response logic 210 generates a "success" CR, as depicted at block 1206.

Figure 13:
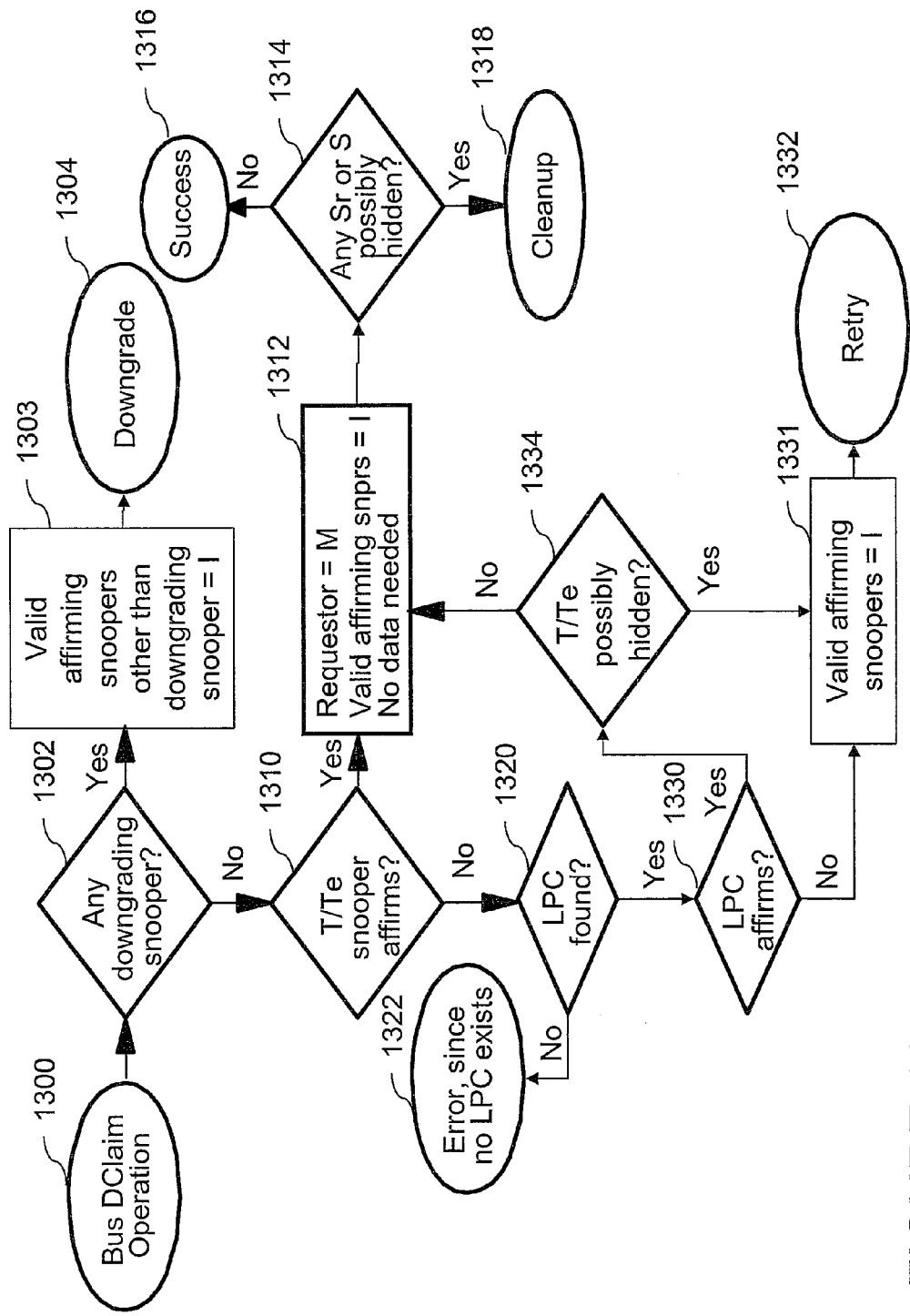
FIG. 13 is a high level logical flowchart of an exemplary method of performing a bus DClaim operation in accordance with the present invention.

Referring now to FIG. 13, there is depicted a high level logical flowchart of an exemplary method of performing a bus DClaim operation in accordance with the present invention. The process begins at block 1300, for example, with a master 232 of an L2 cache 230 issuing a bus DClaim operation on interconnects 110, 114 at block 632 of FIG. 6. The various partial responses that snoopers 122, 236 may provide to distributed response logic 210 in response to the bus DClaim operation are represented in FIG. 13 by the outcomes of decision blocks 1302, 1310, 1314, 1320, 1330 and 1334. These partial responses in turn determine what CR response logic 210 generates for the bus DClaim operation.

As shown at block 1302, if any snooper 236 issues a partial response downgrading the bus DClaim operation to a bus RWITM operation as illustrated, for example, at block 624 of FIG. 6, distributed response logic 210 generates a CR indicating "downgrade", as shown at block 1304. As shown at block 1303, each affirming snooper 236 other than the downgrading snooper 236 invalidates its respective copy of the requested memory block, if any. In response to this CR, the master 232 of the bus DClaim operation must next attempt to gain ownership of the requested memory block utilizing a bus RWITM operation, as depicted at blocks 636 and 652 of FIG. 6.

If a snooper 236 affirms the bus DClaim operation with a partial response indicating that the L2 cache 230 containing the snooper 236 holds the requested memory block in either the T or Te state as shown at block 1310, the process passes to block 1312. Because no data transfer is required in response to a bus DClaim operation, block 1312 indicates that the master 232 in the requesting L2 cache 230 updates the state of its copy of the requested memory block in L2 cache directory 302 to the M state. All affirming snoopers 236 update their respective cache states for the requested memory block to I. As shown at blocks 1314 and 1316, if the partial responses indicate that no hidden S or Sr snoopers 236 exist, the process ends with distributed response logic 210 generating a CR indicating "success". If, on the other hand, at least one partial response indicating the presence of a possibly hidden S or Sr snooper 236 was given in response to the bus DClaim operation, distributed response logic 210 generates a CR indicating "cleanup" (block 1318), meaning that the requesting L2 cache 230 must issue one or more bus kill operations to invalidate the requested memory block in any such hidden S or Sr snooper 236, as described above with respect to blocks 628, 624 and 626 of FIG. 6.

Turning now to block 1320, if no T or Te snooper 236 affirms the bus DClaim operation, and further, if no snooper 122 provides a partial response indicating that it is responsible (i.e., the LPC) for the requested memory block, an error occurs causing processing to halt, as depicted at block 1322. If, on the other hand, no T or Te snooper 236 affirms the bus DClaim operation and a snooper 122 provides a partial response indicating that it is responsible (i.e., the LPC) for the requested memory block but does not affirm the bus DClaim operation (block 1330), each affirming snooper 236 invalidates its respective copy of the requested memory block, if any (block 1331), and response logic 210 generates a CR indicating "retry", as depicted at block 1332. As indicated by decision block 1334, response logic 210 similarly generates a "retry" CR at block 1332 and each affirming snooper 236 invalidates its respective copy of the requested memory block, if any (block 1331) if a memory controller snooper 122 affirms the bus DClaim operation (block 1330) and an L2 cache snooper 236 provides a partial response indicating that a T or Te snooper 236 may be possibly hidden.

As depicted at block 1334, if no T or Te snooper 236 affirms the bus DClaim operation or is possibly hidden and a snooper 122 affirms the bus DClaim operation, the bus DClaim operation is serviced in accordance with block 1312, which is described above.

Figure 14:
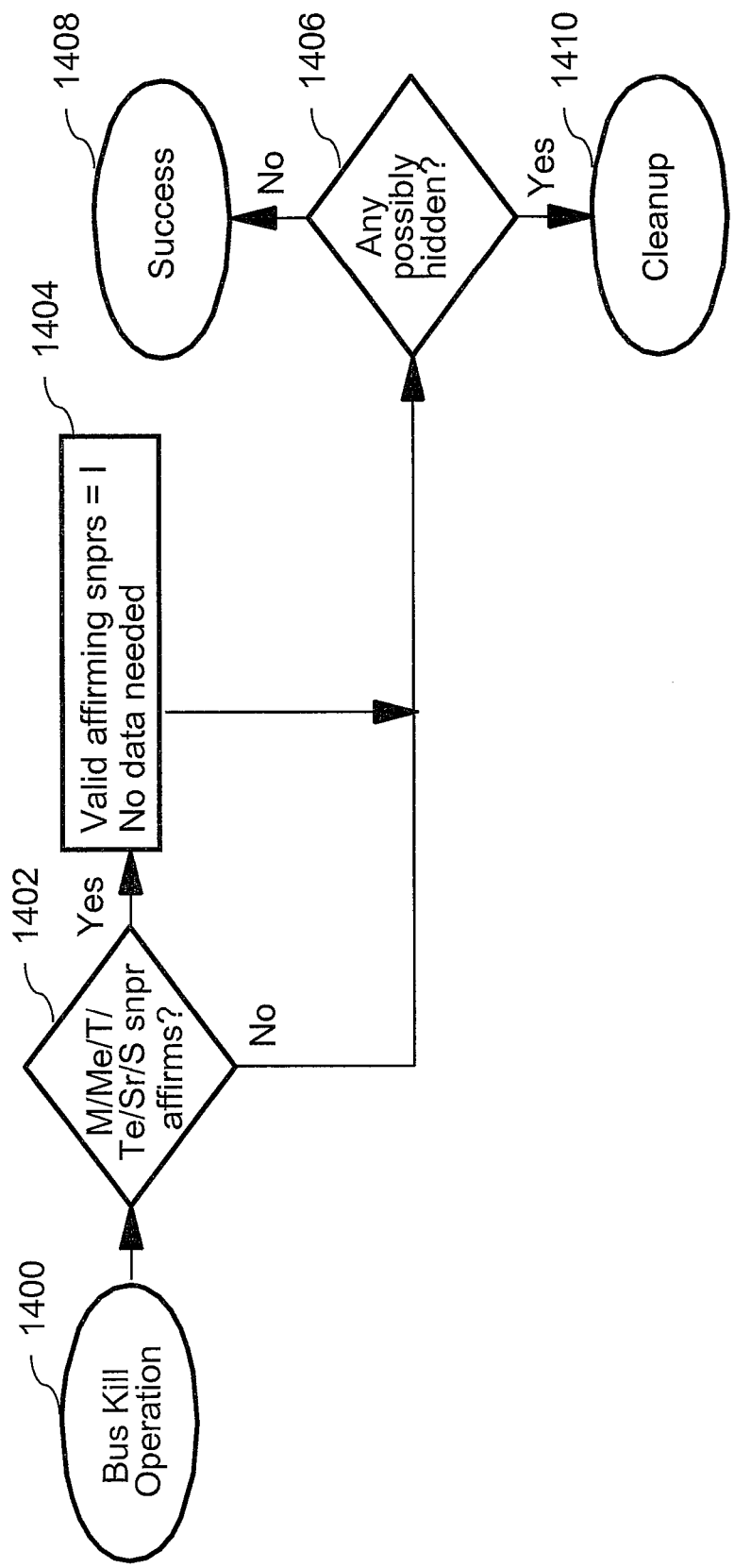
FIG. 14 is a high level logical flowchart of an exemplary method of performing a bus kill operation in accordance with the present invention.

With reference now to FIG. 14, there is illustrated a high level logical flowchart of an exemplary method of performing a bus kill operation in accordance with the present invention. As depicted, the process begins at block 1400, for example, with the master 232 of an L2 cache 230 issuing a bus kill operation on interconnects 110, 114, for example, at block 626 of FIG. 6, block 726 of FIG. 7, block 912 of FIG. 9A, or block 932 of FIG. 9B The various partial responses that snoopers 122, 236 may provide to distributed response logic 210 in response to the bus kill operation are represented in FIG. 14 by the outcomes of decision blocks 1402 and 1406. These partial responses in turn determine what CR response logic 210 generates for the bus kill operation.

In particular, as depicted at blocks 1402 and 1404, any snooper 236 affirming the bus kill operation in any of the M, Me, T, Te, Sr or S states invalidates its copy of the requested memory block without any transmission of data in response to receipt of the CR. As further shown at blocks 1406, 1408 and 1410, response logic 210 generates a CR indicating "cleanup" if any snooper 236 provided a partial response not affirming the bus kill operation and otherwise generates a CR indicating "success".

Figure 15:
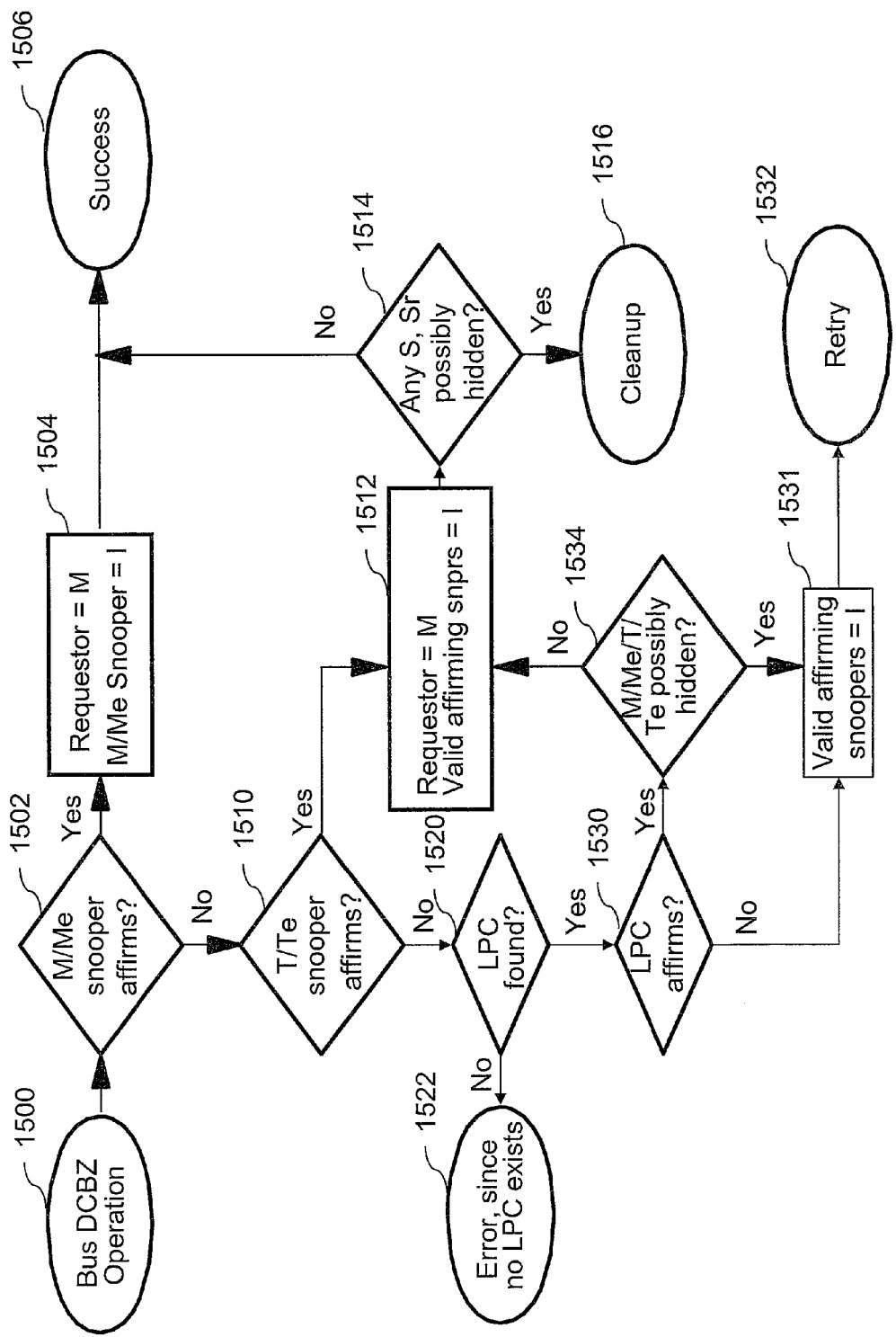
FIG. 15 is a high level logical flowchart of an exemplary method of performing a bus DCBZ operation in accordance with the present invention.

Referring now to FIG. 15, there is depicted a high level logical flowchart of an exemplary method of performing a bus DCBZ operation in accordance with the present invention. The process begins at block 1500, for example, with the master 232 of an L2 cache 230 issuing a bus DCBZ operation on interconnects 110, 114 at block 732 of FIG. 7. The various partial responses that snoopers 122, 236 may provide to distributed response logic 210 are represented in FIG. 15 by the outcomes of decision blocks 1502, 1510, 1514, 1520, 1530 and 1534. These partial responses in turn determine the CR for the bus DCBZ operation.

If a snooper 236 affirms the bus DCBZ operation with a partial response indicating that the L2 cache 230 containing the snooper 236 holds the requested memory block in either of the M or Me states as shown at block 1502, the process proceeds to block 1504. Block 1504 indicates the operations of the requesting L2 cache 230 and the affirming L2 cache 230 in response to the request. In particular, the master 232 in the requesting L2 cache 230 updates the cache state of the requested memory block to the M state (no data is transferred), and the snooper 236 in the affirming L2 cache 230 updates the cache state of the requested memory block to the I state. The process ends with distributed response logic 210 generating a CR indicating "success", as depicted at block 1506.

If, on the other hand, a snooper 236 affirms the bus DCBZ operation with a partial response indicating that the L2 cache 230 containing the snooper 236 holds the requested memory block in either the T or Te state as shown at block 1510, the process passes to block 1512. Block 1512 represents each valid affirming snooper 236 invalidating its respective copy of the requested memory block and the master 232 in the requesting L2 cache 230 updating the cache state of its copy of the requested memory block to the M state. As further illustrated at blocks 1514-1516, if at least one partial response indicating the presence of a possibly hidden S or Sr snooper 236 was given in response to the bus DCBZ operation, distributed response logic 210 generates a CR indicating "cleanup". If the partial responses indicate that no S or Sr snooper 236 was possibly hidden, distributed response logic 210 provides a CR indicating "success" as shown at block 1506.

Turning now to block 1520, if no M, Me, T, or Te snooper 236 affirms the bus DCBZ operation, and further, if no snooper 122 provides a partial response indicating that it is responsible (i.e., the LPC) for the requested memory block, an error occurs causing processing to halt, as depicted at block 1522. If, on the other hand, no M, Me, T, or Te snooper 236 affirms the bus DCBZ operation and a snooper 122 provides a partial response indicating that it is responsible (i.e., the LPC) for the requested memory block but does not affirm the bus DCBZ operation (block 1530), each affirming snooper 236 invalidates its respective copy of the requested memory block, if any (block 1531), and response logic 210 generates a CR indicating "retry", as depicted at block 1532. A "retry" CR is similarly generated at block 1532 and each affirming snooper 236 invalidates its respective copy of the requested memory block, if any (block 1531) if no M, Me, T, or Te snooper 236 affirms the operation, or if LPC snooper 222 affirms the bus DCBZ operation (block 1530) and a M, Me, T or Te snooper 236 is possibly hidden (block 1534). As further indicated by decision block 1534, if a memory controller snooper 122 affirms the bus DCBZ operation (block 1530) and no L2 cache snooper 236 provides a partial response indicating that an M, Me, T, or Te snooper 236 may be possibly hidden (block 1534), the bus DCBZ operation is serviced as described above with reference to block 1512 and following blocks.

Figure 16:
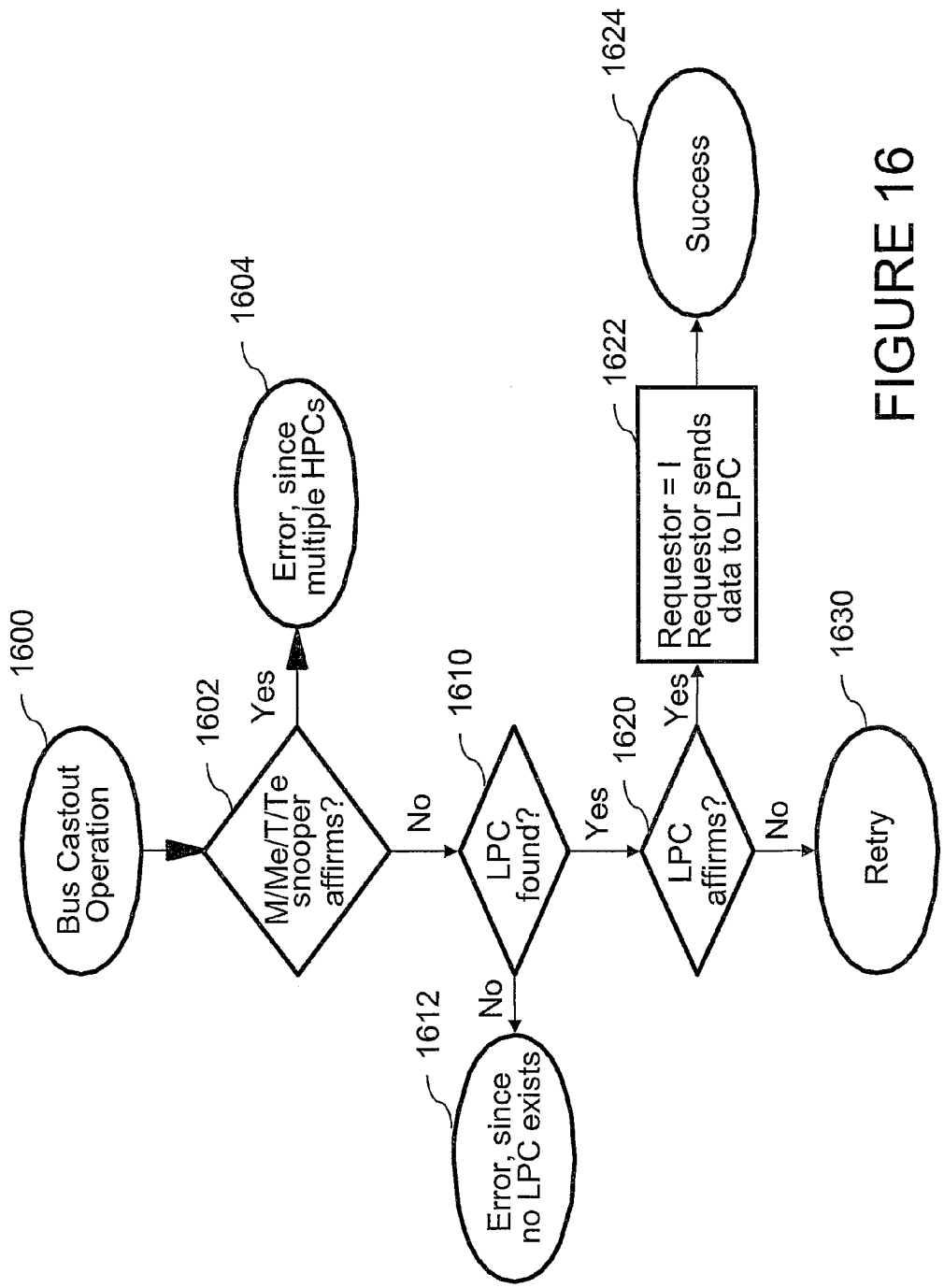
FIG. 16 is a high level logical flowchart of an exemplary method of performing a bus castout operation in accordance with the present invention.

With reference now to FIG. 16, there is illustrated a high level logical flowchart of an exemplary method of performing a bus castout operation in accordance with the present invention. The process begins at block 1600, for example, with a master 232 of an L2 cache 230 issuing a bus castout operation on interconnects 110, 114, for example, at block 1002 of FIG. 10, block 742 of FIG. 7, block 650 of FIG. 6, or block 506 of FIG. 5 The various partial responses that snoopers 122, 236 may provide to distributed response logic 210 are represented in FIG. 16 by the outcomes of decision blocks 1602, 1610 and 1620. These partial responses in turn determine the CR for the bus castout operation.

If a snooper 236 affirms the bus castout operation with a partial response indicating that the L2 cache 230 containing the snooper 236 holds the requested memory block in any of the M, Me, T or Te states as shown at block 1602, an error halting processing occurs, as indicated at block 1604, because the memory block being castout can have only one HPC (i.e., the requesting L2 cache 230).

As depicted at block 1620, if no M, Me, T, or Te snooper 236 affirms the bus castout operation, and further, if no snooper 122 provides a partial response indicating that it is responsible (i.e., the LPC) for the requested memory block (block 1610), an error occurs causing processing to halt, as depicted at block 1612. If, however, no M, Me, T, or Te snooper 236 affirms the bus castout operation and a snooper 122 provides a partial response indicating that it is responsible (i.e., the LPC) for the requested memory block but does not affirm the bus castout operation (block 1620), response logic 210 generates a CR indicating "retry", as depicted at block 1630, because the LPC must be available to receive the castout memory block. If a memory controller snooper 122 is found and affirms the bus castout operation (blocks 1610 and 1620) and no M, Me, T or Te snooper 236 affirms the bus castout operation (block 1602), the requesting L2 cache 230 invalidates the memory block within its cache directory 302 and transmits the memory block to the LPC, as depicted at block 1622. In addition, response logic 210 generates a CR indicating "success", as illustrated at block 1624.

Figure 17A:
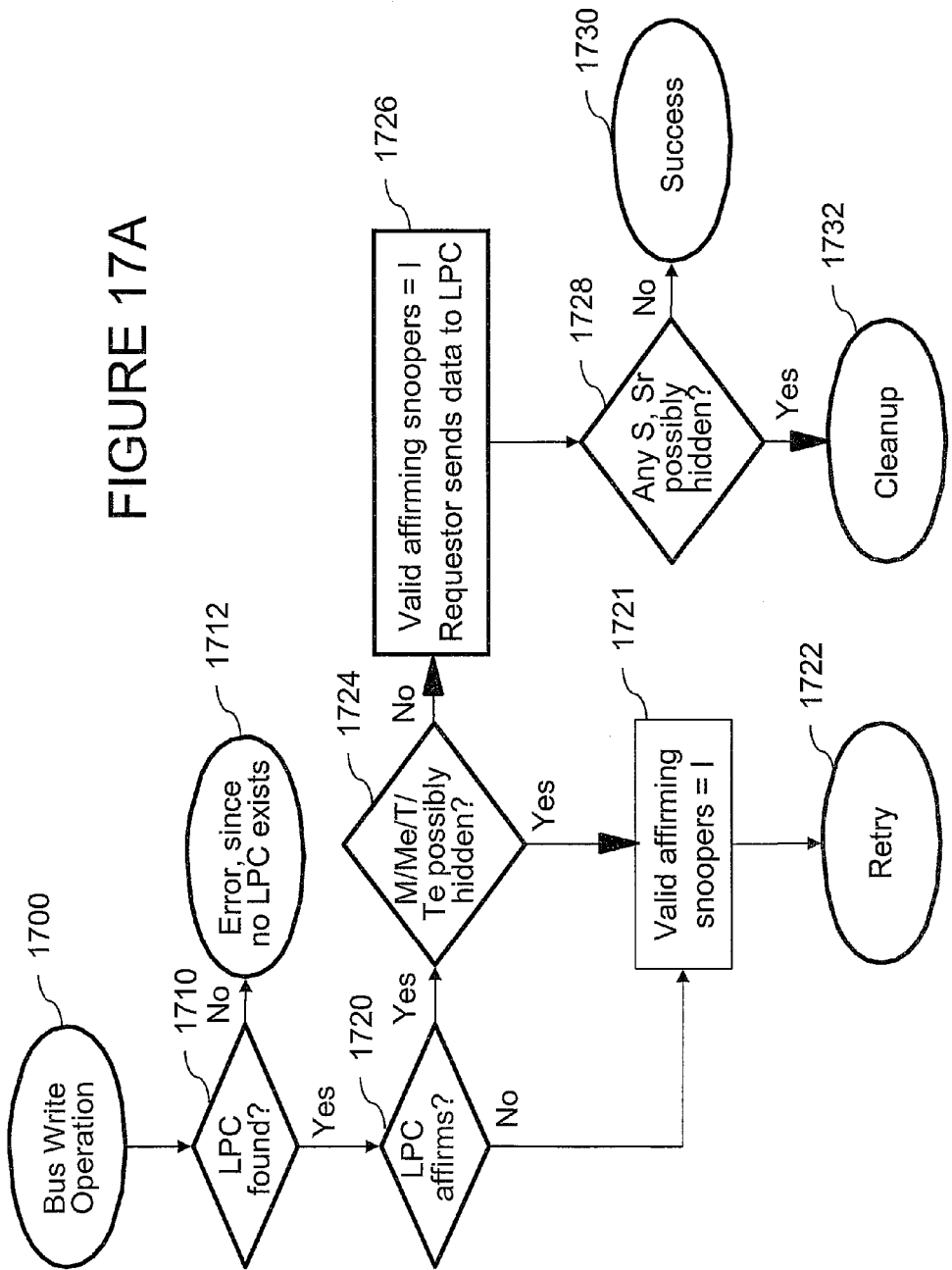
FIG. 17A is a high level logical flowchart of an exemplary method of performing a bus write operation in accordance with the present invention.

Referring now to FIG. 17A, there is depicted a high level logical flowchart of an exemplary method of performing a bus write operation. The process begins at block 1700, for example, with an I/O controller 214 issuing a bus write operation on interconnects 110, 114 at block 902 of FIG. 9A. The various partial responses that snoopers 122, 236 may provide to distributed response logic 210 are represented in FIG. 17A by the outcomes of decision blocks 1710, 1720, 1724 and 1728. These partial responses in turn determine the CR for the bus write operation.

As depicted at block 1710, if no snooper 122 provides a partial response indicating that it is responsible (i.e., the LPC) for the requested memory block, an error occurs causing processing to halt, as depicted at block 1712. If, however, a snooper 122 provides a partial response indicating that it is responsible (i.e., the LPC) for the requested memory block but does not affirm the bus write operation (block 1720), each affirming snooper 236 other than the downgrading snooper 236 invalidates its respective copy of the requested memory block, if any (block 1721), and response logic 210 generates a CR indicating "retry" (block 1722) because the LPC must be available to receive the requested memory block. Response logic 210 similarly generates a "retry" CR if a memory controller snooper 122 affirms the bus castout operation but a partial response indicates that a M, Me, T or Te snooper 236 may be possibly hidden (blocks 1724 and 1722). In this case, a "retry" CR is generated so that the bus write operation only succeeds when no stale HPC copy of the requested memory block remains in the system.

Referring again to block 1724, assuming that a snooper 122 affirms the bus write operation as the LPC and no partial responses are generated that indicate that a M, Me, T or Te snooper 236 may possibly be hidden, the requesting I/O controller 214 transmits the requested memory block to the LPC snooper 122, and snoopers 236, if any, affirming the bus write operation invalidate their respective copies of the requested memory block (block 1726). As shown at blocks 1728 and 1730, if the partial responses indicate that no hidden S or Sr snoopers 236 exist, the process ends with distributed response logic 210 generating a CR indicating "success". If, on the other hand, at least one partial response indicating the presence of a possibly hidden S or Sr snooper 236 was given in response to the bus write operation, distributed response logic 210 generates a CR indicating "cleanup" (block 1732), meaning that the requesting I/O controller 214 must issue one or more bus kill operations to invalidate the requested memory block in any such hidden S or Sr snooper 236, as described above with respect to blocks 906, 910 and 912 of FIG. 9A.

Figure 17B:
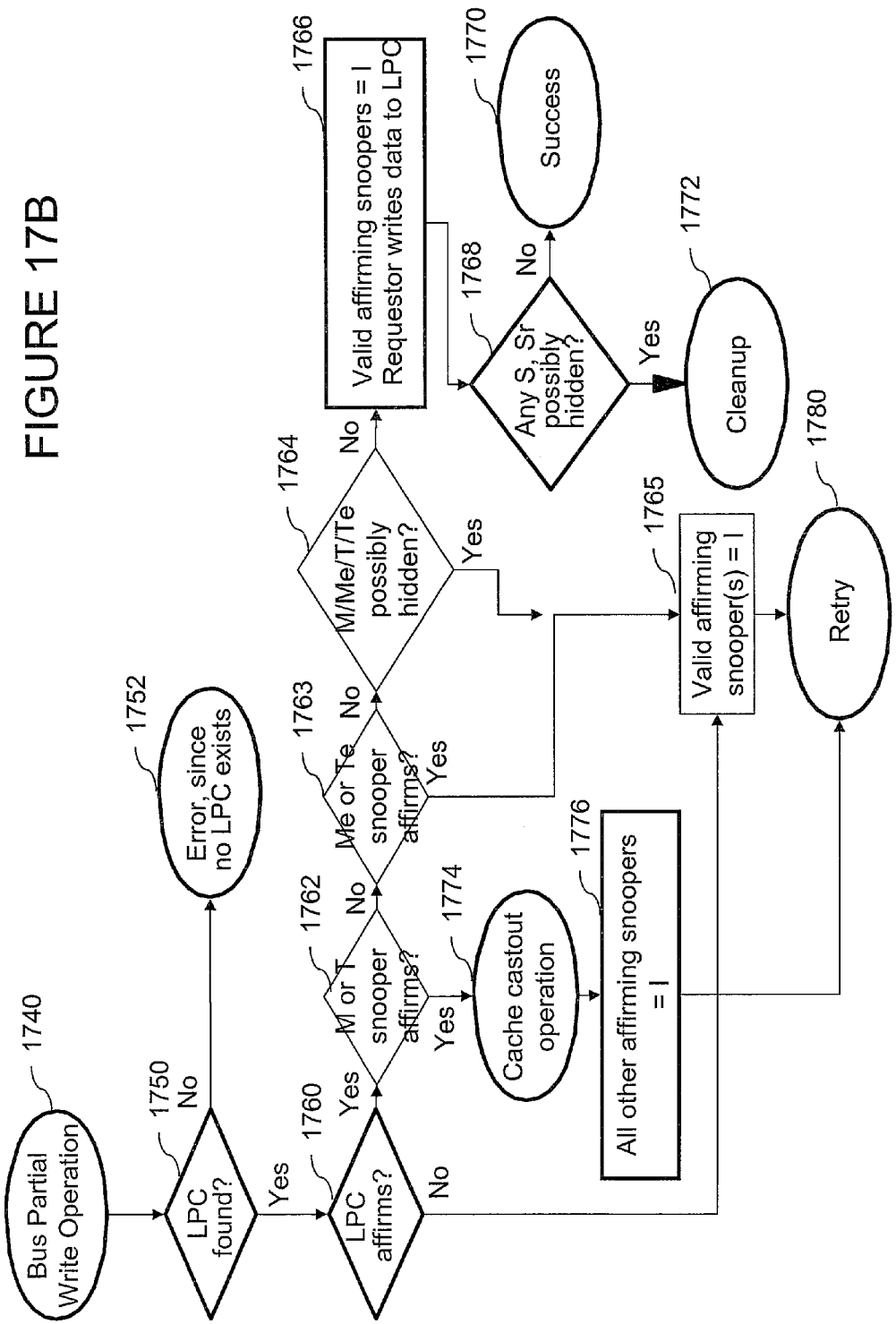
FIG. 17B is a high level logical flowchart of an exemplary method of performing a bus partial write operation in accordance with the present invention.

With reference now to FIG. 17B, there is depicted a high level logical flowchart of an exemplary method of performing a bus partial write operation in accordance with the present invention. The process begins at block 1740, for example, with an I/O controller 214 issuing a bus partial write operation on interconnects 110, 114 at block 922 of FIG. 9B. The various partial responses that snoopers 122, 236 may provide to distributed response logic 210 are represented in FIG. 17B by the outcomes of decision blocks 1750, 1760, 1762, 1763, 1764 and 1768. These partial responses in turn determine the CR for the bus partial write operation.

As depicted at block 1750, if no snooper 122 provides a partial response indicating that it is responsible (i.e., the LPC) for the requested partial memory block, an error occurs causing processing to halt, as depicted at block 1752. If, however, a snooper 122 provides a partial response indicating that it is responsible (i.e., the LPC) for the requested partial memory block but does not affirm the bus partial write operation (block 1760), each affirming snooper 236 invalidates its respective copy of the requested memory block, if any (block 1765), and response logic 210 generates a CR indicating "retry", as depicted at block 1780. A "retry" CR is generated because the LPC must be available to receive the partial memory block. Response logic 210 similarly generates a "retry" CR (block 1780) and each affirming snooper 236 invalidates its respective copy of the requested memory block, if any (block 1765) if a memory controller snooper 122 affirms the bus partial write operation (block 1760), no M, Me, T, or Te snooper 236 affirms the bus partial write operation (block 1762), but a partial response indicates that a M, Me, T or Te snooper 236 may be possibly hidden (block 1764).

If a memory controller snooper 122 affirms the bus partial write operation and an M or T snooper 236 affirms the bus partial write operation (block 1762), the M or T snooper 236 initiates a cache castout operation of the cache line containing the partial memory block, as depicted at block 1774 and as described in detail above with respect to FIG. 10. This castout operation preserves possibly modified data within the memory block that may not be overwritten by the bus partial write operation. Each other snooper 236 affirming the bus partial write operation, if any, invalidates its respective copy of the memory block, as shown at block 1776. As further illustrated at block 1780, response logic 210 generates a "retry" CR. Thus, a "retry" CR is generated, as depicted at block 1780, so that the bus partial write operation only succeeds when no HPC copy of the requested partial memory block remains in the system.

The bus partial write operation is handled similarly if a memory controller snooper 122 affirms the bus partial write operation and an Me or Te snooper 236 affirms the bus partial write operation (block 1763), except that no castout is required because the memory block is unmodified. Accordingly, the Me or Te snooper 236 affirming the bus partial write operation invalidates its copy of the target memory block at block 1765, and response logic 210 provides a "retry" CR, as depicted at block 1780.

Referring again to block 1764, assuming that a snooper 122 affirms the bus partial write operation as the LPC, no M, Me, T or Te snooper 236 affirms the bus partial write operation, and no partial responses are generated that indicate that a M, Me, T or Te snooper 236 may be possibly hidden, the requesting I/O controller 214 transmits the partial memory block to the LPC snooper 122, and snoopers 236, if any, affirming the bus write operation invalidate their respective copies of the requested memory block (block 1766). As shown at blocks 1768 and 1770, if the partial responses indicate that no S or Sr snooper 236 is possibly hidden, the process ends with distributed response logic 210 generating a CR indicating "success". If, on the other hand, at least one partial response indicating the presence of a possibly hidden S or Sr snooper 236 was given in response to the bus partial write operation, distributed response logic 210 generates a CR indicating "cleanup" (block 1772), meaning that the requesting I/O controller 214 must issue one or more bus kill operations to invalidate the requested memory block in any such hidden S or Sr snooper 236, as described above with respect to blocks 926, 930 and 932 of FIG. 9B.

III. Data Delivery Domains

Broadcast-based data processing systems, such as that described in detail above, handle both cache coherency and data delivery through broadcast communication on a system interconnect and each local interconnect. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by among other things the latency of the furthest away lower level cache holding the requested memory block in state from which it will supply data.

In order to reduce system interconnect bandwidth requirements and access latencies while still retaining the advantages of a broadcast-based system, several improvements to broadcast-based coherency management and data delivery mechanisms will now be introduced. The first of these enhancements is a modification to the partial response rules described above in order to reduce worst case access latency for shared data.

As noted above, the read access latency for shared data can be limited in the worst case by the latency for the farthest away (and therefore highest latency) L2 cache holding the requested memory block in the Sr state. As described above with respect to blocks 1118 and 1122 of FIG. 11A and block 1215 of FIG. 12A, an Sr snooper 236 is the data source for the memory block requested by bus read operations and bus RWITM operation that is affirms. Ideally, it would be desirable to minimize data access latency by decreasing the average distance between the requesting L2 cache 230 and an affirming L2 cache 230 containing an Sr snooper 236. One technique for reducing the average distance between a requesting L2 cache 230 and an Sr snooper 236 is to permit multiple concurrent Sr snoopers 236 for a single requested memory block to be distributed throughout SMP data processing system 100. In this manner, the average data access latency is reduced by supplying a shared memory block to a requesting L2 cache 230 from a nearby Sr snooper 236.

In order to implement multiple concurrent and distributed sources for shared memory blocks in an SMP data processing system, such as data processing system 100, two issues must be addressed. First, some rule governing the creation of Sr snoopers 236 must be implemented. Second, there must be a rule governing which Sr snooper 236, if any, provides a shared memory block to a requesting L2 cache 230 in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a memory block in the Sr state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain.

In at least some embodiments, the designation of an Sr snooper within the same domain as the requesting master can be designated with an explicit cache state such as "SL", where the "L" indicates a "local" cache in the same domain. In such embodiments, the SL cache state would preferably replace the Sr cache state described above. In other embodiments, the designation of a "local" Sr snooper within the same domain as the requesting master can be implemented simply by modifying the response behavior of Sr snoopers. For example, assuming that each bus operation includes a scope indicator indicating whether the bus operation has crossed a domain boundary (e.g., an explicit domain identifier of the master or a single local/not local bit), a lower level cache holding a shared memory block in the Sr state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
| --- | --- | --- | --- |
| "local" (i.e., within same domain) | Sr | Sr' affirm | Sr' possibly hidden |
| "remote" (i.e., not within same domain) | Sr | S' affirm | S' possibly hidden |
| "local" (i.e., within same domain) | S | S' affirm | S' possibly hidden |
| "remote" (i.e., not within same domain) | S | S' affirm | S' possibly hidden |

Figure 11B:
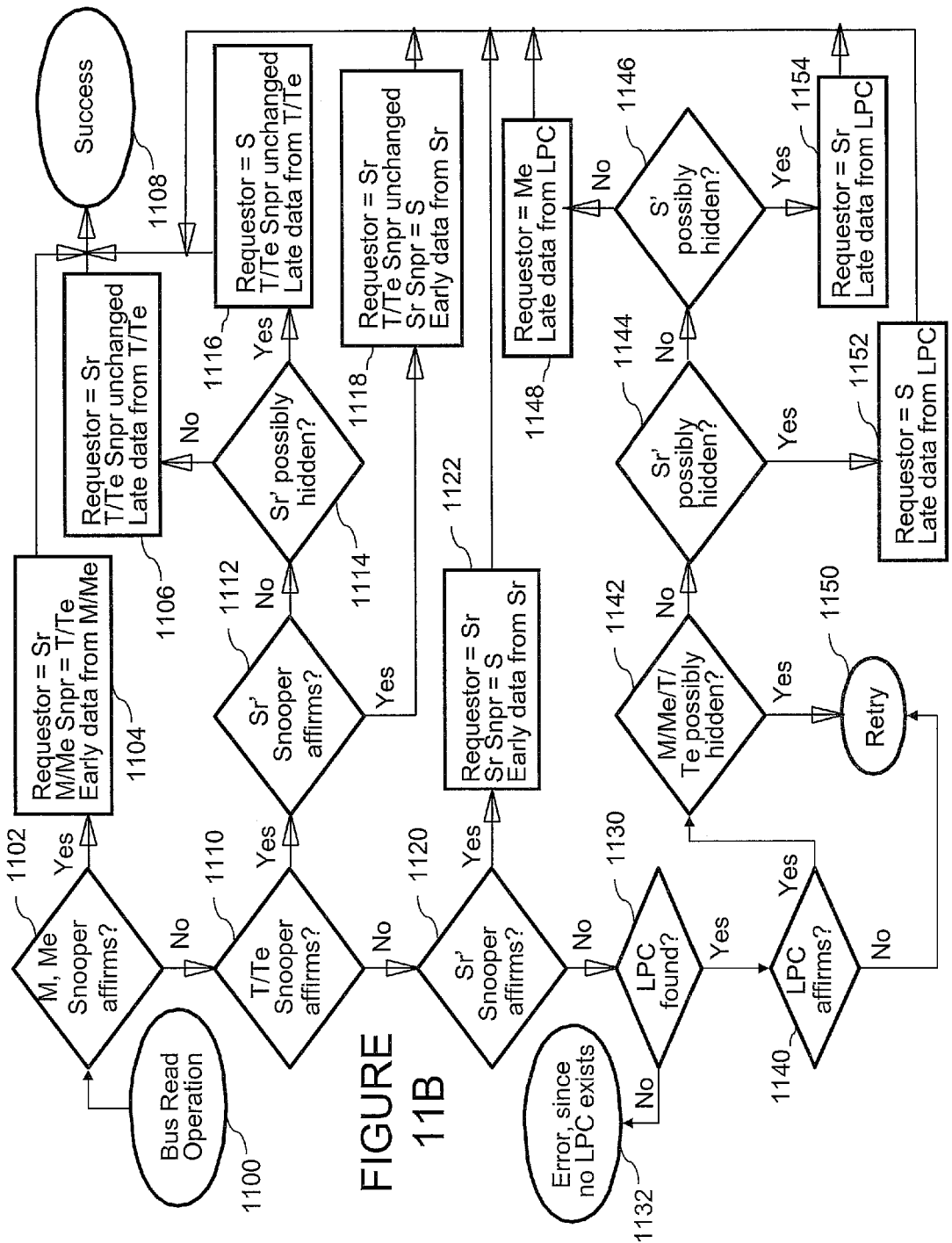
FIG. 11B is a high level logical flowchart of an exemplary method of performing a bus read operation in a data processing system having data delivery domains in accordance with the present invention.
Figure 12B:
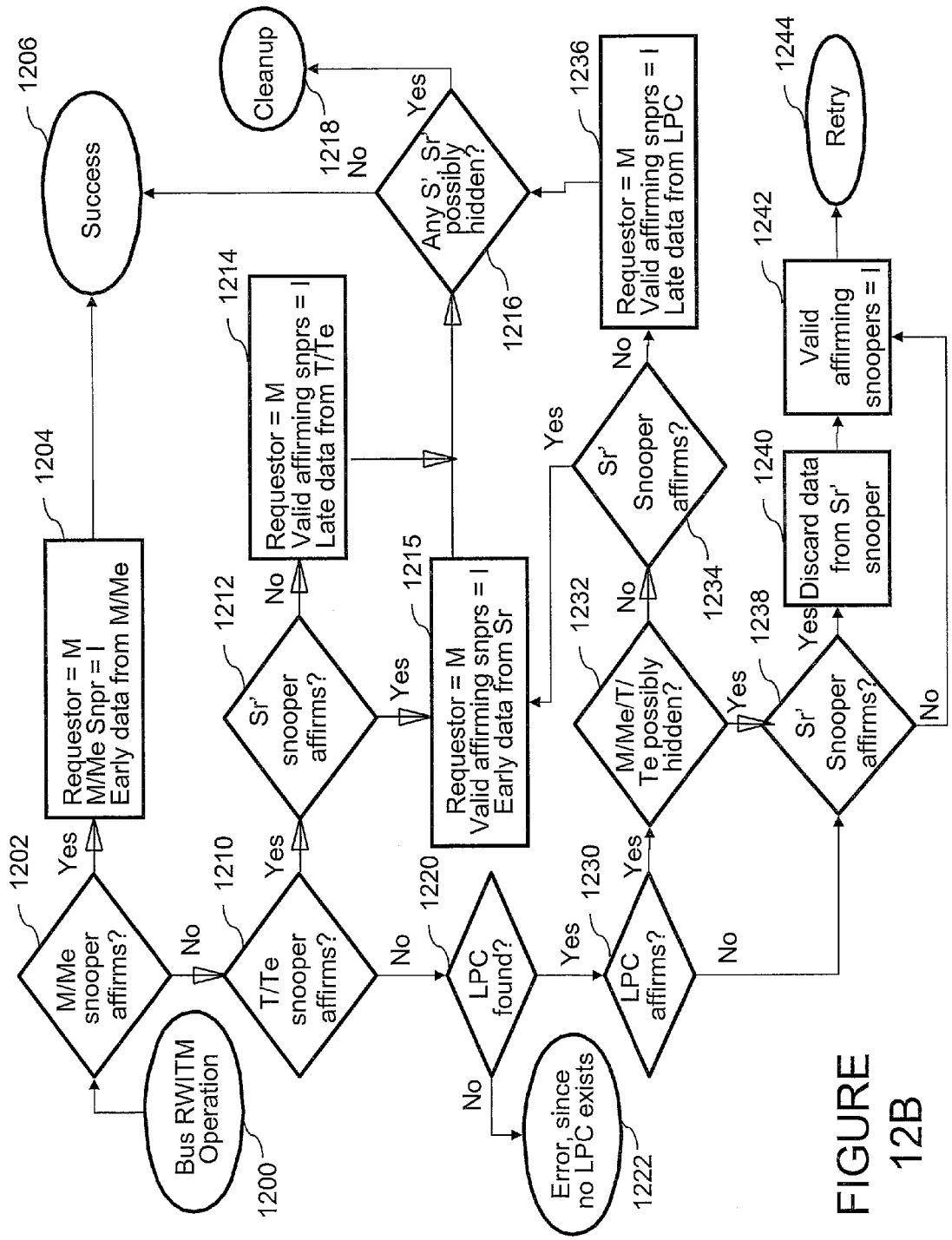
FIG. 12B is a high level logical flowchart of an exemplary method of performing a bus RWITM operation in a data processing system having data delivery domains in accordance with the present invention.

Assuming the response behavior set forth above in Table III, the average data latency for shared data can be significantly decreased by increasing the number of shared copies of memory blocks distributed within an SMP data processing system that may serve as data sources. Advantageously, this enhancement to the data delivery mechanism can be implemented utilizing the processes for servicing bus read and bus RWITM operations described in detail above with reference to FIGS. 11A and 12A. However, to avoid confusion between the partial responses and the underlying cache states, these processes are illustrated in FIGS. 11B and 12B utilizing like reference numerals to designate like steps and utilizing the prime notation employed in Table III to designate partial responses.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system.

In a preferred embodiment, the scope of an operation is indicated in a bus operation by a local/global indicator, which in one embodiment may comprise a 1-bit flag. Forwarding logic 212 within processing units 104 preferably determines whether or not to forward an operation received via local interconnect 114 onto system interconnect 110 based upon the setting of the local/global indicator.

A. Master Operations with Coherency Domains

Figure 18:
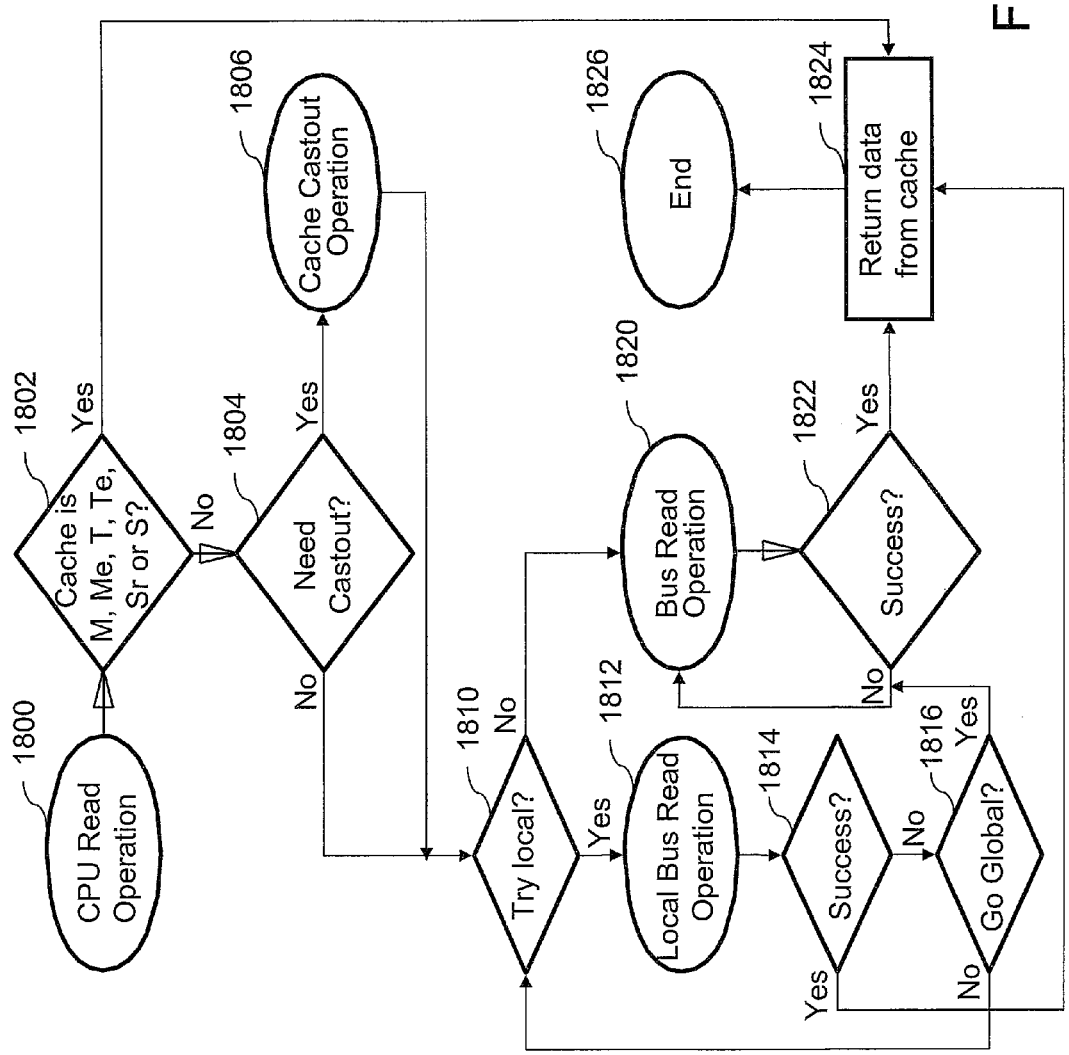
FIG. 18 is a high level logical flowchart of an exemplary method of servicing a read request by a processor core in a data processing system implementing coherency domains in accordance with the present invention.

Referring now to FIG. 18, there is depicted a high level logical flowchart of an exemplary method of servicing a read request by a processor core in a data processing system implementing coherency domains in accordance with preferred embodiments of the present invention. In such embodiments, the process given in FIG. 18 is implemented in lieu of the process depicted in FIG. 5 and described above.

As shown, the process begins at block 1800, which represents a master 232 in an L2 cache 230 receiving a read request from an associated processor core 200. In response to receipt of the read request, master 232 determines at block 1802 whether or not the requested memory block is held in L2 cache directory 302 in any of the M, Me, T, Te, Sr or S states. If so, master 232 accesses L2 cache array 300 to obtain the requested memory block and supplies the requested memory block to the requesting processor core 200, as shown at block 1824. The process thereafter terminates at block 1826.

Returning to block 1802, if the requested memory block is not held in L2 directory 302 in any of the M, Me, T, Te, S, or Sr states, a determination is also made at block 1804 whether or not a castout of an existing cache line is required to accommodate the requested memory block in L2 cache 230. In one embodiment, a castout operation is required at block 1804 and at similar blocks in succeeding figures if the memory block selected as a victim for eviction from the L2 cache 230 of the requesting processor is marked in L2 directory 302 as being in either the M or T coherency state. In response to a determination at block 1804 that a castout is required, a cache castout operation is performed, as indicated at block 1806. Concurrently, the master 232 determines at block 1810 whether or not to issue a bus read operation as a local operation or a global operation.

In a first embodiment in which each bus operation is initially issued as a local operation and issued as a local operation only once, the determination depicted at block 1810 (and like determinations in succeeding figures) can simply represent a determination by the master of whether or not the bus read operation has previously been issued as a local bus read operation. In a second alternative embodiment in which local bus operations can be retried, the determination depicted at block 1810 can represent a determination by the master of whether or not the bus read operation has previously been issued more than a threshold number of times. In a third alternative embodiment, the determination made at block 1810 can be based upon a prediction by the master of whether or not a local operation is likely to be successful (e.g., is likely to find an HPC in the local coherency domain).

In response to a determination at block 1810 to issue a global bus read operation rather than a local bus read operation, the process proceeds from block 1810 to block 1820, which is described below. If, on the other hand, a determination is made at block 1810 to issue a local bus read operation, master 232 initiates a local bus read operation on its local interconnect 114, as illustrated at block 1812 and described below with reference to FIG. 24. As noted above, the local bus read operation is broadcast only within the local coherency domain (e.g., processing node 102) containing master 232. If master 232 receives a CR indicating "success" (block 1814), master 232 receives the requested memory block and returns the requested memory block (or at least a portion thereof) to the requesting processor core 200, as shown at block 1824. Thereafter, the process ends at block 1826.

Returning to block 1814, if the CR for the local bus read operation does not indicate "success", master 232 makes a determination at block 1816 whether or not the CR definitively indicates that the bus read operation cannot be serviced within the local coherency domain and should therefore be reissued as a global bus read operation. If so (e.g., if an L2 cache 230 in another coherency domain holds the requested memory block in the M state or Me state), the process passes to block 1820, which is described below. If, on the other hand, the CR does not definitively indicate that the bus read operation cannot be serviced within the local coherency domain, the process returns from block 1816 to block 1810, which illustrates master 232 again determining whether or not to issue a local bus read operation. In this case, master 232 may employ in the determination any additional information provided by the CR. Following block 1810, the process passes to either block 1812, which is described above, or to block 1820.

Block 1820 depicts master 230 issuing a global bus read operation as described above with reference to FIG. 11B. If the CR of the global bus read operation does not indicate "success" at block 1822, master 232 repeats the global bus read operation at block 1820 until a CR indicating "success" is received. If the CR of the global bus read operation indicates "success", the master 232 receives the requested memory block and returns the requested memory block (or at least a portion thereof) to the requesting processor core 200 at block 1824. The process thereafter terminates at block 1826.

Thus, assuming affinity between processes and their data within the same coherency domain, operations, such as the CPU read operation depicted in FIG. 18, can frequently be serviced utilizing broadcast communication limited in scope to the coherency domain of the requesting master. The combination of data delivery domains as hereinbefore described and coherency domains thus improves not only data access latency, but also reduces traffic on the system interconnect (and other local interconnects) by limiting the scope of broadcast communication.

Figure 19:
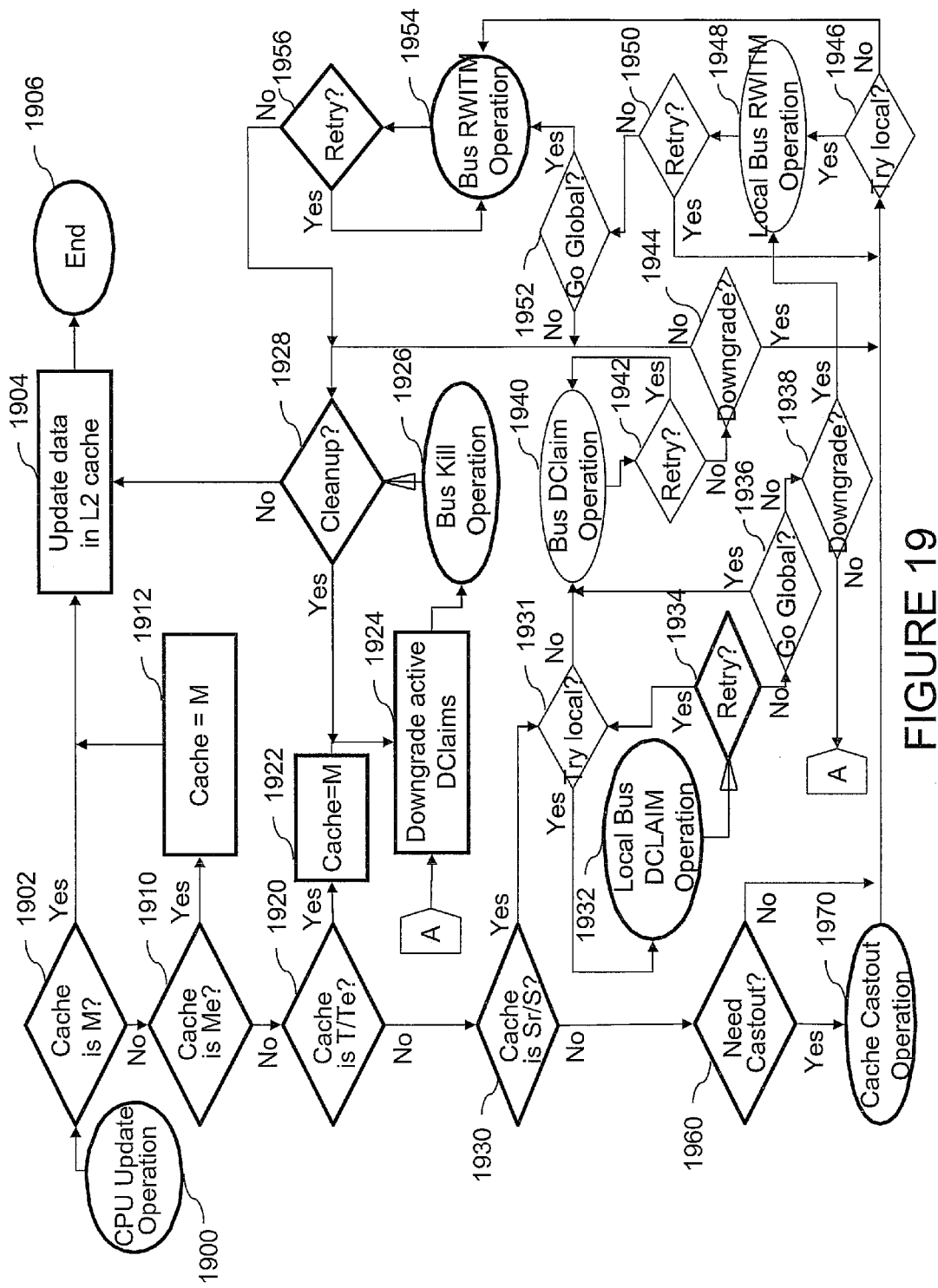
FIG. 19 is a high level logical flowchart of an exemplary method of servicing a processor update operation in a data processing system implementing coherency domains in accordance with the present invention.

With reference now to FIG. 19, there is illustrated a high level logical flowchart of an exemplary method of servicing a processor update operation in a data processing system implementing coherency domains in accordance with preferred embodiments of the present invention. In such embodiments, the process given in FIG. 19 is implemented in lieu of the process depicted in FIG. 6 and described above.

The process begins at block 1900 in response to receipt by an L2 cache 230 of an update request by an associated one of the processor cores 200 within the same processing unit 104. In response to the receipt of the update request, master 232 of the L2 cache 230 accesses its L2 cache directory 302 to determine if the memory block referenced by the request address specified by the update request is cached within L2 cache 230 in M state, as shown at block 1902. If so, the master 232 updates the memory block in L2 cache 232 within the new data supplied by the processor core 200, as illustrated at block 1904. Thereafter, the update process ends at block 1906.

As shown at blocks 1910-1912, if L2 cache directory 302 instead indicates that L2 cache 230 holds the specified memory block in the Me state, master 232 updates the state field 306 for the requested memory block to M state in addition to updating the memory block as shown at block 1904. Thereafter, the process terminates at block 1906.

As depicted at block 1920, if L2 cache directory 302 indicates that L2 cache 230 holds the requested memory block in either of the T or Te states, meaning that the L2 cache 230 is the HPC for the requested memory block and the requested memory block may possibly be held in one or more other L2 caches 230, master 232 must gain exclusive access to the requested memory block in order to perform the requested update to the memory block. The process by which master 232 gains exclusive access to the requested memory block is shown at blocks 1922-1928.

According to this process, master 232 updates the state of the requested memory block in the associated state field 306 of L2 cache directory 302 to the M state, as depicted at block 1922. This upgrade is cache state is permissible without first informing other L2 caches 230 because, as the HPC, the L2 cache 230 has the authority to award itself exclusive access to the requested memory block. As illustrated at block 1924, the snooper 236 of the L2 cache 230 provides "downgrade" partial responses to any competing DClaim operations snooped on its local interconnect 114 by which other masters are seeking ownership of the requested memory block. These partial responses indicate that the other requestors must reissue any such competing operations as bus RWITM operations. In addition, as depicted at block 1926, master 232 issues a bus kill operation on interconnects 110, 114 to invalidate any other cached copies of the memory block, as described above with reference to FIG. 14. Master 232 next determines at block 1928 whether or not the CR for the bus kill operation indicates that the bus kill operation successfully invalidated all other cached copies of the requested memory block or whether additional "cleanup" (i.e., invalidation of other cached copies) is required. If the CR indicates that additional cleanup is not required, the process proceeds to block 1904, which has been described. If the CR indicates that additional cleanup is required, the process returns to block 1924, which has been described.

Referring now to block 1930, if the access to L2 cache directory 302 indicates that the requested memory block is held in the Sr or S states, L2 cache 230 is not the HPC for the requested memory block, and master 232 must gain ownership of the requested memory block from the HPC, if any, or in the absence of an HPC, the LPC, prior to updating the memory block.

Accordingly, master 232 first determines at block 1931 whether to issue a bus DClaim operation as a local or global operation, as described above with reference to block 1810 of FIG. 18. If master 232 makes a determination to issue a global bus DClaim operation, the process proceeds to block 1940, which is described below. In response to a determination at block 1931 to issue a bus DClaim operation as a local operation, master 232 issues a local bus DClaim operation at block 1932, as described below in greater detail with reference to FIG. 26. Master 232 then awaits receipt of the CR of the local bus DClaim operation, which is represented by the collection of decision blocks 1934, 1936 and 1938. If the CR indicates "retry" (block 1934), the process returns to block 1931, which has been described. If the CR alternatively indicates definitively that the bus DClaim operation cannot be serviced with the local coherency domain (block 1936), the process proceeds to block 1940, which is described below. If the CR alternatively indicates "downgrade", meaning that another requester has obtained ownership of the requested memory block via a bus DClaim operation, the process passes to block 1948, which is described below. If the CR alternatively indicates that master 232 has been awarded ownership of the requested memory block by the HPC based upon the local bus DClaim operation, the process passes through page connector A to block 1924 and following blocks, which have been described.

Block 1940 depicts master 232 issuing a global bus DClaim operation, as described above with respect to FIG. 13. Master 232 next determines at blocks 1942-1944 whether or not the CR for the global bus DClaim operation indicates that it succeeded, should be retried, or was "downgraded" to a RWITM operation. If the CR indicates that the bus DClaim operation should be retried (block 1942), master 232 reissues a global bus DClaim operation at block 1940 and continues to do so until a CR other than "retry" is received. If the CR is received indicating that the global bus DClaim operation has been downgraded (block 1944) in response to another requester successfully issuing a bus DClaim operation targeting the requested memory block, the process proceeds to block 1946, which is described below. If the CR alternatively indicates that master 232 has been awarded ownership of the requested memory block by the HPC based upon the global bus DClaim operation, the process passes to block 1928 and following blocks, which have been described.

Block 1946 depicts master 232 of the requesting L2 cache 230 determining whether or not to issue a bus RWITM operation as a local or global operation. If master 232 elects to issue a global RWITM operation, the process passes to block 1954, which is described below. If, however, master 232 elects to issue a local bus RWITM operation, the process proceeds to block 1948, which illustrates master 232 issuing a local bus RWITM operation and awaiting the associated CR. As indicated at block 1950, if the CR indicates "retry", the process returns to block 1946, which represents master 232 again determining whether to issue a local or global RWITM operation utilizing the additional information, if any, provided in the retry CR. If the CR to the local bus RWITM operation issued at block 1948 does not indicate "retry" (block 1950) but instead indicates that the bus RWITM operation was successful in obtaining ownership of the requested memory block (as indicated by a negative determination at block 1952), the process passes to block 1928, which has been described. If master 232 determines at block 1952 that the CR to the local bus RWITM operation indicates that the operation cannot be serviced within the local coherency domain, the process passes to block 1954 and following blocks.

Blocks 1954 and 1956 depict master 232 iteratively issuing a global bus RWITM operation for the requested memory block, as described above with reference to FIG. 12B, until a CR other than "retry" is received. In response to master 232 receiving a non-retry CR indicating that it succeeded in obtaining ownership of the requested memory block (block 1956), the process passes to block 1928 and following blocks, which have been described.

With reference now to block 1960, if a negative determination is made at blocks 1902, 1910, 1920 and 1930, L2 cache 230 does not hold a valid copy of the requested memory block. Accordingly, as indicated at blocks 1960 and 1970, L2 cache 230 performs a cache castout operation if needed to allocate a cache line for the requested memory block. Thereafter, the process passes to block 1946 and following blocks, which are described above.

Figure 20:
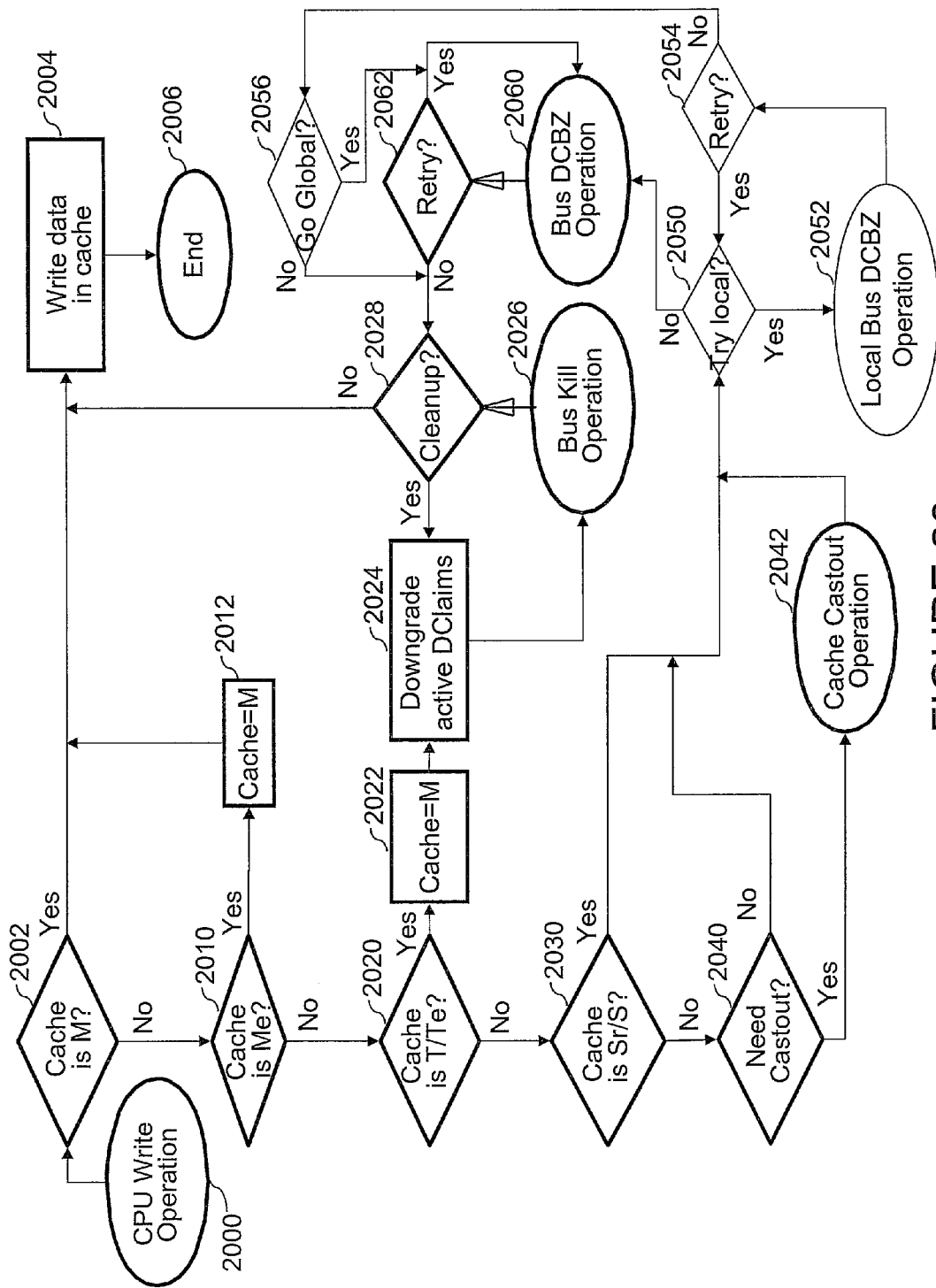
FIG. 20 is a high level logical flowchart of an exemplary method of servicing a processor write operation in a data processing system implementing coherency domains in accordance with the present invention.

Referring now to FIG. 20, there is depicted a high level logical flowchart of an exemplary method of servicing a processor write operation in a data processing system implementing coherency domains in accordance with preferred embodiments of the present invention. In such embodiments, the process given in FIG. 20 is implemented in lieu of the process depicted in FIG. 7 and described above.

The process begins at block 2000 in response to receipt by an L2 cache 230 of a write request by an associated one of the processor cores 200 within the same processing unit 104. In response to the receipt of the write request, master 232 of the L2 cache 230 accesses its L2 cache directory 302 to determine if the memory block referenced by the request address specified by the update request is cached within L2 cache 230 in M state, as shown at block 2002. If so, the master 232 writes the data supplied by the processor core 200 into L2 cache array 300, as illustrated at block 2004. Thereafter, the process ends at block 2006.

As shown at blocks 2010-2012, if L2 cache directory 302 instead indicates that L2 cache 230 holds the specified memory block in the Me state, master 232 updates the state field 306 for the requested memory block to M state in addition to writing the memory block as shown at block 2004. Thereafter, the process terminates at block 2006.

As depicted at block 2020, if L2 cache directory 302 indicates that L2 cache 230 holds the requested memory block in either of the T or Te states, meaning that the L2 cache 230 is the HPC for the requested memory block and the requested memory block may possibly be held in one or more other L2 caches 230, master 232 must gain exclusive access to the requested memory block in order to perform the requested write to the memory block. The process by which master 232 gains exclusive access to the requested memory block is shown at blocks 2022-2028.

According to this process, master 232 updates the state of the requested memory block in the associated state field 306 of L2 cache directory 302 to the M state, as depicted at block 2022. As illustrated at block 2024, the snooper 236 of the requesting L2 cache 230 provides partial responses to competing DClaim operations snooped on its local interconnect 114 to force other requestors for the memory block to reissue any such competing requests as bus RWITM operations. In addition, as depicted at block 2026, master 232 issues a bus kill operation to invalidate any other cached copies of the memory block, as described in detail above with reference to FIG. 14. Master 232 next determines at block 2028 whether or not the CR for the bus kill operation indicates that the bus kill operation successfully invalidated all other cached copies of the requested memory block or whether additional "cleanup" (i.e., invalidation of other cached copies) is required. If the CR indicates that additional cleanup is not required, the process proceeds to block 2004, which has been described. If the CR indicates that additional cleanup is required, the process returns to block 2024, which has been described.

Referring now to block 2030, if the access to L2 cache directory 302 indicates that the requested memory block is held in the Sr or S states, L2 cache 230 is not the HPC for the requested memory block, and master 232 must gain ownership of the requested memory block from the HPC, if any, or in the absence of an HPC, the LPC, prior to writing the memory block. Accordingly, master 232 first determines at block 2050 whether to issue a bus DBCZ operation as a local or global operation.

If master 232 elects to issue a global bus DCBZ operation, the process passes to block 2060, which is described below. If, however, master 232 elects to issue a local bus DCBZ operation, the process proceeds to block 2052, which illustrates master 232 issuing a local bus DCBZ operation, as described below with reference to FIG. 27, and then awaiting the associated CR. As indicated at block 2054, if the CR indicates "retry", the process returns to block 2050, which represents master 232 again determining whether to issue a local or global bus DCBZ operation utilizing the additional information, if any, provided in the "retry" CR. If the CR to the local bus DCBZ operation issued at block 2052 does not indicate "retry" (block 2054) but instead indicates that the bus RWITM operation was successful in obtaining ownership of the requested memory block (block 2056), the process passes to block 2028, which has been described. If master 232 determines at block 2056 that the CR to the local bus DCBZ operation indicates that the operation cannot be serviced within the local coherency domain, the process passes to block 2060 and following blocks.

Block 2060 illustrates the requesting master 232 issuing a global bus DCBZ operation, as described above with respect to FIG. 15. As shown at block 2062, master 232 reissues the global bus DCBZ operation at block 2060 until a CR other than "retry" is received. Following receipt of a CR to the global bus DCBZ operation other than "retry" at block 2062, the process passes to block 2028 and following blocks, which have been described.

With reference now to block 2040, if a negative determination is made at blocks 2002, 2010, 2020 and 2030, L2 cache 230 does not hold a valid copy of the requested memory block. Accordingly, as indicated at block 2040 and 2042, L2 cache 230 performs a cache castout operation if needed to allocate a cache line for the requested memory block. Thereafter, the process passes to block 2050 and following blocks, which have been described.

Figure 21:
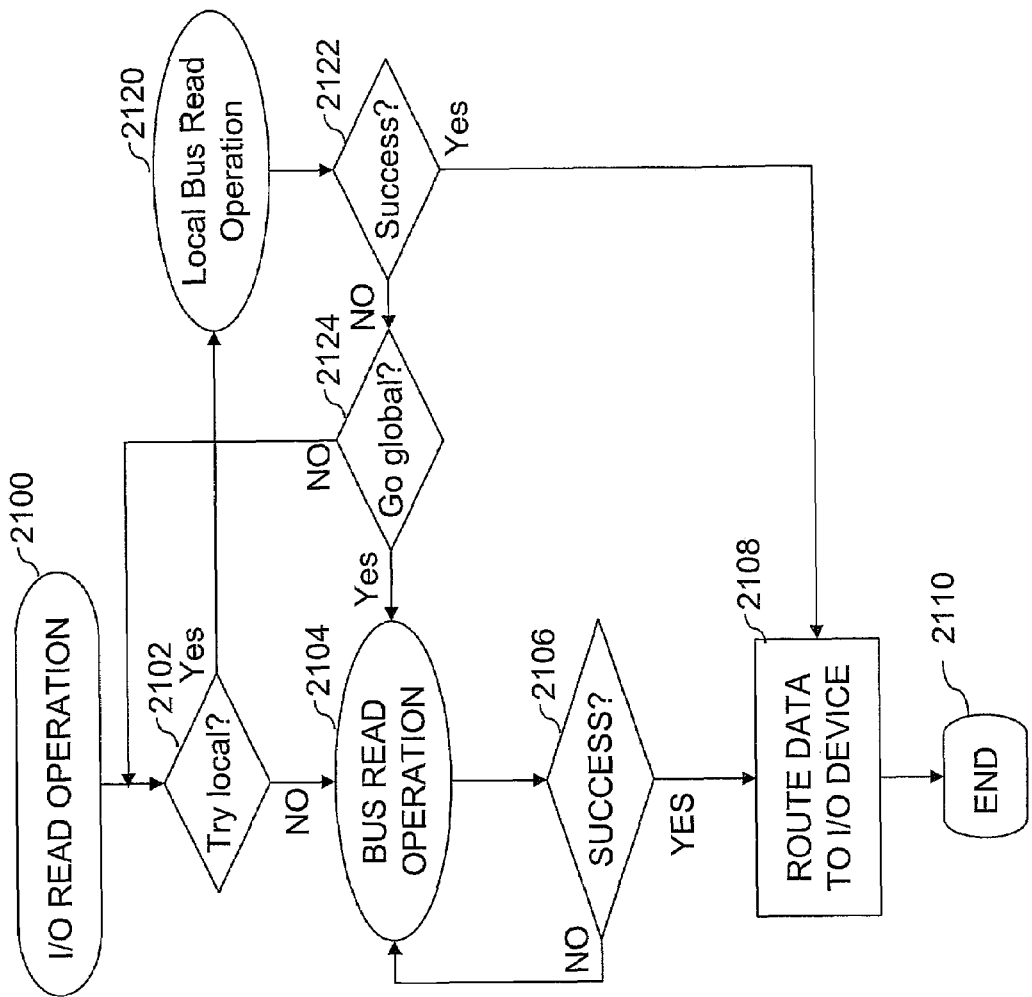
FIG. 21 is a high level logical flowchart of an exemplary method of performing an I/O read operation in a data processing system implementing coherency domains in accordance with the present invention.

Referring now to FIG. 21, there is illustrated a high level logical flowchart of an exemplary method of performing an I/O read operation in a data processing system implementing coherency domains in accordance with preferred embodiments of the present invention. In such embodiments, the process given in FIG. 21 is implemented in lieu of the process depicted in FIG. 8 and described above.

As shown, the process begins at block 2100 in response to receipt by the I/O controller 214 of a processing unit 104 of an I/O read request by an attached I/O device 216. In response to receipt of the I/O read request, I/O controller 214 determines at block 2102 whether or not to issue a global or local bus read operation to obtain the requested memory block.

If the I/O controller 214 elects to issue a global bus read operation, the process passes to block 2104, which is described below. If, however, I/O controller 214 elects to issue a local bus read operation, the process proceeds to block 2120, which illustrates I/O controller 214 issuing a local bus read operation, as described below with reference to FIG. 24, and then awaiting the associated CR. As indicated at block 2122, if the CR indicates "success", I/O controller 214 receives the requested memory block and then routes the requested memory block to I/O device 216, as shown at block 2108. Thereafter, the process ends at block 2110.

Returning to block 2122, if the CR for the local bus read operation issued at block 2120 does not indicate "success", the process passes to block 2124, which depicts I/O controller 214 determining whether the CR definitively indicates that a bus read operation cannot be serviced within the local coherency domain. If not, the process returns to block 2102, which represents I/O controller 214 again determining whether to issue a local or global bus read operation utilizing the additional information, if any, provided in the CR. In response to I/O controller 214 electing at block 2102 to issue a global bus read operation or in response to I/O controller 214 determining at block 2124 that the CR to the local bus read operation definitively indicates that the bus read operation cannot be serviced within the local coherency domain, the process passes to block 2104 and following blocks.

Block 2104 depicts I/O controller 214 issuing a global bus read operation on system interconnect 110 via local interconnect 114, as described above with reference to FIG. 11B. As indicated at block 2106, I/O controller 214 continues to issue the bus read operation until a CR is received indicating "success". Once the global bus read operation succeeds and the requested memory block is received, I/O controller 214 routes the data received in response to the global bus read operation to the requesting I/O device 216, as illustrated at block 2108. The process thereafter terminates at block 2110.

Figure 22:
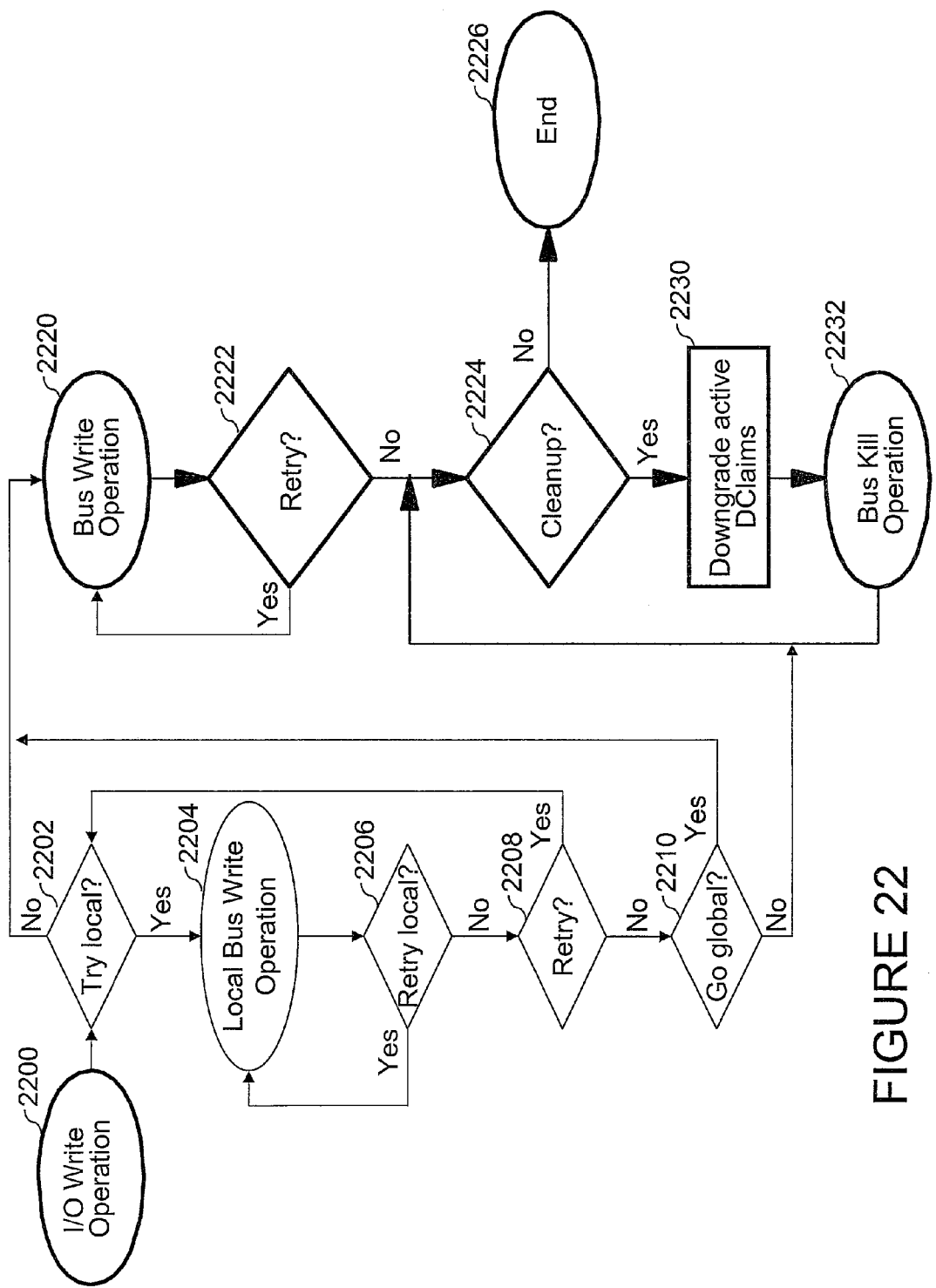
FIG. 22 is a high level logical flowchart of an exemplary method of performing an I/O write operation in a data processing system implementing coherency domains in accordance with the present invention.

With reference now to FIG. 22, there is depicted a high level logical flowchart of an exemplary method of performing an I/O write operation in a data processing system implementing coherency domains in accordance with preferred embodiments of the present invention. In such embodiments, the process given in FIG. 22 is performed in lieu of that illustrated in FIG. 9A.

As shown, the process begins at block 2200 in response to receipt by the I/O controller 214 of a processing unit 104 of an I/O write request by an attached I/O device 216. In response to receipt of the I/O write request, I/O controller 214 determines at block 2202 whether or not to issue a global or local bus write operation to obtain the requested memory block.

If I/O controller 214 elects to issue a global bus write operation, the process passes to block 2220, which is described below. If, however, I/O controller 214 elects to issue a local bus write operation, the process proceeds to block 2204, which illustrates I/O controller 214 issuing a local bus write operation, as described below with reference to FIG. 29, and then awaiting the associated CR. As indicated at block 2206, if the CR indicates "retry local", meaning that the local bus write operation can definitely be serviced within the local coherency domain if retried, I/O controller 214 reissues the local bus write operation at block 2204. If I/O controller 214 receives a CR providing more equivocal information, for example, simply "retry" (block 2208), the process returns block 2202, which has been described. Alternatively, if I/O controller 214 receives a CR indicating definitively that the bus write operation cannot be serviced within the local coherency domain (block 2210), the process proceeds to block 2220, which is described below. Finally, if I/O controller 214 receives a CR indicating that it has been awarded ownership of the requested memory block, the process passes from block 2204 through blocks 2206, 2208 and 2210 to block 2224 and following blocks, which illustrate I/O controller 214 performing cleanup operations, as described below.

Referring now to block 2220, I/O controller 214 issues a global bus write operation, as described above with reference to FIG. 17A. As indicated at block 2222, I/O controller 214 continues to issue the global bus write operation until a CR other than "retry" is received. If the CR for the global bus write operation issued at block 2220 indicates that no other snooper holds a valid copy of the requested memory block (block 2224), the process ends at block 2226. If, however, I/O controller 214 determines at block 2224 that the CR indicates that at least one stale cached copy of the requested memory block may remain, I/O controller 214 performs "cleanup" by downgrading any conflicting DClaim operations it snoops, as shown at block 2230, and issuing bus kill operations, as depicted at block 2232, until a CR is received at block 2224 indicating that no stale cached copies of the requested memory block remain in data processing system 100. Once cleanup operations are complete, the process ends at block 2226.

Figure 23:
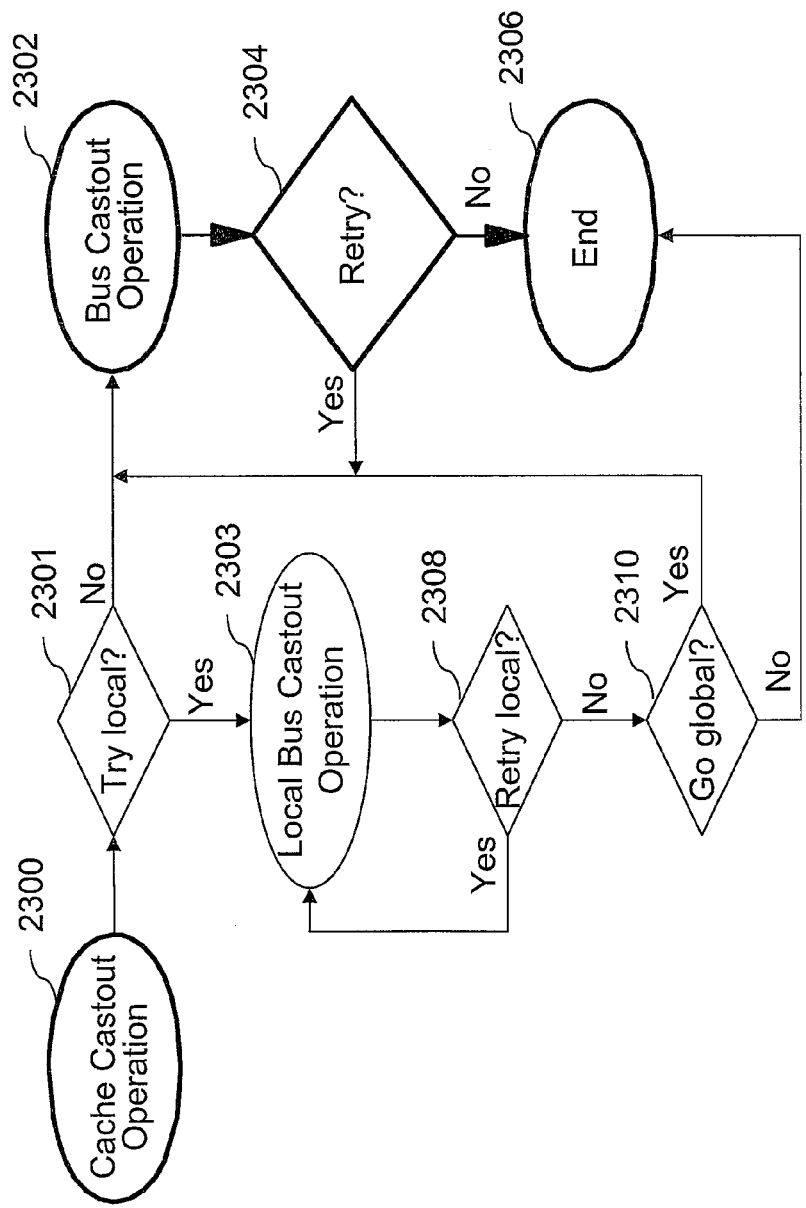
FIG. 23 is a high level logical flowchart of an exemplary method of performing a cache castout operation in a data processing system implementing coherency domains in accordance with the present invention.

Referring now to FIG. 23, there is illustrated a high level logical flowchart of an exemplary method of performing a cache castout operation in a data processing system implementing coherency domains in accordance with preferred embodiments of the present invention. In such embodiments, the process given in FIG. 23 is performed in lieu of that illustrated in FIG. 10.

The illustrated process begins at block 2300 when an L2 cache 230 determines that a castout of a cache line is needed, for example, at block 1804 of FIG. 18, block 1970 of FIG. 19 or block 2042 of FIG. 20. To perform the castout operation, the L2 cache 230 first determines at block 2301 whether or not to issue a global or local bus castout operation for the selected memory block.

If L2 cache 230 elects to issue a global bus castout operation, the process passes to block 2302, which is described below. If, however, L2 cache 230 elects to issue a local bus castout operation, the process proceeds to block 2303, which illustrates L2 cache 230 issuing a local bus castout operation, as described below with reference to FIG. 28, and then awaiting the associated CR. As indicated at block 2308, if the CR indicates "retry local", meaning that the local bus write operation can definitely be serviced within the local coherency domain if retried, L2 cache 230 reissues the local bus castout operation at block 2303. Alternatively, if L2 cache 230 receives a CR indicating definitively that the bus write operation cannot be serviced within the local coherency domain (block 2310), the process proceeds to block 2302, which is described below. Finally, if L2 cache 230 receives a CR indicating that the castout of the selected memory block succeeded, the process simply ends at block 2306.

Block 2302 depicts L2 cache 230 issuing a global bus castout operation on system interconnect 110 via local interconnect 114, as described above with respect to FIG. 16. As indicated at block 2304, the L2 cache 230 reissues the global bus castout operation until a CR other than "retry" is received. Thereafter, the process ends at block 2306.

B. Interconnect Operations with Coherency Domains

Figure 24:
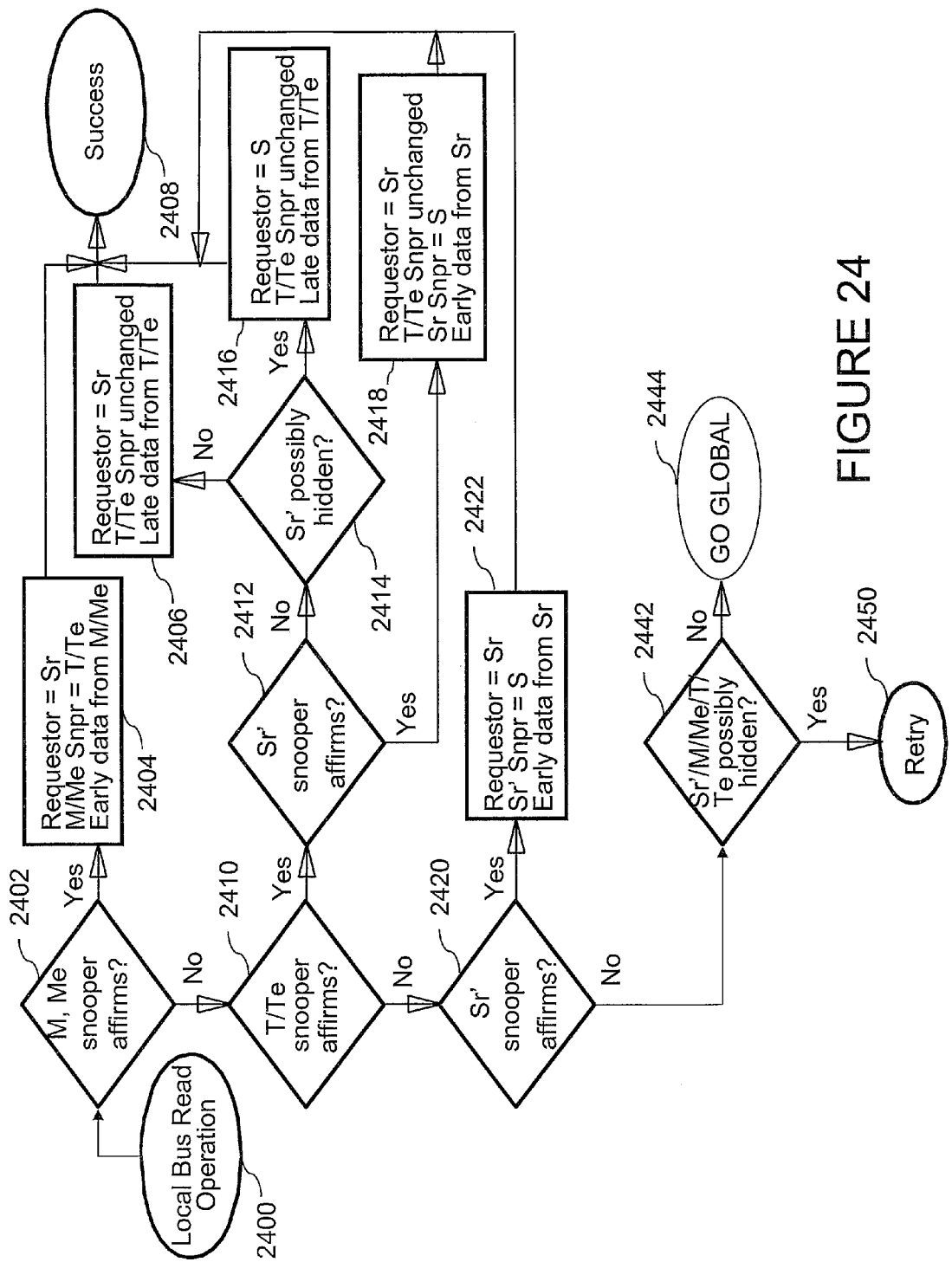
FIG. 24 is a high level logical flowchart of an exemplary method of performing a local bus read operation in a data processing system implementing coherency domains in accordance with the present invention.

With reference now to FIG. 24, there is depicted a high level logical flowchart of an exemplary method of performing a local bus read operation in a data processing system implementing coherency domains in accordance with preferred embodiments of the present invention. As shown, the process begins at block 2400, for example, at block 1812 of FIG. 18, with the issuance of a local bus read operation on local interconnect 114. As described above, the operations performed by the various snoopers 122, 236 in response to the local bus read operation depend upon the partial responses and CR for the bus read operation. The various partial responses that snoopers 122, 236 may provide to distributed response logic 210 are represented in FIG. 24 by the outcomes of decision blocks 2402, 2410, 2412, 2414, 2420, and 2442. These partial responses in turn determine the CR for the local bus read operation.

If a snooper 236 affirms the bus read operation with a partial response indicating that the L2 cache 230 containing the snooper 236 holds the requested memory block in either the M or Me state as shown at block 2402, the process proceeds from block 2402 to block 2404. Block 2404 indicates the operations of the master in the requesting L2 cache 230 and the affirming L2 cache 230 in response to the request. In particular, the snooper 236 in the affirming L2 cache 230 updates the cache state of the requested memory block from M to T or from Me to Te and may initiate transmission of the requested memory block to the requesting L2 cache 230 prior to receipt of the CR (i.e., provides "early" data). In response to receipt of the requested memory block, the master 232 in the requesting L2 cache 230 updates the cache state of the requested memory block to the Sr state. The process ends with distributed response logic 210 generating a CR indicating success, as depicted at block 2408.

If a snooper 236 affirms the bus read operation with a partial response indicating that the L2 cache 230 containing the snooper 236 holds the requested memory block in either the T or Te state as shown at block 2410 and an Sr' snoop response is also given affirming the local bus read operation as shown at block 2412, the process passes to block 2418. Block 2418 represents the Sr' snooper 236 updating the cache state of its copy of the requested memory block to S and initiating transmission of the requested memory block to the requesting L2 cache 230 prior to receipt of the CR (i.e., provides "early" data). In response to receipt of the requested memory block, the master 232 in the requesting L2 cache 230 updates the cache state of the requested memory block to the Sr state. The cache state of the T or Te snooper affirming the local bus read operation remains unchanged. The process then ends with distributed response logic 210 generating a CR indicating "success", as depicted at block 2408.

If the complex of partial responses include a T or Te snooper 236 affirming the bus read operation, no snooper 236 affirming the bus read operation with an Sr' snoop response, and a snooper 236 providing a partial response (e.g., a type of retry) that may indicate that an Sr' snooper 236 is possibly hidden, the process passes to block 2416. Block 2416 represents the T or Te snooper 236 that affirmed the bus read operation initiating transmission of the requested memory block to the requesting L2 cache 230 after receipt of the CR (i.e., provides "late" data) and retaining the requested memory block in the T or Te state. In response to receipt of the requested memory block, the master 232 in the requesting L2 cache 230 holds the requested memory block in the S state (since an Sr snooper 236 may be hidden and only one Sr snooper 236 is permitted in the data delivery domain for the requested memory block). The process then ends with distributed response logic 210 generating a CR indicating success, as depicted at block 2408.

If the complex of partial responses includes a T or Te snooper 236 affirming the bus read operation, no Sr' snooper 236 affirming the local bus read operation, and no snooper 236 providing a partial response indicating a possibly hidden Sr' snooper 236, the process passes to block 2406. Block 2406 represents the T or Te snooper 236 that affirmed the bus read operation initiating transmission of the requested memory block to the requesting L2 cache 230 after receipt of the CR (i.e., provides "late" data) and retaining the requested memory block in the T or Te state. In response to receipt of the requested memory block, the master 232 in the requesting L2 cache 230 holds the requested memory block in the Sr state (since no other Sr snooper 236 exists in the data delivery domain for the requested memory block). The process then ends with distributed response logic 210 generating a CR indicating success, as depicted at block 2408.

Referring now to block 2420, if no M, Me, T or Te snooper 236 affirms the bus read operation, but a snooper 236 affirms the local bus read operation with an Sr' partial response, the local bus read operation is serviced in accordance with block 2422. In particular, the Sr' snooper 236 initiates transmission of the requested memory block to the requesting L2 cache 230 prior to receipt of CR and updates the state of the requested memory block in its L2 cache directory 302 to the S state. The master 232 in the requesting L2 cache 230 holds the requested memory block in the Sr state. The process then ends with distributed response logic 210 generating a CR indicating success, as depicted at block 2408.

Turning now to block 2442, if no M, Me, T, Te or Sr' snooper 236 affirms the local bus read operation or is possibly hidden, response logic 210 generates a "go global" CR (block 2444) indicating to the master 232 that the bus read operation should be reissued as a global bus read operation. If, on the other hand, no M, Me, T, Te or Sr' snooper 236 affirms the bus read operation and a snooper 236 provides a partial response indicating that it cannot affirm the bus read operation but may hold the requested memory block in one of the M, Me, Sr, T or Te cache state, response logic 210 generates a CR indicating "retry", as depicted at block 2450. In response to the "retry" CR, the master 232 may reissue the bus read operation as either a local or global bus read operation, as explained above with reference to block 1810.

Figure 25:
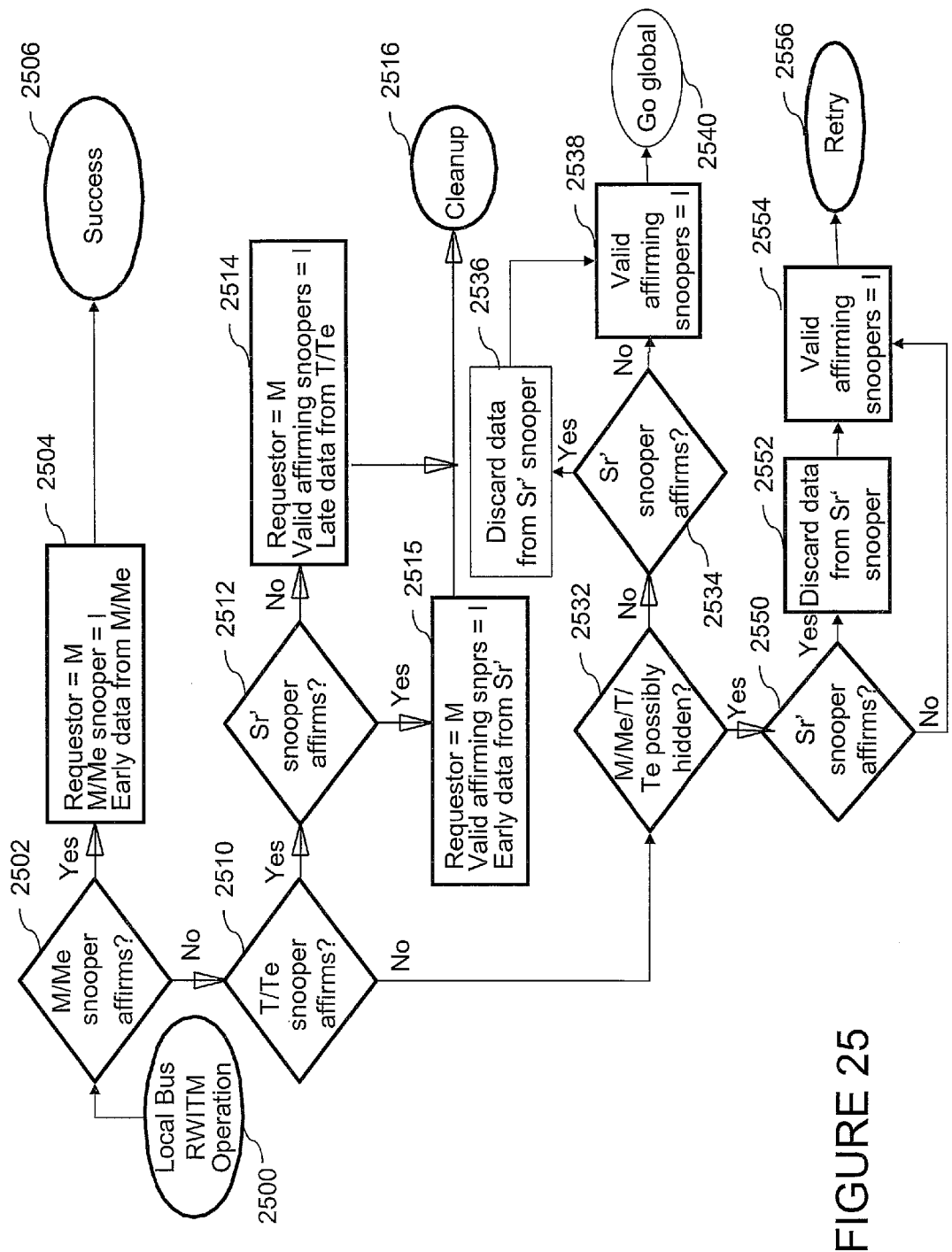
FIG. 25 is a high level logical flowchart of an exemplary method of performing a local bus RWITM operation in a data processing system implementing coherency domains in accordance with the present invention.

Referring now to FIG. 25, there is illustrated a high level logical flowchart of an exemplary method of performing a local bus RWITM operation in a data processing system implementing coherency domains in accordance with preferred embodiments of the present invention. The process begins at block 2500 with a master 232 issuing a local bus RWITM operation on the local interconnect 114 of a coherency domain, for example, at block 1948 of FIG. 19. The operations performed by the various snoopers 122, 236 in response to the local bus RWITM operation depend upon the partial responses and CR for the local bus RWITM operation. The various partial responses that snoopers 122, 236 may provide to distributed response logic 210 are represented in FIG. 25 by the outcomes of decision blocks 2502, 2510, 2512, 2532, 2534 and 2550. These partial responses in turn determine the CR for the local bus RWITM operation.

If a snooper 236 affirms the local bus RWITM operation with a partial response indicating that the L2 cache 230 containing the snooper 236 holds the requested memory block in either the M or Me state as shown at block 2502, the process proceeds from block 2502 to block 2504. Block 2504 indicates the operations of the requesting L2 cache 230 and the affirming L2 cache 230 in response to the request. In particular, the snooper 236 in the affirming L2 cache 230 updates the cache state of the requested memory block to the I state and may initiate transmission of the requested memory block to the requesting L2 cache 230 prior to receipt of the CR (i.e., provides "early" data). In response to receipt of the requested memory block, the master 232 in the requesting L2 cache 230 holds the requested memory block in the M state. The process then ends with distributed response logic 210 generating a CR indicating success, as depicted at block 2506.

If a snooper 236 affirms the bus RWITM operation with a partial response indicating that the L2 cache 230 containing the snooper 236 holds the requested memory block in either the T or Te state as shown at block 2510 and no snooper 236 affirms the bus RWITM operation with a Sr' partial response as shown at block 2512, the process passes to block 2514. Block 2514 represents the T or Te snooper 236 that affirmed the bus RWITM request initiating transmission of the requested memory block to the requesting L2 cache 230 in response to receipt of the CR (i.e., provides "late" data). In response to receipt of the requested memory block, the master 232 in the requesting L2 cache 230 holds the cache state of the requested memory block in the M state. All affirming snoopers 236 update their respective cache states for the requested memory block to I. As shown at block 2516, the CR generated by distributed response logic 210 indicates "cleanup", meaning that the master 232 may have to issue one or more bus kill operations to invalidate other copies of the requested memory block, if any, residing outside of the local coherency domain, as described above with reference to blocks 1926, 1928 and 1924 of FIG. 19.

If the complex of partial responses includes a T or Te snooper 236 and Sr' snooper 236 both affirming the local bus RWITM operation, the process passes to block 2515. Block 2515 represents the Sr' snooper 236 that affirmed the bus RWITM request initiating transmission of the requested memory block to the requesting L2 cache 230 prior to receipt of the CR (i.e., providing "early" data). In response to receipt of the requested memory block, the master 232 in the requesting L2 cache 230 holds the cache state of the requested memory block in the M state. All affirming snoopers 236 update their respective cache states for the requested memory block to I. The CR generated by distributed response logic 210 indicates "cleanup", as shown at block 2516.

Turning now to block 2532, if no M, Me, T, or Te snooper 236 affirms the local bus RWITM operation, and further, no M, Me, T, or Te snooper 236 provides a partial response indicating that it may be possibly hidden (block 2532), all affirming snoopers 236 invalidate the requested memory block in their respective L2 cache directories 302 (block 2538). In addition, data provided by an Sr' snooper 236 affirming the local bus RWITM operation, if any, is discarded by the master 232 (blocks 2534 and 2536) in response to receipt of the CR. Response logic 210 generates a CR indicating "go global", as depicted at block 2540, because no HPC for the requested memory block can be found in the local coherency domain.

Affirming snoopers 236 also invalidate their respective copies of the requested memory block at block 2544 and response logic 210 generates a "retry" CR at block 2556 if no M, Me, T or Te snooper 236 affirms the local bus RWITM operation (blocks 2502 and 2510) but a snooper 236 provides a partial response indicating that it may hold the requested memory block in one of the M, Me, T, or Te states but cannot affirm the local bus RWITM operation (block 2532). As shown at block 2550, if the complex of partial responses further includes an Sr' snooper 236 affirming the local bus RWITM operation and thus providing early data, the "retry" CR provided by response logic 210 further instructs the requesting L2 cache 230 to discard the copy of the requested memory block provided by the Sr' snooper 236, as shown at block 2552. The copy of the requested memory block is discarded as no HPC is available to mediate the transfer of HPC status to the requesting master 232.

Figure 26:
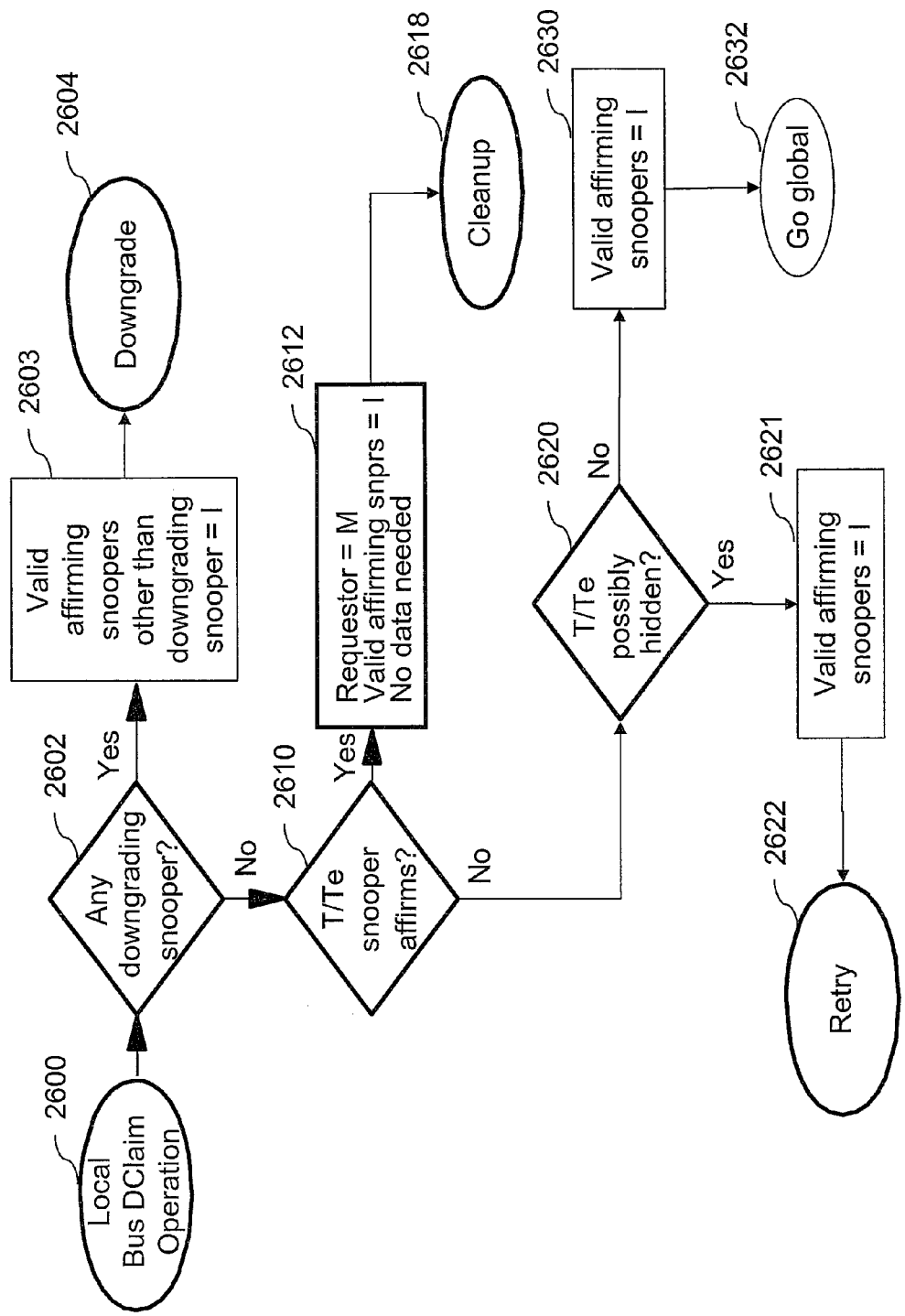
FIG. 26 is a high level logical flowchart of an exemplary method of performing a local bus DClaim operation in a data processing system implementing coherency domains in accordance with the present invention.

With reference now to FIG. 26, there is illustrated a high level logical flowchart of an exemplary method of performing a local bus DClaim operation in a data processing system implementing coherency domains in accordance with preferred embodiments of the present invention. The process begins at block 2600, for example, with a master 232 issuing a local bus DClaim operation on a local interconnect 114 at block 1932 of FIG. 19. The various partial responses that snoopers 236 may provide to distributed response logic 210 in response to the local bus DClaim operation are represented in FIG. 26 by the outcomes of decision blocks 2602, 2610, and 2620. These partial responses in turn determine what CR response logic 210 generates for the local bus DClaim operation.

As shown at block 2602, if any snooper 236 issues a partial response downgrading the local bus DClaim operation to a bus RWITM operation as illustrated, for example, at block 1938 of FIG. 19, each affirming snooper 236 other than the downgrading snooper 236 invalidates its respective copy of the requested memory block, if any (block 2603), and distributed response logic 210 generates a CR indicating "downgrade", as shown at block 2604. In response to this CR, the master 232 of the local bus DClaim operation next attempts to gain ownership of the requested memory block utilizing a local bus RWITM operation, as depicted at block 1948 of FIG. 19.

If a snooper 236 affirms the local bus DClaim operation with a partial response indicating that the L2 cache 230 containing the snooper 236 holds the requested memory block in either the T or Te state as shown at block 2610, the process passes to block 2612. Because no data transfer is required in response to a bus DClaim operation, block 2612 indicates that the master 232 in the requesting L2 cache 230 updates the cache state of the requested memory block in L2 cache directory 302 to the M state. All affirming snoopers 236 update their respective cache states for the requested memory block to I. As shown at block 2618, distributed response logic 210 generates a CR indicating "cleanup", meaning that the requesting L2 cache 230 must issue one or more bus kill operations to invalidate copies of the requested memory block, if any, held outside of the local coherency domain.

Turning now to block 2620, if no snooper downgrades the local bus DClaim operation (block 2602), no T or Te snooper 236 affirms the local bus DClaim operation (block 2610), and further, and a snooper 236 provides a partial response indicating that it may hold the requested memory block in the T or Te state but cannot affirm the local bus DClaim operation, the process passes to blocks 2621 and 2622. These blocks illustrate each affirming snooper 236 invalidating its respective copy of the requested memory block, if any (block 2621), and response logic 210 generating a CR indicating "retry" (block 2622). In response to the "retry" CR, the requesting master 232 may reissue the bus DClaim operation as either a local or global operation, as explained above with reference to block 1931 of FIG. 19. If, however, no snooper downgrades the local bus DClaim operation (block 2602), no T or Te snooper 236 affirms the bus DClaim operation or is possibly hidden (blocks 2602, 2610, 2620), response logic 210 provides a "go global" CR, as shown at block 2632, and all affirming snoopers, if any, having a valid copy of the requested memory block invalidate their respective copies of the requested memory block, as shown at block 2630. In response to the "go global" CR, the master 232 reissues the bus DClaim operation as a global operation, as depicted at block 1940 of FIG. 19.

Figure 27:
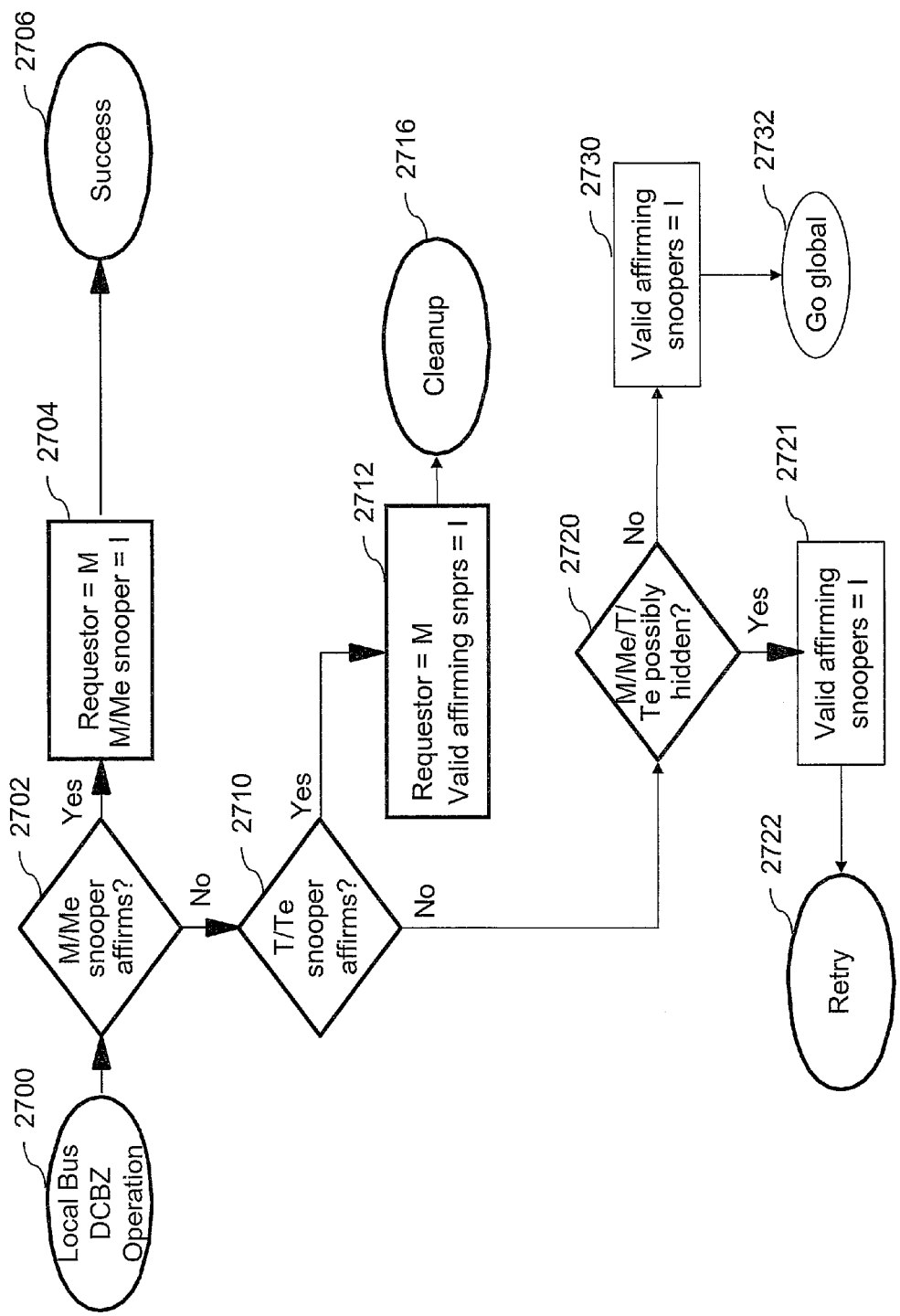
FIG. 27 is a high level logical flowchart of an exemplary method of performing a local bus DCBZ operation in a data processing system implementing coherency domains in accordance with the present invention.

Referring now to FIG. 27, there is depicted a high level logical flowchart of an exemplary method of performing a local bus DCBZ operation in a data processing system implementing coherency domains in accordance with preferred embodiments of the present invention. The process begins at block 2700, for example, with the issuance of a local bus DCBZ operation on a local interconnect 114 at block 2052 of FIG. 20. The various partial responses that snoopers 236 may provide to distributed response logic 210 are represented in FIG. 27 by the outcomes of decision blocks 2702, 2710, and 2720. These partial responses in turn determine the CR for the local bus DCBZ operation.

If a snooper 236 affirms the local bus DCBZ operation with a partial response indicating that the L2 cache 230 containing the snooper 236 holds the requested memory block in either the M or Me state as shown at block 2702, the process proceeds to block 2704. Block 2704 indicates the operations of the requesting L2 cache 230 and affirming L2 cache 230 in response to the request. In particular, the master 232 in the requesting L2 cache 230 updates the cache state of the requested memory block to the M state (no data is transferred), and the snooper 236 in the affirming L2 cache 230 updates the cache state of the requested memory block to the I state. The process then ends with distributed response logic 210 generating a CR indicating "success", as depicted at block 2706.

If, on the other hand, a snooper 236 affirms the local bus DCBZ operation with a partial response indicating that the L2 cache 230 containing the snooper 236 holds the requested memory block in either the T or Te state as shown at block 2710, the process passes to block 2712. Block 2712 represents the T or Te snooper 236 (and any other valid affirming snooper) invalidating its copy of the requested memory block and the master 232 in the requesting L2 cache 230 updating the cache state of the requested memory block to the M state. As further illustrated at block 2716, distributed response logic 210 generates a CR indicating "cleanup" in order to ensure the invalidation of copies of the requested memory block, if any, held in L2 caches 230 outside of the local coherency domain.

Turning now to block 2720, if no M, Me, T or Te snooper 236 affirms the local bus DCBZ operation (blocks 2702 and 2710), and further, a snooper 236 provides a partial response indicating that it may hold the requested memory block in the M, Me, T or Te state but cannot affirm the local bus DCBZ operation, each affirming snooper 236 invalidates its respective copy of the requested memory block, if any (block 2721), and response logic 210 generates a CR indicating "retry", as depicted at block 2722. In response to the "retry" CR, the requesting master 232 may reissue the bus DCBZ operation as either a local or global operation, as explained above with reference to block 2050 of FIG. 20. If, however, no M, Me, T or Te snooper 236 affirms the bus DClaim operation or is possibly hidden (blocks 2702, 2710, 2720), response logic 210 provides a "go global" CR, as shown at block 2732, and all affirming snoopers, if any, having a valid copy of the requested memory block invalidate their respective copies of the requested memory block, as shown at block 2730. In response to the "go global" CR, the master 232 reissues the bus DCBZ operation as a global operation, as depicted at block 2060 of FIG. 20.

Figure 28:
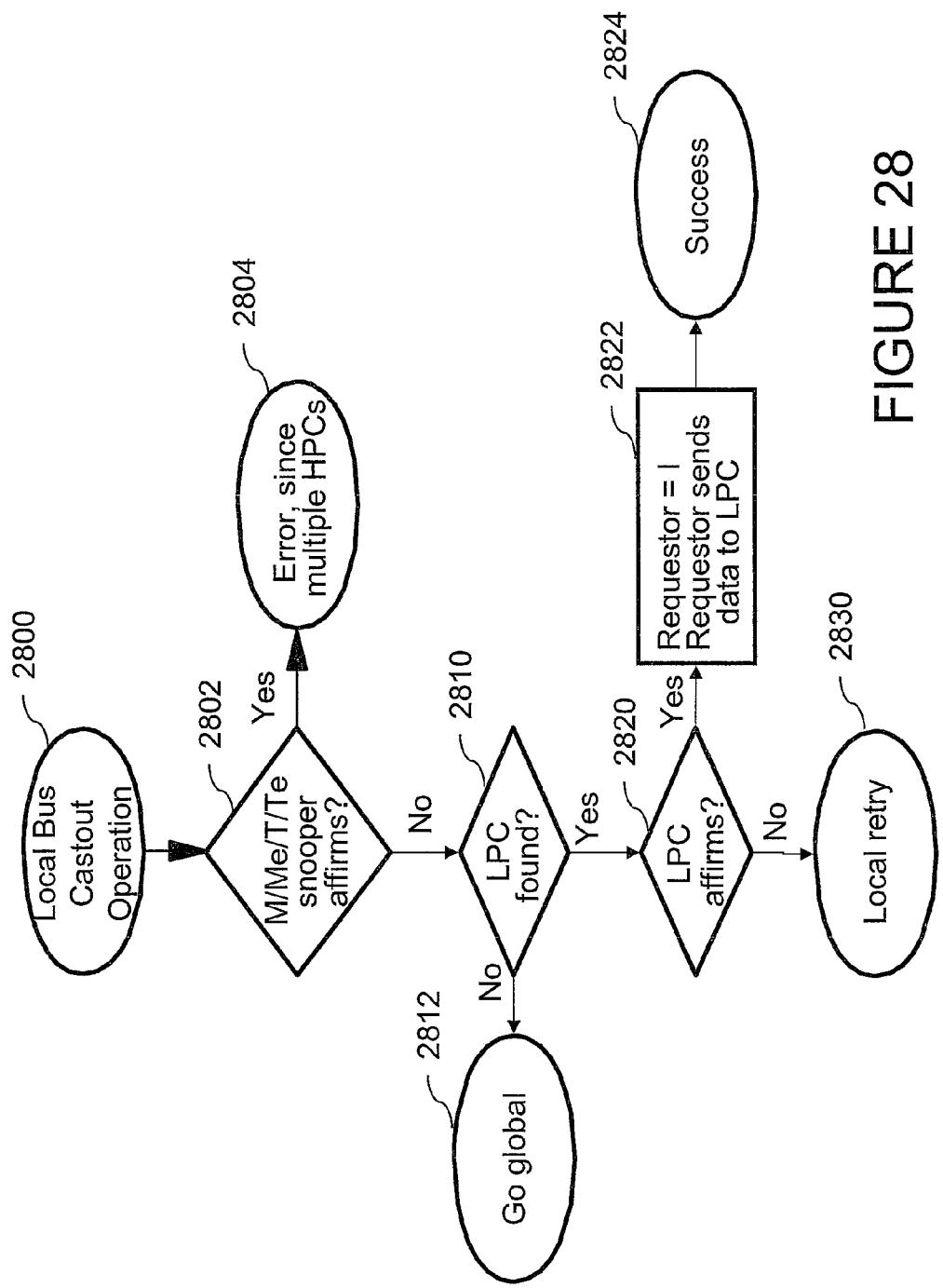
FIG. 28 is a high level logical flowchart of an exemplary method of performing a local bus castout operation in a data processing system implementing coherency domains in accordance with the present invention.

With reference now to FIG. 28, there is illustrated a high level logical flowchart of an exemplary method of performing a local bus castout operation in a data processing system implementing coherency domains in accordance with preferred embodiments of the present invention. The process begins at block 2800, for example, with the issuance of a local bus castout operation on a local interconnect 114 at block 2303 of FIG. 23. The various partial responses that snoopers 122, 236 may provide to distributed response logic 210 are represented in FIG. 28 by the outcomes of decision blocks 2802, 2810 and 2820. These partial responses in turn determine the CR for the local bus castout operation.

If a snooper 236 affirms the bus castout operation with a partial response indicating that the L2 cache 230 containing the snooper 236 holds the requested memory block in any of the M, Me, T or Te states as shown at block 2802, an error halting processing occurs, as indicated at block 2804, because the memory block being castout can have only one HPC (i.e., the requesting L2 cache 230).

As depicted at block 2810, if no M, Me, T, or Te snooper 236 affirms the bus castout operation (block 2802), and further, if no snooper 122 provides a partial response indicating that it is responsible (i.e., the LPC) for the requested memory block, response logic 210 provides a "go global" CR, as depicted at block 2812, because the LPC is a required participant to receive the castout memory block. If, however, no M, Me, T, or Te snooper 236 affirms the bus castout operation (block 2802) and a snooper 122 provides a partial response indicating that it is responsible (i.e., the LPC) for the requested memory block but does not affirm the bus castout operation (blocks 2810 and 2820), response logic 210 generates a CR indicating "local retry", as depicted at block 2830, because the LPC is in the local coherency domain but must be available to receive the castout memory block. If a memory controller snooper 122 affirms the bus castout operation (block 2820) and no M, Me, T or Te snooper 236 affirms the bus castout operation (block 2802), the requesting L2 cache 230 invalidates the memory block within its cache directory 302 and transmits the memory block to the LPC, as depicted at block 2822. In addition, response logic 210 generates a CR indicating "success", as illustrated at block 2824.

Figure 29:
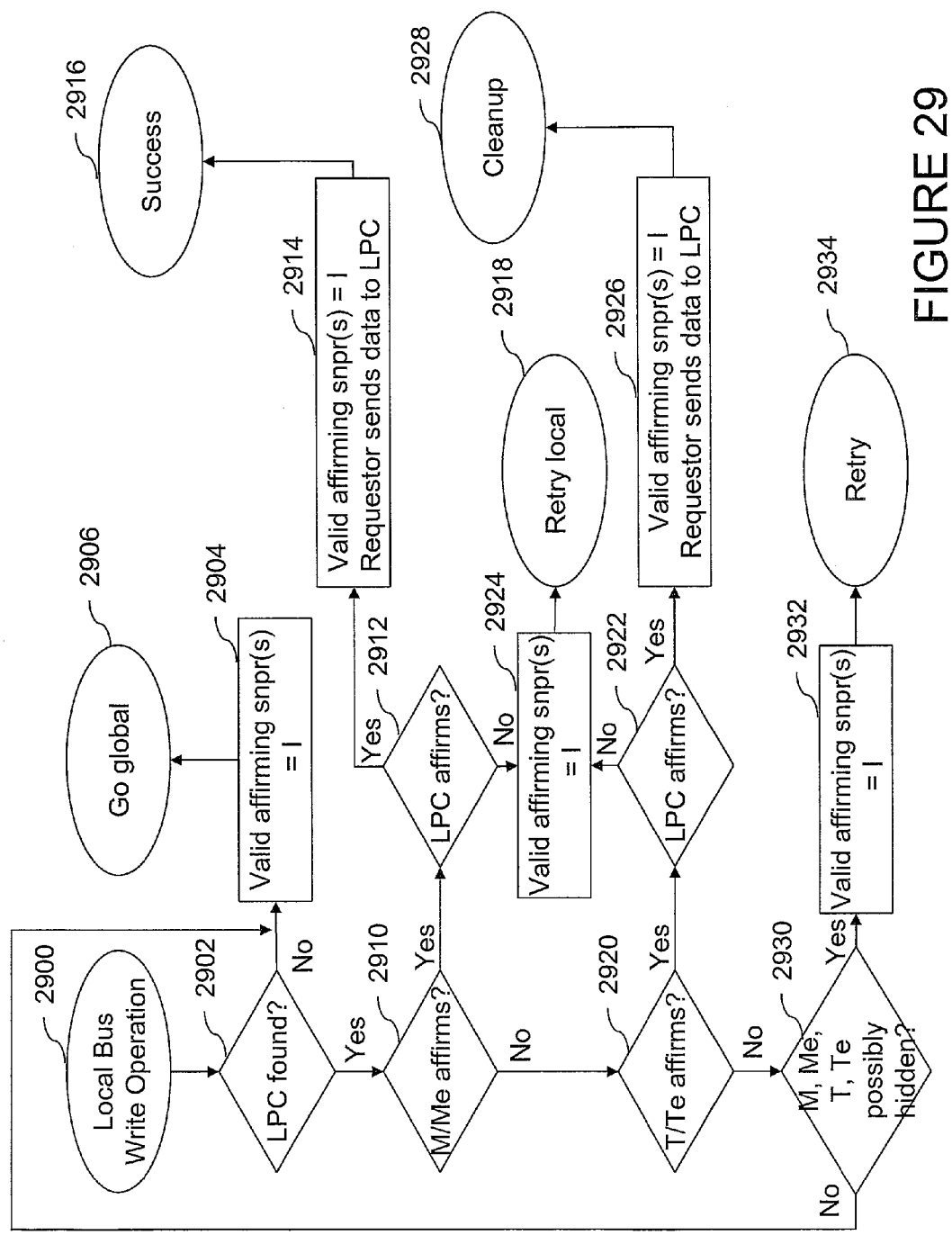
FIG. 29 is a high level logical flowchart of an exemplary method of performing a local bus write operation in a data processing system implementing coherency domains in accordance with the present invention.

Referring now to FIG. 29, there is depicted a high level logical flowchart of an exemplary method of performing a local bus write operation in a data processing system implementing coherency domains in accordance with preferred embodiments of the present invention. The process begins at block 2900, for example, with the issuance of a local bus write operation on a local interconnect 114 at block 2204 of FIG. 22. The various partial responses that snoopers 122, 236 may provide to distributed response logic 210 are represented in FIG. 29 by the outcomes of decision blocks 2902, 2910, 2912, 2920, 2922 and 2930. These partial responses in turn determine the CR for the local bus write operation.

If no snooper 122 provides a partial response indicating that is responsible (i.e., the LPC) for the target memory block (block 2902), each affirming snooper 236 invalidates its respective copy of the target memory block, as shown at block 2904, and response logic 210 provides a "go global" CR, as illustrated at block 2906, because the LPC is a necessary participant in the bus write operation. If a snooper 122 provides a partial response indicating that it is responsible (i.e., the LPC) for the requested memory block but does not affirm the bus write operation (block 2912) and a M or Me snooper 236 affirms the local bus write operation (block 2910), each affirming snooper 236 invalidates its respective copy of the requested memory block, if any (block 2924), and response logic 210 generates a CR indicating "retry local", as depicted at block 2918. A "retry local" CR is generated because the LPC must be available to receive the target memory block. Response logic 210 similarly generates a "retry" CR at block 2934 if a memory controller snooper 122 indicates that it is the LPC for the target memory block (block 2902), no M, Me, T or Te snooper 236 affirms the local bus write operation (block 2910 and 2920), and a partial response indicates that a M, Me, T or Te snooper 236 may be possibly hidden (block 2930). In this case, each affirming snooper 236 invalidates its copy, if any, of the target memory block (block 2932), and response logic 210 generates a "retry" CR so that the local bus write operation only succeeds when no HPC copy of the requested memory block remains in the system.

Referring again to block 2912, assuming that an M or Me snooper 236 affirms the local bus write operation and a snooper 122 affirms the bus write operation as the LPC, the requesting L2 cache 230 transmits the requested memory block to the LPC snooper 122, and snoopers 236, if any, affirming the bus write operation invalidate their respective copies of the requested memory block (block 2914). The process ends with distributed response logic 210 generating a CR indicating "success" (block 2916).

As depicted at block 2920 and following blocks, if a snooper 122 provides a partial response indicating that it is the LPC for the target memory block (block 2902) but cannot affirm the local bus write operation (block 2922), no M or Me snooper 236 affirms the local bus write operation (block 2910), and a T or Te snooper 236 affirms the local bus write operation, distributed response logic 210 generates a CR indicating "retry local" to force the operation to be reissued locally (block 2918), and snoopers 236 affirming the local bus write operation invalidate their respective copies of the requested memory block (block 2924). Assuming the same partial responses except for the LPC snooper 122 affirming the local bus write operation (block 2922), the requesting L2 cache 230 transmits the requested memory block to the LPC snooper 122, and each snooper 236 affirming the local bus write operation invalidates its respective copy of the requested memory block (block 2926). The process ends with distributed response logic 210 generating a CR indicating "cleanup" so that any other copies of the requested memory block that may be held outside of the local coherency domain are invalidated (block 2928).

As has been described, the present invention supports the implementation of coherency domains within a broadcast-based SMP data processing system that permit the scope of broadcast of certain operations to be restricted to a local coherency domain in operating scenarios in which the operation can be serviced within the local coherency domain. In this manner, the limited bandwidth on local and system interconnects is advantageously conserved.

V. Domain Indicators

In the embodiment described above, masters 232 in L2 caches 230 have no a priori knowledge of whether an operation will succeed if issued locally or whether a global broadcast of the operation will ultimately be required. As a consequence, over time many operations will have to be issued first as local operations and then reissued as global operations. As will be appreciated, it would be desirable to limit the issuance of unneeded local-only operations in order to reduce operational latency and conserve additional bandwidth on local interconnects.

A. Exemplary Implementation of Domain Indicators

Figure 30:
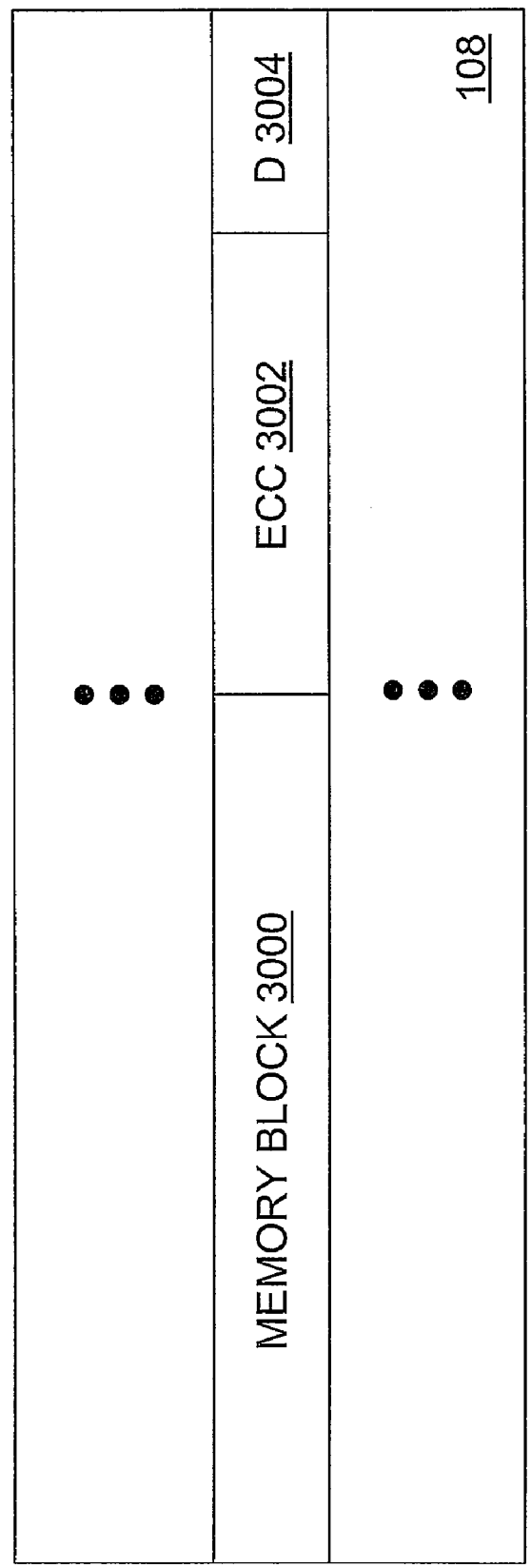
FIG. 30 illustrates a domain indicator in accordance with a preferred embodiment of the present invention.

Accordingly, the present invention may be further enhanced through the implementation of a domain indicator per memory block that indicates whether or not a copy of the associated memory block is cached outside of the local coherency domain. For example, FIG. 30 depicts a first exemplary implementation of a domain indicator in accordance with the present invention. As shown in FIG. 30, a system memory 108, which may be implemented in dynamic random access memory (DRAM), stores a plurality of memory blocks 3000. System memory 108 stores in association with each memory block 3000 an associated error correcting code (ECC) 3002 utilized to correct errors, if any, in memory block 3000 and a domain indicator 3004. Although in some embodiments of the present invention, domain indicator 3004 may identify a particular coherency domain (i.e., specify a coherency domain ID), it is hereafter assumed that domain indicator 3004 is a 1-bit indicator that is set (e.g., to '1' to indicate "local") if the associated memory block 3000 is cached, if at all, only within the same coherency domain as the memory controller 106 serving as the LPC for the memory block 3000. Domain indicator 3004 is reset (e.g., to '0' to indicate "global") otherwise. The setting of domain indicators 3004 to indicate "local" may be implemented imprecisely in that a false setting of "global" will not induce any coherency errors, but may cause unneeded global broadcasts of operations.

Importantly, a memory controller 106 that sources a memory block in response to an operation preferably transmits the associated domain indicator 3004 in conjunction with the requested memory block.

B. Interconnect Operations with Coherency Domains and Domain Indicators

With the exemplary implementation of domain indicators 3004, the CPU and cache operations described above with reference to FIGS. 18-23 and 9b and the local bus DClaim operation, local Bus DCBZ operation, and global bus kill operation described above with reference to FIGS. 26, 27 and 14, respectively, remain essentially unchanged. Modifications are preferably made, however, in the replacement of victim memory blocks. First, cache castout operations, such as that illustrated at blocks 1806, 1970, 2042 of FIGS. 18-20, respectively, are preferably performed not only for victim memory blocks in the M and T coherency states as described above, but also for victim memory blocks in the Te coherency state. Despite being consistent with the system memory image, Te memory blocks are preferably replaced via cache castout operations rather than simple L2 cache directory updates because of a second enhancement, namely, the use of castout operations to update domain indicators 3004 in system memories 108 and to indicate the possible presence of shared copies of the memory block in one or more other coherency domains, as described further below with reference to FIGS. 39-40.

Figure 31:
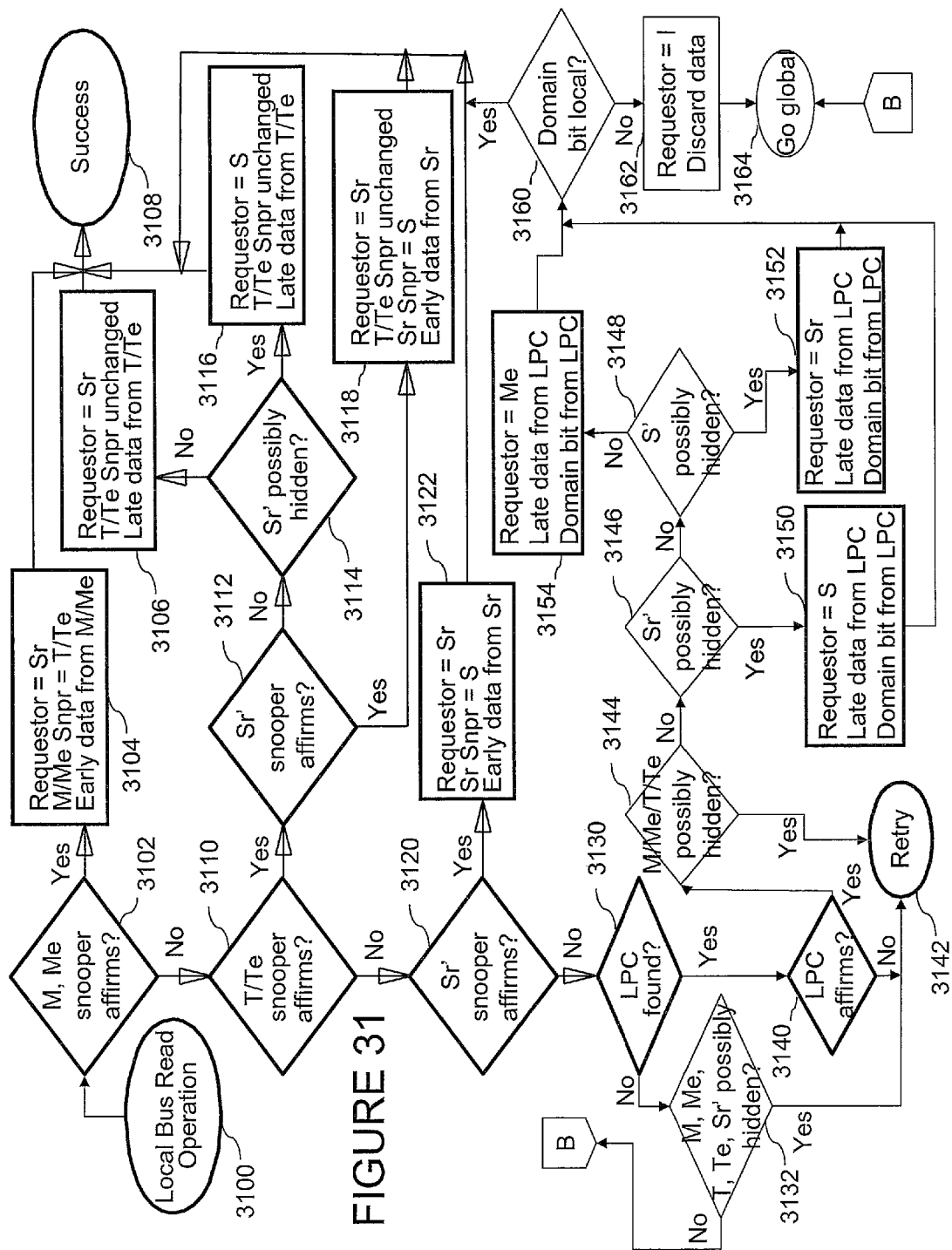
FIG. 31 is a high level logical flowchart of an exemplary method of performing a local bus read operation in a data processing system implementing coherency domains and domain indicators in accordance with the present invention.

The implementation of domain indicators 3004 also permits enhancement of the local and global bus read operations, local and global bus RWITM operations, global bus DClaim and DCBZ operations, local and global bus write operations, and global bus partial write operations described below with reference to FIGS. 31-41. Referring now to FIG. 31, there is depicted a high level logical flowchart of an exemplary method of performing a local bus read operation in a data processing system implementing coherency domains and domain indicators in accordance with the present invention. The process begins at block 3100, for example, at block 1812 of FIG. 18, with an L2 cache 230 issuing a local bus read operation on its local interconnect 114. The various partial responses that snoopers 122, 236 may provide to distributed response logic 210 in response to snooping the local bus read operation are represented in FIG. 31 by the outcomes of decision blocks 3102, 3110, 3112, 3114, 3120, 3130, 3132, 3140, 3144, 3146 and 3148. These partial responses in turn determine the CR for the local bus read operation.

As shown at block 3102, if a snooper 236 of an L2 cache 230 affirms the local bus read operation with a partial response indicating that the L2 cache 230 holds the requested memory block in either the M or Me state, the process proceeds from block 3102 to block 3104. Block 3104 indicates the operations of the requesting L2 cache 230 and the affirming L2 cache 230 in response to the local bus read operation. In particular, the snooper 236 in the affirming L2 cache 230 updates the cache state of the requested memory block from M to T or from Me to Te. In addition, the snooper 236 in the affirming L2 cache 230 may initiate transmission of the requested memory block to the requesting L2 cache 230 prior to receipt of the CR (i.e., provides "early" data). Upon receipt, the master 232 in the requesting L2 cache 230 places the requested memory block in L2 cache array 300 in the Sr state. The process ends with distributed response logic 210 generating a CR indicating "success", as depicted at block 3108.

If, on the other hand, a snooper 236 of an L2 cache 230 affirms the local bus read operation with a partial response indicating that the L2 cache 230 holds the requested memory block in either the T or Te state (block 3110) and an Sr' snooper 236 also affirms the bus read operation (block 3112), the process passes to block 3118. Block 3118 represents the Sr' snooper 236 updating the cache state of the requested memory block to S and initiating transmission of the requested memory block to the requesting L2 cache 230 prior to receipt of the CR (i.e., provides "early" data). Upon receipt, the master 232 in the requesting L2 cache 230 places the requested memory block in L2 cache array 300 in the Sr state. The T or Te snooper 236 remains unchanged. The process ends with distributed response logic 210 generating a CR indicating "success", as depicted at block 3108.

If the complex of partial responses includes a T or Te snooper 236 affirming the bus read operation (block 3110), no Sr' snooper 236 affirming the bus read operation (block 3112), and a snooper 236 providing an partial response (e.g., a type of retry) indicating that an Sr' snooper 236 may be possibly hidden in the local data delivery domain (block 3114), the process passes to block 3116. Block 3116 represents the T or Te snooper 236 that affirmed the bus read operation initiating transmission of the requested memory block to the requesting L2 cache 230 after receipt of the CR (i.e., provides "late" data) and retaining the requested memory block in the T or Te state. Upon receipt, the master 232 in the requesting L2 cache 230 places the requested memory block in L2 cache directory 300 in the S state (since an Sr' snooper 236 may be hidden and only one Sr' snooper 236 is permitted in each data delivery domain for the requested memory block). The process ends with distributed response logic 210 generating a CR indicating "success", as depicted at block 3108.

If the complex of partial responses includes a T or Te snooper 236 affirming the local bus read operation (block 3110), no Sr' snooper 236 affirming the bus read operation (block 3112), and no snooper 236 providing a partial response that may possibly hide a Sr' snooper 236 (block 3114), the process passes to block 3106. Block 3106 represents the T or Te snooper 236 that affirmed the bus read operation initiating transmission of the requested memory block to the requesting L2 cache 230 after receipt of the CR (i.e., provides "late" data) and retaining the requested memory block in the T or Te state. Upon receipt, the master 232 in the requesting L2 cache 230 places the requested memory block in L2 cache array 300 in the Sr state (since no other Sr' snooper 236 exists for the requested memory block in the local data delivery domain). The process ends with distributed response logic 210 generating a CR indicating "success", as depicted at block 3108.

Referring now to block 3120, if no M, Me, T or Te snooper 236 affirms the local bus read operation, but an Sr' snooper 236 affirms the local bus read operation, the local bus read operation is serviced in accordance with block 3122. In particular, the Sr' snooper 236 affirming the local bus read operation initiates transmission of the requested memory block to the requesting L2 cache 230 prior to receipt of CR and updates the state of the requested memory block in its L2 cache directory 302 to the S state. The master 232 in the requesting L2 cache 230 places the requested memory block in its L2 cache array 300 in the Sr state. The process ends with distributed response logic 210 generating a CR indicating "success", as depicted at block 3108.

Turning now to block 3130, if no M, Me, T, Te or Sr' snooper 236 affirms the local bus read operation, and further, if no snooper 122 provides a partial response indicating that it is responsible (i.e., the LPC) for the requested memory block, response logic 210 generates one of two CRs depending upon whether an HPC or data source for the requested memory block may possibly reside in the local domain, but is possibly hidden. In particular, if an M, Me, T, Te or Sr' snooper 236 is possibly hidden (block 3132), response logic 210 provides a "retry" CR, as shown at block 3142. If, on the other hand, no M, Me, T, Te or Sr' snooper 236 is possibly hidden, the bus read operation cannot be serviced in the local domain, and response logic 210 accordingly provides a "go global" CR at block 3164, instructing the master 232 to reissue the bus read operation as a global bus read operation.

Referring now to block 34, if a snooper 122 provides a partial response indicating that it is responsible (i.e., the LPC) for the requested memory block but does not affirm the local bus read operation, response logic 210 generates a CR indicating "retry", as depicted at block 3142. As indicated by decision block 3144, response logic 210 similarly generates a "retry" CR at block 3142 if a memory controller snooper 122 affirms the bus read operation and an L2 cache snooper 236 provides a partial response indicating that it may hold the requested memory block in one of the M, Me, T, or Te states but cannot affirm the local bus read operation. In each of these cases, response logic 210 generates a "retry" CR because the bus read operation, if reissued as a local operation, may be able to be serviced without resorting to a global broadcast.

With reference now to block 3146, if no M, Me, T, Te or Sr' snooper 236 affirms the bus read operation, no M, Me, T, Te snooper 236 is possibly hidden, and a memory controller snooper 122 affirms the local bus read operation, the snooper 122 affirming the local bus read operation provides the requested memory block 3000 and the associated domain indicator 3004 to the requesting L2 cache 230 in response to the CR, as depicted at each of blocks 3150, 3152 and 3154. As shown at blocks 3150, 3152, 3154 and 3160, the master 232 of the requesting L2 cache 230 handles the requested memory block in accordance with the CR and the state of the domain indicator 3004, which may arrive after the CR together with the requested memory block. In particular, if master 232 determines at block 3160 that the domain indicator 3004 is reset to "global", meaning that a modified copy of the requested memory block may be cached outside the local domain, master 232 of the requesting L2 cache 230 discards the requested memory block, remaining in the I state with respect to the requested memory block (block 3162). In addition, in light of the "global" domain indicator 3004, master 232 interprets the CR as indicating "go global" (block 3164), meaning that master 232 will reissue the bus read operation as a global bus read operation.

If, on the other hand, the domain indicator 3004 is set to indicate "local" (block 3160), the master 232 of the requesting cache 230 interprets the CR as indicating "success" (block 3108) and places the requested memory block within its L2 cache array 300. The master 232 also sets the state field 306 associated with the requested memory block to a state indicated by the CR. In particular, if the partial responses and hence the CR indicate that a Sr' snooper 236 may be hidden (block 3146), the requesting L2 cache 230 holds the requested memory block in the S state (block 3150) because only one Sr copy of the memory block is permitted in any domain. Alternatively, if the partial responses and CR indicate that no Sr' snooper 236 may be hidden, but an S' snooper 236 may be hidden, the requesting L2 cache 236 holds the requested memory block in the Sr state (block 3152). Finally, if neither a Sr' or S' snooper 236 may be hidden (block 3148), the requesting L2 cache 230 holds the requested memory block in the Me state (block 3154) because the requesting L2 cache 230 is guaranteed to belong to the only cache hierarchy within data processing system 100 holding the requested memory block 3000.

Figure 32:
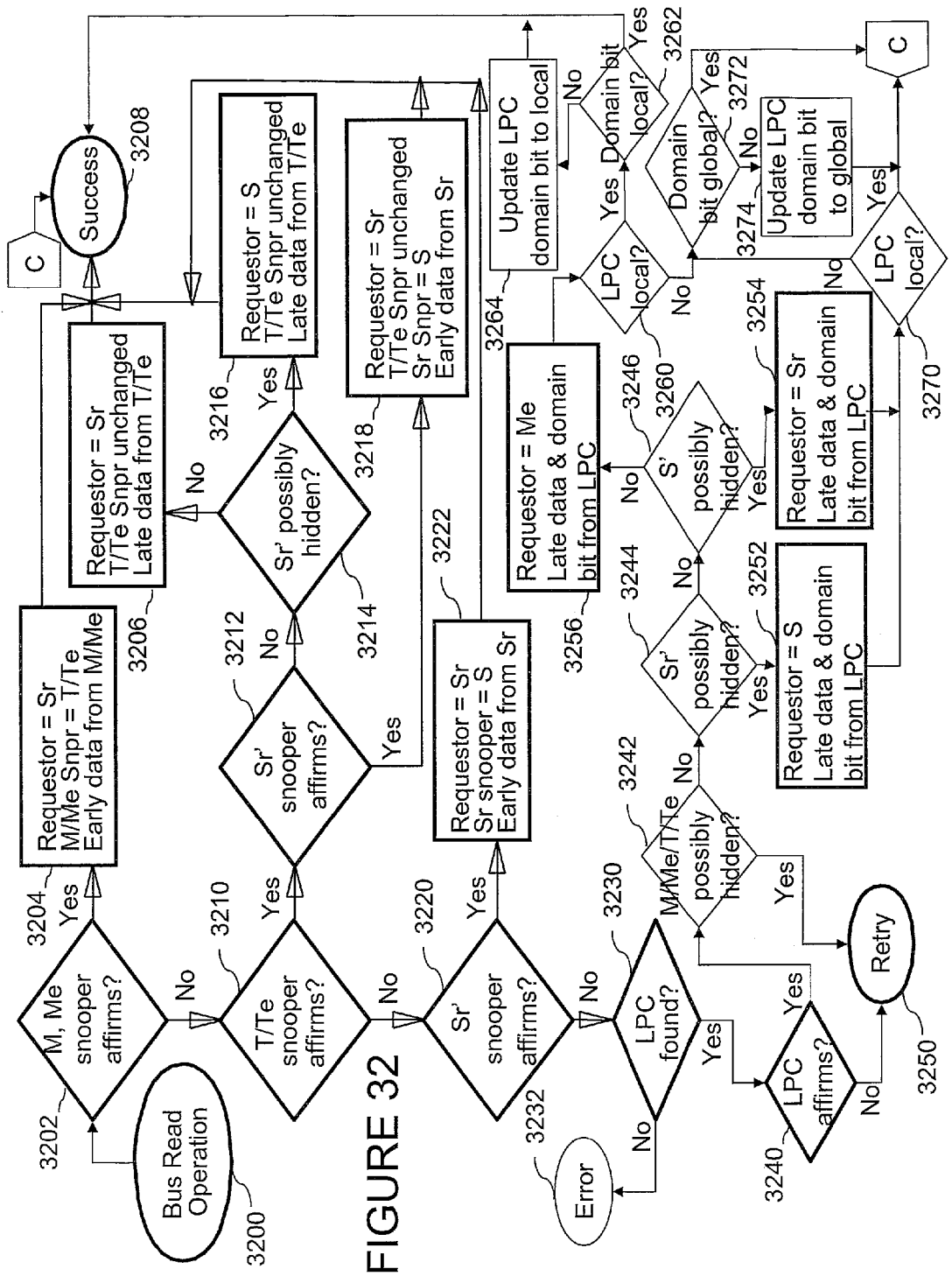
FIG. 32 is a high level logical flowchart of an exemplary method of performing a global bus read operation in a data processing system implementing coherency domains and domain indicators in accordance with the present invention.

With reference now to FIG. 32, there is depicted a high level logical flowchart of an exemplary method of performing a global bus read operation in a data processing system implementing coherency domains and domain indicators in accordance with the present invention. The process begins at block 3200, for example, at block 1820 of FIG. 18, with an L2 cache 230 issuing a global bus read operation on its local interconnect 114. The various partial responses that snoopers 122, 236 may provide to distributed response logic 210 in response to snooping the global bus read operation are represented in FIG. 32 by the outcomes of decision blocks 3202, 3210, 3212, 3214, 3220, 3230, 3240, 3242, 3244, and 3246. These partial responses in turn determine the CR for the global bus read operation.

As shown at block 3202, if a snooper 236 of an L2 cache 230 affirms the global bus read operation with a partial response indicating that the L2 cache 230 holds the requested memory block in either the M or Me state, the process proceeds from block 3202 to block 3204. Block 3204 indicates the operations of the requesting L2 cache 230 and the affirming L2 cache 230 in response to the global bus read operation. In particular, the snooper 236 in the affirming L2 cache 230 updates the cache state of the requested memory block from M to T or from Me to Te. In addition, the snooper 236 in the affirming L2 cache 230 may initiate transmission of the requested memory block to the requesting L2 cache 230 prior to receipt of the CR (i.e., provides "early" data). Upon receipt, the master 232 in the requesting L2 cache 230 places the requested memory block in L2 cache array 300 in the Sr state. The process ends with distributed response logic 210 generating a CR indicating "success", as depicted at block 3208.

If a snooper 236 of an L2 cache 230 affirms the global bus read operation with a partial response indicating that the L2 cache 230 holds the requested memory block in either the T or Te state (block 3210) and an Sr' snooper 236 also affirms the bus read operation (block 3212), the process passes to block 3218. Block 3218 represents the Sr' snooper 236 updating the cache state of the requested memory block to S and initiating transmission of the requested memory block to the requesting L2 cache 230 prior to receipt of the CR (i.e., provides "early" data). Upon receipt, the master 232 in the requesting L2 cache 230 places the requested memory block in L2 cache array 300 in the Sr state. The T or Te snooper 236 remains unchanged. The process ends with distributed response logic 210 generating a CR indicating "success", as depicted at block 3208.

If the complex of partial responses includes a T or Te snooper 236 affirming the global bus read operation, no Sr' snooper 236 affirming the bus read operation, and a snooper 236 providing an partial response (e.g., a type of retry) indicating that an Sr' snooper 236 may exist in the local data delivery domain but did not affirm the global bus read operation, the process passes to block 3216. Block 3216 represents the T or Te snooper 236 that affirmed the global bus read operation initiating transmission of the requested memory block to the requesting L2 cache 230 after receipt of the CR (i.e., provides "late" data) and retaining the requested memory block in the T or Te state. Upon receipt, the master 232 in the requesting L2 cache 230 places the requested memory block in L2 cache directory 300 in the S state (since an Sr' snooper 236 may be hidden within the local domain the requesting cache 236 and only one Sr memory block is permitted in each domain). The process ends with distributed response logic 210 generating a CR indicating "success", as depicted at block 3208.

If the complex of partial responses includes a T or Te snooper 236 affirming the global bus read operation, no Sr' snooper 236 affirming the bus read operation, and no snooper 236 providing a partial response that may hide a Sr' snooper 236, the process passes to block 3206. Block 3206 represents the T or Te snooper 236 that affirmed the global bus read operation initiating transmission of the requested memory block to the requesting L2 cache 230 after receipt of the CR (i.e., provides "late" data) and retaining the requested memory block in the T or Te state. Upon receipt, the master 232 in the requesting L2 cache 230 places the requested memory block in L2 cache array 300 in the Sr state (since no other Sr' snooper 236 exists for the requested memory block in the local data delivery domain). The process ends with distributed response logic 210 generating a CR indicating "success", as depicted at block 3208.

Referring now to block 3220, if no M, Me, T or Te snooper 236 affirms the global bus read operation, but an Sr' snooper 236 affirms the global bus read operation, the global bus read operation is serviced in accordance with block 3222. In particular, the Sr' snooper 236 that affirmed the global bus read operation initiates transmission of the requested memory block to the requesting L2 cache 230 prior to receipt of CR and updates the state of the requested memory block in its L2 cache directory 302 to the S state. The master 232 in the requesting L2 cache 230 places the requested memory block in L2 cache array 300 in the Sr state. The process ends with distributed response logic 210 generating a CR indicating "success", as depicted at block 3208.

Turning now to block 3230, if no M, Me, T, Te or Sr' snooper 236 affirms the global bus read operation, and further, if no snooper 122 provides a partial response indicating that it is responsible (i.e., the LPC) for the requested memory block, an error occurs that halts processing as shown at block 3232 because every memory block is required to have an LPC.

Referring now to block 3240, if a snooper 122 provides a partial response indicating that it is responsible (i.e., the LPC) for the requested memory block but does not affirm the global bus read operation, response logic 210 generates a CR indicating "retry", as depicted at block 3250. As indicated by decision block 3242, response logic 210 similarly generates a "retry" CR at block 3250 if a memory controller snooper 122 affirms the global bus read operation and an L2 cache snooper 236 provides a partial response indicating that it may hold the requested memory block in one of the M, Me, T, or Te states but cannot affirm the global bus read operation. In each of these cases, response logic 210 generates a "retry" CR to cause the operation to be reissued because one of the possibly hidden snoopers 236 may be required to source the requested memory block to the requesting L2 cache 230.

With reference now to block 3244, if no M, Me, T, Te or Sr' snooper 236 affirms the global bus read operation, no M, Me, T, Te snooper 236 is possibly hidden, and a memory controller snooper 122 affirms the global bus read operation, the snooper 122 that affirmed the global bus read operation provides the requested memory block 3000 and the associated domain indicator 3004 to the requesting L2 cache 230 in response to the CR, as depicted at each of blocks 3252 and 3254. As shown at blocks 3244, 3246, 3252, 3254 and 3256, the master 232 of the requesting L2 cache 230 handles the requested memory block in accordance with the partial responses compiled into the "success" CR represented at block 3208. In particular, if the CR indicates that no Sr' or S' snooper 236 is possibly hidden, the requesting L2 cache 230 holds the requested memory block in the Me state (block 3256); the requesting L2 cache 230 holds the requested memory block in the Sr state if no Sr' snooper 236 is possibly hidden and a S' snooper 236 is possibly hidden; and the requesting L2 cache 230 holds the requested memory block in the S state if an Sr' snooper 236 is possibly hidden.

In response to the CR, the memory controller snooper 122 that is the LPC for the requested memory block 3000 then determines whether to update the domain indicator 3004 for the requested memory block 3000, as illustrated at blocks 3260, 3262, 3270, 3272 and 3274. If the CR indicates that the new cache state for the requested memory block 3000 is Me, the LPC snooper 122 determines whether it is within the same domain as the requesting L2 cache 230 (block 3260) and whether the domain indicator 3004 in system memory 108 indicates local or global (blocks 3262 and 3272). If the LPC is within the same domain as the requesting L2 cache 230 (block 3260), the LPC snooper 122 sets the domain indicator 3004 to "local" if it is reset to "global" (block 3262 and 3264). If the LPC is not within the same domain as the requesting L2 cache 230 (block 3260), the LPC snooper 122 resets the domain indicator 3004 to "global" if it is set to "local" (block 3272 and 3274).

If the CR indicates that the new cache state for the requested memory block 3000 is S or Sr, the LPC snooper 122 similarly determines whether it is within the same domain as the requesting L2 cache 230 (block 3270) and whether the domain indicator 3004 indicates local or global (block 3272). If the LPC is within the same domain as the requesting L2 cache 230 (block 3270), no update to the domain indicator 3004 is required. If, however, the LPC is not within the same domain as the requesting L2 cache 230 (block 3270), the LPC snooper 122 resets the domain indicator 3004 to "global" if it is set to "local" (block 3272 and 3274). Thus, LPC snooper 122 updates the domain indicator 3004, if required.

Figure 33:
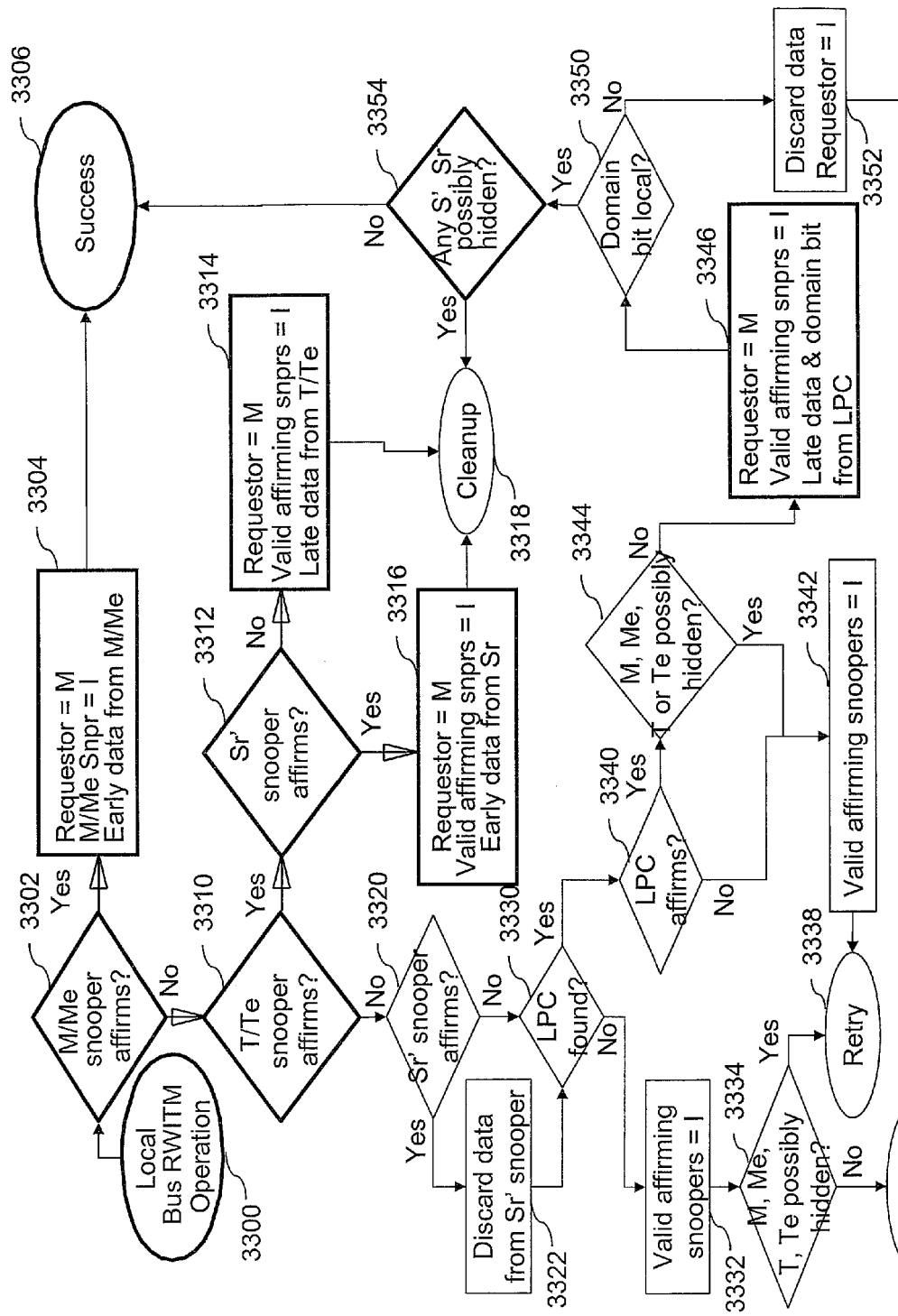
FIG. 33 is a high level logical flowchart of an exemplary method of performing a local bus RWITM operation in a data processing system implementing coherency domains and domain indicators in accordance with the present invention.

Referring now to FIG. 33, there is depicted a high level logical flowchart of an exemplary method of performing a local bus RWITM operation in a data processing system implementing coherency domains and domain indicators in accordance with the present invention. The process begins at block 3300, for example, with a master 232 of an L2 cache 230 issuing a local bus RWITM operation its local interconnect 114 at block 1948 of FIG. 19. The various partial responses that snoopers 122, 236 may provide to distributed response logic 210 are represented in FIG. 33 by the outcomes of decision blocks 3302, 3310, 3312, 3320, 3330, 3334, 3340 and 3344. These partial responses in turn determine the CR for the local bus RWITM operation.

If a snooper 236 affirms the local bus RWITM operation with a partial response indicating that the L2 cache 230 containing the snooper 236 holds the requested memory block in either the M or Me state as shown at block 3302, the process proceeds from block 3302 to block 3304. Block 3304 indicates the operations of the requesting L2 cache 230 and the affirming L2 cache 230 in response to the local bus RWITM operation. In particular, the snooper 236 in the affirming L2 cache 230 updates the cache state of the requested memory block from the M state to the I state and initiates transmission of the requested memory block to the requesting L2 cache 230, possibly prior to receipt of the CR (i.e., provides "early" data). Upon receipt, the master 232 in the requesting L2 cache 230 places the requested memory block in L2 cache array 300 in the M state. The process ends with distributed response logic 210 generating a CR indicating "success", as depicted at block 3306.

If a snooper 236 affirms the local bus RWITM operation with a partial response indicating that the L2 cache 230 containing the snooper 236 holds the requested memory block in either the T or Te state as shown at block 3310 and no Sr' snooper 236 affirms the bus RWITM operation as shown at block 3312, the process passes to block 3314. Block 3314 represents the T or Te snooper 236 that affirmed the local bus RWITM operation initiating transmission of the requested memory block to the requesting L2 cache 230 in response to receipt of the "cleanup" CR (block 3318) from response logic 210. In response to receipt of the requested memory block, the requesting L2 cache 230 holds the requested memory block in the M state. All affirming snoopers 236 update their respective cache states for the requested memory block to I.

If the complex of partial responses includes a T or Te snooper 236 and an Sr' snooper 236 affirming the local bus RWITM operation, the process passes to block 3316. Block 3316 represents the Sr' snooper 236 that affirmed the local bus RWITM operation initiating transmission of the requested memory block to the requesting L2 cache 230 prior to receipt of the "cleanup" CR (block 3318) provided by response logic 210. In response to receipt of the requested memory block 3000, the requesting L2 cache 230 holds the requested memory block in the M state. All affirming snoopers 236 update their respective cache states for the requested memory block to I.

The local bus RWITM operation cannot be serviced by a L2 cache snooper 236 without retry if no M, Me, T, or Te snooper 236 (i.e., HPC) affirms the local bus RWITM operation to signify that it can mediate the data transfer. Accordingly, if an Sr' snooper 236 affirms the local bus RWITM operation and supplies early data to the requesting L2 cache 230 as shown at block 3320, the master 232 of the requesting L2 cache 230 discards the data provided by the Sr' snooper 236, as depicted at block 3322. However, as discussed further below, the local bus RWITM operation may still be serviced locally without retry if the LPC snooper 122 is within the local domain (block 3330) and affirms the local bus RWITM operation (block 3340) and the domain indicator 3004 for the requested memory block 3000 indicates "local" (block 3350).

Thus, if no memory controller snooper 122 provides a partial response indicating that it is responsible (i.e., the LPC) for the requested memory block (block 3330), each affirming snooper 236 invalidates the requested memory block in its respective L2 cache directory 302 (block 3332). The CR generated by response logic 210 depends upon whether any partial responses indicate that an M, Me, T or Te snooper 236 may be hidden (block 3334). That is, if no M, Me, T or Te snooper 236 may be hidden, response logic 210 generates a "go global" CR at block 3336 to inform the master 232 that the local bus RWITM operation must be reissued as a global RWITM operation. On the other hand, if an M, Me, T or Te snooper 236 (i.e., an HPC) for the requested memory block may be hidden, response logic 210 generates a CR indicating "retry", as depicted at block 3338, because the operation may be serviced locally if retried.

Similarly, snoopers 236 invalidate their respective copies of the requested memory block (block 3342), and response logic 210 provides a "retry" CR for the local bus RWITM operation (block 3338) if no M, Me, T, Te snooper 236 affirms the local bus RWITM operation and a snooper 122 provides a partial response, but does not affirm the local bus RWITM operation. A "retry" CR is also generated at block 3338, and snoopers 236 invalidate their respective copies of the requested memory block (block 3342) if no M, Me, T or Te snooper 236 affirmed the local bus RWTIM operation (blocks 3302, 3310), a snooper 122 affirmed the local bus RWITM operation (block 3340), and an M, Me, T, or Te snooper 236 may be possibly hidden (block 3344).

As shown at block 3346, if no M, Me, T, or Te snooper 236 affirms the local bus RWITM operation or is possibly hidden and the LPC snooper 122 affirms the local bus RWITM operation, each affirming snooper 236 invalidates its respective copy of the requested memory block 3000. In addition, the LPC snooper 122 provides the requested memory block 3000 and associated domain indicator 3004 to the requesting L2 cache 230 in response to receipt of the CR from response logic 210. The master 232 of the requesting L2 cache 230 handles the data in accordance with the domain indicator 3004. In particular, if the domain indicator 3004 is reset to "global", meaning that a remote cached copy may exist that renders stale the data received from the LPC snooper 122, master 232 discards the data received from the LPC snooper 122, maintains an invalid coherency state with respect to the requested memory block (block 3352), and interprets the CR provided by response logic 210 as "go global" (block 3336). If, on the other hand, the domain indicator 3004 is set to "local", meaning that no remote cached copy of the requested memory block renders the data received from the LPC snooper 122 potentially stale, the master 232 places the requested memory block (and optionally the domain indicator 3004) in its L2 cache array 300 and sets the associated state field 306 to M (block 3346). If the partial responses and hence the CR indicate an S' or Sr' snooper 236 is possibly hidden (block 3354), the CR indicates "cleanup", meaning that the requesting L2 cache 230 must invalidate the other valid cached copies of the requested memory block 3000, if any. If no such S' or Sr' snoopers 236 are possibly hidden by incomplete partial responses, the CR indicates "success", as depicted at block 3306.

Figure 34:
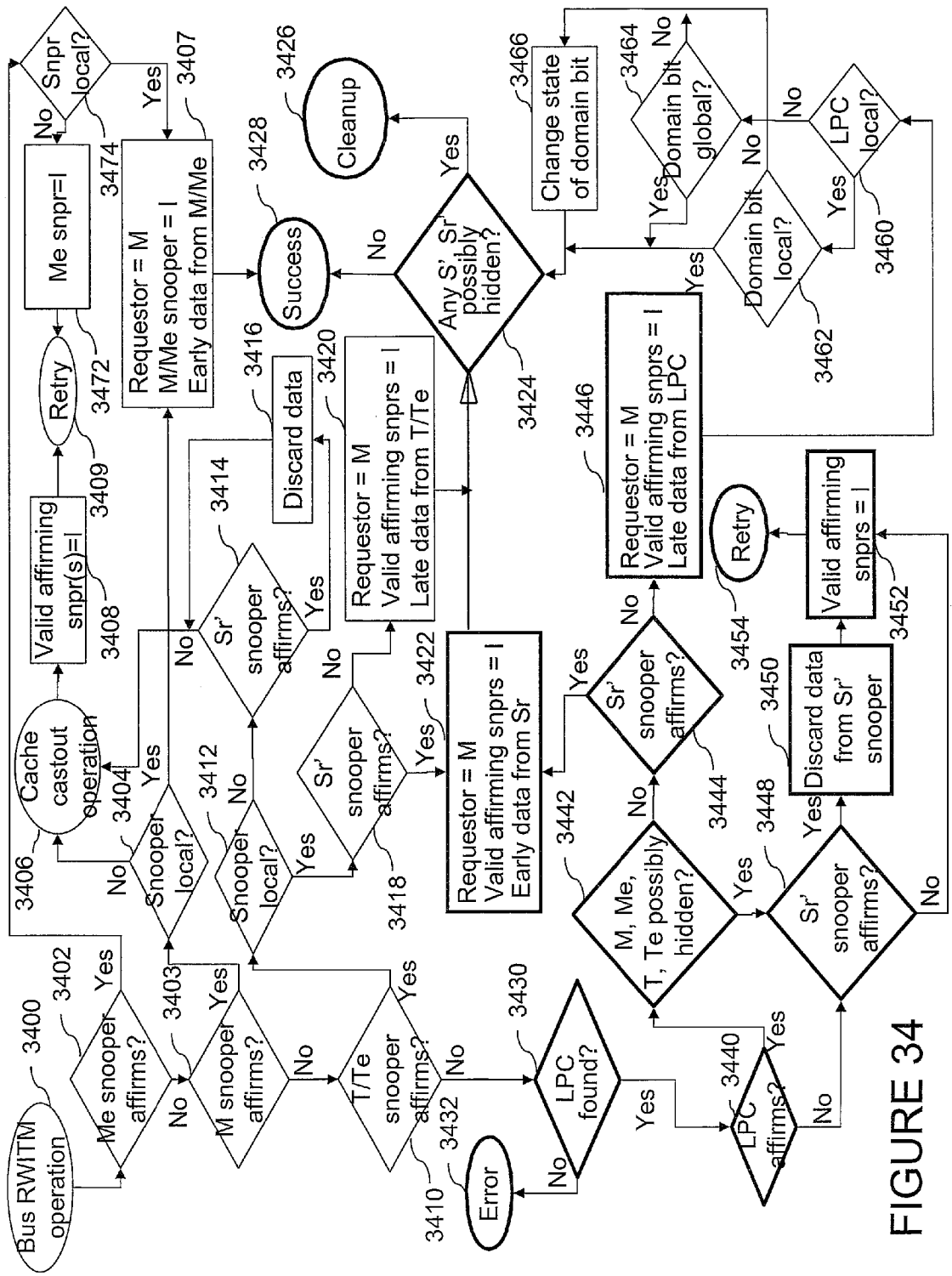
FIG. 34 is a high level logical flowchart of an exemplary method of performing a global bus read operation in a data processing system implementing coherency domains and domain indicators in accordance with the present invention.

With reference now to FIG. 34, there is illustrated a high level logical flowchart of an exemplary method of performing a global bus RWITM operation in a data processing system implementing coherency domains and domain indicators in accordance with the present invention. The process begins at block 3400, for example, with a master 232 of an L2 cache 230 issuing a global bus RWITM operation on interconnects 110, 114 at block 1954 of FIG. 19. The various partial responses that snoopers 122, 236 may provide to distributed response logic 210 are represented in FIG. 34 by the outcomes of decision blocks 3402, 3410, 3414, 3418, 3430, 3440, 3442, 3444 and 3448. These partial responses in turn determine the CR for the global bus RWITM operation.

If a snooper 236 affirms the global bus RWITM operation with a partial response indicating that the L2 cache 230 containing the snooper 236 holds the requested memory block in the Me state as shown at block 3402, the process proceeds from block 3402 to block 3474. Block 3474 illustrates the Me snooper 236 determining whether it is local to (i.e., in the same domain as) the requesting master 232, for example, by reference to the scope indicator in the bus operation. If not, the Me snooper 236 invalidates its copy of the requested memory block 3000, at depicted at block 3472, and response logic 210 generates a "retry" CR, as shown at block 3409. In response to receipt of the "retry" CR, the LPC snooper 122 may also set the domain indicator for the requested memory block 3000 to "local" if the CR supports this functionality. If, on the other hand, Me snooper 236 determines at block 3474 that it is within the same domain as the requesting master 232, the Me snooper 236 initiates provision of the requested memory block to master 232 prior to receipt of the CR and invalidates its copy of the requested memory block (block 3407). In response to receipt of the requested memory block, the master 232 places the requested memory block in its L2 cache array 300 in the M state (block 3407). Response logic 210 also generates a CR indicating "success", as shown at block 3428.

Similarly, if an M snooper 236 affirms the global bus RWITM operation, as illustrated at block 3403, the M snooper 236 handles the operation differently depending upon whether it is within the same domain as the requesting master 232 (block 3404). If not, the M snooper 236 in the affirming L2 cache 230 performs a cache castout operation (block 3406) to "push" its modified copy of the requested memory block to the system memory 108 that serves as the LPC for the requested memory block and invalidates its copy of the requested memory (block 3408). Response logic 210 provides a CR indicating "retry" at block 3409. If, on the other hand, the M snooper 236 is local to the requesting master 232, the M snooper 236 updates the cache state of the requested memory block from the M state to the I state and initiates transmission of the requested memory block to the requesting L2 cache 230 prior to receipt of the CR (i.e., provides "early" data), as depicted at block 3407. Upon receipt, the master 232 in the requesting L2 cache 230 places the requested memory block in the associated L2 cache array 300 in the M state. The process ends with distributed response logic 210 generating a CR indicating "success", as depicted at block 3428.

Turning now to block 3410, if a snooper 236 affirms the global bus RWITM operation with a partial response indicating that the L2 cache 230 containing the snooper 236 holds the requested memory block in either the T or Te state, the process passes to block 3412, which represents the T or Te snooper 236 determining whether or not it is local to the requesting master 232. If not, the global bus RWITM operation is handled in accordance with blocks 3406, 3408 and 3409, which are described above. In addition, as illustrated at blocks 3414 and 3416, any early data provided by an Sr' snooper 236 in response to the global bus RWITM operation is discarded by the requesting master 232. If, however, the T or Te snooper 236 determines at block 3412 that it is local to the requesting master 232, the global bus RWITM operation is serviced in accordance with either block 3420 or block 3422. That is, as shown at block 3420, if no Sr' snooper 236 affirms the global bus RWITM operation (block 3418), the T or Te snooper 236 that affirmed the global bus RWITM operation initiates transmission of the requested memory block to the requesting L2 cache 230 in response to receipt of the CR (i.e., provides "late" data). In response to receipt of the requested memory block, the requesting L2 cache 230 holds the requested memory block in the M state. In addition, all affirming snoopers 236 update their respective cache states for the requested memory block to I. Alternatively, as depicted at block 3422, if an Sr' snooper 236 affirms the global bus RWITM operation (block 3418), the Sr' snooper 236 initiates transmission of the requested memory block to the requesting L2 cache 230 prior to receipt of the CR (i.e., provides "early" data). In response to receipt of the requested memory block, the requesting L2 cache 230 holds the requested memory block in the M state. In addition, all affirming snoopers 236 update their respective cache states for the requested memory block to I.

As further illustrated at blocks 3426 and 3428, the data transfer to the requesting L2 cache 230 is permitted even in the presence of partial response(s) indicating the presence of a possibly hidden S' or Sr' snooper 236. If no hidden S' or Sr' snoopers 236 exist, the process ends with distributed response logic 210 generating a CR indicating "success", as depicted at block 3406. If, on the other hand, at least one partial response indicating the presence of a possibly hidden S' or Sr' snooper 236 was given in response to the global bus RWITM operation, distributed response logic 210 generates a CR indicating "cleanup", meaning that the requesting L2 cache 230 must issue one or more bus kill operations to invalidate the requested memory block in any such hidden S' or Sr' snooper 236.

Referring now to block 3430, if no M, Me, T, or Te snooper 236 affirms the global bus RWITM operation, and further, if no snooper 122 provides a partial response indicating that it is responsible (i.e., the LPC) for the requested memory block, an error occurs causing processing to halt, as depicted at block 3432. If, on the other hand, no M, Me, T, or Te snooper 236 affirms the bus RWITM operation and a snooper 122 provides a partial response indicating that it is responsible (i.e., the LPC) for the requested memory block but does not affirm the bus RWITM operation (block 3440), each affirming snooper 236 invalidates the requested memory block in its respective L2 cache directory 302 (block 3452), and response logic 210 generates a CR indicating "retry", as depicted at block 3454. In addition, data provided by an Sr' snooper 236 affirming the global bus RWITM operation, if any, is discarded by the master 232 (blocks 3448 and 3450). As indicated by decision block 3442, affirming snoopers 236 similarly invalidate their respective copies of the requested memory block at block 3452 and response logic 210 generates a "retry" CR at block 3454 if a memory controller snooper 122 affirms the bus RWITM operation (block 3440) and an L2 cache snooper 236 provides a partial response indicating that it may hold the requested memory block in one of the M, Me, T, or Te states but cannot affirm the global bus RWITM operation.

With reference now to block 3444, if no M, Me, T, or Te snooper 236 affirms the global bus RWITM operation or is possibly hidden, a snooper 122 affirms the global bus RWITM operation, and an Sr' snooper 236 affirms the global bus RWITM operation, the global bus RWITM operation is serviced in accordance with block 3422 and following blocks, which are described above. Assuming these same conditions except for the presence of an Sr' snooper 236 affirming the global bus RWITM operation, the global bus RWITM operation is serviced in accordance with block 3446. In particular, in response to the CR, the LPC snooper 122 provides the requested memory block 3000 and domain indicator 3004 to the requesting L2 cache 230, which obtains the requested memory block in the M state, and all affirming snoopers 236 invalidate their respective copies of the requested memory block, if any.

Following block 3446, the process passes to blocks 3460-3466, which collectively represent the LPC snooper 122 determining whether or not to update the domain indicator 3004 for the requested memory block 3000 based upon whether the LPC snooper 122 is local to the requesting master 232 (block 3460) and the present state of the domain indicator (blocks 3462 and 3464). LPC snooper 122 changes the state of the domain indicator 3004 at block 3466 if LPC snooper 122 is local to the requesting master 232 and domain indicator 3004 is reset to indicate "global" or if LPC snooper 122 is not local to the requesting master 232 and domain indicator 3004 is set to indicate "local".

If the partial responses indicate an S' or Sr' snooper 236 is possibly hidden (block 3424), the requesting L2 cache 230 receives a "cleanup" CR indicating that it must invalidate any other valid cached copies of the requested memory block. If no S' or Sr' snoopers 236 are possibly hidden by incomplete partial responses, response logic 210 generates a "success" CR, as depicted at block 3428.

Figure 35:
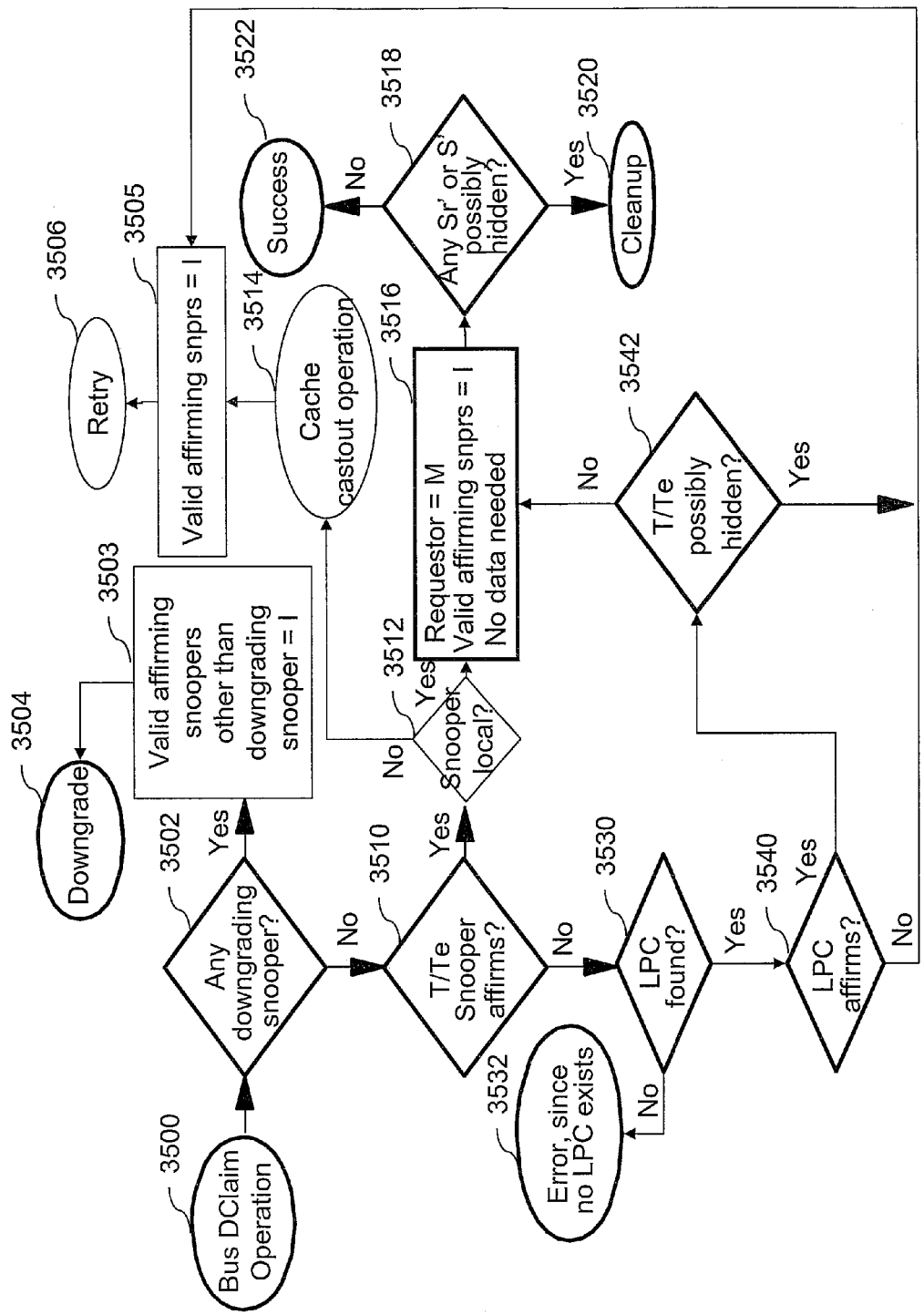
FIG. 35 is a high level logical flowchart of an exemplary method of performing a global bus DClaim operation in a data processing system implementing coherency domains and domain indicators in accordance with the present invention.

Referring now to FIG. 35, there is depicted a high level logical flowchart of an exemplary method of performing a global bus DClaim operation in a data processing system implementing coherency domains and domain indicators in accordance with the present invention. The process begins at block 3500, for example, with a master 232 of an L2 cache 230 issuing a global bus DClaim operation on interconnects 110, 114 at block 1940 of FIG. 19. The various partial responses that snoopers 122, 236 may provide to distributed response logic 210 in response to the global bus DClaim operation are represented in FIG. 35 by the outcomes of decision blocks 3502, 3510, 3518, 3530, 3540 and 3542. These partial responses in turn determine what CR response logic 210 generates for the global bus DClaim operation.

As shown at block 3502, if any snooper 236 issues a partial response downgrading the global bus DClaim operation to a global bus RWITM operation, each affirming snooper 236 other than the downgrading snooper 236 invalidates its respective copy of the requested memory block, if any (block 2603), and distributed response logic 210 generates a CR indicating "downgrade", as shown at block 3504. In response to this CR, the master 232 of the global bus DClaim operation will next attempt to gain ownership of the requested memory block utilizing a bus RWITM operation, as depicted at blocks 1948 and 1954 of FIG. 19.

If a snooper 236 affirms the global bus DClaim operation with a partial response indicating that the L2 cache 230 containing the snooper 236 holds the requested memory block in either the T or Te state as shown at block 3510, the process passes to block 3512. Block 3512 depicts the T or Te snooper 236 determining whether it is local to the requesting master 232. If not, the T or Te snooper 236 performs a cache castout operation (block 3514), and each affirming snooper 236 invalidates its copy of the requested memory block 3000. In addition, distributed response logic 210 generates a CR indicating "retry", as illustrated at block 3506.

Returning to block 3512, if the T or Te snooper 236 determines that it is local to the requesting master 232, the global bus DClaim operation is handled in accordance with block 3516. In particular, the master 232 in the requesting L2 cache 230 updates the state of its copy of the requested memory block to the M state. All affirming snoopers 236 update their respective cache states for the requested memory block to I. As shown at blocks 3518, 3520 and 3522, if the partial responses indicate that no S' or Sr' snooper 236 is possibly hidden, the process ends with distributed response logic 210 generating a CR indicating "success" (block 3522). If, on the other hand, at least one partial response indicating the presence of a possibly hidden S' or Sr' snooper 236 was given in response to the global bus DClaim operation, distributed response logic 210 generates a CR indicating "cleanup" (block 3520), meaning that the requesting L2 cache 230 must issue one or more bus kill operations to invalidate the requested memory block in any such hidden S' or Sr' snooper 236.

Turning now to block 3530, if no T or Te snooper 236 affirms the global bus DClaim operation, and further, if no snooper 122 provides a partial response indicating that it is responsible (i.e., the LPC) for the requested memory block 3000, an error occurs causing processing to halt, as depicted at block 3532. If, on the other hand, no T or Te snooper 236 affirms the global bus DClaim operation and a snooper 122 provides a partial response indicating that it is responsible (i.e., the LPC) for the requested memory block but does not affirm the global bus DClaim operation (block 3540), each affirming snooper 236 invalidates its respective copy of the requested memory block, if any (block 3505), and response logic 210 generates a CR indicating "retry", as depicted at block 3506. As indicated by decision block 3542, response logic 210 similarly generates a "retry" CR at block 3506 and each affirming snooper 236 invalidates its respective copy of the requested memory block, if any (block 3505) if a memory controller snooper 122 affirms the bus DClaim operation (block 3540) and an L2 cache snooper 236 provides a partial response indicating that it may hold the requested memory block in one of the T or Te states but cannot affirm the global bus DClaim operation.

As depicted at block 3542, if no T or Te snooper 236 affirms the global bus DClaim operation or is possibly hidden and a snooper 122 affirms the global bus DClaim operation, the global bus DClaim operation is serviced in accordance with block 3516 and following blocks, which are described above.

Figure 36:
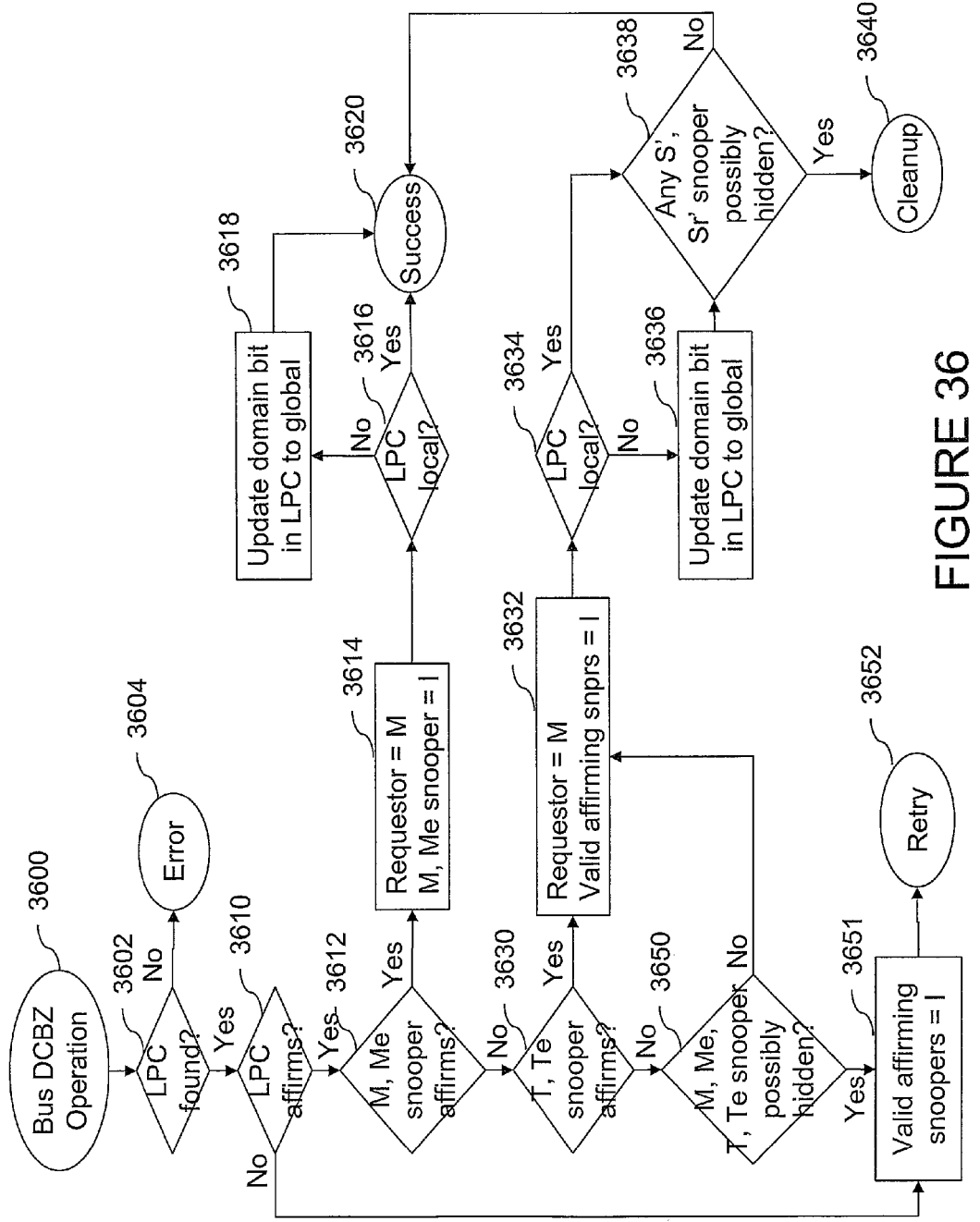
FIG. 36 is a high level logical flowchart of an exemplary method of performing a global bus DCBZ operation in a data processing system implementing coherency domains and domain indicators in accordance with the present invention.

With reference now to FIG. 36, there is illustrated a high level logical flowchart of an exemplary method of performing a global bus DCBZ operation in a data processing system implementing coherency domains and domain indicators in accordance with the present invention. The process begins at block 3600, for example, with the master 232 of an L2 cache 230 issuing a global bus DCBZ operation on interconnects 110, 114 at block 2060 of FIG. 20. The various partial responses that snoopers 122, 236 may provide to distributed response logic 210 are represented in FIG. 36 by the outcomes of decision blocks 3602, 3610, 3612, 3630, 3638 and 3650. These partial responses in turn determine the CR for the global bus DCBZ operation.

As indicated at blocks 3602-3604, if no snooper 122 provides a partial response indicating that it is responsible (i.e., the LPC) for the requested memory block 3000, an error halting processing occurs, since no LPC was found. If a snooper 122 indicates that it is the LPC for the requested memory block 3000, but does not affirm the global DCBZ operation, each affirming snooper 236 invalidates its respective copy of the requested memory block, if any (block 3651), and response logic 210 generates a CR indicating "retry", as depicted at block 3652. A "retry" CR is similarly generated by response logic 210 at block 3652 and each affirming snooper 236 invalidates its respective copy of the requested memory block, if any (block 3651) if a snooper 122 affirms the global bus DCBZ operation (block 3610), no M, Me, T or Te snooper 236 affirms the global bus DCBZ operation (blocks 3612 and 3630), and an M, Me, T or Te snooper 236 is possibly hidden (block 3650).

If a snooper 236 affirms the global bus DCBZ operation with a partial response indicating that the L2 cache 230 containing the snooper 236 holds the requested memory block in either the M or Me state as shown at block 3612, the process proceeds to block 3614. Block 3614 indicates the operations of the requesting L2 cache 230 and the affirming L2 cache 230 in response to the global bus DCBZ operation. In particular, the master 232 in the requesting L2 cache 230 updates the cache state of the requested memory block to the M state (no data is transferred), and the snooper 236 in the affirming L2 cache 230 updates the cache state of the requested memory block to the I state. As further shown at block 3616 and 3618, the LPC snooper 122 also resets the domain indicator 3004 associated with the requested memory block 3000 to "global" if the LPC snooper 122 is not within the same coherency domain as the requesting master 232. The process ends with distributed response logic 210 generating a CR indicating "success", as depicted at block 3620.

If a snooper 236 affirms the global bus DCBZ operation with a partial response indicating that the L2 cache 230 containing the snooper 236 holds the requested memory block in either the T or Te state as shown at block 3630, the process passes to block 3632. Block 3632 represents the T or Te snooper 236 invalidating its copy of the requested memory block and the master 232 in the requesting L2 cache 230 updating the cache state of its copy of the requested memory block to the M state. As further shown at block 3634 and 3636, the LPC snooper 122 also resets the domain indicator 3004 associated with the requested memory block 3000 to "global" if the LPC snooper 122 is not within the same coherency domain as the requesting master 232. If at least one partial response indicating the presence of a possibly hidden S' or Sr' snooper 236 was given in response to the global bus DCBZ operation, distributed response logic 210 generates a CR indicating "cleanup". If the partial responses indicate that no S' or Sr' snooper 236 is possibly hidden, distributed response logic 210 provides a CR indicating "success" as shown at block 3606.

As indicated by decision block 3650, if a memory controller snooper 122 affirms the global bus DCBZ operation (block 3610) and no M, Me, T or Te snooper 236 affirms the global bus DCBZ operation or is possibly hidden (blocks 3612, 3630 and 3650), the global bus DCBZ operation is serviced as described above with reference to block 3632 and following blocks.

Figure 37:
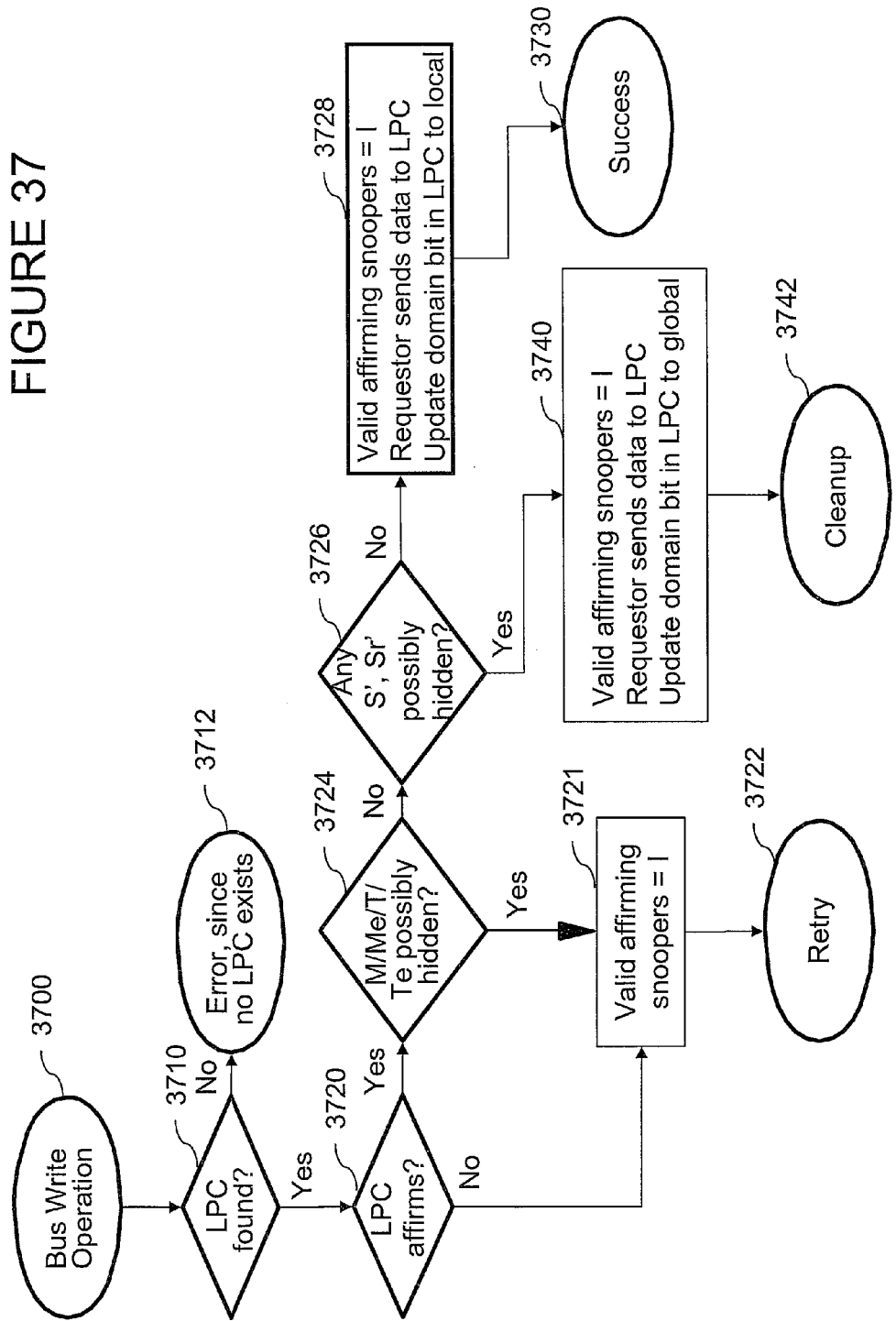
FIG. 37 is a high level logical flowchart of an exemplary method of performing a global bus write operation in a data processing system implementing coherency domains and domain indicators in accordance with the present invention.

Referring now to FIG. 37, there is depicted a high level logical flowchart of an exemplary method of performing a global bus write operation in a data processing system implementing coherency domains and domain indicators in accordance with the present invention. The process begins at block 3700, for example, with an I/O controller 214 issuing a global bus write operation on interconnects 110, 114 at block 2220 of FIG. 22. The various partial responses that snoopers 122, 236 may provide to distributed response logic 210 are represented in FIG. 37 by the outcomes of decision blocks 3710, 3720, 3724, and 3726. These partial responses in turn determine the CR for the global bus write operation.

As depicted at block 3710, if no snooper 122 provides a partial response indicating that it is responsible (i.e., the LPC) for the requested memory block 3000, an error occurs, causing processing to halt, as depicted at block 3712. If, however, a snooper 122 provides a partial response indicating that it is responsible (i.e., the LPC) for the requested memory block 3000 but does not affirm the bus write operation (block 3720), each affirming snooper 236 invalidates its respective copy of the requested memory block, if any (block 3721), and response logic 210 generates a CR indicating "retry", as depicted at block 3722. A "retry" CR is generated because the LPC must be available to receive the requested memory block 3000. Response logic 210 similarly generates a "retry" CR (block 3722) and each affirming snooper 236 invalidates its respective copy of the requested memory block, if any (block 3721) if a memory controller snooper 122 affirms the global bus write operation but a partial response indicates that an M, Me, T or Te snooper 236 may be possibly hidden (blocks 3724 and 3722). In this case, a "retry" CR is generated so that the global bus write operation only succeeds when no HPC copy of the requested memory block remains in the system.

Referring again to block 3724, assuming that a snooper 122 affirms the global bus write operation as the LPC and no partial responses are generated that indicate that a M, Me, T or Te snooper 236 may be possibly hidden, the requesting I/O controller 214 transmits the requested memory block to the LPC snooper 122, and snoopers 236, if any, affirming the global bus write operation invalidate their respective copies of the requested memory block (block 3728 or block 3740). As represented by blocks 3726 and 3730, if the partial responses indicate that no S' or Sr' snooper 236 is possibly hidden, the process ends with distributed response logic 210 generating a CR indicating "success". In addition, the LPC snooper 122 sets the domain indicator 3004 associated with the requested memory block 3000 to indicate "local" (block 3728). If, on the other hand, at least one partial response indicating the presence of a possibly hidden S' or Sr' snooper 236 was given in response to the global bus write operation, distributed response logic 210 generates a CR indicating "cleanup" (block 3742), and the LPC snooper 122 resets the domain indicator 3004 associated with the requested memory block 3000 to indicate "global" (block 3740).

Figure 38:
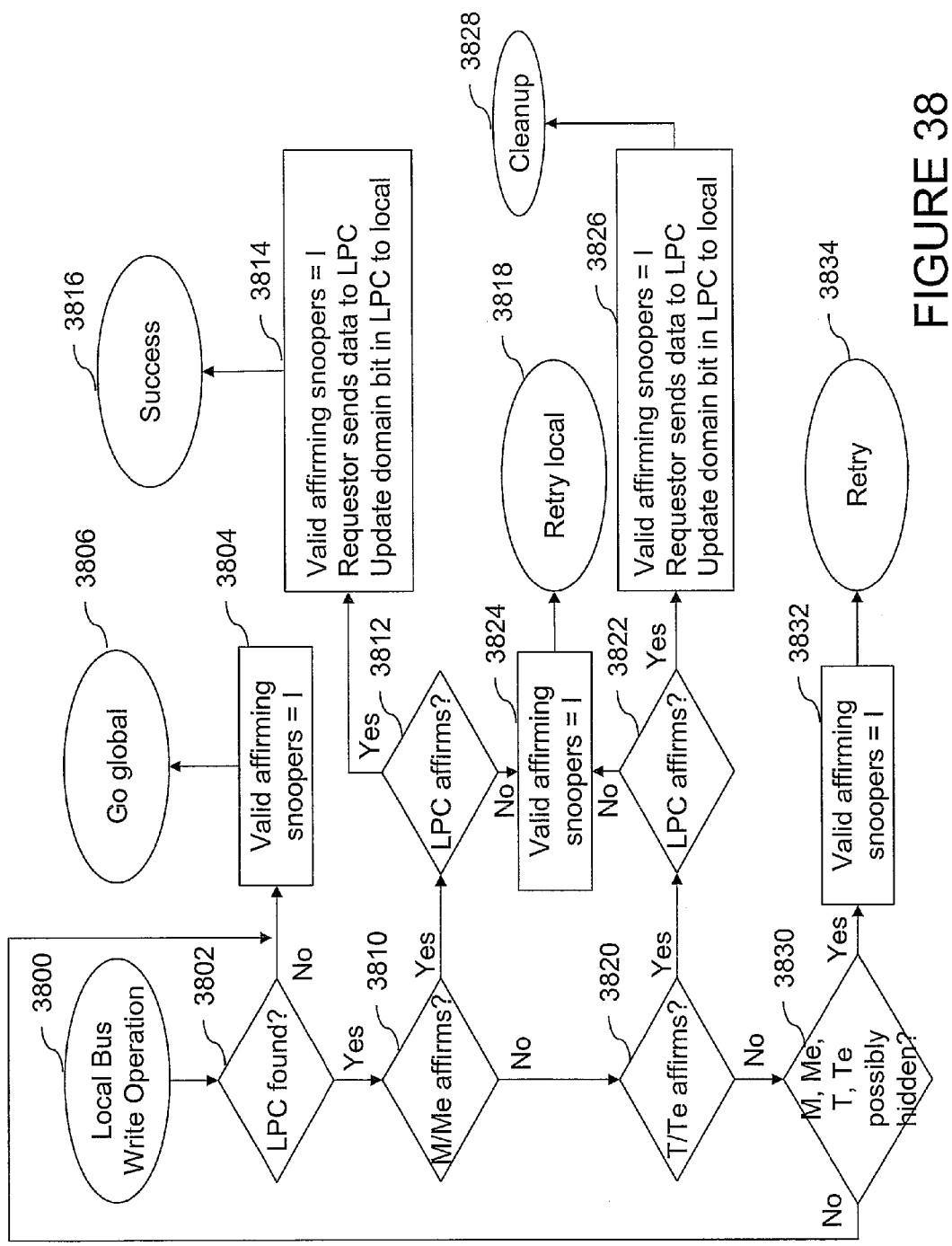
FIG. 38 is a high level logical flow chart of an exemplary method of performing a local bus write operation in a data processing system implementing coherency domains and domain indicators in accordance with the present invention.

With reference now to FIG. 38, there is illustrated a high level logical flowchart of an exemplary method of performing a local bus write operation in a data processing system implementing coherency domains and domain indicators in accordance with preferred embodiments of the present invention. The process begins at block 3800, for example, with the issuance of a local bus write operation on a local interconnect 114 at block 2204 of FIG. 22. The various partial responses that snoopers 122, 236 may provide to distributed response logic 210 are represented in FIG. 38 by the outcomes of decision blocks 3802, 3810, 3812, 3820, 3822 and 3830. These partial responses in turn determine the CR for the local bus write operation.

If no snooper 122 provides a partial response indicating that it is responsible (i.e., the LPC) for the target memory block (block 3802), each affirming snooper 236 invalidates its respective copy of the target memory block, as shown at block 3804, and response logic 210 provides a "go global" CR, as illustrated at block 3806, because the LPC is a necessary participant in the bus write operation. As depicted at block 3810, if a snooper 122 provides a partial response indicating that it is responsible (i.e., the LPC) for the requested memory block 3000 but does not affirm the local bus write operation (block 3812) and a M or Me snooper 236 affirms the local bus write operation (block 3810), each affirming snooper 236 invalidates its respective copy of the requested memory block, if any (block 3824), and response logic 210 generates a CR indicating "retry local", as depicted at block 3818. A "retry local" CR is generated because the LPC must be available to receive the target memory block. Response logic 210 similarly generates a "retry" CR at block 3834 if a memory controller snooper 122 indicates that it is the LPC for the target memory block, no M, Me, T or Te snooper 236 affirms the local bus write operation, and a partial response indicates that a M, Me, T or Te snooper 236 may be hidden (block 3830). In this case, each affirming snooper 236 invalidates its copy, if any, of the target memory block, and response logic 210 generates a "retry" CR so that the local bus write operation only succeeds when no HPC copy of the requested memory block remains in the system.

Referring again to block 3812, assuming that a M or Me snooper 236 affirms the local bus write operation and a snooper 122 affirms the local bus write operation as the LPC, the requesting I/O controller 214 transmits the requested memory block to the LPC snooper 122, and snoopers 236, if any, affirming the local bus write operation invalidate their respective copies of the requested memory block (block 3814). In addition, the LPC snooper 122 sets the domain indicator 3004 associated with the target memory block 3000 to "local". The process ends at block 3816 with distributed response logic 210 generating a CR indicating "success".

As depicted at block 3820 and following blocks, if a snooper 122 provides a partial response indicating that it is the LPC for the target memory block (block 3802) but cannot affirm the local bus write operation (block 3822), no M or Me snooper 236 affirms the local bus write operation (block 3810), and a T or Te snooper 236 affirms the local bus write operation, distributed response logic 210 generates a CR indicating "retry local" (block 3818) to force the operation to be reissued locally, and snoopers 236 affirming the local bus write operation invalidate their respective copies of the requested memory block (block 3824). Assuming the same partial responses except for the LPC snooper 122 affirming the local bus write operation (block 3822), the requesting I/O controller 214 transmits the requested memory block to the LPC snooper 122, and each snooper 236 affirming the local bus write operation invalidates its respective copy of the requested memory block (block 3826). In addition, the LPC snooper 122 sets the domain indicator 3004 associated with the target memory block 3000 to "local". The process ends with distributed response logic 210 generating a CR indicating "cleanup" so that any other copies of the requested memory block that may be held outside of the local coherency domain are invalidated.

Figure 39:
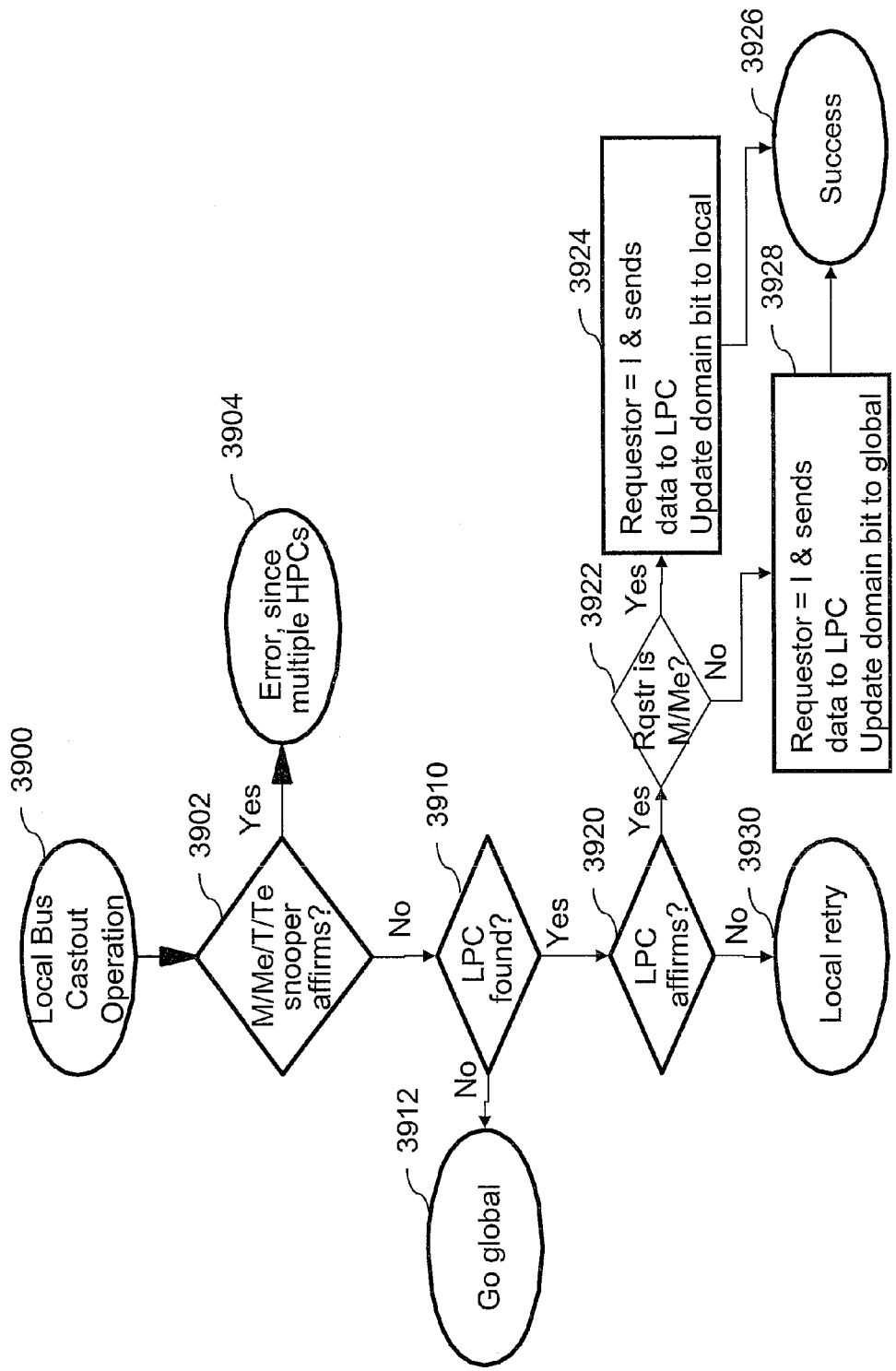
FIG. 39 is a high level logical flowchart of an exemplary method of performing a local bus castout operation in a data processing system implementing coherency domains and domain indicators in accordance with the present invention.

Referring now to FIG. 39, there is depicted a high level logical flowchart of an exemplary method of performing a local bus castout operation in a data processing system implementing coherency domains and domain indicators in accordance with preferred embodiments of the present invention. The process begins at block 3900, for example, with the issuance of a local bus castout operation on a local interconnect 114, for example, at block 1806 of FIG. 18, block 1970 of FIG. 19, or block 2042 of FIG. 20. The various partial responses that snoopers 122, 236 may provide to distributed response logic 210 are represented in FIG. 39 by the outcomes of decision blocks 3902 and 3910. These partial responses in turn determine the CR for the local bus castout operation.

If a snooper 236 affirms the local bus castout operation with a partial response indicating that the L2 cache 230 containing the snooper 236 holds the requested memory block in any of the M, Me, T or Te states as shown at block 3902, an error halting processing occurs, as indicated at block 3904, because the memory block being castout can have only one HPC (i.e., the requesting L2 cache 230).

As depicted at block 3910, if no M, Me, T, or Te snooper 236 affirms the local bus castout operation (block 3902), and further, if no snooper 122 provides a partial response indicating that it is responsible (i.e., the LPC) for the requested memory block, response logic 210 provides a "go global" CR, as depicted at block 3912, because the LPC is a required participant to receive the castout memory block. If, however, no M, Me, T, or Te snooper 236 affirms the bus castout operation (block 3902) and a snooper 122 provides a partial response indicating that it is responsible (i.e., the LPC) for the requested memory block but does not affirm the bus castout operation (blocks 3910 and 3920), response logic 210 generates a CR indicating "local retry", as depicted at block 3930, because the LPC is in the local coherency domain but must be available to receive the castout memory block. If a memory controller snooper 122 affirms the bus castout operation (block 3920) and no M, Me, T or Te snooper 236 affirms the bus castout operation (block 3902), the requesting L2 cache 230 invalidates the memory block within its cache directory 302 and transmits the memory block to the LPC (block 3924 or block 3928). In addition to updating the memory block 3000, the LPC snooper 122 sets the associated domain indicator 3004 to "local" if the memory block 3000 is in the M or Me state (blocks 3922 and 3924), and resets the associated domain indicator 3004 to "global" if the memory block 3000 is in the T or Te state (blocks 3922 and 3928). The update of the domain indicator 3004 to "local" is possible because a castout of a memory block in either of the M or Me states guarantees that no remotely cached copy of the memory block exists. In response to an affirmative determination at block 3920, response logic 210 generates a CR indicating "success", as illustrated at block 3926.

Figure 40:
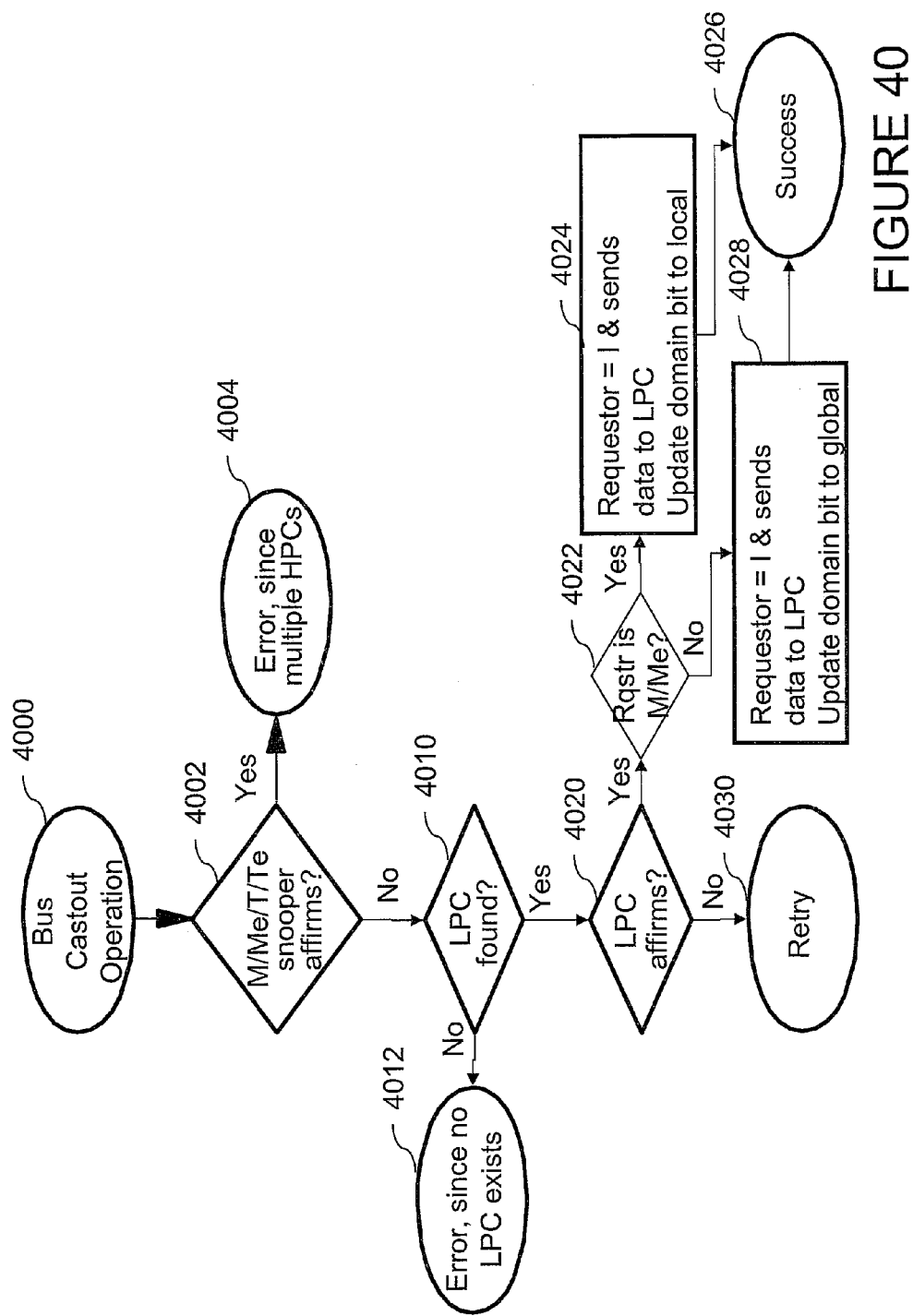
FIG. 40 is a high level logical flowchart of an exemplary method of performing a global bus castout operation in a data processing system implementing coherency domains and domain indicators in accordance with the present invention.

With reference now to FIG. 40, there is illustrated a high level logical flowchart of an exemplary method of performing a global bus castout operation in a data processing system implementing coherency domains and domain indicators in accordance with the present invention. The process begins at block 4000, for example, with a master 232 of an L2 cache 230 issuing a global bus castout operation on interconnects 110, 114, for example, at block 2302 of FIG. 23. The various partial responses that snoopers 122, 236 may provide to distributed response logic 210 are represented in FIG. 40 by the outcomes of decision blocks 4002, 4010 and 4020. These partial responses in turn determine the CR for the global bus castout operation.

If a snooper 236 affirms the global bus castout operation with a partial response indicating that the L2 cache 230 containing the snooper 236 holds the requested memory block in any of the M, Me, T or Te states as shown at block 4002, an error halting processing occurs, as indicated at block 4004, because the memory block being castout can have only one HPC (i.e., the requesting L2 cache 230).

As depicted at block 4020, if no M, Me, T, or Te snooper 236 affirms the global bus castout operation, and further, if no snooper 122 provides a partial response indicating that it is responsible (i.e., the LPC) for the requested memory block 3000, an error occurs causing processing to halt, as depicted at block 4012. If, however, no M, Me, T, or Te snooper 236 affirms the bus castout operation and a snooper 122 provides a partial response indicating that it is responsible (i.e., the LPC) for the requested memory block but does not affirm the global bus castout operation (block 4020), response logic 210 generates a CR indicating "retry", as depicted at block 4030, because the LPC must be available to receive the castout memory block. If a memory controller snooper 122 affirms the bus castout operation and no M, Me, T or Te snooper 236 affirms the global bus castout operation (block 4020), the requesting L2 cache 230 invalidates the memory block within its cache directory 302 and transmits the memory block to the LPC (block 4024 or block 4028). In addition to updating the memory block 3000, the LPC snooper 122 sets the associated domain indicator 3004 to "local" if the memory block 3000 is in the M or Me state (blocks 4022 and 4024), and resets the associated domain indicator 3004 to "global" if the memory block 3000 is in the T or Te state (blocks 4022 and 4028). The update of the domain indicator 3004 to "local" is possible because a castout of a memory block 3000 in either of the M or Me states guarantees that no remotely cached copy of the memory block exists. In response to an affirmative determination at block 4020, response logic 210 generates a CR indicating "success", as illustrated at block 4026.

Figure 41:
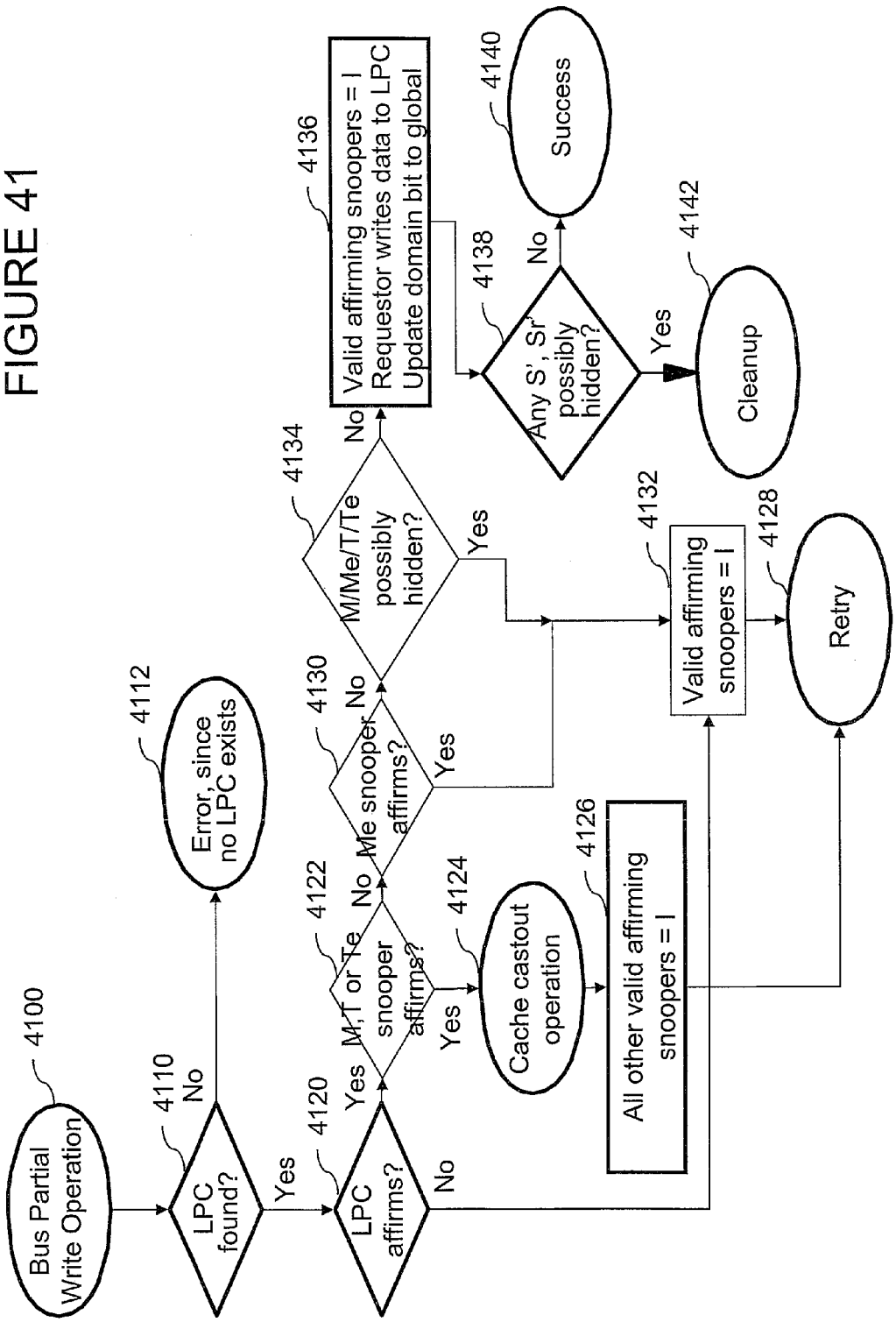
FIG. 41 is a high level logical flowchart of an exemplary method of performing a global bus partial write operation in a data processing system implementing coherency domains and domain indicators in accordance with the present invention.

Referring now to FIG. 41, there is depicted a high level logical flowchart of an exemplary method of performing a bus partial write operation in a data processing system implementing coherency domains and domain indicators in accordance with the present invention. The process begins at block 4100, for example, with an I/O controller 214 issuing a global bus partial write operation on interconnects 110, 114 at block 922 of FIG. 9B. The various partial responses that snoopers 122, 236 may provide to distributed response logic 210 are represented in FIG. 41 by the outcomes of decision blocks 4110, 4120, 4122, 4134 and 4138. These partial responses in turn determine the CR for the global bus partial write operation.

As depicted at block 4110, if no snooper 122 provides a partial response indicating that it is responsible (i.e., the LPC) for the requested partial memory block, an error occurs causing processing to halt, as depicted at block 4112. If, however, a snooper 122 provides a partial response indicating that it is responsible (i.e., the LPC) for the requested partial memory block but does not affirm the global bus partial write operation (block 4120), each affirming snooper 236 invalidates its respective copy of the requested memory block, if any (block 4132), and response logic 210 generates a CR indicating "retry", as depicted at block 4128. A "retry" CR is generated because the LPC must be available to receive the partial memory block. Response logic 210 similarly generates a "retry" CR at block 4128 and each affirming snooper 236 invalidates its respective copy of the requested memory block, if any (block 4132) if a memory controller snooper 122 affirms the global bus partial write operation, no M, Me, T, or Te snooper 236 affirms the global bus partial write operation (blocks 4122 and 4130), but a partial response indicates that a M, Me, T or Te snooper 236 may be possibly hidden (blocks 4134 and 4128).

If a memory controller snooper 122 affirms the bus partial write operation and an M, T, or Te snooper 236 affirms the global bus partial write operation (block 4122), the M, T or Te snooper 236 initiates a cache castout operation of the cache line containing the partial memory block, as depicted at block 4124 and as described above. Each other snooper 236 affirming the global bus partial write operation, if any, invalidates its copy of the memory block, as shown at block 4126. As further illustrated at block 4128, response logic 210 generates a "retry" CR. Thus, a "retry" CR is generated, as depicted at block 4128, so that the global bus partial write operation only succeeds when no HPC copy of the requested partial memory block remains in the system.

The global bus partial write operation is handled similarly if a memory controller snooper 122 affirms the global bus partial write operation and an Me snooper 236 affirms the global bus partial write operation (block 4130), except that no castout is required because the cached copy of the memory block is unmodified. Accordingly, the Me snooper 236 affirming the global bus partial write operation invalidates its copy of the target memory block at block 4132, and response logic 210 provides a "retry" CR, as depicted at block 4128.

Referring again to block 4134, assuming that a snooper 122 affirms the global bus partial write operation as the LPC, no M, Me, T or Te snooper 236 affirms the global bus partial write operation, and no partial responses are generated that indicate that a M, Me, T or Te snooper 236 may be possibly hidden, the requesting L2 cache 230 transmits the partial memory block to the LPC snooper 122, and snoopers 236, if any, affirming the global bus partial write operation invalidate their respective copies of the requested memory block (block 4136). In addition, the LPC snooper 122 updates the domain indicator 3004 for the updated memory block to "global". As shown at blocks 4138 and 4140, if the partial responses indicate that no hidden S' or Sr' snooper 236 exists, the process ends with distributed response logic 210 generating a CR indicating "success". If, on the other hand, at least one partial response indicating the presence of a possibly hidden S' or Sr' snooper 236 was given in response to the global bus partial write operation, distributed response logic 210 generates a CR indicating "cleanup" (block 4142), meaning that the requesting I/O controller 214 must issue one or more bus kill operations to invalidate the requested memory block in any such hidden S' or Sr' snooper 236.

VI. Domain Indicator Storage

A. Storage of Domain Indicators at System Memory

In the foregoing description, it has been assumed that the domain indicators described herein are simply stored together with the associated memory blocks in system memory as shown in FIG. 30. In accordance with one aspect of the present invention, the storage of domain indicators in system memory can be improved through the reuse of existing "spare" storage.

Figure 42:
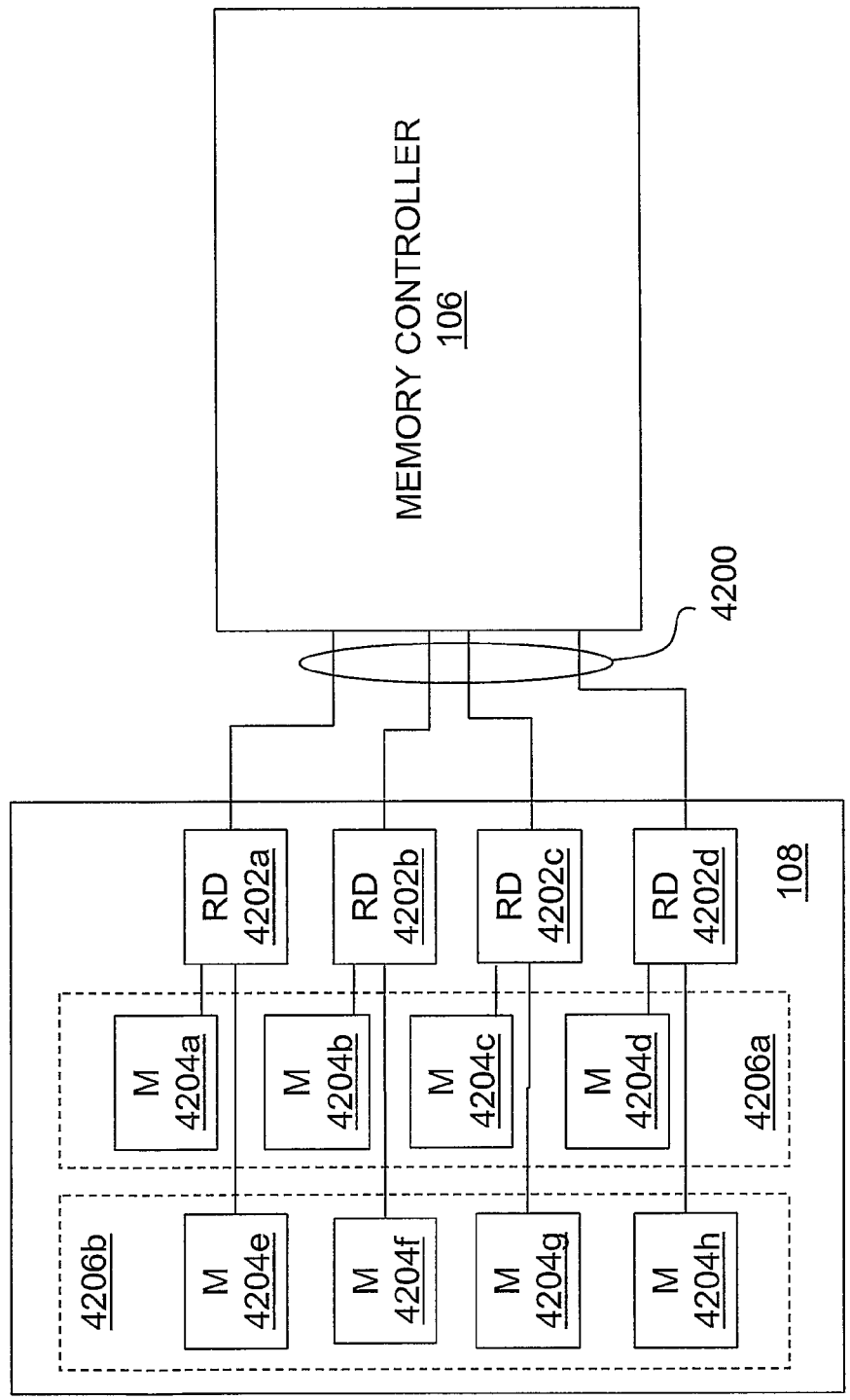
FIGS. 42-43 depict an exemplary system memory configuration that enhances storage of domain indicators in accordance with the present invention.

With reference now to FIG. 42, there is illustrated an exemplary embodiment of a system memory organization that provides improved storage of domain indicators in accordance with the present invention. As shown, an individual system memory 108 (e.g., system memory 108*a* or 108*b* of FIG. 1) is coupled by a memory bus 4200 to a memory controller 106 that controls read and write access to the information in system memory 108. In an exemplary embodiment, each system memory 108 is implemented with multiple redrive (RD) chips 4202*a*-4202*d*, each providing address and data connections for multiple (in this case two) Dynamic Random Access Memory (DRAM) Dual Inline Memory Modules (DIMMs) 4204. That is, RD chip 4202*a* is connected to DIMMs 4204*a*, 4204*e*; RD chip 4202*b* is connected to DIMMs 4204*b*, 4204*f*; RD chip 4202*c* is connected to DIMMs 4204*c*, 4204*g*; and RD chip 4202*d* is connected to DIMMs 4204*d*, 4204*h*. The DIMMs 4204 comprising each system memory 108 are further organized into multiple "ranks" 4206*a*-4206*b* each containing one DIMM 4204 connected to each of RD chips 4202*a*-4202*d*. For example, rank 4206*a* includes DIMMs 4204*a*-4204*d*, and rank 4206*b* includes DIMMs 4204*e*-4204*h*. Real memory addresses may be "striped" across the DIMMs 26 comprising each rank 4206 so that access latency for full cache line memory accesses is reduced.

Figure 43:
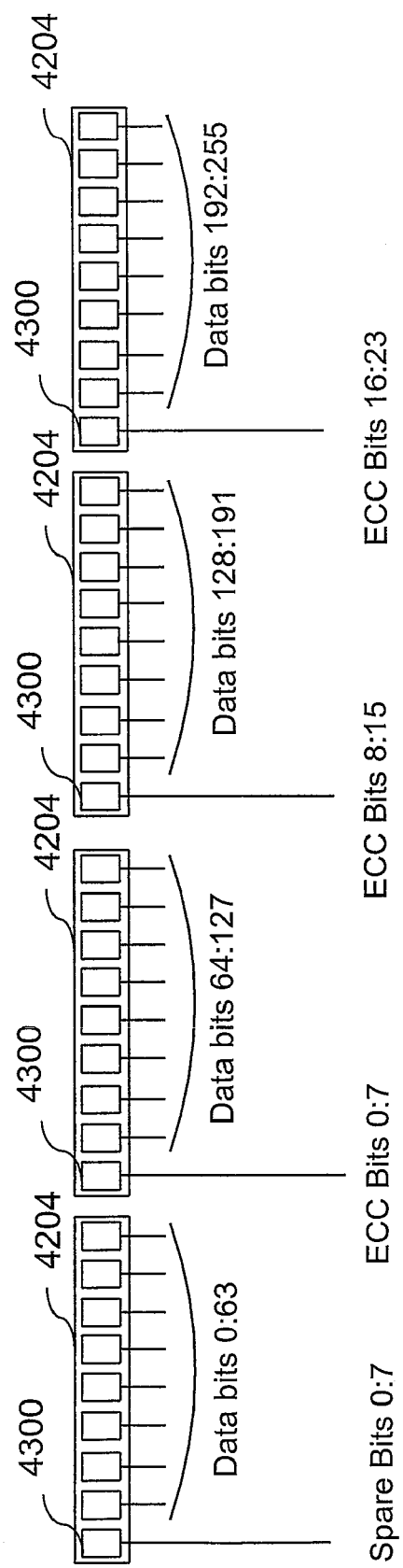

Referring now to FIG. 43, there is depicted a more detailed block diagram of an exemplary implementation of the DIMMs 4204 forming one rank 4206 of a system memory 108. In the depicted embodiment, each DIMM 4204 contains 9 Dynamic Random Access Memory (DRAM) chips 4300 that are each 8 bits wide. Each row in an individual DIMM 4204 was thus originally designed to provide 8 bytes of data storage in 8 of DRAM chips 4300 and 1 associated "spare" byte of storage for the ECC in the ninth DRAM chip 4300. According to the present invention, however, the 4 DIMMs 4204 forming a rank 4206 are aggregated to provide storage for 32-byte (255-bit) memory blocks, each having 4 bytes of "spare" storage. Because each 32-byte memory block only requires 24 bits of ECC, the ECC for a memory block is preferably striped across corresponding DRAM chips 4300 in 3 DIMMs 4204, as shown, leaving 8 additional bits of storage in one DRAM chip 4300 for each row of storage.

These 8 additional bits of storage are primarily used by memory controller 106 as replacement storage in case of a hard failure in any one of the other 35 bytes of storage in the same row. Until needed as replacement storage, 1 of the 8 spare bits in each row is preferably utilized by memory controller 106 to store a domain indicator 3004 for the associated 32-byte memory block 3000. If memory controller 106 subsequently utilizes the 8 spare bits in a row as replacement storage, meaning that storage for the domain indicator 3004 of the row is no longer available, memory controller 106 implies a domain indicator 3004 reset to indicate "global" for that row to ensure that coherency is maintained. In this manner, the storage capacity requirements of system memory 108 are reduced.

B. Storage of Domain Indicators in Cache

In accordance with the present invention, storage of domain indicators in cache memory, such as L2 caches 230, can also be enhanced. In particular, in the embodiment of data processing system 100 described with reference to FIG. 30, domain indicators 3004 are received by L2 caches 230 in conjunction with the associated memory blocks and may optionally be stored with the memory blocks in L2 cache arrays 300. While this arrangement permits a simplified data flow for domain indicators, when a first L2 cache 230 responds to a bus RWITM operation of a second L2 cache 230 residing in a different coherency domain by supplying the requested memory block, no "global" indicator remains cached in the local coherency domain. Thus, the LPC must be accessed to determine whether or not the memory block is known to be cached, if at all, only locally. Consequently, as shown, for example, at blocks 3406-3409 of FIG. 34, if an HPC for a memory block receives a bus RWITM operation from a requestor in a remote coherency domain, the system responds with a retry-push including a cache castout of the requested memory block and retry of the bus RWITM operation. As will be appreciated, it would be preferable to eliminate the latency and bandwidth utilization associated with retry-push responses.

The present invention recognizes that it would therefore be desirable to reduce access latency to a domain indication in cases in which no copy of a memory block remains cached in a coherency domain through the use of an additional cache state, referred to herein as Ig (Invalid global). The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain.

The Ig state is formed in a lower level cache in response to that cache providing a requested memory block to a requestor in another coherency domain in response to an exclusive access request (e.g., a bus RWITM or bus DClaim operation). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed anytime that a cache sources a memory block to a remote coherency domain in response to an exclusive access request.

Because cache directory entries including an Ig state carry potentially useful information, it is desirable in at least some implementations to preferentially retain entries in the Ig state over entries in the I state (e.g., by modifying the Least Recently Used (LRU) algorithm utilized to evaluate LRU field 308 to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries, for example, at block 1804 of FIG. 18, block 1960 of FIG. 19 and block 2040 of FIG. 20. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with the an Ig entry as the selected victim. The cache thus avoids avoid placing two copies of the same address tag in the cache directory. Third, the castout of the Ig state is preferably performed as a local operation, or if performed as a global operation, ignored by the LPC of the castout address. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is written back to the LPC (if local to the cache performing the castout).

Implementation of an Ig state in accordance with the present invention improves communication efficiency by maintaining a cached domain indicator for a memory block in a coherency domain even when no valid copy of the memory block remains cached in the coherency domain. As a consequence, an HPC for a memory block can service an exclusive access request (e.g., a bus RWITM or bus DClaim operation) from a remote coherency domain without retrying the request and performing a push of the requested memory block to the LPC.

With the implementation of the Ig state, CPU and I/O operations can be implemented as described above with reference to FIGS. 18-22 and 9b, given the rules governing selection and replacement of Ig entries noted above. In addition, the implementation of the Ig state does not affect the global bus read operation (FIG. 32), local and global bus DCBZ operations (FIGS. 27 and 36), local and global bus write operations (FIGS. 38 and 37) and bus partial write operation (FIG. 41) described above, given the understanding that updates to the coherency states of valid affirming snoopers (i.e., those snoopers holding the requested memory block in a valid state) to the I coherency state do not affect Ig snoopers, which by definition do not hold a valid copy of the requested memory block. High level logical flowcharts of cache and bus operations modified by the implementation of the Ig cache state are illustrated in FIGS. 44-48 and described in detail below.

Figure 44:
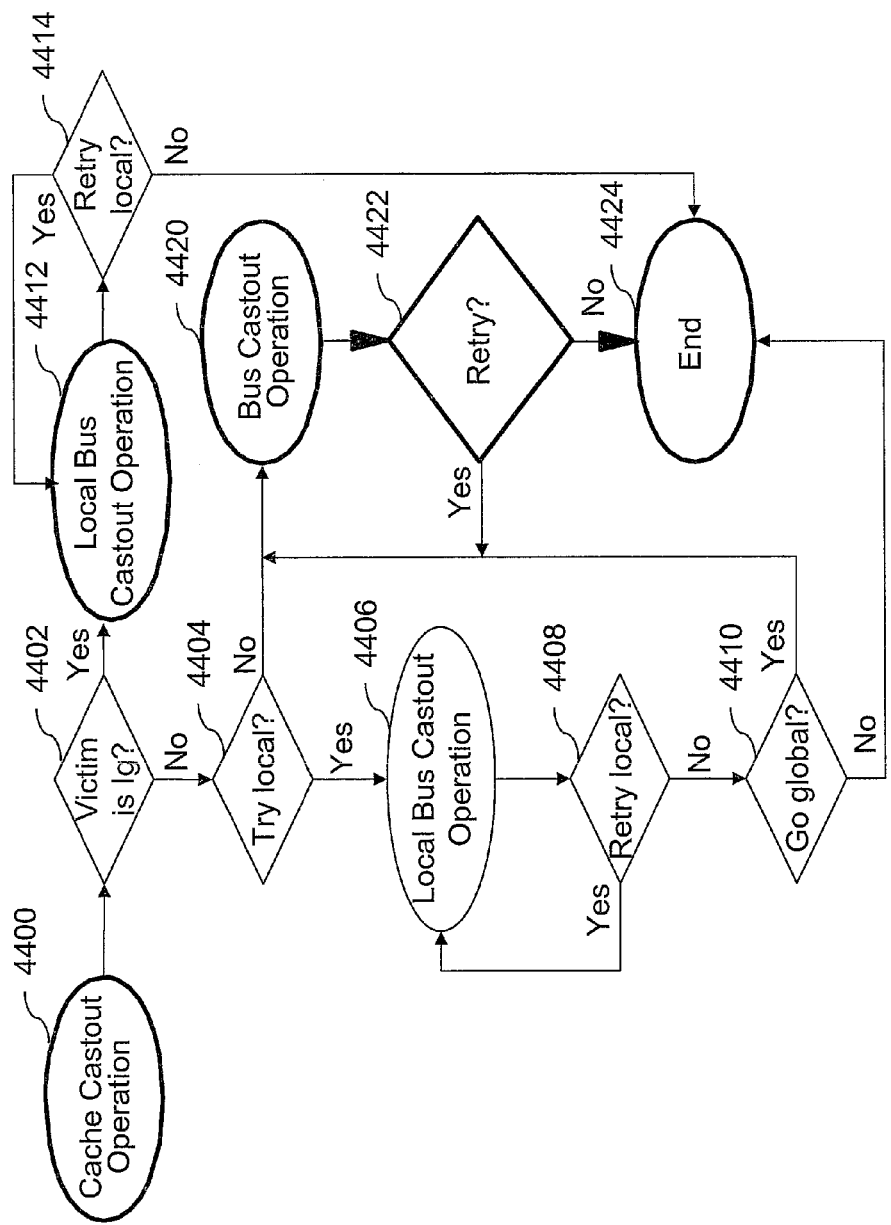
FIG. 44 is a high level logical flowchart of an exemplary cache castout operation for a data processing system implementing coherency domains, domain indicators and the Ig cache state in accordance with the present invention.

Referring first to FIG. 44, a high level logical flowchart of an exemplary cache castout operation for a data processing system implementing coherency domains, domain indicators and the Ig cache state is depicted. In such embodiments, the process given in FIG. 44 is performed in lieu of that illustrated in FIG. 23.

The illustrated process begins at block 4400 when an L2 cache 230 determines that a castout of a cache line is needed, for example, at block 1804 of FIG. 18, block 1970 of FIG. 19 or block 2042 of FIG. 20. In the present embodiment, a cache castout operation is required if the victim memory block selected for replacement is in any of the M, T, Te or Ig coherency states. To perform the castout operation, the L2 cache 230 first determines at block 4402 whether or not the victim entry selected for replacement from the target congruence class is in the Ig state. If so, an address-only local bus castout operation is issued at block 4412 and, if necessary, retried (as indicated by block 4414) in order to update the corresponding domain indicator in the LPC system memory 108 to indicate "global." As noted above, the castout of the Ig entry is preferably performed only as a local operation, meaning that if the LPC system memory 108 is not within the local coherency domain, the CR does not indicate "retry local" at block 4414. Thereafter, the cache castout operation ends at block 4424.

Returning to block 4402, if the victim entry selected for replacement is not in the Ig state, the L2 cache 230 determines at block 4404 whether to issue a global or local bus castout operation for the selected memory block. If L2 cache 230 elects to issue a global bus castout operation, the process passes to block 4420, which is described below. If, however, L2 cache 230 elects to issue a local bus castout operation, the process proceeds to block 4406, which illustrates the L2 cache 230 issuing a local bus castout operation, as described above with reference to FIG. 39, and then awaiting the associated CR. As indicated at block 4408, if the CR indicates "retry local", meaning that the local bus write operation can definitely be serviced within the local coherency domain if retried, L2 cache 230 reissues the local bus castout operation at block 4406. Alternatively, if L2 cache 230 receives a CR indicating definitively that the bus write operation cannot be serviced within the local coherency domain (block 4410), the process proceeds to block 4420, which is described below. Finally, if L2 cache 230 receives a CR indicating that the castout of the selected memory block succeeded, the process simply ends at block 4424.

Block 4420 depicts L2 cache 230 issuing a global bus castout operation on system interconnect 110 via local interconnect 114, as described above with reference to FIG. 40. As indicated at block 4422, the L2 cache 230 reissues the global bus castout operation until a CR other than "retry" is received. Thereafter, the process ends at block 4424.

Figure 45:
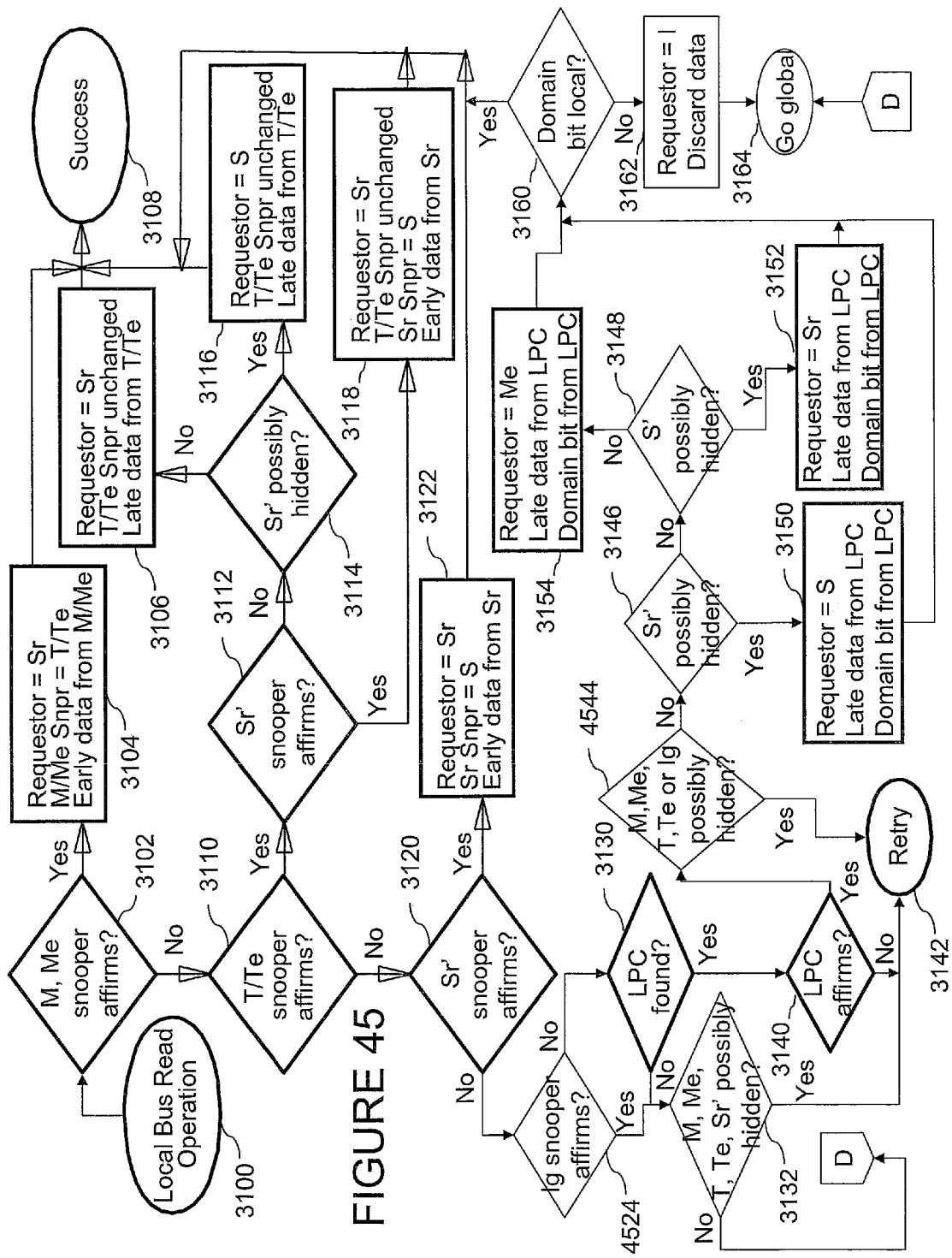
FIG. 45 is a high level logical flowchart of an exemplary method of performing a local bus read operation in a data processing system implementing coherency domains, domain indicators and the Ig state in accordance with the present invention.

With reference now to FIG. 45, there is illustrated a high level logical flowchart of an exemplary method of performing a local bus read operation in a data processing system implementing coherency domains, domain indicators and the Ig state in accordance with the present invention. As indicated by like reference numerals, the illustrated process is identical to that described above with reference to FIG. 31, except for blocks 4524 and block 4544, which are now described.

Block 4524 depicts a scenario in which the snooper 236 of an L2 cache 230 provides a partial response affirming the local bus read operation and indicating that the L2 cache 230 holds the address tag of the requested memory block in the Ig state. If no M, Me, T, Te or Sr' snooper 236 is possibly hidden by an incomplete partial response (block 3132), distributed response logic 210 provides a "go global" CR, as depicted at block 3164. If, on the other hand, an Ig snooper 236 affirms the local bus read operation and the complex of partial responses indicates an M, Me, T, Te or Sr' snooper 236 is possibly hidden, response logic 210 generates a "retry" CR, as depicted at block 3142.

Block 4544 is a decision block indicating that if no M, Me, T, Te, Sr' or Ig snooper 236 affirms the local bus read operation, an LPC snooper 122 affirms the local bus read operation, and a M, Me, T, Te or Ig snooper 236 is possibly hidden, response logic 210 generates a "retry" CR at block 3142. Response logic 210 generates a "retry" CR at block 3142 because the bus read operation, if reissued as a local operation, may be able to be serviced without resorting to a global broadcast.

Figure 46:
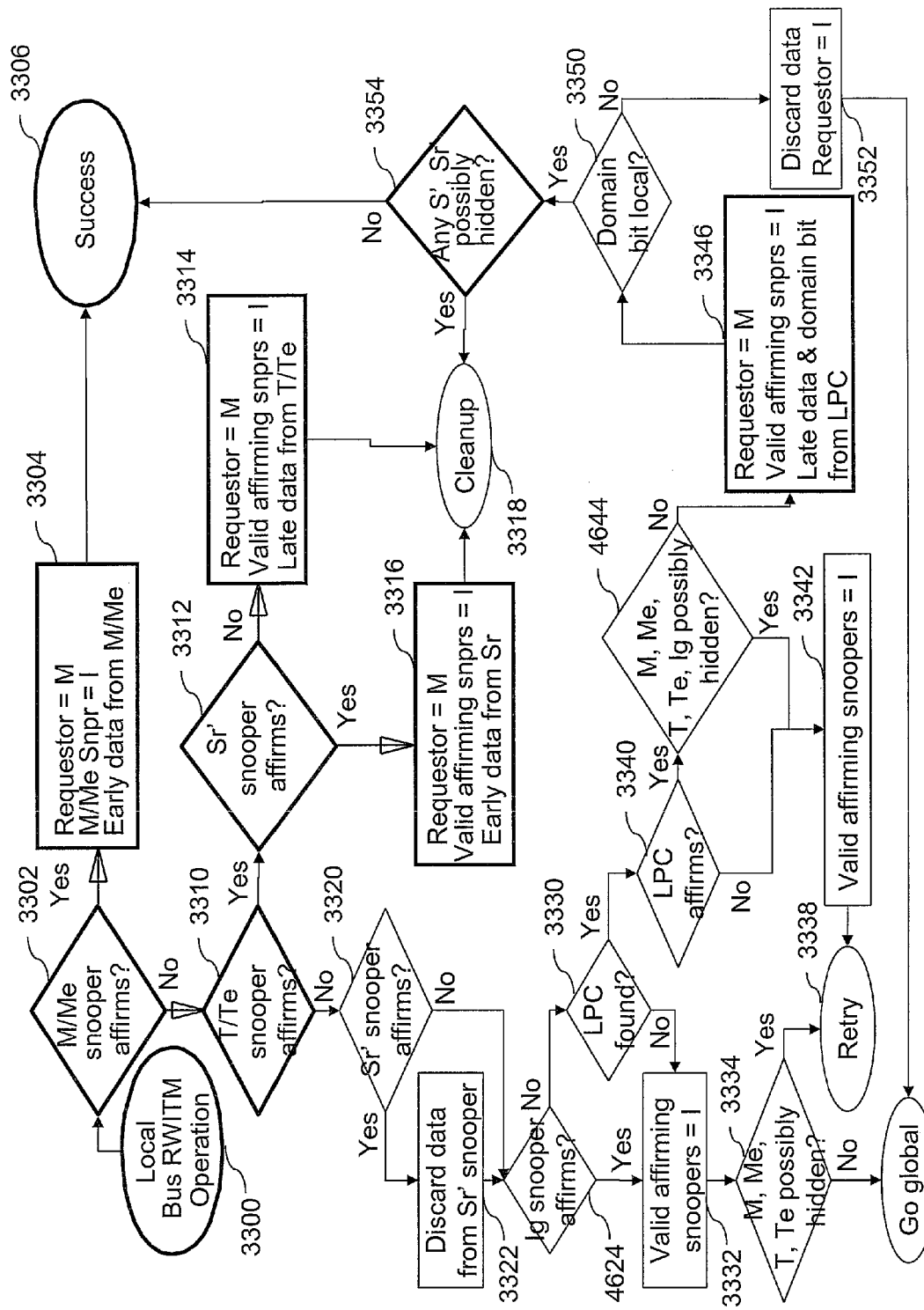
FIG. 46 is a high level logical flowchart of an exemplary method of performing a local bus RWITM operation in a data processing system implementing coherency domains, domain indicators and the Ig state in accordance with the present invention.

Referring now to FIG. 46, there is depicted a high level logical flowchart of an exemplary method of performing a local bus RWITM operation in a data processing system implementing coherency domains, domain indicators and the Ig state in accordance with the present invention. As indicated by like reference numerals, the illustrated process is identical to that described above with reference to FIG. 33, except for blocks 4624 and block 4644, which are now described.

Block 4624 represents the differences in handling the local bus RWITM operation depending upon whether a snooper 236 of an L2 cache 230 provides a partial response affirming the local bus RWITM operation and indicating that the L2 cache 230 holds the address tag of the requested memory block in the Ig state. If so, any affirming snooper 236 other than the Ig snooper 236 invalidates the relevant cache entry (block 3332). If no M, Me, T, or Te snooper 236 is possibly hidden by an incomplete partial response (block 3334), distributed response logic 210 provides a "go global" CR, as depicted at block 3336. If, on the other hand, an Ig snooper 236 affirms the local bus RWITM operation and the complex of partial responses indicates an M, Me, T, or Te snooper 236 is possibly hidden, response logic 210 generates a "retry" CR, as depicted at block 3338. Thus, the affirmance of the local bus RWITM operation by an Ig snooper 236 will cause the operation to be reissued as a global operation if no HPC is possibly hidden in the local coherency domain.

If an Ig snooper 236 does not affirm the local bus RWITM operation at block 4624, the local bus RWITM operation is handled in accordance with block 3330 and following blocks, which, except for block 4644, have been described in detail above. Block 4644 is a decision block indicating that if no M, Me, T, Te or Ig snooper 236 affirms the local bus read operation, an LPC snooper 122 affirms the local bus read operation, and a M, Me, T, Te or Ig snooper 236 is possibly hidden, each valid affirming snooper 236 (i.e., not an Ig snooper 236) invalidates its copy of the requested memory block, at block 3342, and response logic 210 generates a "retry" CR at block 3338. Response logic 210 generates a "retry" CR at block 3338 because the bus RWITM operation, if reissued as a local operation, may be able to be serviced without resorting to a global broadcast.

Figure 47:
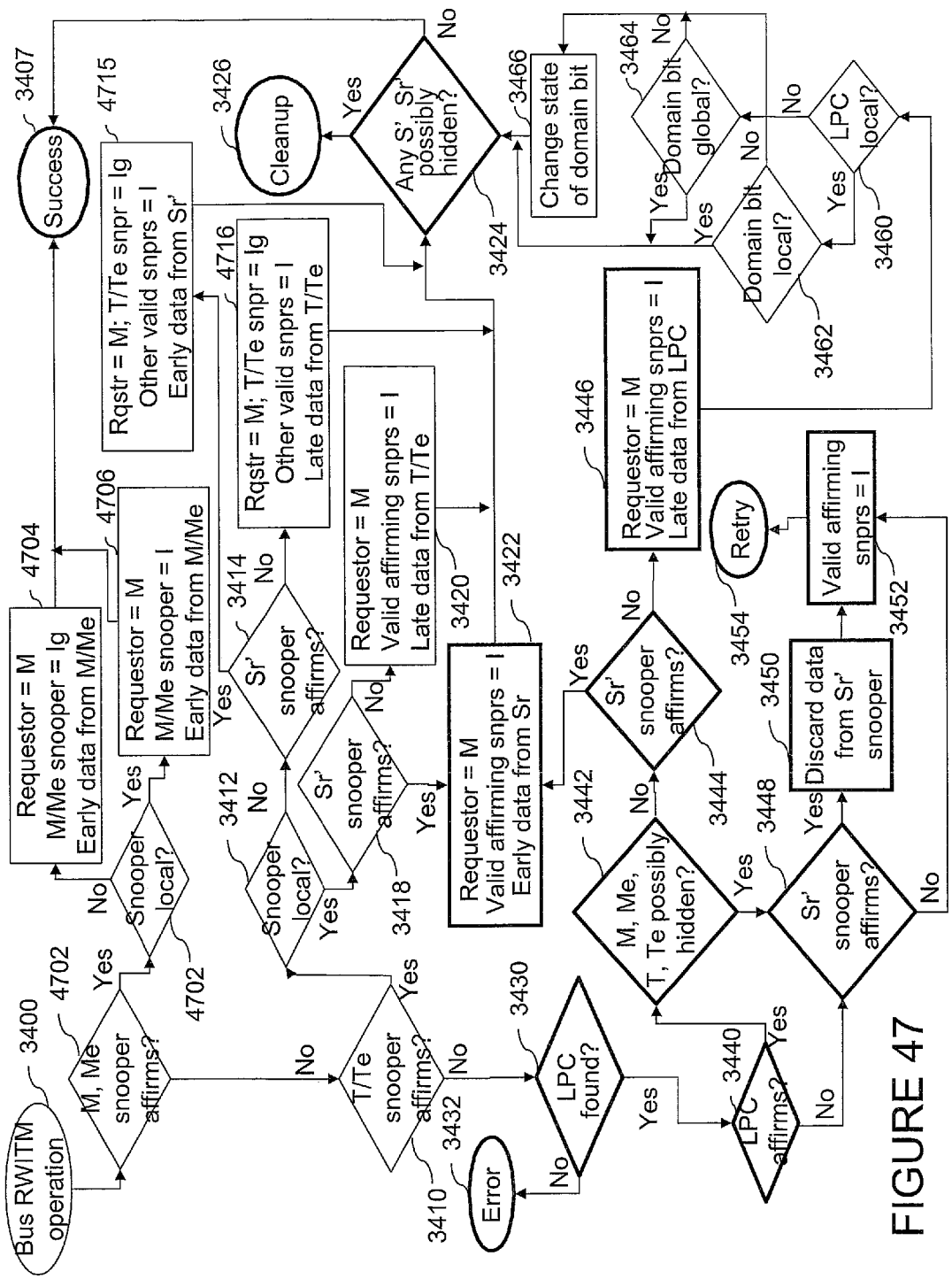
FIG. 47 is a high level logical flowchart of an exemplary method of performing a global bus RWITM operation in a data processing system implementing coherency domains, domain indicators and the Ig state in accordance with the present invention.

With reference now to FIG. 47, there is illustrated a high level logical flowchart of an exemplary method of performing a global bus RWITM operation in a data processing system implementing coherency domains, domain indicators and the Ig state in accordance with the present invention. As indicated by like reference numbers, the illustrated process is the same as that described above with reference to FIG. 34, except for the cases in which an HPC (e.g., M, Me, T or Te) snooper 236 affirms the global bus RWITM operation.

As shown, the process begins at block 3400 in response to the master 232 of a requesting L2 cache 230 issuing a global bus RWITM operation, for example, at block 1954 of FIG. 19. If a snooper 236 affirms the global bus RWITM operation with a partial response indicating that the L2 cache 230 containing the snooper 236 holds the requested memory block in the M or Me state as shown at block 4702, the M or Me snooper 236 provides early data to the requesting master 232, which then holds the requested memory block in the M state (block 4704 or block 4706). Response logic 210 generates a CR indicating "success", as shown at block 3407. In addition, the M or Me snooper 236 updates its cache state to either I or Ig depending upon whether or not it is local to (i.e., in the same coherency domain as) the requesting master 232 (block 4702). If the M or Me snooper 236 determines it belongs to the same coherency domain as the requesting master 232, for example, by reference to the scope indicator in the bus operation, the M or Me snooper 236 updates its cache state for the requested memory block to I. On the other hand, if the M or Me snooper 236 determines it does not belong to the same coherency domain as the requesting master 232, the M or Me snooper 236 updates its cache state for the requested memory block to the Ig state in order to maintain a cached domain indicator for the requested memory block in its coherency domain. Consequently, no retry-push is required in response to the global bus RWITM operation in order to update the domain indicator 3004 in the LPC system memory 108.

Turning now to block 3410, if a snooper 236 affirms the global bus RWITM operation with a partial response indicating that the L2 cache 230 containing the snooper 236 holds the requested memory block in either the T or Te state, the process passes to block 3412, which represents the T or Te snooper 236 determining whether or not it is local to the requesting master 232. If so, the global bus RWITM operation is handled in accordance with blocks 3418 and following blocks, which are described in detail above. If, however, the T or Te snooper 236 affirming the global bus RWITM operation determines that it is not local to the requesting master 232, the global bus RWITM operation is serviced in accordance with either block 4715 or block 4716, depending upon whether or not an Sr' snooper 236 affirmed the global bus RWITM operation.

As shown at blocks 4715, if an Sr' snooper 236 affirmed the global bus RWITM operation, the Sr' snooper 236 provides early data to the requesting master 232, and the T or Te snooper 236 that affirmed the global bus RWITM operation updates its cache state for the entry containing the requested memory block to Ig. In response to receipt of the requested memory block, the requesting L2 cache 230 holds the requested memory block in the M state. In addition, any valid affirming snooper 236 (i.e., not an Ig snooper 236) other than the T or Te snooper 236 updates its respective cache state for the requested memory block to I. Alternatively, as depicted at block 4716, if an Sr' snooper 236 does not affirm the global bus RWITM operation, the T or Te snooper 236 provides late data in response to receipt of a CR indicating "success" (block 3407). In response to receipt of the requested memory block, the requesting L2 cache 230 holds the requested memory block in the M state. In addition, the T or Te snooper 236 updates its cache state to Ig, and any other valid affirming snooper 236 updates its respective cache state for the requested memory block to I. Thus, if a remote T or Te snooper 236 affirms the global bus RWITM operation, the affirming T or Te snooper 236 enters the Ig state in order to maintain a cached domain indicator for the requested memory block in its coherency domain. Consequently, no retry-push is required in response to the global bus RWITM operation in order to update the domain indicator 3004 in the LPC system memory 108.

In either of the cases represented by block 4715 or block 4716, response logic 210 generates a CR dependent upon whether an S' or Sr' snooper 236 is possibly hidden and thus unable to invalidate its copy of the requested memory block in response to snooping the global bus RWITM operation. If response logic 210 makes a determination at block 3424 based upon the partial responses to the bus RWITM operation that an S' or Sr' snooper 236 is possibly hidden, response logic 210 generates a CR indicating "cleanup", as shown at block 3426. Alternatively, if response logic 210 determines that no S' or Sr' snooper 236 is possibly hidden, response logic 210 generates a CR indicating "success", as depicted at block 3407.

Figure 48:
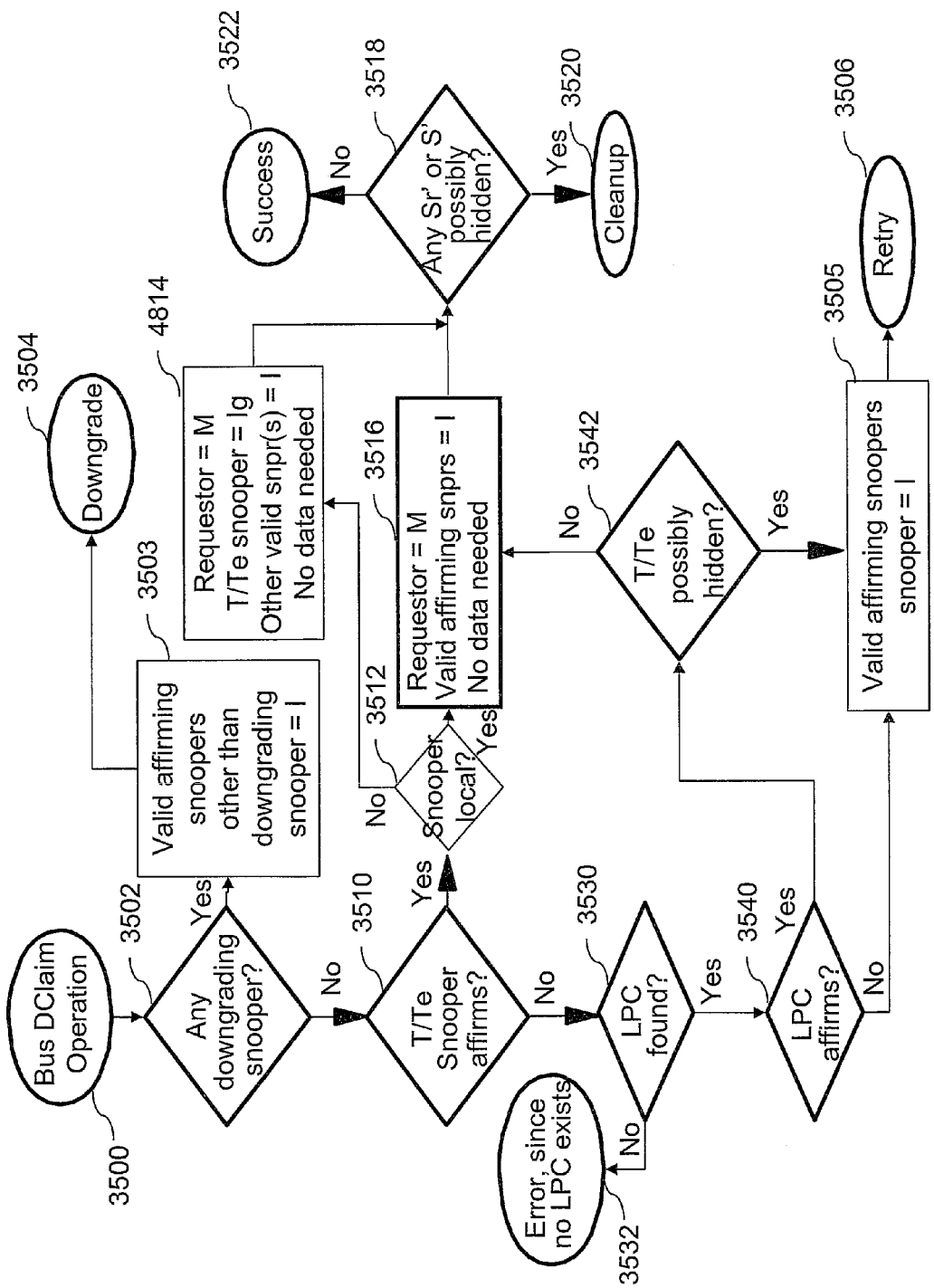
FIG. 48 is a high level logical flowchart of an exemplary method of performing a global bus DClaim operation in a data processing system implementing coherency domains, domain indicators and the Ig state in accordance with the present invention.

Referring now to FIG. 48, there is depicted a high level logical flowchart of an exemplary method of performing a global bus DClaim operation in a data processing system implementing coherency domains, domain indicators and the Ig state in accordance with the present invention. As indicated by like reference numbers, the illustrated process is the same as that described above with reference to FIG. 35, except for the case in which a T or Te snooper 236 affirms the global bus DClaim operation (block 3510) that is not within the same coherency domain as the requesting master 232 (block 3512).

In particular, rather than performing a retry-push as depicted in FIG. 35 at blocks 3514, 3505 and 3506 in order to update the domain indicator 3004 at the LPC system memory 108, the T or Te snooper 236 simply updates the state of its relevant entry to Ig to maintain a cached domain indicator for the requested memory block as shown at block 4814. In addition, the requesting master 232 updates the coherency state of its copy of the requested memory block to M, and each valid affirming snooper 236 other than the T or Te snooper 236 updates its coherency state for the requested memory block to I (block 4814). As shown at blocks 3518, 3520 and 3522, if the partial responses indicate that no S' or Sr' snooper 236 is possibly hidden, the process ends with distributed response logic 210 generating a CR indicating "success" (block 3522). If, on the other hand, at least one partial response indicating the presence of a possibly hidden S' or Sr' snooper 236 was given in response to the global bus DClaim operation, distributed response logic 210 generates a CR indicating "cleanup" (block 3520), meaning that the requesting L2 cache 230 must issue one or more bus kill operations to invalidate the requested memory block in any such hidden S' or Sr' snooper 236.

Figure 49:
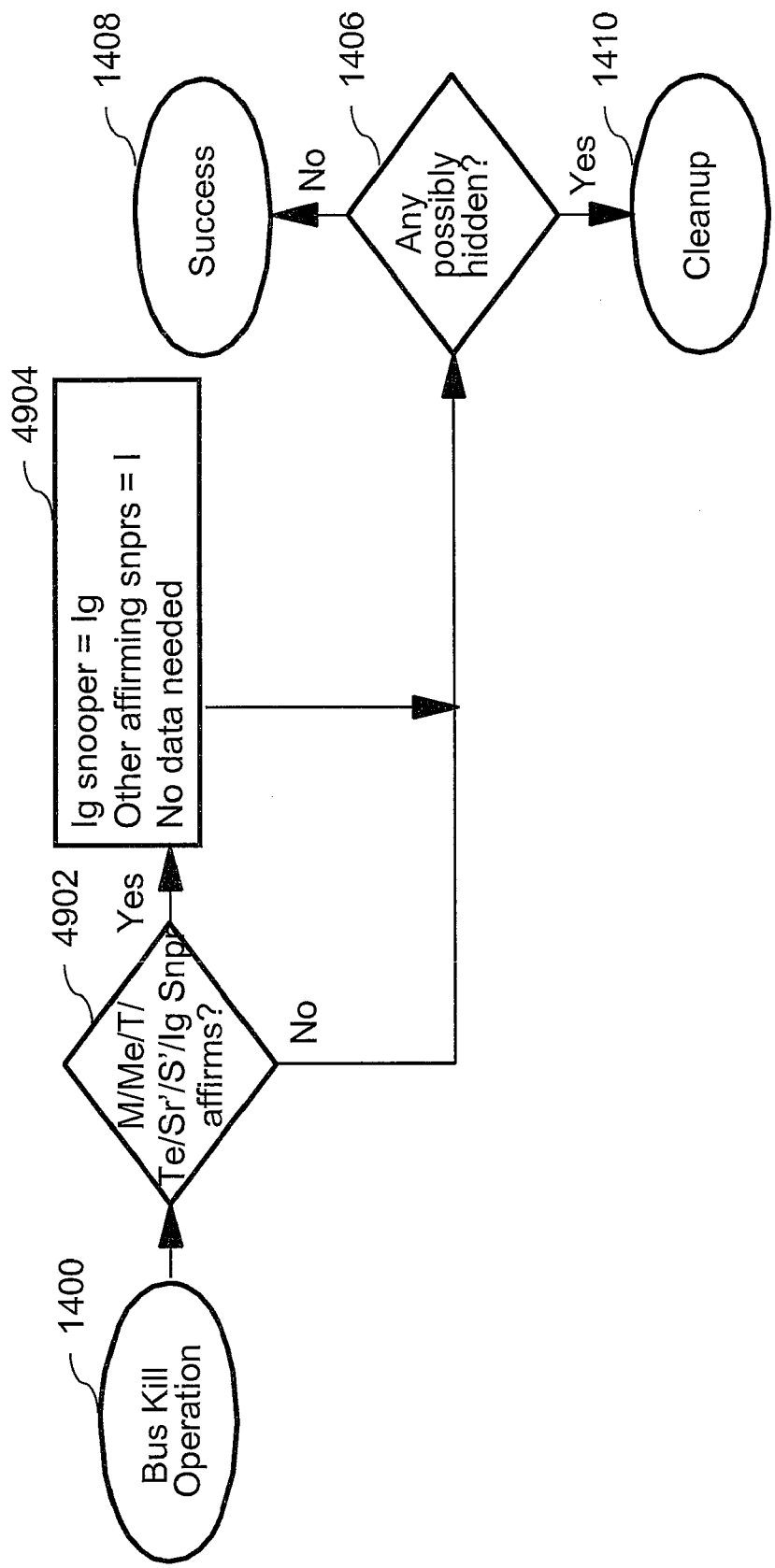
FIG. 49 is a high level logical flowchart of an exemplary method of performing a global bus kill operation in a data processing system implementing coherency domains, domain indicators and the Ig state in accordance with the present invention.

With reference now to FIG. 49, there is illustrated a high level logical flowchart of an exemplary method of performing a global bus kill operation in a data processing system implementing coherency domains, domain indicators and the Ig state in accordance with the present invention. As indicated by like reference numbers, the illustrated process is the same as that described above with reference to FIG. 14, except for the operations performed by an affirming Ig snooper 236.

In particular, as depicted at blocks 4902 and 4904, while each snooper 236 affirming the bus kill operation in any of the M, Me, T, Te, Sr' or S' states invalidates its copy of the requested memory block by assuming the I state, an affirming Ig snooper 236, if any, remains in the Ig state. No change of state to the I state is required because the Ig state indicates the associated data is already invalid.

Figure 50:
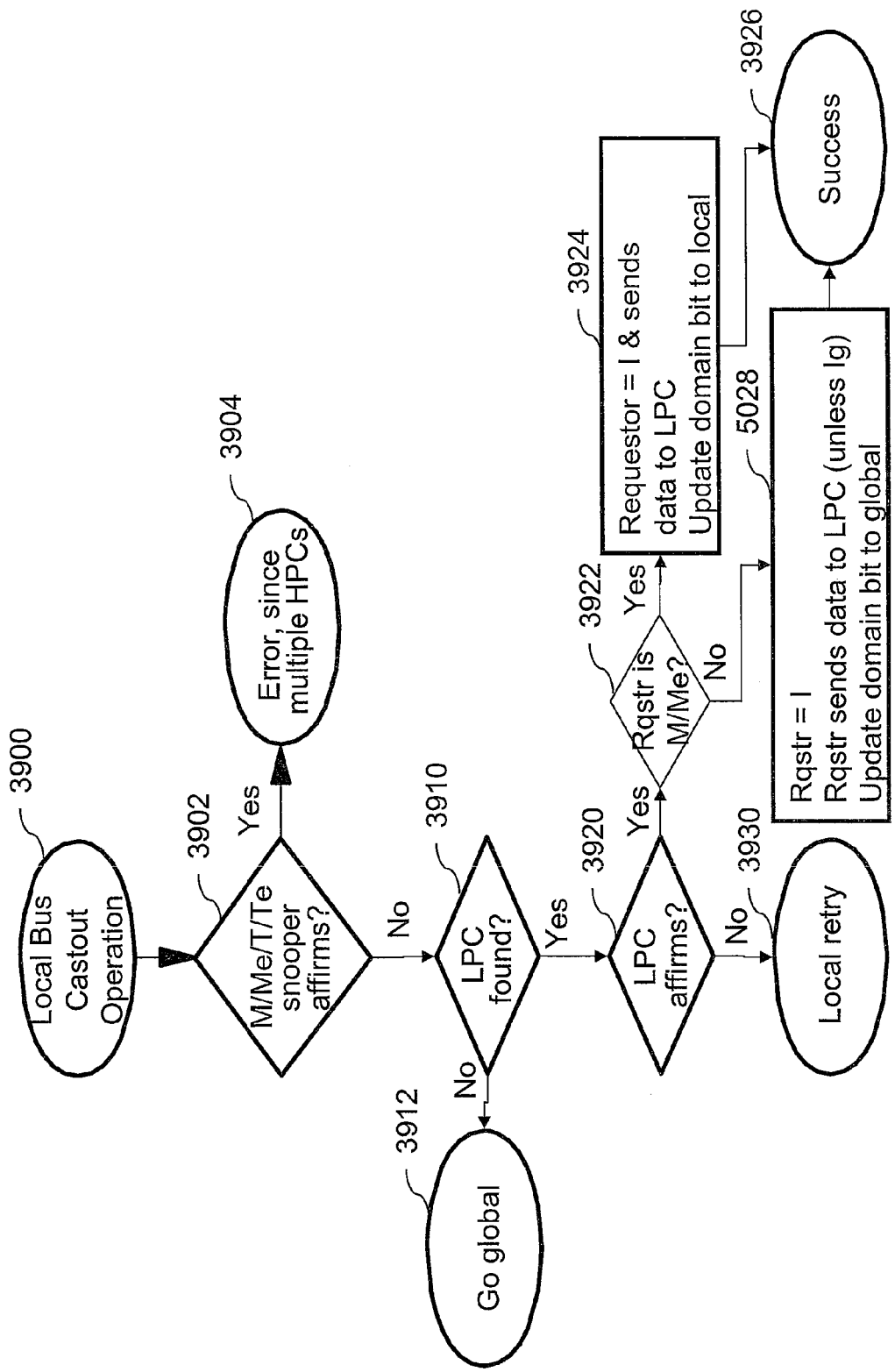
FIGS. 50 and 51 are high level logical flowcharts of exemplary methods of performing local and global bus castout operations, respectively, in a data processing system implementing coherency domains, domain indicators and the Ig state in accordance with the present invention.
Figure 51:
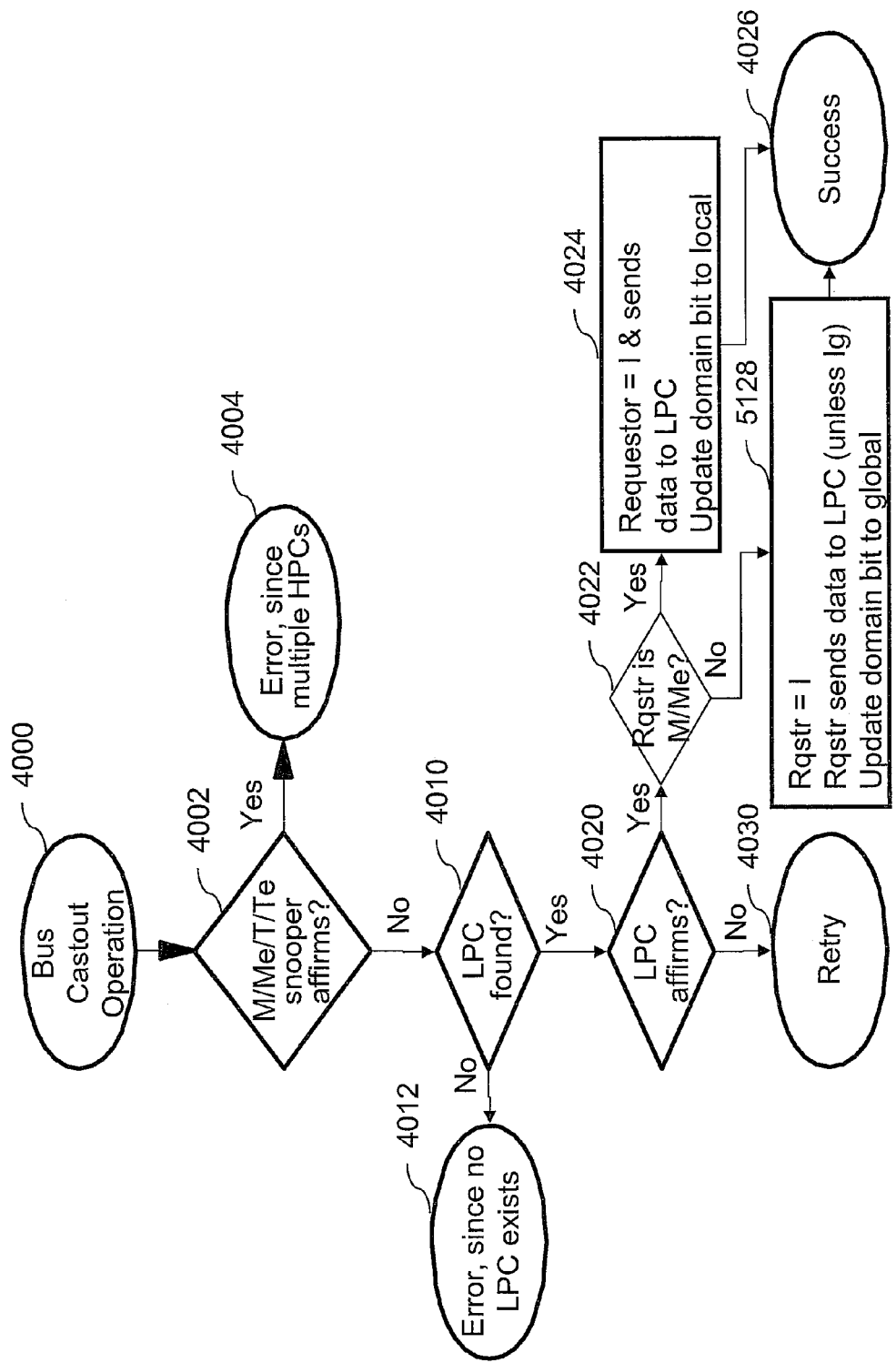

Referring now to FIGS. 50 and 51, there are depicted high level logical flowcharts of exemplary methods of performing local and global bus castout operations, respectively, in a data processing system implementing coherency domains, domain indicators and the Ig state in accordance with the present invention. The depicted processes are identical to those described above with respect to FIGS. 39 and 40, respectively, except for the case in which the requesting L2 cache 230 holds the memory block in the Ig state. As indicated at block 5028 of FIG. 50 and block 5128 of FIG. 51, if an LPC snooper 122 affirms a castout operation of a requesting Ig cache 230, the requesting Ig cache 230 updates the state of the relevant entry to I and performs a dataless address-only castout operation to cause the LPC snooper 122 to update the corresponding domain indicator 3004 to indicate "global". No data is written back to the LPC snooper 122 by the requesting Ig cache 230 because the requesting Ig cache 230 does not hold a valid copy of the memory block corresponding to the address tag associated with the Ig state. As illustrated at block 3926 or 4026, response logic 210 generates a CR indicating "success" if an LPC snooper 122 affirms the castout operation at block 3920 or 4020.

VII. Castout Collisions

In conventional data processing systems, performing a bus castout operation will not result in an address collision between operations because, absent an error condition, only one cache is responsible for casting out a modified memory block to system memory. However, when a bus castout operation is performed in a data processing system implementing the Ig cache state as depicted in FIGS. 50 and 51, it is possible for multiple caches to independently castout Ig cache entries having the same address in order to notify the memory controller to update the domain indicator in the associated system memory. It is also possible for one cache to perform a castout of an Ig entry while another cache holding a memory block associated with that same address in one of the M, Me, T or Te state performs a castout of the memory block. When multiple chronologically overlapping castout operations having the same target address are received by a memory controller a "castout collision" is said to result. As described in greater detail below with reference to FIGS. 52 and 53, the present invention not only handles castout collisions correctly so that no errors result in the setting of the domain indicators in system memory, but also advantageous discards and/or merges bus castout operations to obtain greater utilization of the bandwidth of local and system interconnects 114, 110 and the resources of memory controllers 106.

Figure 52:
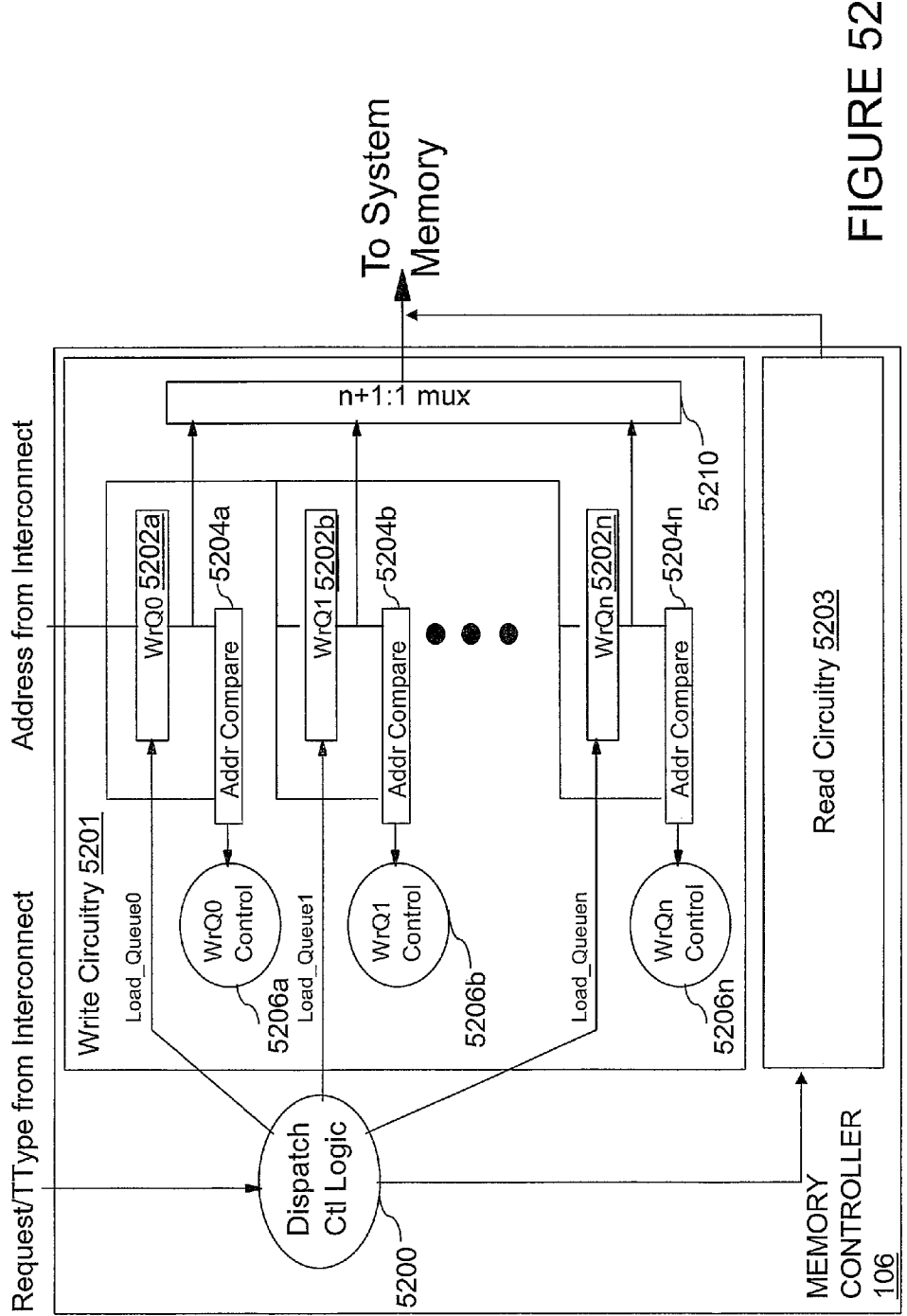
FIG. 52 is a block diagram of an exemplary implementation of a memory controller in accordance with at least one embodiment of the present invention.

With reference now to FIG. 52, there is illustrated a more detailed block diagram of a memory controller 106 in accordance with the present invention. As shown, memory controller 106 includes write circuitry 5201 that services operations that update the associated system memory 108, read circuitry 5203 that services read-type operations targeting the associated system memory 108, and dispatch control logic 5200 that snoops bus operations and dispatches selected operations to write circuitry 5201 and read circuitry 5203. Write circuitry 5201 includes n+1 write queues (WrQs) 5202a-5202n, each having a respective one of address comparators 5204a-5204n and write queue controllers 5206a-5206n. The output of each write queue 5202 is coupled to an input of an n+1:1 multiplexer 5210, the output of which is coupled to the associated system memory 108.

Figure 53:
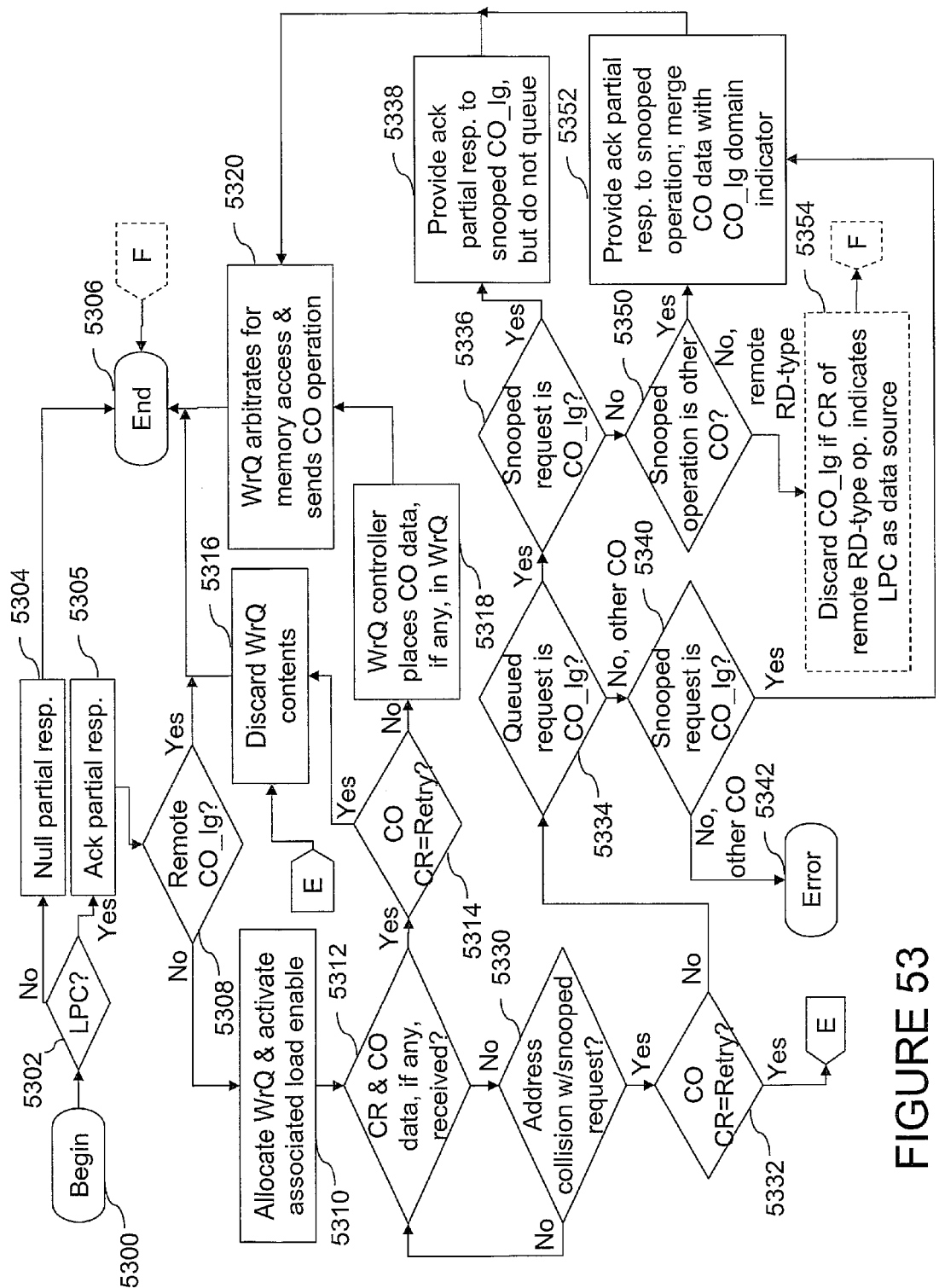
FIG. 53 is a high level logical flowchart of an exemplary method by which a memory controller of a system memory may handle castout collisions in accordance with at least one embodiment of the present invention.

Referring now to FIG. 53, there is depicted a high level block diagram of an exemplary method by which a memory controller 106 as depicted in FIG. 52 handles castout collisions in accordance with a preferred embodiment of the present invention. The process begins at block 5300 in response to receipt of bus castout operation and then proceeds to block 5302, which illustrates a determination by dispatch control logic 5200 of whether or not the memory controller 106 serves as the LPC for the address specified by the bus castout operation. As will be appreciated, the determination made at block 5302 may be made utilizing a variety of conventional techniques, including comparison of the castout address to range registers and/or hashing the castout address. If dispatch control logic 5200 determines that the memory controller 106 is not the LPC for the castout address, dispatch control logic 5200 provides a "null" partial response at block 5304 to indicate that memory controller 106 is not the LPC for the castout address. Thereafter, the process ends at block 5306.

If, on the other hand, dispatch control logic 5200 determines that memory controller 106 is the LPC for the castout address, dispatch control logic 5200 provides a partial response acknowledging the bus castout operation, as depicted at block 5305. As illustrated at block 5308, dispatch control logic 5200 further determines whether the bus castout operation is a global bus castout operation of a cache entry in the Ig state that was initiated by an L2 cache 230 in a different coherency domain than memory controller 106. The determination depicted at block 5308 can be made, for example, by reference to the transaction type and scope indicator contained in the bus castout operation. Because no update is made to a domain indicator in system memory 108 in response to a castout of an Ig cache entry from a remote coherency domain, if an affirmative determination is made at block 5308, dispatch control logic 5200 does not allocate one of write queues 5202 to service the global bus castout operation. The process then ends at block 5306.

In response to a determination at block 5308 that the bus castout operation received at block 5300 is not a global bus castout of an Ig cache entry by an L2 cache 230 in a remote coherency domain, dispatch control logic 5200 allocates a one of write queues 5202 (hereafter, assumed to be write queue 5202a) to service the castout operation and activates a load enable (e.g., Load_queue0) to load the castout address (and associated "global" domain indicator if an Ig castout operation) into write queue 5202a (block 5310). As depicted at block 5312, write queue controller 5206a associated with the write queue 5202a then awaits receipt of the CR for the bus castout operation and the castout memory block, if any. While awaiting receipt of the CR and castout memory block (if any), write queue controller 5206a monitors its local interconnect 114 for an address collision between the queued bus castout operation and subsequently snooped operations, as indicated by the loop between block 5312 and block 5330. Write queue controller 5206a detects an address collision in response to receipt of a signal from its associated address comparator 5204a that indicates that the address of a snooped operation matches the castout address specified by the queued bus castout operation.

If no address collision is detected at block 5330 before the CR for the bus castout operation and castout memory block (if any) is received, the process proceeds from block 5312 to block 5314. Block 5314 depicts a determination by write queue controller 5206a of whether or not the CR for the bus castout operation indicates "retry". If so, write queue controller 5206a discards the queued bus castout operation, and dispatch control logic 5200 reallocates write queue 5202a to a subsequent operation. Thereafter, the process terminates at block 5306.

Alternatively, in response to a determination at block 5314 that the CR for the bus castout operation indicates "success" rather than "retry", write queue controller 5206a places the castout memory block, if any, within write queue 5202a. As illustrated at block 5320, write queue controller 5206a arbitrates for access to the associated system memory 108, and once access permission is obtained, transmits the castout operation from its write queue 5202a to system memory 108. In transmitting the castout operation, the castout memory block, if any, contained in write queue 5202a overwrites the corresponding memory block in system memory 108 and the domain indicator, if any, contained within write queue 5202a overwrites the associated domain indicator in system memory 108. The process then terminates at block 5306.

If an address collision between a snooped operation and the queued bus castout operation is detected at block 5330 before the CR for the bus castout operation is received, the castout collision is handled in accordance with block 5332 and following blocks. That is, if, following the detection of the address collision, the queued bus castout operation receives a CR indicating "retry", as depicted at block 5332, write queue controller 5202a discards the contents of write queue 5202a. The process then ends at block 5306, and memory controller 106 handles the snooped operation that collided with the bus castout operation separately. On the other hand, assuming a CR indicating "success" for the queued bus castout operation, memory controller 106 manages the address collision in a manner dependent upon the transaction types of the queued bus castout operation and the snooped operation.

For example, if both the queued bus castout operation and the snooped operation are castouts of Ig cache entries having the same address (blocks 5334 and 5336), dispatch control logic 5200 provides a partial response acknowledging the second Ig bus castout operation, but does not allocate it a write queue 5202, as illustrated at block 5338. As will be appreciated, no write queue 5202 is allocated to the second Ig castout operation because it is redundant in view of the already queued bus castout operation. The process thereafter passes to block 5320, which, as has been described, depicts performing an update to the domain indicator in system memory 108 for the specified castout address. Thereafter, the process ends at block 5306. Returning to block 5334, if the queued bus castout operation is not a castout of an Ig cache entry and is instead a castout of a valid memory block and the snooped operation is another castout of the same memory block (block 5340), an error causing processing to halt occurs, as shown at block 5342, because each memory block can have only one HPC.

Referring again to blocks 5334 and 5340, if the queued bus castout operation is a castout of a valid memory block and the snooped operation is a castout of an Ig cache entry, dispatch control logic 5200 provides a partial response acknowledging the Ig castout operation, as depicted at block 5352. However, as further indicated at block 5352, dispatch control logic 5200 preferably does not allocate a write queue 5202 to the Ig castout operation. Instead, dispatch control logic 5200 merges the "global" domain indicator provided by the snooped Ig castout operation with the address and associated memory block of the queued bus castout operation that are contained in the previously allocated write queue 5202*a*. Thereafter, the process passes to blocks 5320 and 5306, which have been described.

Referring again to blocks 5334, 5336 and 5350, if the queued bus castout operation is an Ig castout operation, and the snooped operation is a castout of a valid memory block, dispatch control logic 5200 provides a partial response acknowledging the snooped castout operation, as depicted at block 5352. In addition, dispatch control logic 5200 advantageously merges the castout memory block into write queue 5202*a* containing the "global" domain indicator and address of the queued Ig castout operation, rather than allocating the snooped castout operation a separate write queue 5202. Thereafter, the process passes to blocks 5320 and 5306, which have been described.

Referring again to block 5350, a write queue controller 5206 may optionally be further optimized to snoop a queued Ig castout operation not only against other bus castout operations, but also against bus read-type (e.g., read or RWITM) operations. In particular, as shown at block 5354, in response to detecting an address collision between a queued Ig castout operation and a bus read-type operation, write queue controller 5206*a* can discard the queued Ig castout operation if response logic 210 provides a CR for the snooped bus read-type operation indicating that the system memory 108 is the source for the requested memory block. The Ig castout operation can safely be discarded because the bus read-type operation, when serviced by read circuitry 5203, will, if necessary, update the domain indicator in system memory 108 to "global". Following block 5354, the process depicted in FIG. 53 ends at block 5306.

As has been described, the present invention optimizes the handling of bus castout operations to improve utilization of the bandwidth of local and system interconnects 114, 110 and the resources of memory controllers 106. For example, rather than retrying a subsequent operation that collides with a queued castout operation as is conventional, the present invention advantageously permits snooped castout operations that collide with already queued castout operations to be discarded or merged with the queued castout operations. In addition, in at least one embodiment the present invention further permits a queued bus castout operation to be discarded in favor of a subsequently snooped operation, such as a read-type operation originating from a remote coherency domain.

VIII. T States Providing a Domain Indication

It will be recalled from the foregoing discussion with reference to Table II that the exemplary coherency states utilized herein are indicative of a number of properties regarding the associated memory block, including (1) whether the cache holding the memory block is the HPC for the memory block, (2) whether the memory block is the sole cached copy system wide, (3) whether the cache can source the memory block to another cache by intervention, and (4) whether the memory block is consistent with the corresponding memory block in system memory.

As demonstrated by the Ig coherency state described above, coherency states may further indicate whether another cache in a remote coherency domain (possibly) holds a cache entry having a matching address. This additional information may also be expressed by one or more additional coherency states associated with valid memory blocks that are possibly shared. For example, in at least one embodiment of the present invention, the T and Te coherency states may be selectively designated with the notation "n" (i.e., Tn and Ten), where "n" means that the associated valid memory block is known to not be cached outside of the coherency domain containing the cache holding the memory block. An exemplary set of coherency states including the Tn and Ten coherency states may thus be summarized as shown below in Table IV.

TABLE IV

| Cache state | HPC? | Unique? | Data source? | Consistent with LPC? | Cached outside local domain? | Legal concurrent states |
|---|---|---|---|---|---|---|
| M | yes | yes | yes, before CR | no | no | I, Ig (& LPC) |
| Me | yes | yes | yes, before CR | yes | no | I, Ig (& LPC) |
| T | yes | unknown | yes, after CR if none provided before CR | no | unknown | Sr, S, I, Ig (& LPC) |
| Tn | yes | unknown | yes, after CR if none provided before CR | no | no | Sr, S, I, Ig (& LPC) |
| Te | yes | unknown | yes, after CR if none provided before CR | yes | unknown | Sr, S, I, Ig (& LPC) |
| Ten | yes | unknown | yes, after CR if none provided before CR | yes | no | Sr, S, I, Ig (& LPC) |
| Sr | no | unknown | yes, before CR | unknown | unknown | T, Tn, Te, Ten, S, I, Ig (& LPC) |

TABLE IV-continued

| Cache state | HPC? | Unique? | Data source? | Consistent with LPC? | Cached outside local domain? | Legal concurrent states |
|---|---|---|---|---|---|---|
| S | no | unknown | no | unknown | unknown | T, Tn, Te, Ten, Sr, S, I, Ig (& LPC) |
| I | no | n/a | no | n/a | unknown | M, Me, T, Tn, Te, Ten, Sr, S, I, Ig (& LPC) |
| Ig | no | n/a | no | n/a | Assumed so, in absence of other information | M, Me, T, Tn, Te, Ten, Sr, S, I, Ig (& LPC) |

As will become apparent from the following description of CPU, cache and bus operations in an exemplary data processing system 100, implementation of the exemplary set of coherency states summarized in Table IV, and in particular, the Tn and Ten coherency states, permits an advantageous reduction in the broadcast scope of certain bus operations, including bus kill operations.

A. CPU I/O and Cache Operations

With the implementation of the Tn and Ten coherency states, the I/O read and I/O partial write operations are preferably implemented in the manner described above with reference to FIGS. 21 and 9B, respectively. Cache castout operations are preferably implemented as described above with respect to FIG. 44, except that victim memory blocks in the Tn coherency state are (like victim memory blocks in the M, T, Te and Ig states) preferably replaced utilizing cache castout operations. Castouts of victim memory blocks in the Tn state update both the corresponding data and domain indicator in the LPC system memory 108. The implementation of Tn and Ten coherency states supports enhancements to the CPU read, CPU update, CPU write and I/O write operations, as depicted in FIGS. 54, 55A-55B, 56A-56B, and 57, respectively, and as described below.

Figure 54:
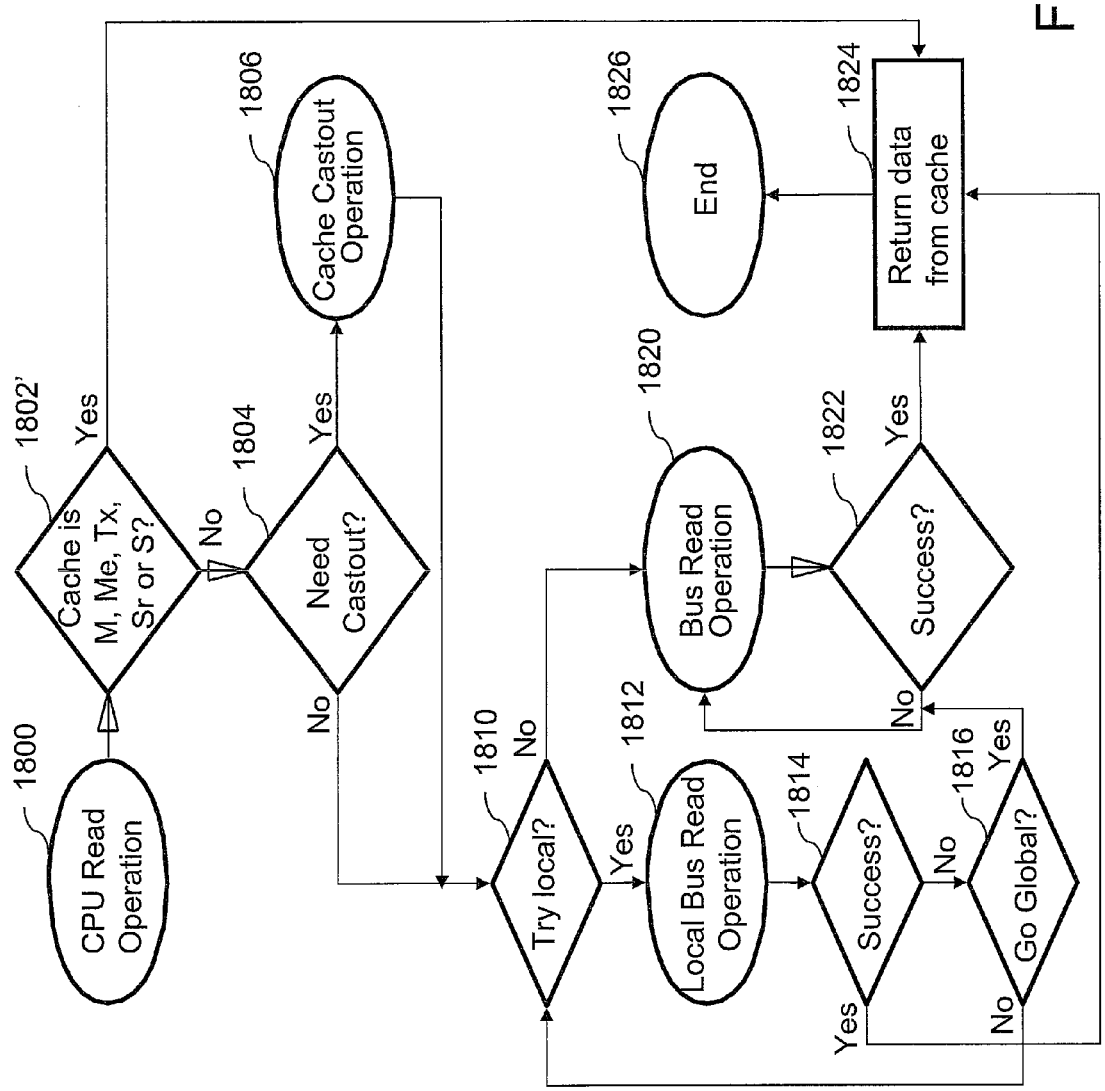
FIG. 54 is a high level logical flowchart of an exemplary method of servicing a read operation by a processor core in a data processing system implementing Tn and Ten coherency states in accordance with the present invention.

With reference now to FIG. 54, there is depicted a high level logical flowchart of an exemplary method of servicing a processor read operation in a data processing system implementing Tn and Ten coherency states in accordance with the present invention. As indicated by like reference numerals, the illustrated method is substantially identical to that depicted in FIG. 18. The one difference (signified by the use of prime notation) is found at block 1802', which indicates that a cache holding a requested memory block in any of the T, Te, Tn or Ten states (collectively represented by the designation Tx), can service a CPU read operation of one of the processor cores 200 in the same processing unit 104 by supplying the requested memory block to the processor core 200, as depicted at block 1824.

Figure 55A:
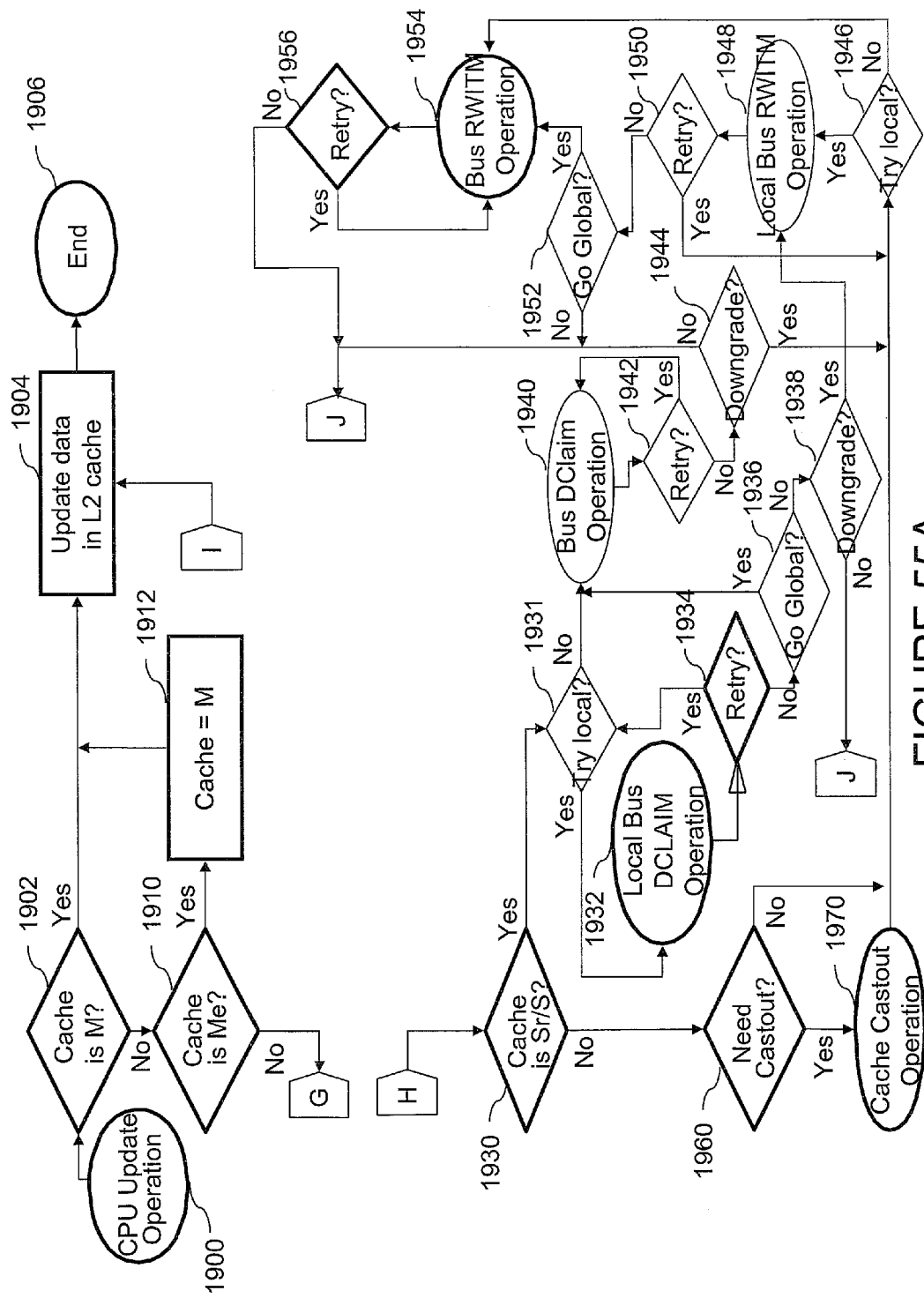
FIGS. 55A-55B together form a high level logical flowchart of an exemplary method of servicing a processor update operation in a data processing system implementing Tn and Ten coherency states in accordance with the present invention.
Figure 55B:
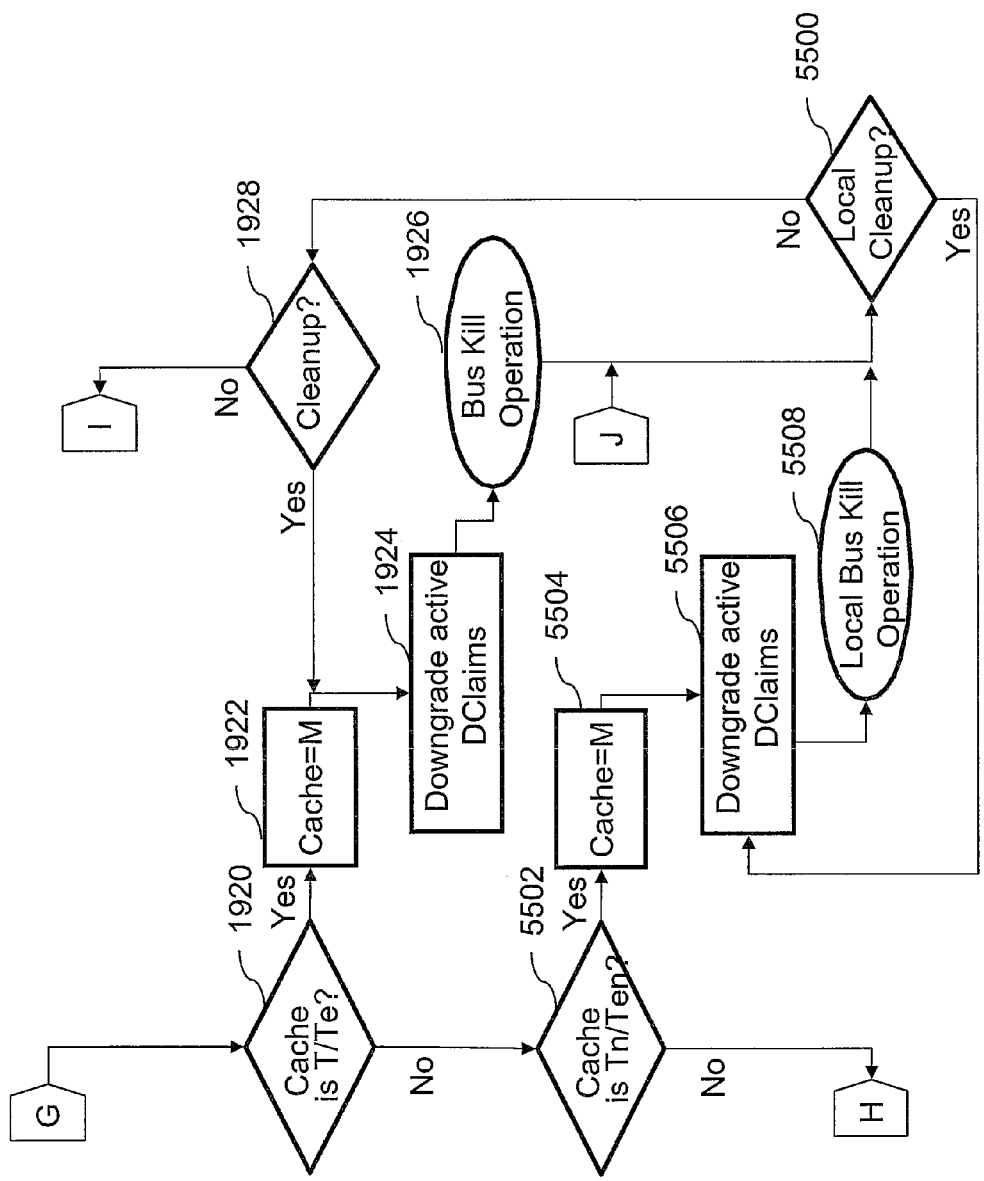

Referring now to FIG. 55A-55B, there is illustrated a high level logical flowchart of an exemplary method of servicing a processor update operation in a data processing system implementing Tn and Ten coherency states in accordance with preferred embodiments of the present invention. As indicated by the use of like reference numerals, the process is substantially similar to that described above with reference to FIG. 19.

As depicted, the process begins at block 1900 in response to receipt by an L2 cache 230 of an update request by an associated one of the processor cores 200 within the same processing unit 104. In response to the receipt of the update request, master 232 of the L2 cache 230 accesses L2 cache directory 302 to determine if the memory block referenced by the request address specified by the update request is cached within L2 cache 230 in M state, as shown at block 1902. If so, the master 232 updates the memory block in L2 cache 232 within the new data supplied by the processor core 200, as illustrated at block 1904. Thereafter, the update process ends at block 1906.

As shown at blocks 1910-1912, if L2 cache directory 302 instead indicates that L2 cache 230 holds the specified memory block in the Me state, master 232 updates the state field 306 for the requested memory block to M state in addition to updating the memory block as shown at block 1904. Thereafter, the process terminates at block 1906.

Following page connector G to FIG. 55B, if L2 cache directory 302 indicates that L2 cache 230 holds the requested memory block in either of the T or Te states (block 1920), meaning that the L2 cache 230 is the HPC for the requested memory block and the requested memory block may possibly be held in one or more other L2 caches 230, master 232 must gain exclusive access to the requested memory block in order to perform the requested update to the memory block. The process by which master 232 gains exclusive access to the requested memory block is shown at block 1922 and following blocks.

According to this process, master 232 updates the state of the requested memory block in the associated state field 306 of L2 cache directory 302 to the M state, as depicted at block 1922. This upgrade is cache state is permissible without first informing other L2 caches 230 because, as the HPC, the L2 cache 230 has the authority to award itself exclusive access to the requested memory block. As illustrated at block 1924, the snooper 236 of the L2 cache 230 provides "downgrade" partial responses to competing DClaim operations snooped on its local interconnect 114, if any, by which other masters are seeking ownership of the requested memory block. These partial responses indicate that the other requesters must reissue any such competing operations as bus RWITM operations. In addition, as depicted at block 1926, master 232 issues a bus kill operation on interconnects 110, 114 to invalidate any other cached copies of the memory block, as described below with reference to FIG. 65.

Master 232 next determines at blocks 5500 and 1928 whether or not the CR for the bus kill operation indicates that the bus kill operation successfully invalidated all other cached copies of the requested memory block or whether additional local or global "cleanup" (i.e., invalidation of other cached copies) is required. If the CR indicates that additional cleanup is not required, the process proceeds through page connector I to block 1904 of FIG. 55A, which has been described. If the CR indicates that additional cleanup is required, master 232 additionally determines whether the CR indicates that the other cached copy or copies of the requested memory block reside entirely within its local coherency domain (block 5500) or whether at least one copy of the requested memory block is cached outside the local coherency domain of master 232 (block 1928). If the CR indicates that each remaining cached copy of the requested memory block resides in the local coherency domain of master 232, the snooper 236 of the requesting L2 cache 230 continues to downgrade active bus DClaim operations (block 5506), and the master 232 of the requesting L2 cache 230 continues to issue local bus kill operation (block 5508) limited in scope to the local coherency domain of master 232 until all other cached copies of the memory block are invalidated. If the CR indicates that at least one remaining cached copy of the requested memory block resides in a remote coherency domain, the process returns to block 1924, which has been described.

With reference now to block 5502, if the access to the L2 cache directory 302 indicates that the requested memory block is held in one of the Tn or Ten states, then master 232 knows that the requesting L2 cache 230 is the HPC for the requested memory block and that any other cached copy of the requested memory block is held by a cache in its local coherency domain. Accordingly, master 232 updates the state of the requested memory block in the associated state field 306 of L2 cache directory 302 to the M state, as depicted at block 5504. In addition, the snooper 236 of the requesting L2 cache 230 provides "downgrade" partial responses to any competing DClaim operations snooped on its local interconnect 114 (block 5506), and the master 232 of the requesting L2 cache 230 continues to issue local bus kill operation (block 5508) limited in scope to the local coherency domain of master 232 until any other cached copies of the memory block are invalidated. If the master 232 determines by reference to the CR for a local bus kill operation that no further local cleanup is required (block 5500), the process passes through block 1928 and page connector I to block 1904, which has been described.

Referring now to block 1930 of FIG. 55A, if the access to L2 cache directory 302 indicates that the requested memory block is held in the Sr or S states, the requesting L2 cache 230 is not the HPC for the requested memory block, and master 232 must gain ownership of the requested memory block from the HPC, if any, or in the absence of an HPC, the LPC, prior to updating the memory block.

Accordingly, master 232 first determines at block 1931 whether to issue a bus DClaim operation as a local or global operation. If master 232 makes a determination to issue a global bus DClaim operation, the process proceeds to block 1940, which is described below. In response to a determination at block 1931 to issue a bus DClaim operation as a local operation, master 232 issues a local bus DClaim operation at block 1932, as described below in greater detail with reference to FIG. 62. Master 232 then awaits receipt of the CR of the local bus DClaim operation, which is represented by the collection of decision blocks 1934, 1936 and 1938. If the CR indicates "retry" (block 1934), the process returns to block 1931, which has been described. If the CR alternatively indicates definitively that the bus DClaim operation cannot be serviced with the local coherency domain (block 1936), the process proceeds to block 1940, which is described below. If the CR alternatively indicates "downgrade", meaning that another requestor has obtained ownership of the requested memory block via a bus DClaim operation, the process passes to block 1948, which is described below. If the CR alternatively indicates that master 232 has been awarded ownership of the requested memory block by the HPC based upon the local bus DClaim operation, the process passes through page connector J to block 5500 of FIG. 55B and following blocks, which have been described.

Block 1940 depicts master 232 issuing a global bus DClaim operation, as described below with respect to FIG. 63. Master 232 next determines at blocks 1942-1944 whether or not the CR for the global bus DClaim operation indicates that it succeeded, should be retried, or was "downgraded" to a RWITM operation. If the CR indicates that the bus DClaim operation should be retried (block 1942), master 232 reissues a global bus DClaim operation at block 1940 and continues to do so until a CR other than "retry" is received. If the CR is received indicating that the global bus DClaim operation has been downgraded in response to another requester successfully issuing a bus DClaim operation targeting the requested memory block, the process proceeds to block 1946, which is described below. If the CR alternatively indicates that master 232 has been awarded ownership of the requested memory block by the HPC based upon the global bus DClaim operation, the process passes through page connector J to block 5500 of FIG. 55B and following blocks, which have been described.

Block 1946 depicts master 232 of the requesting L2 cache 230 determining whether or not to issue a bus RWITM operation as a local or global operation. If master 232 elects to issue a global RWITM operation, the process passes to block 1954, which is described below. If, however, master 232 elects to issue a local bus RWITM operation, the process proceeds to block 1948, which illustrates master 232 issuing a local bus RWITM operation and awaiting the associated CR. As indicated at block 1950, if the CR indicates "retry", the process returns to block 1946, which represents master 232 again determining whether to issue a local or global RWITM operation utilizing the additional information, if any, provided in the retry CR. If the CR to the local bus RWTIM operation issued at block 1948 does not indicate "retry" (block 1950) but instead indicates that the bus RWITM operation was successful in obtaining ownership of the requested memory block (block 1952), the process passes through page connect J to block 5500 of FIG. 55B, which has been described. If master 232 determines at block 1952 that the CR to the local bus RWITM operation indicates that the operation cannot be serviced within the local coherency domain, the process passes to block 1954 and following blocks.

Blocks 1954 and 1956 depict master 232 iteratively issuing a global bus RWITM operation for the requested memory block, as described below with reference to FIGS. 61A-61B, until a CR other than "retry" is received. In response to master 232 receiving a non-retry CR indicating that it succeeded in obtaining ownership of the requested memory block (block 1956), the process passes through page connector J to block 5500 and following blocks, which have been described.

With reference now to block 1960, if a negative determination has been made at blocks 1902, 1910, 1920, 5502 and 1930, L2 cache 230 does not hold a valid copy of the requested memory block. Accordingly, as indicated at blocks 1960 and 1970, L2 cache 230 performs a cache castout operation if needed to allocate a cache line for the requested memory block. Thereafter, the process passes to block 1946 and following blocks as described above.

Figure 56A:
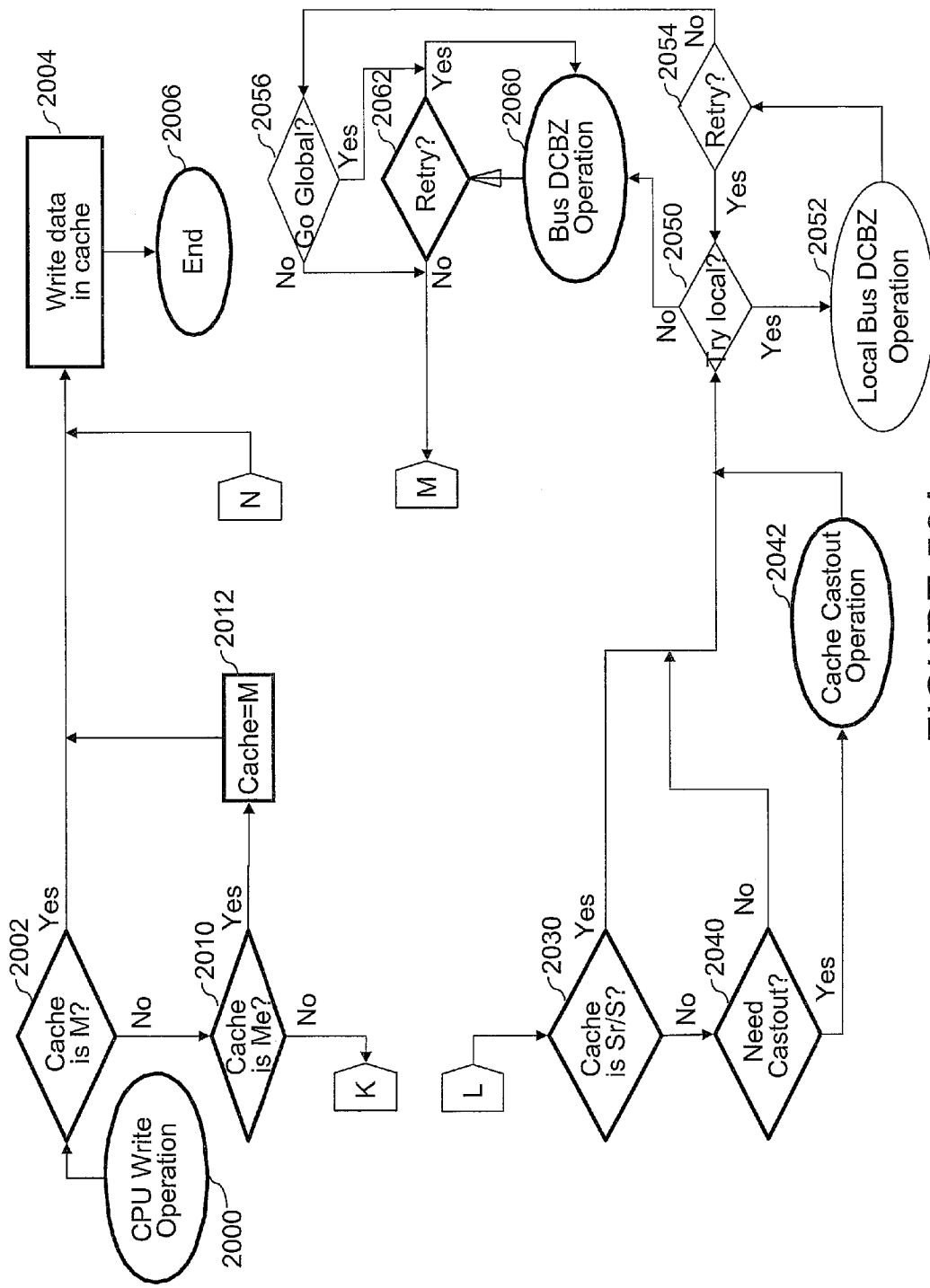
FIG. 56A-56B together form a high level logical flowchart of an exemplary method of servicing a processor write operation in a data processing system implementing Tn and Ten coherency states in accordance with the present invention.
Figure 56B:
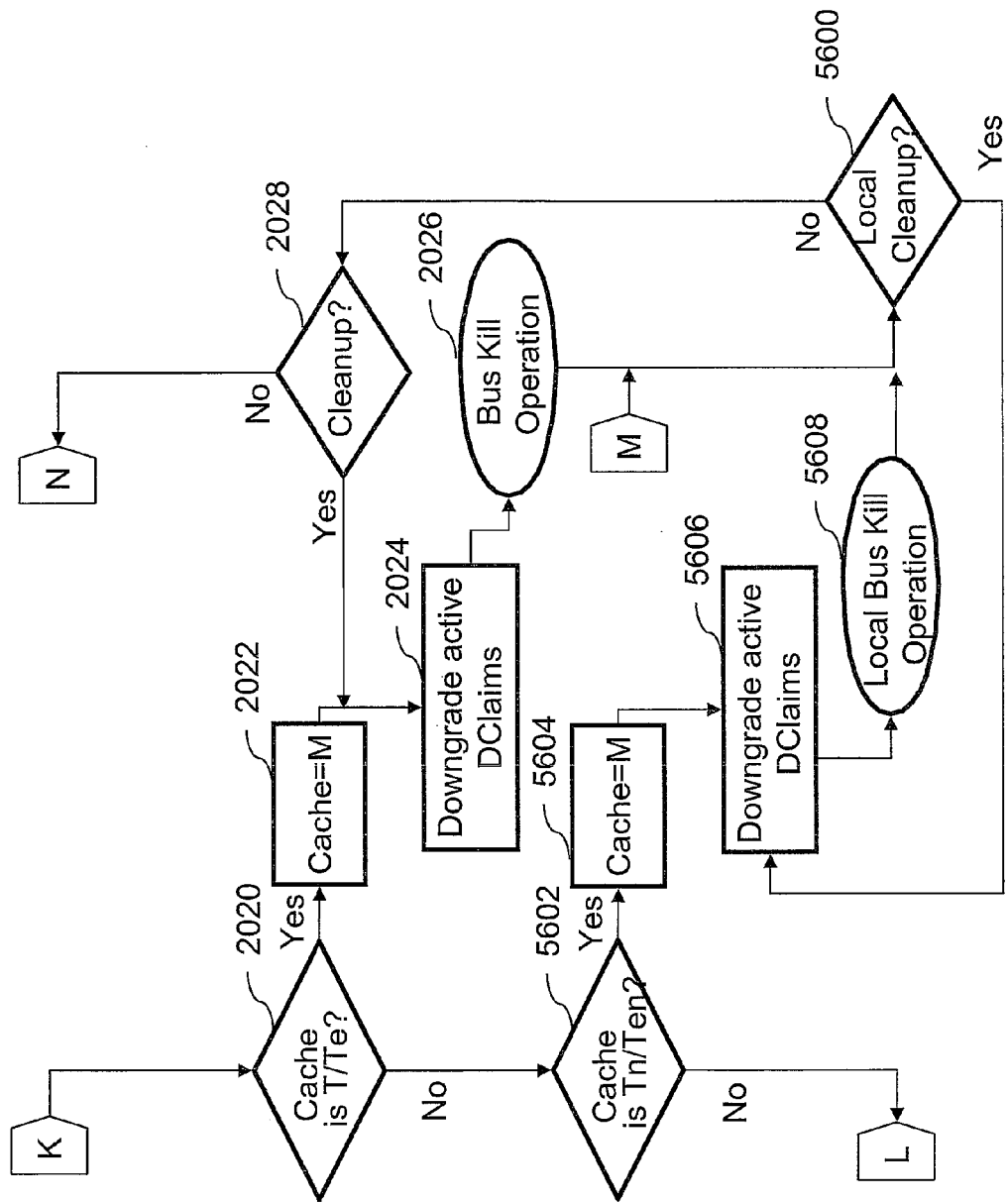

With reference now to FIGS. 56A-56B, there is depicted a high level logical flowchart of an exemplary method of servicing a processor write operation in a data processing system implementing Tn and Ten coherency states in accordance with preferred embodiments of the present invention. As indicated by the use of like reference numbers, the process given in FIGS. 56A-56B is substantially similar the process depicted in FIG. 20 and described above.

The process begins at block 2000 in response to receipt by an L2 cache 230 of a write request by an associated one of the processor cores 200 within the same processing unit 104. In response to the receipt of the write request, master 232 of the L2 cache 230 accesses L2 cache directory 302 to determine if the memory block referenced by the request address specified by the update request is cached within L2 cache 230 in M state, as shown at block 2002. If so, the master 232 writes the data supplied by the processor core 200 into L2 cache array 300, as illustrated at block 2004. Thereafter, the process ends at block 2006.

As shown at blocks 2010-2012, if L2 cache directory 302 instead indicates that L2 cache 230 holds the specified memory block in the Me state, master 232 updates the state field 306 for the requested memory block to M state in addition to writing the memory block as shown at block 2004. Thereafter, the process terminates at block 2006.

Passing through page connector K to block 2020 of FIG. 56B, if L2 cache directory 302 indicates that L2 cache 230 holds the requested memory block in either of the T or Te states, meaning that the L2 cache 230 is the HPC for the requested memory block and the requested memory block may possibly be held in one or more other L2 caches 230, master 232 must gain exclusive access to the requested memory block in order to perform the requested write to the memory block. The process by which master 232 gains exclusive access to the requested memory block is shown at block 2022 and following blocks.

According to this process, master 232 updates the state of the requested memory block in the associated state field 306 of L2 cache directory 302 to the M state, as depicted at block 2022. As illustrated at block 724, the snooper 236 of the requesting L2 cache 230 provides "downgrade" partial responses to competing DClaim operations snooped on its local interconnect 114 to attempt to force other requesters for the memory block to reissue any such competing requests as RWITM requests. In addition, as depicted at block 2026, master 232 issues a bus kill operation to invalidate any other cached copies of the memory block, as described in detail below with reference to FIG. 65.

Master 232 next determines at blocks 5600 and 2028 whether or not the CR for the bus kill operation indicates that the bus kill operation successfully invalidated all other cached copies of the requested memory block or whether additional local or global "cleanup" (i.e., invalidation of other cached copies) is required. If the CR indicates that additional cleanup is not required, the process proceeds through page connector N to block 2004 of FIG. 56A, which has been described. If the CR indicates that additional cleanup is required, master 232 additionally determines whether the CR indicates that the other cached copy or copies of the requested memory block reside entirely within its local coherency domain (block 5600) or whether at least one copy of the requested memory block is cached outside the local coherency domain of master 232 (block 2028). If the CR indicates that each remaining cached copy of the requested memory block resides in the local coherency domain of master 232, the snooper 236 of the requesting L2 cache 230 continues to downgrade active bus DClaim operations (block 5606), and the master 232 of the requesting L2 cache 230 continues to issue local bus kill operation (block 5608) limited in scope to the local coherency domain of master 232 until all other cached copies of the memory block are invalidated. If the CR indicates that at least one remaining cached copy of the requested memory block resides in a remote coherency domain, the process returns to block 2024, which has been described.

With reference now to block 5602, if the access to the L2 cache directory 302 indicates that the requested memory block is held in one of the Tn or Ten states, then master 232 knows that the requesting L2 cache 230 is the HPC for the requested memory block and that any other cached copy of the requested memory block is held by another cache in its local coherency domain. Accordingly, master 232 updates the state of the requested memory block in the associated state field 306 of L2 cache directory 302 to the M state, as depicted at block 5604. In addition, the snooper 236 of the requesting L2 cache 230 provides "downgrade" partial responses to any competing DClaim operations snooped on its local interconnect 114 (block 5606), and the master 232 of the requesting L2 cache 230 continues to issue local bus kill operation (block 5608) limited in scope to the local coherency domain of master 232 until any other cached copies of the memory block are invalidated. If the master 232 determines by reference to the CR for a local bus kill operation that no further local cleanup is required (block 5600), the process passes through block 2028 and page connector N to block 2004, which has been described.

Referring now to block 2030 of FIG. 56A, if the access to L2 cache directory 302 indicates that the requested memory block is held in the Sr or S states, the requesting L2 cache 230 is not the HPC for the requested memory block, and master 232 must gain ownership of the requested memory block from the HPC, if any, or in the absence of an HPC, the LPC, prior to writing the memory block. Accordingly, master 232 first determines at block 2050 whether to issue a bus DBCZ operation as a local or global operation.

If master 232 elects to issue a global bus DCBZ operation, the process passes to block 2060, which is described below. If, however, master 232 elects to issue a local bus DCBZ operation, the process proceeds to block 2052, which illustrates master 232 issuing a local bus DCBZ operation, as described below with reference to FIG. 66, and then awaiting the associated CR. As indicated at block 2054, if the CR for the local bus DCBZ operation indicates "retry", the process returns to block 2050, which represents master 232 again determining whether to issue a local or global bus DCBZ operation utilizing the additional information, if any, provided in the retry CR. If the CR to the local bus DCBZ operation issued at block 2052 does not indicate "retry" (block 2054) but instead indicates that the bus RWITM operation was successful in obtaining ownership of the requested memory block (block 2056), the process passes through page connector M to block 5600 of FIG. 56B, which has been described. If master 232 determines at block 2056 that the CR to the local bus DCBZ operation indicates that the operation cannot be serviced within the local coherency domain, the process passes to block 2060 and following blocks.

Block 2060 illustrates master 232 issuing a global bus DCBZ operation, as described below with respect to FIG. 67. As shown at block 2062, master 232 reissues the global bus DCBZ operation at block 2060 until a CR other than "retry" is received. Following receipt of a CR to the global bus DCBZ operation other than "retry" at block 2062, the process passes through page connector M to block 5600 of FIG. 56B and following blocks, which have been described.

With reference now to block 2040, if a negative determination has been made at blocks 2002, 2010, 2020, 5602 and 2030, L2 cache 230 does not hold a valid copy of the requested memory block. Accordingly, as indicated at block 2040 and 2042, L2 cache 230 performs a cache castout operation if needed to allocate a cache line for the requested memory block. Thereafter, the process passes to block 2050 and following blocks, which have been described.

Figure 57:
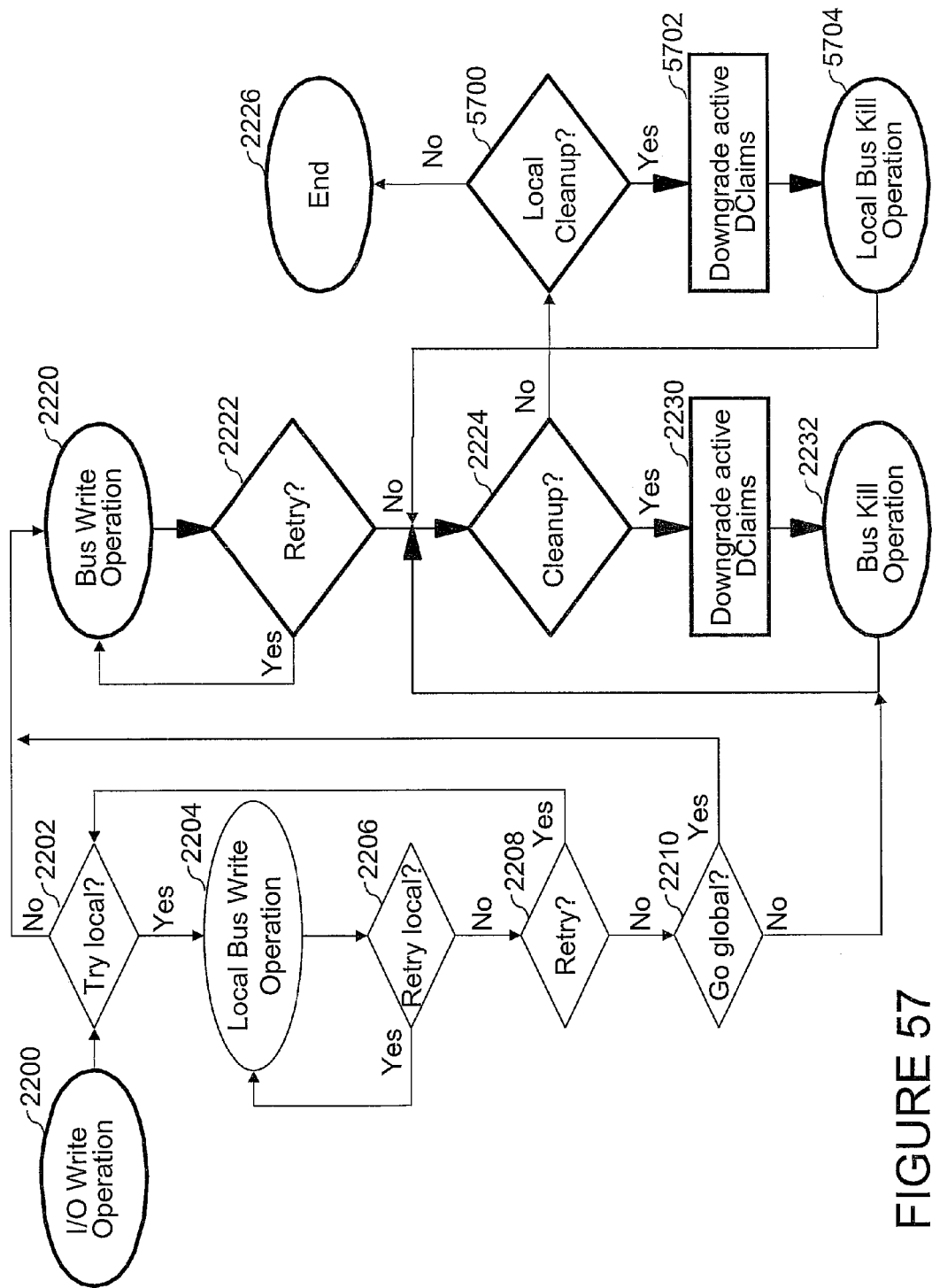
FIG. 57 is a high level logical flowchart of an exemplary method of performing an I/O write operation in a data processing system implementing Tn and Ten coherency states in accordance with the present invention.

Referring now to FIG. 57, there is depicted a high level logical flowchart of an exemplary method of performing an I/O write operation in a data processing system implementing Tn and Ten coherency states in accordance with a preferred embodiment of the present invention. As indicated by like reference numerals, the process given in FIG. 57 is similar to that illustrated in FIG. 22.

As shown, the process begins at block 2200 in response to receipt by the I/O controller 214 of a processing unit 104 of an I/O write request by an attached I/O device 216. In response to receipt of the I/O write request, I/O controller 214 determines at block 2202 whether or not to issue a global or local bus write operation to obtain the requested memory block.

If I/O controller 214 elects to issue a global bus write operation, the process passes to block 2220, which is described below. If, however, I/O controller 214 elects to issue a local bus write operation, the process proceeds to block 2204, which illustrates I/O controller 214 issuing a local bus write operation, as described below with reference to FIG. 70, and then awaiting the associated CR. As indicated at block 2206, if the CR indicates "retry local", meaning that the local bus write operation can definitely be serviced within the local coherency domain if retried, I/O controller 214 reissues the local bus write operation at block 2204. If I/O controller 214 receives a CR providing more equivocal information, for example, simply "retry" (block 2208), the process returns block 2202, which has been described. Alternatively, if I/O controller 214 receives a CR indicating definitively that the bus write operation cannot be serviced within the local coherency domain (block 2210), the process proceeds to block 2220, which is described below. Finally, if I/O controller 214 receives a CR indicating that it has been awarded ownership of the requested memory block, the process passes from block 2204 through blocks 2206, 2208 and 2210 to block 2224 and following blocks, which illustrate I/O controller 214 performing cleanup operations, if necessary, as described below.

Referring now to block 2220, I/O controller 214 issues a global bus write operation, as described below with reference to FIG. 71. As indicated at block 2222, I/O controller 214 continues to issue the global bus write operation until a CR other than "retry" is received. If the CR for the global bus write operation issued at block 2220 indicates that no other snooper holds a valid copy of the requested memory block (blocks 2224 and 5700), the process ends at block 2226 with the attached I/O device 216 able to write to the requested memory block. If, however, I/O controller 214 determines at block 2224 that the CR indicates that at least one stale cached copy of the requested memory block remains outside of its local coherency domain, I/O controller 214 performs a global "cleanup" by downgrading any conflicting DClaim operations it snoops, as shown at block 2230, and issuing global bus kill operations, as depicted at block 2232, until a CR is received at block 2224 indicating that no stale cached copies of the requested memory block remain outside of the local coherency domain.

If I/O controller 214 determines at block 5700 that the CR indicates that no stale cached copies of the requested memory block remain outside of the local coherency domain but at least one stale cached copy of the requested memory block remains within its local coherency domain, I/O controller 214 performs a local "cleanup" by downgrading any conflicting DClaim operations it snoops, as shown at block 5702, and issuing local bus kill operations, as depicted at block 5704 until a CR is received indicating that no stale cached copies of the requested memory block remain within data processing system 100 (blocks 2224 and 5700). Once cleanup operations are complete, the process ends at block 2226.

As has been described, the implementation of Tn and Ten coherency states provides an indication of whether a possibly shared memory block is additionally cached only within the local coherency domain. Consequently, when a requester within the same coherency domain as a cache holding a memory block in one of the Tn or Ten states issues an exclusive access operation (e.g., a bus DClaim, bus RWITM, bus DCBZ or bus write operation) for the memory block, the scope of broadcast operations, such as bus kill operations, can advantageously be restricted to the local coherency domain, reducing interconnect bandwidth utilization.

B. Interconnect Operations

Referring now to FIGS. 58-72, exemplary local and global bus operations in an illustrative data processing system 100 implementing Tn and Ten coherency states will now be described. In these figures, the T, Te, Tn or Ten states are collectively represented by the designation Tx, and blocks that are unchanged from prior figures other than by the substitution of "Tx" for the T and Te states are signified by the use of prime notation.

Figure 58:
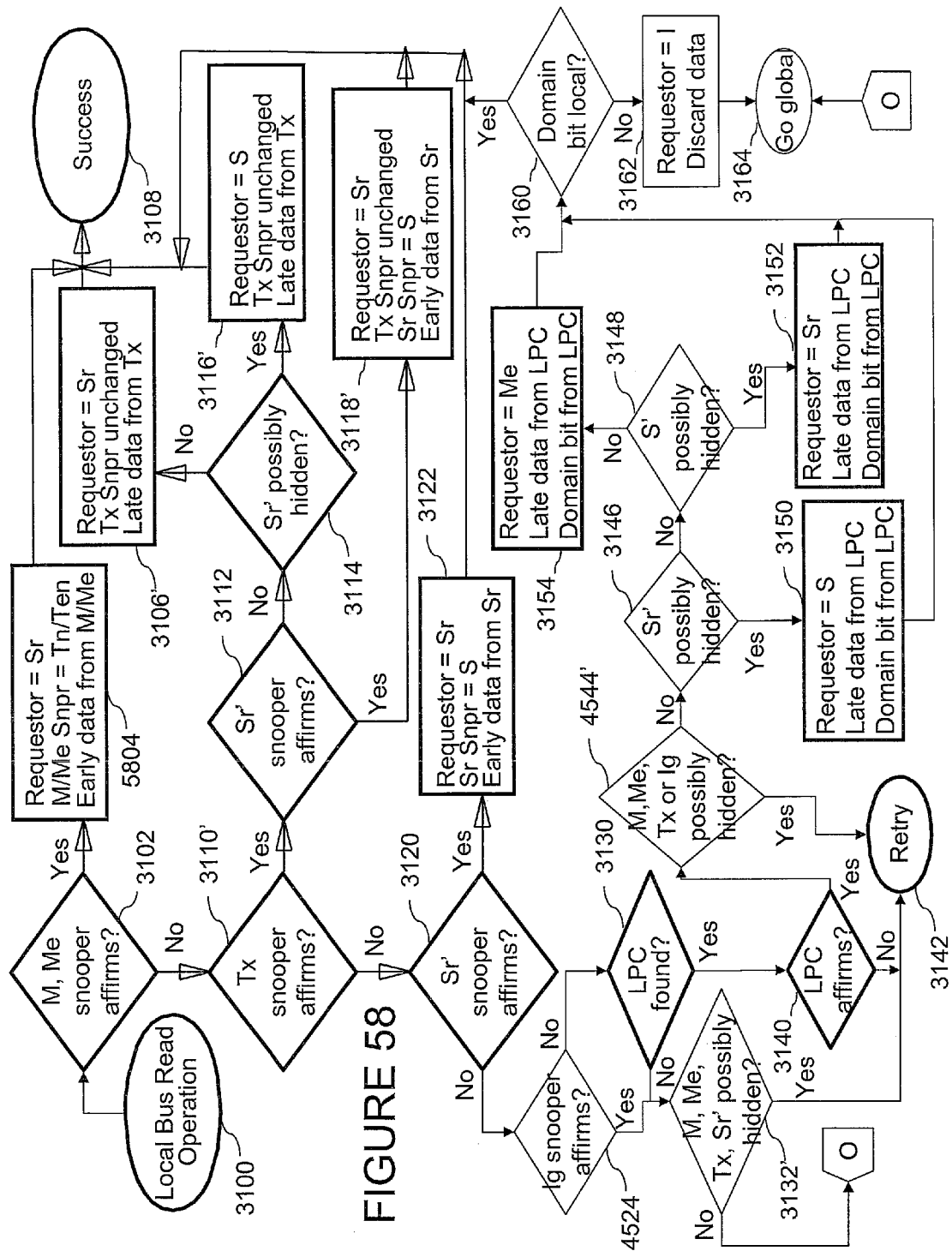
FIG. 58 is a high level logical flowchart of an exemplary method of performing a local bus read operation in a data processing system implementing Tn and Ten coherency states in accordance with the present invention.

Referring first to FIG. 58, there is depicted a high level logical flowchart of an exemplary method of performing a local bus read operation in a data processing system implementing Tn and Ten coherency states in accordance with one embodiment of the present invention. As can be seen by comparison of FIG. 58 with FIG. 45, FIG. 58 is substantially identical to FIG. 45, except for modifications reflecting the introduction of the Tn and Ten coherency states. For example, block 5804 replaces block 3104 in order to indicate that an M or Me snooper 236 that affirms a local bus read operation and subsequently supplies the requested memory block updates its cache state to Tn (for an M snooper 236) or Ten (for an Me snooper 236), thus indicating that the requested memory block is cached only within its local coherency domain. Other blocks that reference one of the T, Te, Tn or Ten states (collectively designated Tx) and are otherwise unchanged are signified in FIG. 58 by the use of prime notation, as noted above.

Figure 59A:
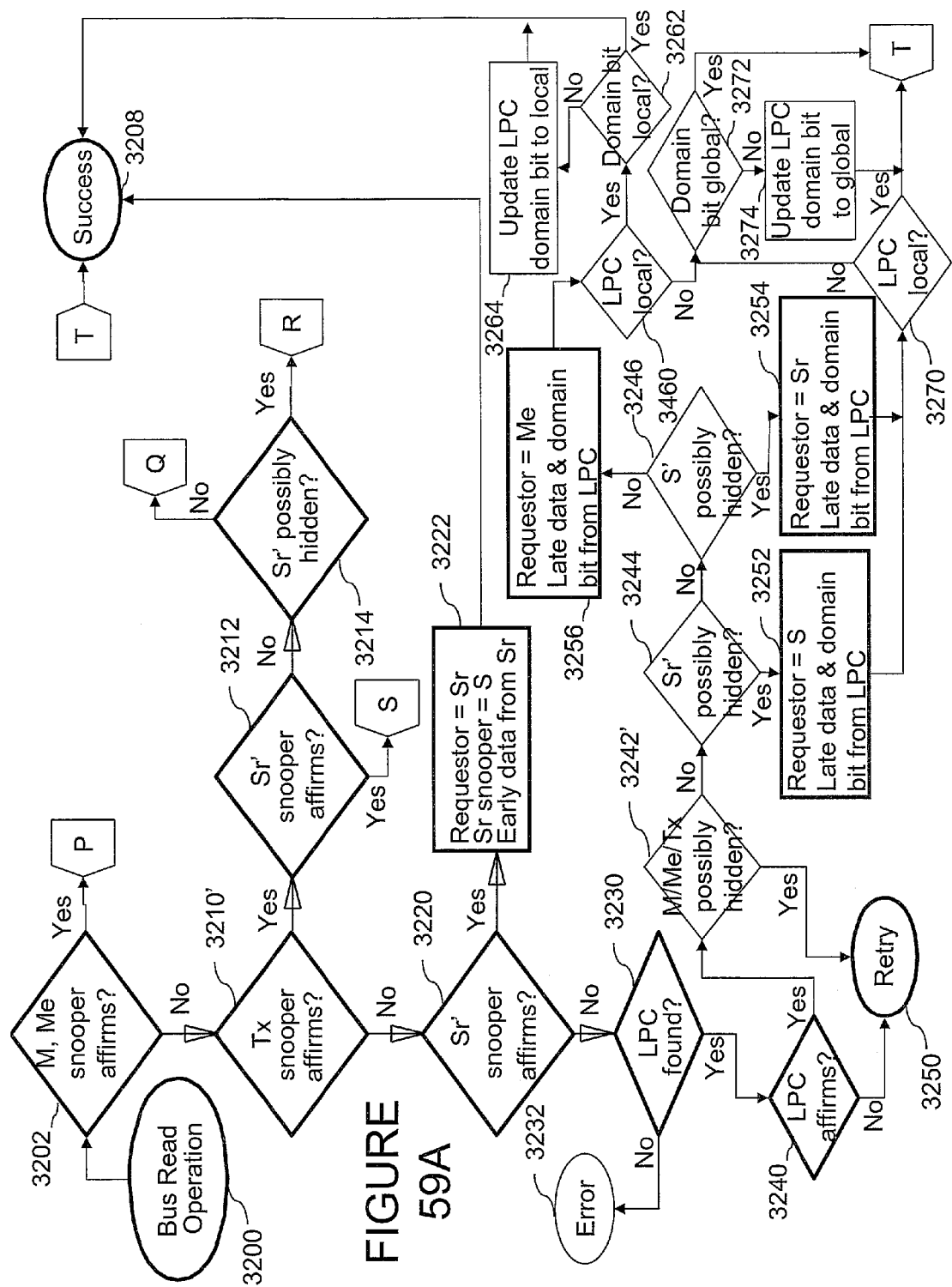
FIGS. 59A-59B together form a high level logical flowchart of an exemplary method of performing a global bus read operation in a data processing system implementing Tn and Ten coherency states in accordance with the present invention.
Figure 59B:
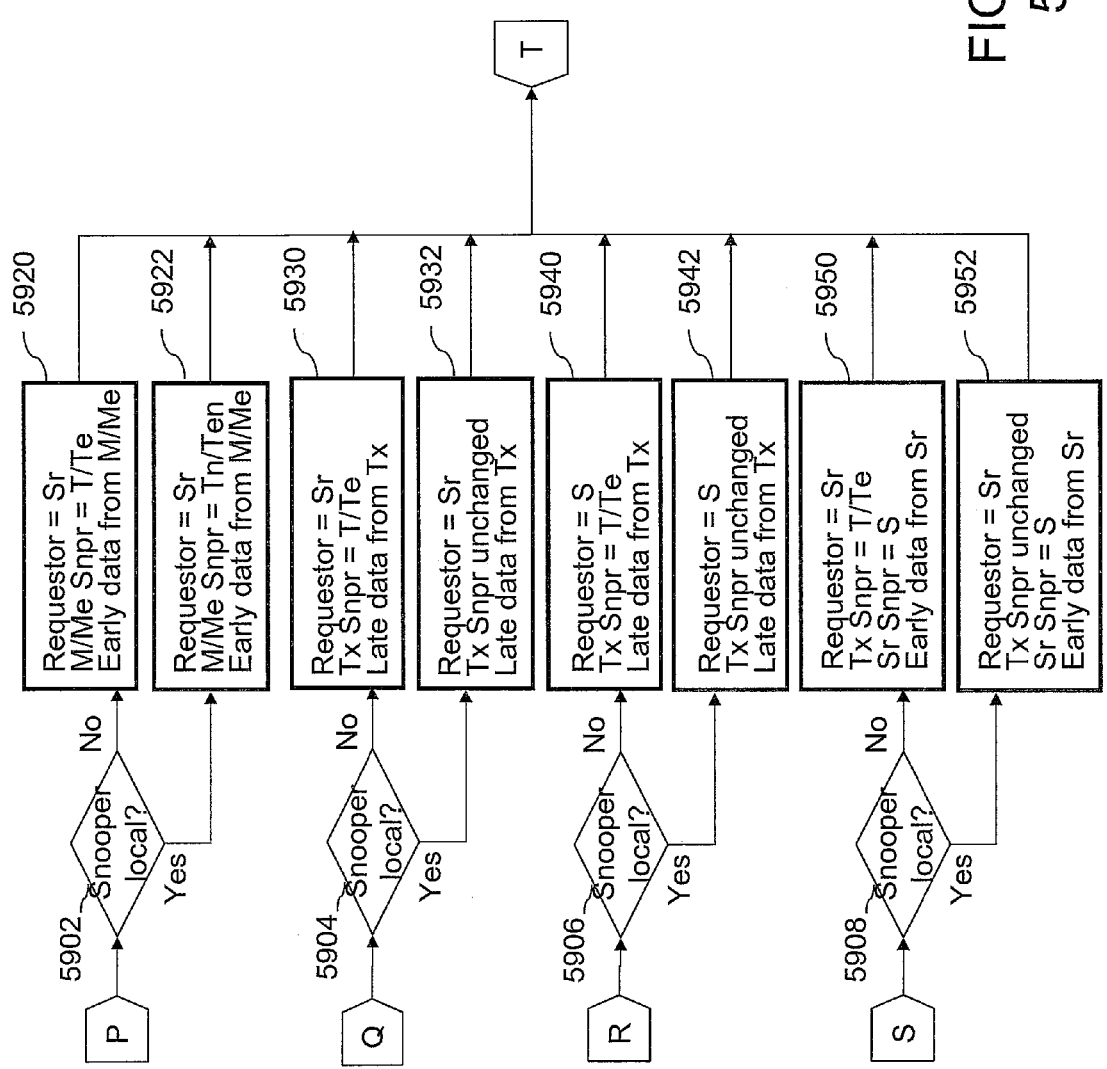

With reference now to FIGS. 59A-59B, there is depicted a high level logical flowchart of an exemplary method of performing a global bus read operation in a data processing system implementing Tn and Ten coherency states in accordance with the present invention. The process begins at block 3200, for example, at block 1820 of FIG. 54, with an L2 cache 230 issuing a global bus read operation on its local interconnect 114. The various partial responses that snoopers 122, 236 may provide to distributed response logic 210 in response to snooping the global bus read operation are represented in FIG. 59A by the outcomes of decision blocks 3202, 3210', 3212, 3214, 3220, 3230, 3240, 3242', 3244, and 3246. These partial responses in turn determine the CR for the global bus read operation.

As shown at block 3202, if a snooper 236 of an L2 cache 230 affirms the global bus read operation with a partial response indicating that the L2 cache 230 holds the requested memory block in either the M or Me state, the process proceeds from block 3202 through page connector P to block 5902 of FIG. 59B. Block 5902 represents the fact that the M or Me snooper 236 updates its cache state differently depending upon whether the M or Me snooper 236 is local (i.e., within the same coherency domain) as the requesting L2 cache 230 as indicated by the scope indicator in the global bus read operation. In either case, the snooper 236 in the affirming L2 cache 230 may initiate transmission of the requested memory block to the requesting L2 cache 230 prior to receipt of the CR (i.e., provides "early" data), and upon receipt, the master 232 in the requesting L2 cache 230 places the requested memory block in its L2 cache array 300 in the Sr state (blocks 5920 and 5922). However, the snooper 236 in the affirming L2 cache 230 updates the state of the requested memory block from M to T or from Me to Te if the snooper 236 is not local to the requesting L2 cache 230 (block 5920) and updates the state of the requesting memory block from M to Tn or from Me to Ten if the snooper 236 is local (block 5922). The process then returns to FIG. 59A through page connector T and ends with distributed response logic 210 generating a CR indicating "success", as depicted at block 3208.

If a snooper 236 of an L2 cache 230 affirms the global bus read operation with a partial response indicating that the L2 cache 230 holds the requested memory block in any the T, Tn, Te or Ten states (generically designated in block 3210' as Tx) and an Sr' snooper 236 also affirms the bus read operation (block 3212), the process passes through page connector S to block 5908. Block 5908 indicates that the affirming Tx snooper 236 updates the state of the requested memory block differently depending upon whether the scope indicator of the global bus read operation indicated that the snooper 236 is within the coherency domain of the requesting L2 cache 230. In either case, the Sr' snooper 236 updates the state of the requested memory block to S and initiates transmission of the requested memory block to the requesting L2 cache 230 prior to receipt of the CR (blocks 5950 and 5952). Upon receipt, the master 232 in the requesting L2 cache 230 places the requested memory block in L2 cache array 300 in the Sr state (blocks 5950 and 5952). In addition, the Tx snooper 236 updates the state of the requested memory block, if necessary, from Tn to T or from Ten to Te if the snooper 236 is not local to the requesting L2 cache 230 (block 5950), but leaves the state of the requested memory block unchanged if the Tx snooper 236 is local to the requesting L2 cache (block 5952). The process then returns to FIG. 59A through page connector T and ends with distributed response logic 210 generating a CR indicating "success", as depicted at block 3208.

If the complex of partial responses includes a Tx snooper 236 affirming the global bus read operation (block 3210'), no Sr' snooper 236 affirming the bus read operation (block 3212), and a snooper 236 providing an partial response (e.g., a type of retry) indicating that an Sr' snooper 236 may exist in the local data delivery domain but did not affirm the global bus read operation, the process passes through page connector R to block 5906 of FIG. 59B. Block 5906 indicates that the affirming Tx snooper 236 updates the state of the requested memory block differently depending upon whether the scope indicator of the global bus read operation indicated that the snooper 236 is within the coherency domain of the requesting L2 cache 230. In either case, the Tx snooper 236 that affirmed the global bus read operation initiates transmission of the requested memory block to the requesting L2 cache 230 after receipt of the CR (blocks 5940 and 5942). Upon receipt, the master 232 in the requesting L2 cache 230 places the requested memory block in L2 cache directory 300 in the S state (since an Sr' snooper 236 may be hidden within the local domain the requesting cache 236 and only one Sr' snooper 236 is permitted in each domain for the requested memory block). In addition, the Tx snooper 236 updates the state of the requested memory block, if necessary, from Tn to T or from Ten to Te if the snooper 236 is not local to the requesting L2 cache 230 (block 5940), but leaves the state of the requested memory block unchanged if the Tx snooper 236 is local to the requesting L2 cache (block 5942). The process then returns to FIG. 59A through page connector T and ends with distributed response logic 210 generating a CR indicating "success", as depicted at block 3208.

If the complex of partial responses includes a Tx snooper 236 affirming the global bus read operation, no Sr' snooper 236 affirming the bus read operation, and no snooper 236 providing a partial response that may hide a Sr' snooper 236, the process passes through page connector Q to block 5904 of FIG. 59B. Block 5904 indicates that the affirming Tx snooper 236 updates the state of the requested memory block differently depending upon whether the scope indicator of the global bus read operation indicated that the snooper 236 is within the coherency domain of the requesting L2 cache 230. In either case, the Tx snooper 236 that affirmed the global bus read operation initiates transmission of the requested memory block to the requesting L2 cache 230 after receipt of the CR (i.e., provides "late" data), the master 232 in the requesting L2 cache 230 places the requested memory block in its L2 cache array 300 in the Sr state (since no other Sr' snooper 236 exists for the requested memory block in the local domain). In addition, the Tx snooper 236 updates the state of the requested memory block, if necessary, from Tn to T or from Ten to Te if the snooper 236 is not local to the requesting L2 cache 230 (block 5930), but leaves the state of the requested memory block unchanged if the Tx snooper 236 is local to the requesting L2 cache (block 5952). The process then returns to FIG. 59A through page connector T and ends with distributed response logic 210 generating a CR indicating "success", as depicted at block 3208.

Referring now to block 3220, if no M, Me, or Tx snooper 236 affirms the global bus read operation, but an Sr' snooper 236 affirms the global bus read operation, the global bus read operation is serviced in accordance with block 3222. In particular, the Sr' snooper 236 that affirmed the global bus read operation initiates transmission of the requested memory block to the requesting L2 cache 230 prior to receipt of CR and updates the state of the requested memory block in its L2 cache directory 302 to the S state. The master 232 in the requesting L2 cache 230 places the requested memory block in L2 cache array 300 in the Sr state. The process ends with distributed response logic 210 generating a CR indicating "success", as depicted at block 3208.

Turning now to block 3230, if no M, Me, Tx or Sr' snooper 236 affirms the global bus read operation, and further, if no snooper 122 provides a partial response indicating that it is responsible (i.e., the LPC) for the requested memory block, an error occurs that halts processing as shown at block 3232 because every memory block is required to have an LPC.

Referring now to block 3240, if a snooper 122 provides a partial response indicating that it is responsible (i.e., the LPC) for the requested memory block but does not affirm the global bus read operation, response logic 210 generates a CR indicating "retry", as depicted at block 3250. As indicated by decision block 3242', response logic 210 similarly generates a "retry" CR at block 3250 if a memory controller snooper 122 affirms the global bus read operation and an L2 cache snooper 236 provides a partial response indicating that it may hold the requested memory block in one of the M, Me, or Tx states but cannot affirm the global bus read operation. In each of these cases, response logic 210 generates a "retry" CR to cause the operation to be reissued because one of the possibly hidden snoopers 236 may be required to source the requested memory block to the requesting L2 cache 230.

With reference now to block 3244, if no M, Me, Tx or Sr' snooper 236 affirms the bus read operation, no M, Me, or Tx snooper 236 is possibly hidden, and a memory controller snooper 122 affirms the global bus read operation, the snooper 122 affirming the global bus read operation provides the requested memory block 3000 and the associated domain indicator 3004 to the requesting L2 cache 230 in response to the CR, as depicted at each of blocks 3252 and 3254. As shown at blocks 3244, 3246, 3252, 3254 and 3256, the master 232 of the requesting L2 cache 230 handles the requested memory block in accordance with the partial responses compiled into the "success" CR represented at block 3208. In particular, if the CR indicates that no Sr' or S' snooper 236 is possibly hidden, the requesting L2 cache 230 holds the requested memory block in the Me state (block 3256); the requesting L2 cache 230 holds the requested memory block in the Sr state if no Sr' snooper 236 is possibly hidden and a S' snooper 236 is possibly hidden; and the requesting L2 cache 230 holds the requested memory block in the S state if an Sr' snooper 236 is possibly hidden.

In response to the CR, the memory controller snooper 122 that is the LPC for the requested memory block then determines whether to update the domain indicator for the requested memory block, as illustrated at blocks 3260, 3262, 3270, 3272 and 3274. If the CR indicates that the new cache state for the requested memory block is Me, the LPC snooper 122 determines whether it is within the same domain as the requesting L2 cache 230 (block 3260), for example, by reference to the scope indicator in the global bus read operation, and whether the domain indicator 3004 indicates local or global (blocks 3260 and 3272). If the LPC is within the same domain as the requesting L2 cache 230 (block 3260), the LPC snooper 122 sets the domain indicator 3004 to "local" if it is reset to "global" (block 3262 and 3264). If the LPC is not within the same domain as the requesting L2 cache 230 (block 3260), the LPC snooper 122 resets the domain indicator 3004 to "global" if it is set to "local" (block 3272 and 3274).

If the CR indicates that the new cache state for the requested memory block 3000 is S or Sr, the LPC snooper 122 similarly determines whether it is within the same domain as the requesting L2 cache 230 (block 3270) and whether the domain indicator 3004 indicates local or global (block 3272). If the LPC is within the same domain as the requesting L2 cache 230 (block 3270), no update to the domain indicator 3004 is required. If, however, the LPC is not within the same domain as the requesting L2 cache 230 (block 3270), the LPC snooper 122 resets the domain indicator 3004 to "global" if it is set to "local" (block 3272 and 3274). Thus, LPC snooper 122 updates the domain indicator 3004, if required, in response to receipt of the CR.

Figure 60:
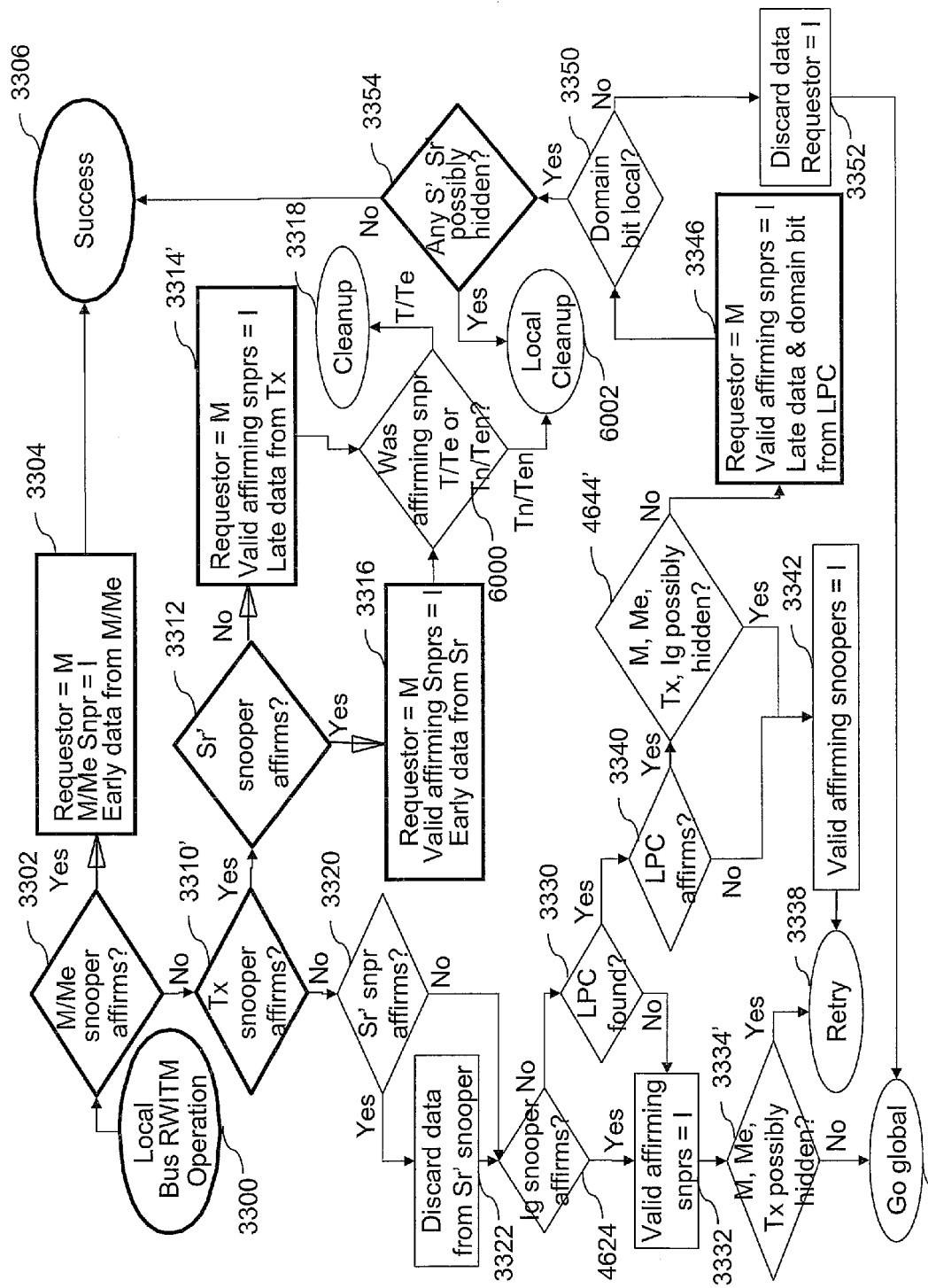
FIG. 60 is a high level logical flowchart of an exemplary method of performing a local bus RWITM operation in a data processing system implementing Tn and Ten coherency states in accordance with the present invention.

Referring now to FIG. 60, there is depicted a high level logical flowchart of an exemplary method of performing a local bus RWITM operation in a data processing system implementing coherency domains and domain indicators in accordance with the present invention. As indicated by like reference numerals, the illustrated method is similar to those depicted in FIGS. 33 and 46.

The process begins at block 3300, for example, with a master 232 of an L2 cache 230 issuing a local bus RWITM operation its local interconnect 114 at block 1948 of FIG. 55A. The various partial responses that snoopers 122, 236 may provide to distributed response logic 210 are represented in FIG. 33 by the outcomes of decision blocks 3302, 3310', 3312, 3320, 4624, 3330, 3334', 3340 and 4644'. These partial responses in turn determine the CR for the local bus RWITM operation.

If a snooper 236 affirms the local bus RWITM operation with a partial response indicating that the L2 cache 230 containing the snooper 236 holds the requested memory block in either the M or Me state as shown at block 3302, the process proceeds from block 3302 to block 3304. Block 3304 indicates the operations of the requesting L2 cache 230 and the affirming L2 cache 230 in response to the local bus RWITM operation. In particular, the snooper 236 in the affirming L2 cache 230 updates the cache state of the requested memory block from the M or Me state to the I state and may initiate transmission of the requested memory block to the requesting L2 cache 230 prior to receipt of the CR (i.e., provides "early" data). Upon receipt, the master 232 in the requesting L2 cache 230 places the requested memory block in its L2 cache array 300 in the M state. The process ends with distributed response logic 210 generating a CR indicating "success", as depicted at block 3306.

Referring to block 3310', if a snooper 236 affirms the local bus RWITM operation with a partial response indicating that the L2 cache 230 containing the snooper 236 holds the requested memory block in any of the T, Tn, Te or Ten states (generically designated as Tx in FIG. 60) and no Sr' snooper 236 affirms the local bus RWITM operation (block 3312), the process passes to block 3314'. Block 3314' represents the Tx snooper 236 that affirmed the local bus RWITM operation initiating transmission of the requested memory block to the requesting L2 cache 230 in response to receipt of the CR from response logic 210. In response to receipt of the requested memory block, the requesting L2 cache 230 holds the requested memory block in the M state. All valid affirming snoopers 236 update their respective cache states for the requested memory block to I.

If the complex of partial responses includes a Tx snooper 236 and an Sr' snooper 236 both affirming the local bus RWITM operation (blocks 3310' and 3312), the process passes to block 3316. Block 3316 represents the Sr' snooper 236 that affirmed the local bus RWITM operation initiating transmission of the requested memory block to the requesting L2 cache 230 prior to receipt of the CR provided by response logic 210. In response to receipt of the requested memory block, the requesting L2 cache 230 holds the requested memory block in the M state. All valid affirming snoopers 236 update their respective cache states for the requested memory block to I.

As shown at block 6000, in either of the cases represented by blocks 3316 and 3314', response logic 210 generates a CR dependent upon whether the Tx affirming snooper 236 held the requested memory block in one of the T/Te states or the Tn/Ten states. If the Tx snooper 236 was T or Te, response logic 210 generates a CR indicating "cleanup", as shown at block 3318. If, however, the Tx snooper 236 was Tn or Ten, response logic 210 advantageously restricts the scope of the cleanup operations to the local domain by generating a CR indicating "local cleanup", as shown at block 6002.

The local bus RWITM operation cannot be serviced by a L2 cache snooper 236 without retry if no M, Me, or Tx snooper 236 (i.e., HPC) affirms the local bus RWITM operation to signify that it can mediate the data transfer. Accordingly, if an Sr' snooper 236 affirms the local bus RWITM operation and supplies early data to the requesting L2 cache 230 as shown at block 3320, the master 232 of the requesting L2 cache 230 discards the data provided by the Sr' snooper 236, as depicted at block 3322.

Block 4624 represents the differences in handling the local bus RWITM operation depending upon whether a snooper 236 of an L2 cache 230 provides a partial response affirming the local bus RWITM operation and indicating that the L2 cache 230 holds the address tag of the requested memory block in the Ig state. If so, any affirming snooper 236 other than the Ig snooper 236 invalidates the relevant cache entry (block 3332). If no M, Me, or Tx snooper 236 is possibly hidden by an incomplete partial response (block 3334), distributed response logic 210 provides a "go global" CR, as depicted at block 3336. If, on the other hand, an Ig snooper 236 affirms the local bus RWITM operation and the complex of partial responses indicates an M, Me, or Tx snooper 236 is possibly hidden, response logic 210 generates a "retry" CR, as depicted at block 3338. Thus, the affirmance of the local bus RWITM operation by an Ig snooper 236 will cause the operation to be reissued as a global operation if no HPC is possibly hidden in the local coherency domain.

If an Ig snooper 236 does not affirm the local bus RWITM operation at block 4624, the local bus RWITM operation is handled in accordance with block 3330 and following blocks. In particular, if no memory controller snooper 122 provides a partial response indicating that it is responsible (i.e., the LPC) for the requested memory block (block 3330), each valid affirming snooper 236 invalidates the requested memory block in its respective L2 cache directory 302 (block 3332). The CR generated by response logic 210 depends upon whether any partial responses indicate that an M, Me, or Tx snooper 236 may be hidden (block 3334'). That is, if no M, Me, or Tx snooper 236 may be hidden, response logic 210 generates a "go global" CR at block 3336 to inform the master 232 that the local bus RWITM operation must be reissued as a global RWITM operation. On the other hand, if an M, Me, or Tx snooper 236 (i.e., an HPC) for the requested memory block may be hidden, response logic 210 generates a CR indicating "retry", as depicted at block 3338, because the operation may be serviced locally if retried.

Similarly, valid affirming snoopers 236 invalidate their respective copies of the requested memory block (block 3342), and response logic 210 provides a "retry" CR for the local bus RWITM operation (block 3338) if no M, Me, or Tx snooper 236 affirms the local bus RWITM operation and a snooper 122 provides a partial response indicating that it is the LPC but does not affirm the local bus RWITM operation. A "retry" CR is also generated at block 3338, and valid snoopers 236 invalidate their respective valid copies of the requested memory block (block 3342) if no M, Me, or Tx snooper 236 affirmed the local bus RWTIM operation (blocks 3302, 3310'), a snooper 122 affirmed the local bus RWITM operation (block 3340), and an M, Me, Tx or Ig snooper 236 may be possibly hidden (block 4644').

As shown at block 3346, if no M, Me, or Tx snooper 236 affirms the local bus RWITM operation or is possibly hidden and the LPC snooper 122 affirms the local bus RWITM operation, each valid affirming snooper 236 invalidates its respective copy of the requested memory block. In addition, the LPC snooper 122 provides the requested memory block and associated domain indicator 3004 to the requesting L2 cache 230 in response to receipt of the CR from response logic 210. The master 232 of the requesting L2 cache 230 handles the data in accordance with the domain indicator 3004. In particular, if the domain indicator 3004 is reset to "global", meaning that a remote cached copy may exist that renders stale the data received from the LPC snooper 122, master 232 discards the data received from the LPC snooper 122, maintains an invalid coherency state with respect to the requested memory block (block 3352), and interprets the CR provided by response logic 210 as "go global" (block 3336). If, on the other hand, the domain indicator 3004 is set to "local", meaning that no remote cached copy of the requested memory block renders the data received from the LPC snooper 122 potentially stale, the master 232 places the requested memory block and domain indicator 3004 in its L2 cache array 300 and sets the associated state field 306 to M (block 3346). If the partial responses and hence the CR indicate an S' or Sr' snooper 236 is possibly hidden (block 3354), the CR indicates "local cleanup" (block 6002), meaning that the requesting L2 cache 230 must invalidate the other valid locally cached copies of the requested memory block, if any, through one or more local bus kill operations. If no such S' or Sr' snoopers 236 are possibly hidden by incomplete partial responses, the CR indicates "success", as depicted at block 3306.

It will be further appreciated that in some embodiments, the master of the local bus RWITM operation may speculatively perform a local cleanup as shown at block 6002 prior to receipt of the domain indicator 3004 from the LPC (block 3350). In this manner, the latency associated with data delivery from the LPC can be masked by the one or more local bus kill operations involved in the local cleanup operations.

Figure 61A:
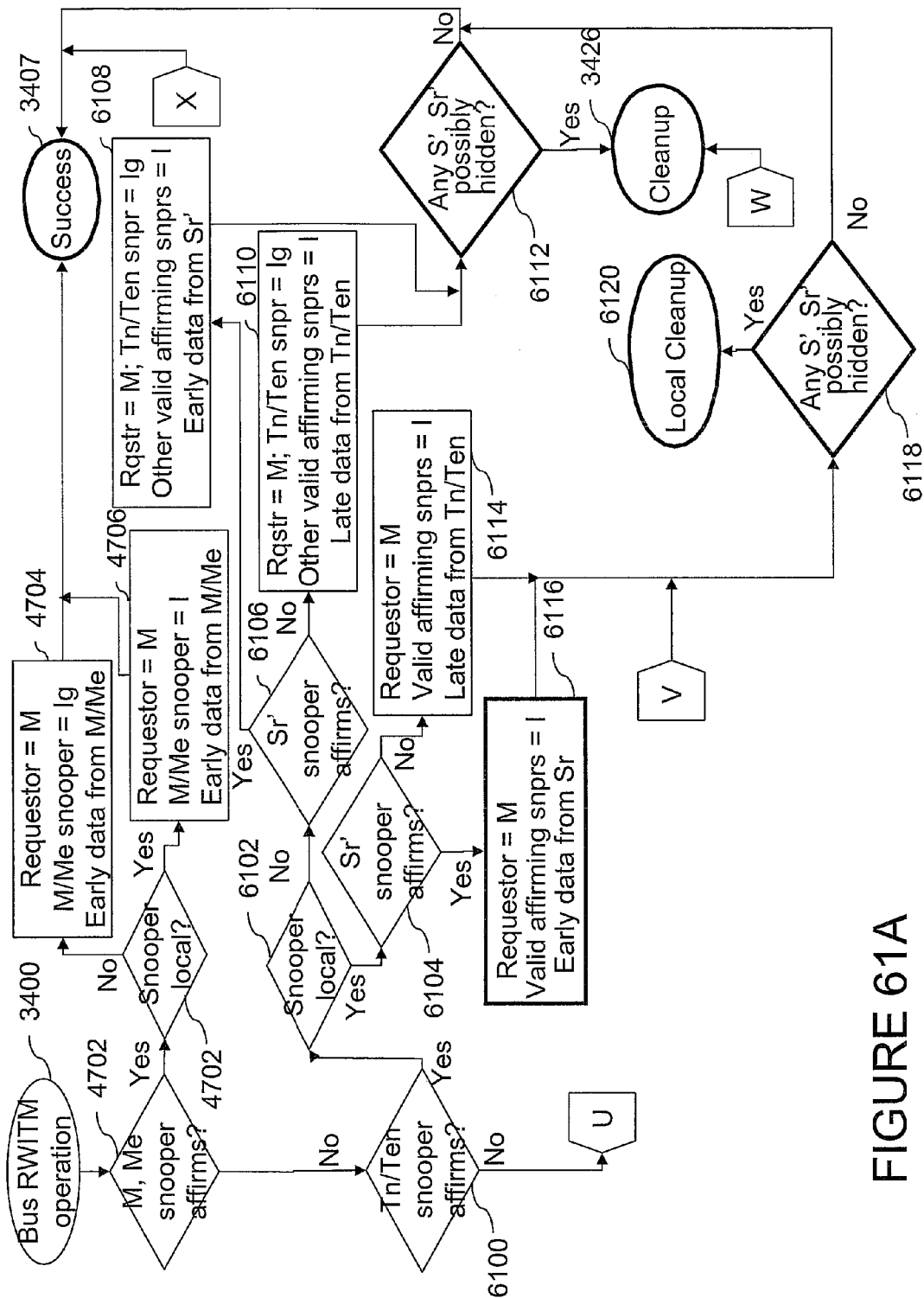
FIGS. 61A-61B together form a high level logical flowchart of an exemplary method of performing a global bus RWITM operation in a data processing system implementing Tn and Ten coherency states in accordance with the present invention.
Figure 61B:
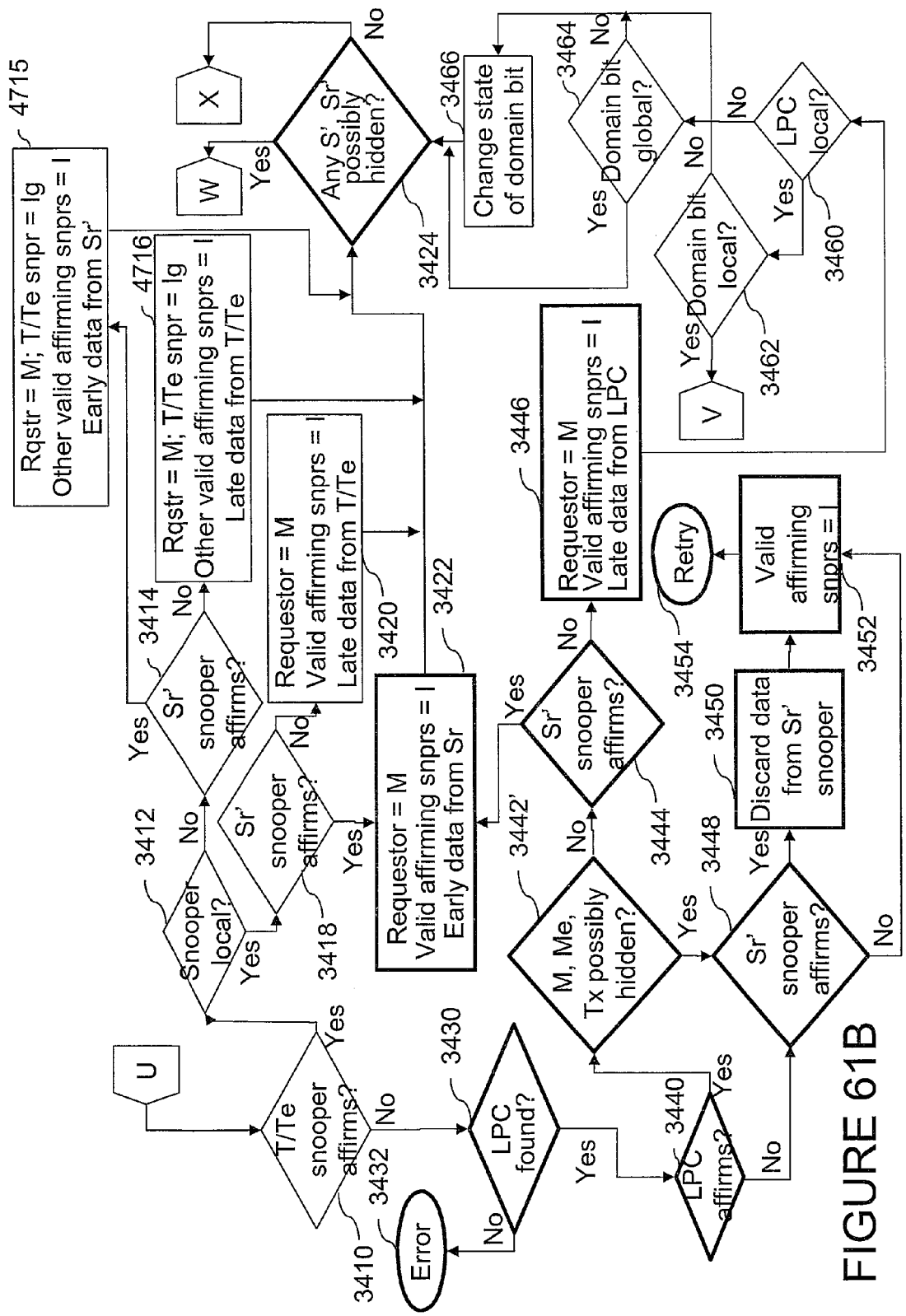

With reference now to FIGS. 61A-61B, there is illustrated a high level logical flowchart of an exemplary method of performing a global bus RWITM operation in a data processing system implementing the Tn and Ten coherency states in accordance with the present invention. As indicated by like reference numbers, the illustrated process is similar to that described above with reference to FIG. 47.

As shown, the process begins at block 3400 in response to the master 232 of a requesting L2 cache 230 issuing a global bus RWITM operation, for example, at block 1954 of FIG. 55A. If a snooper 236 affirms the global bus RWITM operation with a partial response indicating that the L2 cache 230 containing the snooper 236 holds the requested memory block in the M or Me state as shown at block 4702, the M or Me snooper 236 provides early data to the requesting master 232, which holds the requested memory block in the M state (block 4704 or block 4706). Response logic 210 generates a CR indicating "success", as shown at block 3407. In addition, the M or Me snooper 236 updates its cache state to either I or Ig depending upon whether or not it is local to (i.e., in the same coherency domain as) the requesting master 232 (block 4702). If the M or Me snooper 236 determines it belongs to the same coherency domain as the requesting master 232, for example, by reference to the scope indicator in the bus operation, the M or Me snooper 236 updates its cache state for the requested memory block to I. On the other hand, if the M or Me snooper 236 determines it does not belong to the same coherency domain as the requesting master 232, the M or Me snooper 236 updates its cache state for the requested memory block to Ig in order to maintain a cached domain indicator for the requested memory block in its coherency domain. Consequently, no retry-push is required in response to the global bus RWITM operation in order to update the domain indicator 3004 in the LPC system memory 108.

Turning now to block 6100, if a snooper 236 affirms the global bus RWITM operation with a partial response indicating that the L2 cache 230 containing the snooper 236 holds the requested memory block in either the Tn or Ten state, the process passes to block 6102, which represents the Tn or Ten snooper 236 determining whether or not it is local to the requesting master 232. If so, the global bus RWITM operation is handled in accordance with blocks 6104 and following blocks, which are described below. If, however, the Tn or Ten snooper 236 affirming the global bus RWITM operation determines that it is not local to the requesting master 232, the global bus RWITM operation is serviced in accordance with either block 6108 or block 6110, depending upon whether or not an Sr' snooper 236 also affirmed the global bus RWITM operation.

As shown at blocks 6108, if an Sr' snooper 236 affirmed the global bus RWITM operation, the Sr' snooper 236 provides early data to the requesting master 232, and the Tn or Ten snooper 236 that affirmed the global bus RWITM operation updates its cache state for the entry containing the requested memory block to Ig. In response to receipt of the requested memory block, the requesting L2 cache 230 holds the requested memory block in the M state. In addition, any valid affirming snooper 236 other than the Tn or Ten snooper 236 updates its respective cache state for the requested memory block to I. Alternatively, as depicted at block 6110, if an Sr' snooper 236 does not affirm the global bus RWITM operation, the Tn or Ten snooper 236 provides late data in response to receipt of the CR. In response to receipt of the requested memory block, the requesting L2 cache 230 holds the requested memory block in the M state. In addition, the Tn or Ten snooper 236 updates its cache state to Ig, and any other valid affirming snooper 236 updates its respective cache state for the requested memory block to I. Thus, if a remote Tn or Ten snooper 236 affirms the global bus RWITM operation, the affirming Tn or Ten snooper 236 enters the Ig state in order to maintain a cached domain indicator for the requested memory block in its coherency domain. Consequently, no retry-push is required in response to the global bus RWITM operation in order to update the domain indicator 3004 in the LPC system memory 108.

In either of the cases represented by blocks 6108 and 6110, response logic 210 generates a CR dependent upon whether an S' or Sr' snooper 236 is possibly hidden and thus unable to invalidate its copy of the requested memory block in response to snooping the global bus RWITM operation. If response logic 210 makes a determination at block 3424 based upon the partial responses to the global bus RWITM operation that an S' or Sr' snooper 236 is possibly hidden, response logic 210 generates a CR indicating "cleanup", as shown at block 3426. Alternatively, if response logic 210 determines that no S' or Sr' snooper 236 is possibly hidden, response logic 210 generates a CR indicating "success", as depicted at block 3407.

Returning to block 6104, if a Tn or Ten snooper 236 that is local to the requesting master 232 affirms the global bus RWITM operation, the global bus RWITM operation is serviced in accordance with either block 6114 or block 6116, depending upon whether or not an Sr' snooper 236 also affirmed the global bus RWITM operation.

As shown at blocks 6116, if an Sr' snooper 236 affirmed the global bus RWITM operation, the Sr' snooper 236 provides early data to the requesting master 232, and each valid snooper 236 that affirmed the global bus RWITM operation updates its respective cache state for the entry containing the requested memory block to I. In response to receipt of the requested memory block, the requesting L2 cache 230 holds the requested memory block in the M state. Alternatively, as depicted at block 6114, if an Sr' snooper 236 does not affirm the global bus RWITM operation, the Tn or Ten snooper 236 provides late data in response to receipt of the CR. In response to receipt of the requested memory block, the requesting L2 cache 230 holds the requested memory block in the M state. In addition, each valid affirming snooper 236 updates its respective cache state for the requested memory block to I.

In either of the cases represented by blocks 6114 and 6116, response logic 210 generates a CR dependent upon whether an S' or Sr' snooper 236 is possibly hidden and thus unable to invalidate its copy of the requested memory block in response to snooping the global bus RWITM operation. If response logic 210 makes a determination at block 6118 based upon the partial responses to the global bus RWITM operation that an S' or Sr' snooper 236 is possibly hidden, response logic 210 generates a CR indicating "local cleanup", as shown at block 6120. Thus, the scope of the bus kill operations required to ensure coherency are advantageously limited to the local coherency domain containing the requesting L2 cache 230 and the (former) Tn or Ten snooper 236. Alternatively, if response logic 210 determines that no S' or Sr' snooper 236 is possibly hidden, response logic 210 generates a CR indicating "success", as depicted at block 3407.

Following page connector U to block 3410 of FIG. 61B, if a T or Te snooper 236 affirms the global bus RWITM operation, the process passes to block 3412, which represents the T or Te snooper 236 determining whether or not it is local to the requesting master 232. If so, the global bus RWITM operation is handled in accordance with blocks 3418 and following blocks, which are described in detail below. If, however, the T or Te snooper 236 affirming the global bus RWITM operation determines that it is not local to the requesting master 232, the global bus RWITM operation is serviced in accordance with either block 4715 or block 4716, depending upon whether or not an Sr' snooper 236 affirmed the global bus RWITM operation.

As shown at blocks 4715, if an Sr' snooper 236 affirmed the global bus RWITM operation, the Sr' snooper 236 provides early data to the requesting master 232, and the T or Te snooper 236 that affirmed the global bus RWITM operation updates its cache state for the entry containing the requested memory block to Ig. In response to receipt of the requested memory block, the requesting L2 cache 230 holds the requested memory block in the M state. In addition, any valid affirming snooper 236 other than the T or Te snooper 236 updates its respective cache state for the requested memory block to I. Alternatively, as depicted at block 4716, if an Sr' snooper 236 does not affirm the global bus RWITM operation, the T or Te snooper 236 provides late data in response to receipt of a CR. In response to receipt of the requested memory block, the requesting L2 cache 230 holds the requested memory block in the M state. In addition, the T or Te snooper 236 updates its cache state to Ig, and any other valid affirming snooper 236 updates its respective cache state for the requested memory block to I. Thus, if a remote T or Te snooper 236 affirms the global bus RWITM operation, the affirming T or Te snooper 236 enters the Ig state in order to maintain a cached domain indicator for the requested memory block in its coherency domain. Consequently, no retry-push is required in response to the global bus RWITM operation in order to update the domain indicator 3004 in the LPC system memory 108.

In either of the cases represented by block 4715 or block 4716, response logic 210 generates a CR dependent upon whether an S' or Sr' snooper 236 is possibly hidden and thus unable to invalidate its copy of the requested memory block in response to snooping the global bus RWITM operation. If response logic 210 makes a determination at block 3424 based upon the partial responses to the bus RWITM operation that an S' or Sr' snooper 236 is possibly hidden, response logic 210 generates a CR indicating "cleanup", as shown at block 3426. Alternatively, if response logic 210 determines that no S' or Sr' snooper 236 is possibly hidden, response logic 210 generates a CR indicating "success", as depicted at block 3407.

Returning to blocks 3412 and 3418, if the T or Te snooper 236 determines at block 3412 that it is local the requesting master 232, the global bus RWITM operation is serviced in accordance with either block 3420 or block 3422, depending upon whether an Sr' snooper 236 also affirmed the global bus RWITM operation. That is, as shown at block 3420, if no Sr' snooper 236 affirms the global bus RWITM operation (block 3418), the T or Te snooper 236 that affirmed the global bus RWITM operation initiates transmission of the requested memory block to the requesting L2 cache 230 in response to receipt of the CR (i.e., provides "late" data). In response to receipt of the requested memory block, the requesting L2 cache 230 holds the requested memory block in the M state. In addition, all valid affirming snoopers 236 update their respective cache states for the requested memory block to I.

Alternatively, as depicted at block 3422, if an Sr' snooper 236 affirms the global bus RWITM operation (block 3418), the Sr' snooper 236 initiates transmission of the requested memory block to the requesting L2 cache 230 prior to receipt of the CR (i.e., provides "early" data). In response to receipt of the requested memory block, the requesting L2 cache 230 holds the requested memory block in the M state. In addition, all valid affirming snoopers 236 update their respective cache states for the requested memory block to I. Following either block 3420 or block 3422, the process passes to block 3424, which has been described.

Referring now to block 3430, if no M, Me, or Tx snooper 236 affirms the global bus RWITM operation, and further, if no snooper 122 provides a partial response indicating that it is responsible (i.e., the LPC) for the requested memory block, an error occurs causing processing to halt, as depicted at block 3432. If, on the other hand, no M, Me, or Tx snooper 236 affirms the bus RWITM operation and a snooper 122 provides a partial response indicating that it is responsible (i.e., the LPC) for the requested memory block but does not affirm the bus RWITM operation (block 3440), each valid affirming snooper 236 invalidates the requested memory block in its respective L2 cache directory 302 (block 3452), and response logic 210 generates a CR indicating "retry", as depicted at block 3454. In addition, data provided by an Sr' snooper 236 affirming the global bus RWITM operation, if any, is discarded by the master 232 (blocks 3448 and 3450). As indicated by decision block 3442, valid affirming snoopers 236 similarly invalidate their respective copies of the requested memory block at block 3452 and response logic 210 generates a "retry" CR at block 3454 if a memory controller snooper 122 affirms the global bus RWITM operation (block 3440) and an L2 cache snooper 236 provides a partial response indicating that it may hold the requested memory block in one of the M, Me, or Tx states but cannot affirm the global bus RWITM operation.

With reference now to block 3444, if no M, Me, or Tx snooper 236 affirms the global bus RWITM operation or is possibly hidden, a snooper 122 affirms the global bus RWITM operation, and a Sr' snooper 236 affirms the global bus RWITM operation, the global bus RWITM operation is serviced in accordance with block 3422 and following blocks, which are described above. Assuming these same conditions except for the absence of an Sr' snooper 236 affirming the global bus RWITM operation, the global bus RWITM operation is serviced in accordance with block 3446. In particular, in response to the CR, the LPC snooper 122 provides the requested memory block to the requesting L2 cache 230, which obtains the requested memory block in the M state, and all valid affirming snoopers 236 invalidate their respective copies of the requested memory block, if any.

Following block 3446, the process passes to blocks 3460-3466, which collectively represent the LPC snooper 122 determining whether or not to update the domain indicator 3004 for the requested memory block based upon whether the LPC snooper 122 is local to the requesting master 232 (block 3460) and the present state of the domain indicator (blocks 3462 and 3464). If the LPC snooper 122 is local to the requesting L2 cache 230 and the domain indicator 3004 in system memory 108 is set to indicate "local", no update is required, and the process passes through page connector V to block 6118 of FIG. 61A, which has been described. On the other hand, LPC snooper 122 changes the state of the domain indicator 3004 at block 3466 if LPC snooper 122 is local to the requesting master 232 and domain indicator 3004 is reset to indicate "global" or if LPC snooper 122 is not local to the requesting master 232 and domain indicator 3004 is reset to indicate "local".

If the partial responses indicate an S' or Sr' snooper 236 is possibly hidden (block 3424), the requesting L2 cache 230 receives a "cleanup" CR indicating that it must invalidate any other valid cached copies of the requested memory block. If no S' or Sr' snoopers 236 are possibly hidden by incomplete partial responses, response logic 210 generates a "success" CR, as depicted at block 3407.

Figure 62:
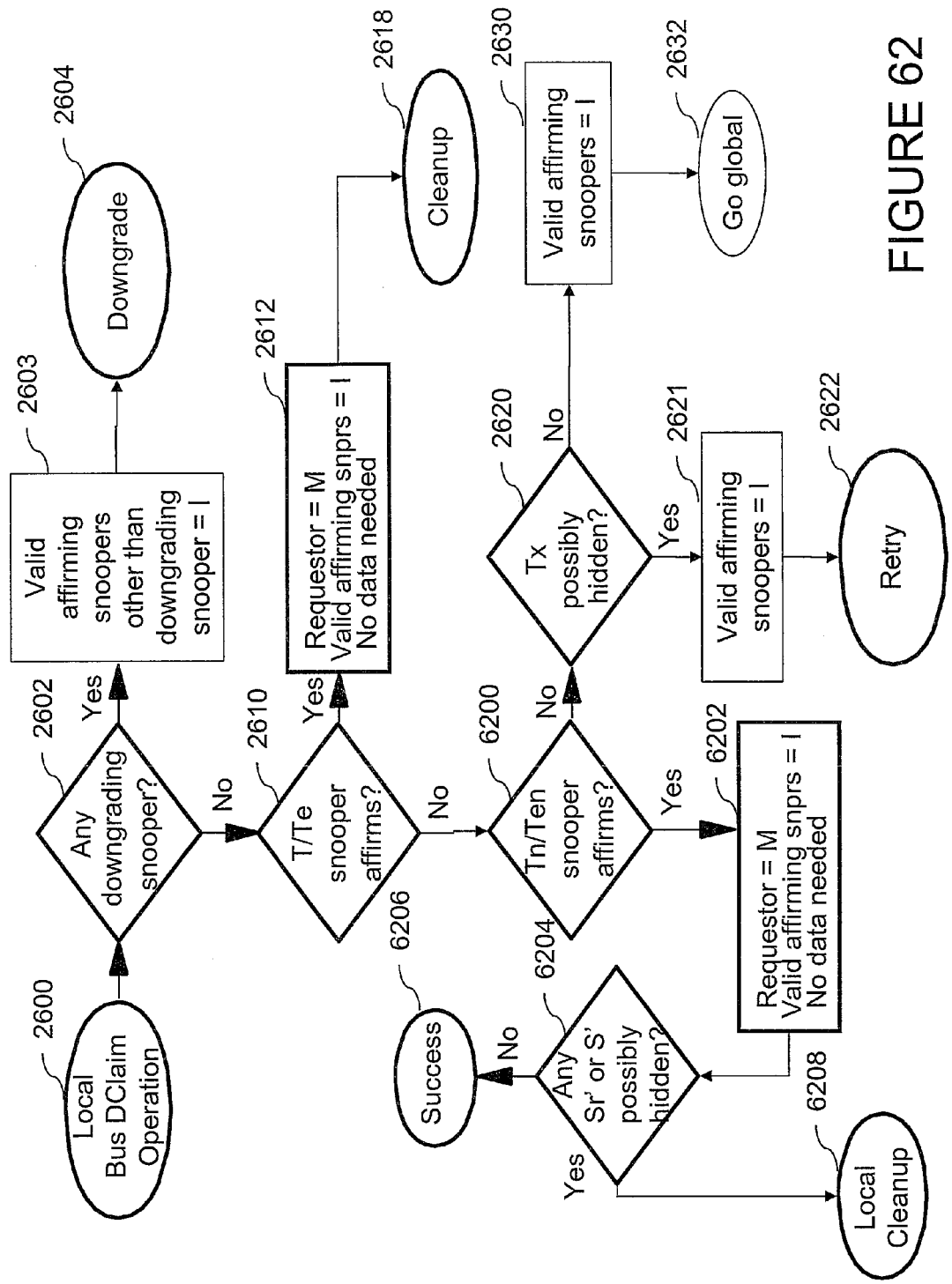
FIG. 62 is a high level logical flowchart of an exemplary method of performing a local bus DClaim operation in a data processing system implementing Tn and Ten coherency states in accordance with the present invention.

With reference now to FIG. 62, there is illustrated a high level logical flowchart of an exemplary method of performing a local bus DClaim operation in a data processing system implementing Tn and Ten coherency states in accordance with preferred embodiments of the present invention. As indicated by like reference numerals, the depicted process is similar to that illustrated in FIG. 26 and described above.

As shown, the process begins at block 2600, for example, with a master 232 issuing a local bus DClaim operation on a local interconnect 114 at block 1932 of FIG. 55A. The various partial responses that snoopers 236 may provide to distributed response logic 210 in response to the local bus DClaim operation are represented in FIG. 62 by the outcomes of decision blocks 2602, 2610, 2620, 6200, and 6204. These partial responses in turn determine what CR response logic 210 generates for the local bus DClaim operation.

As shown at block 2602, if any snooper 236 issues a partial response downgrading the local bus DClaim operation to a bus RWITM operation as illustrated, for example, at blocks 1924 and 5504 of FIG. 55A, each valid affirming snooper 236 (i.e., not Ig snooper(s) 236) other than the downgrading snooper 236 invalidates its respective copy of the requested memory block, if any (block 2603), and distributed response logic 210 generates a CR indicating "downgrade", as shown at block 2604. In response to this CR, the master 232 of the local bus DClaim operation must next attempt to gain ownership of the requested memory block utilizing a local bus RWITM operation, as depicted at block 1948 of FIG. 55A.

If a snooper 236 affirms the local bus DClaim operation with a partial response indicating that the L2 cache 230 containing the snooper 236 holds the requested memory block in either the T or Te state as shown at block 2610, the process passes to block 2612. Because no data transfer is required in response to a bus DClaim operation, block 2612 indicates that the master 232 in the requesting L2 cache 230 updates the cache state of the requested memory block in L2 cache directory 302 to the M state. All valid affirming snoopers 236 update their respective cache states for the requested memory block to I. As shown at block 2618, distributed response logic 210 generates a CR indicating "cleanup", meaning that the requesting L2 cache 230 must issue one or more bus kill operations to invalidate copies of the requested memory block, if any, held outside of the local coherency domain.

As illustrated at block 6200, if a Tn or Ten snooper 236 affirms the local bus DClaim operation, the process passes to block 6202. Because no data transfer is required in response to a bus DClaim operation, block 2612 indicates that the master 232 in the requesting L2 cache 230 updates the cache state of the requested memory block in L2 cache directory 302 to the M state. All valid affirming snoopers 236 update their respective cache states for the requested memory block to I. As shown at block 6204, distributed response logic 210 generates a CR that is dependent upon whether the partial responses received by response logic 210 indicate that an Sr' or S' snooper 236 may be possibly hidden. If not, distributed response logic 210 generates a response indicating "success", as shown at block 6206, because the presence of the Tn or Ten coherency state guarantees that no L2 cache 230 outside of the local coherency domain holds a copy of the requested memory block. If the partial responses indicate that an Sr' or S' snooper 236 may be possibly hidden, response logic 210 generates a CR indicating "local cleanup", as shown at block 6208. Only local cleanup operations are required because the Tn or Ten coherency state again guarantees that no L2 cache 230 outside of the local coherency domain holds a valid copy of the requested memory block.

Turning now to block 2620, if no snooper downgrades the local bus DClaim operation (block 2602), no Tx snooper 236 affirms the local bus DClaim operation (blocks 2610 and 6200), and further, and a snooper 236 provides a partial response indicating that it may hold the requested memory block in a Tx state but cannot affirm the local bus DClaim operation, each valid affirming snooper 236 invalidates its respective copy of the requested memory block, if any (block 2621), and response logic 210 generates a CR indicating "retry", as depicted at block 2622. In response to the "retry" CR, the requesting master 232 may reissue the bus DClaim operation as either a local or global operation, as explained above with reference to block 1931 of FIG. 55A. If, however, no snooper downgrades the local bus DClaim operation (block 2602), no Tx snooper 236 affirms the bus DClaim operation or is possibly hidden (blocks 2602, 2610, 6200, and 2620), response logic 210 provides a "go global" CR, as shown at block 2632, and all affirming snoopers, if any, having a valid copy of the requested memory block invalidate their respective copies of the requested memory block, as shown at block 2630. In response to the "go global" CR, the master 232 reissues the bus DClaim operation as a global operation, as depicted at block 1940 of FIG. 55A.

Figure 63:
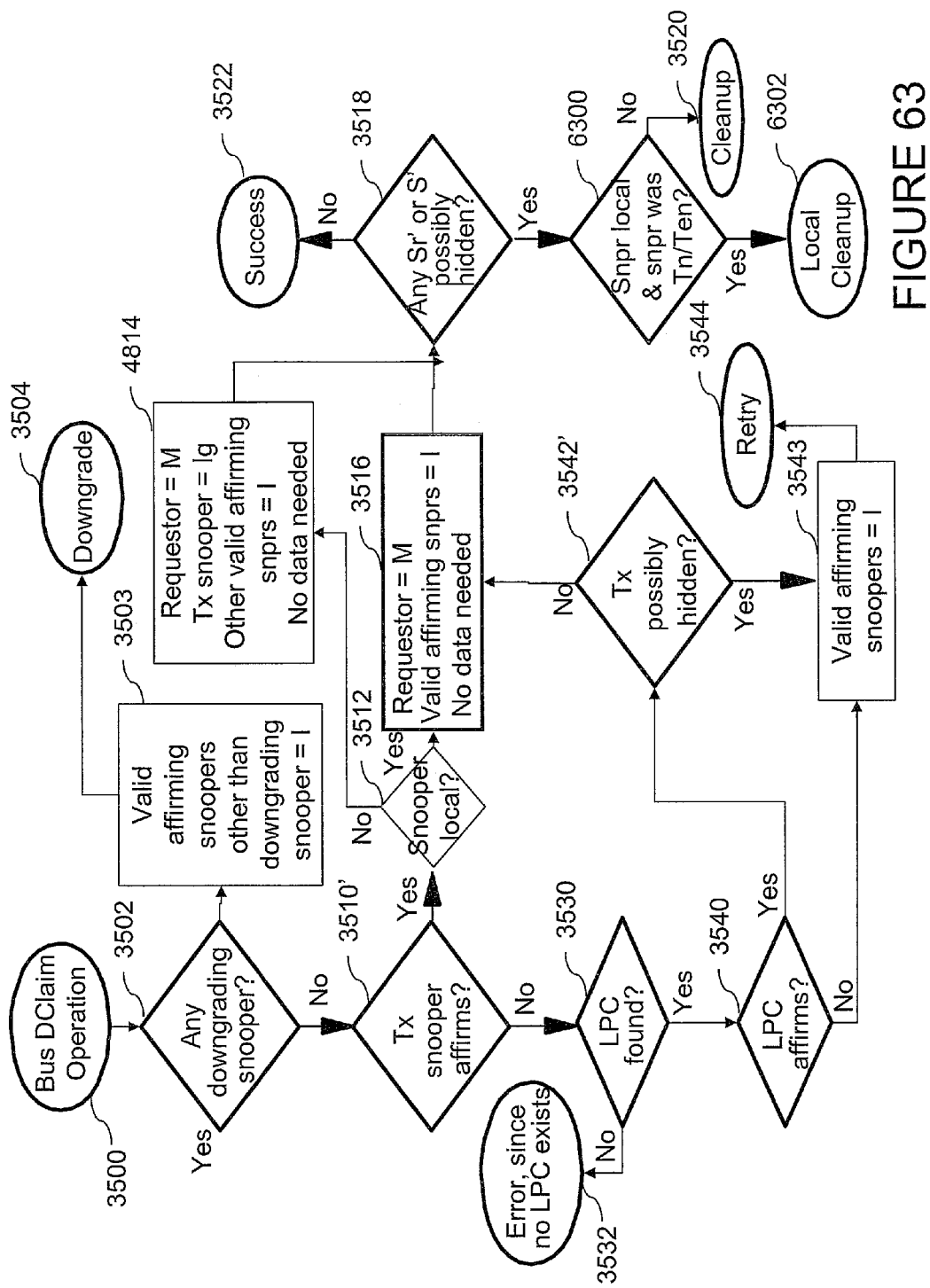
FIG. 63 is a high level logical flowchart of an exemplary method of performing a global bus DClaim operation in a data processing system implementing Tn and Ten coherency states in accordance with the present invention.

Referring now to FIG. 63, there is depicted a high level logical flowchart of an exemplary method of performing a global bus DClaim operation in a data processing system implementing Tn and Ten coherency states in accordance with the present invention. The process begins at block 3500, for example, with a master 232 of an L2 cache 230 issuing a global bus DClaim operation on interconnects 110, 114 at block 1940 of FIG. 55A. The various partial responses that snoopers 122, 236 may provide to distributed response logic 210 in response to the global bus DClaim operation are represented in FIG. 35 by the outcomes of decision blocks 3502, 3510', 3518, 3530, 3540, 3542' and 6300 These partial responses in turn determine what CR response logic 210 generates for the global bus DClaim operation.

As shown at block 3502, if any snooper 236 issues a partial response downgrading the global bus DClaim operation to a bus RWITM operation, each valid affirming snooper 236 other than the downgrading snooper 236 invalidates its respective copy of the requested memory block, if any (block 3503), and distributed response logic 210 generates a CR indicating "downgrade", as shown at block 3504. In response to this CR, the master 232 of the global bus DClaim operation must next attempt to gain ownership of the requested memory block utilizing a bus RWITM operation, as depicted at blocks 1948 and 1954 of FIG. 55A.

If a Tx (e.g., T, Te, Tn, or Ten) snooper 236 affirms the global bus DClaim operation as shown at block 3510, the process passes to block 3512. Block 3512 depicts the Tx snooper 236 determining whether it is local to the requesting master 232. If not, the Tx snooper 236 updates the state of its relevant entry to Ig to maintain a cached domain indicator for the requested memory block as shown at block 4814. In addition, the requesting master 232 updates the coherency state of its copy of the requested memory block to M, and each valid affirming snooper 236 other than the Tx snooper 236 (i.e., not an Ig snooper 236) updates its coherency state for the requested memory block to I (block 4814).

Returning to block 3512, if the Tx snooper 236 determines that it is local to the requesting master 232, the global bus DClaim operation is handled in accordance with block 3516. In particular, the master 232 in the requesting L2 cache 230 updates the state of its copy of the requested memory block to the M state, and all valid affirming snoopers 236 update their respective cache states for the requested memory block to I.

As shown at blocks 3518 and 3522, if the partial responses indicate that no S' or Sr' snooper 236 is possibly hidden, the process ends with distributed response logic 210 generating a CR indicating "success" (block 3522). If, on the other hand, a determination is made at block 3518 that at least one partial response indicating the presence of a possibly hidden S' or Sr' snooper 236 was given in response to the global bus DClaim operation, some type of cleanup operation will be required. If the affirming Tx snooper 236 is within the same coherency domain as the requesting master 232 and, prior to the operation, was in one of the Te and Ten states, distributed response logic 210 generates a CR indicating "local cleanup" (block 6302), meaning that the requesting L2 cache 230 must issue one or more local bus kill operations to invalidate the requested memory block in any such hidden S' or Sr' snooper 236. If the affirming Tx snooper 236 is not within the same coherency domain as the requesting master 232 or the affirming Tx snooper 236 was, prior to the operation, in one of the T or Te coherency states, global cleanup is required, and response logic 210 generates a CR indicating "cleanup" (block 3520). Thus, the presence of a Tn or Ten coherency state can again be utilized to limit the scope of bus kill operations.

Turning now to block 3530, if no Tx snooper 236 affirms the global bus DClaim operation, and further, if no snooper 122 provides a partial response indicating that it is responsible (i.e., the LPC) for the requested memory block, an error occurs causing processing to halt, as depicted at block 3532. If, on the other hand, no Tx snooper 236 affirms the global bus DClaim operation and a snooper 122 provides a partial response indicating that it is responsible (i.e., the LPC) for the requested memory block but does not affirm the global bus DClaim operation (block 3540), each valid affirming snooper 236 invalidates its respective copy of the requested memory block, if any (block 3543), and response logic 210 generates a CR indicating "retry", as depicted at block 3544. Response logic 210 similarly generates a "retry" CR at block 3544 and each valid affirming snooper 236 other than the downgrading snooper 236 invalidates its respective copy of the requested memory block, if any (block 3543) if a memory controller snooper 122 affirms the bus DClaim operation (block 3540) and an Tx snooper 236 may be possibly hidden (block 3542').

As depicted at block 3542', if no Tx snooper 236 affirms the global bus DClaim operation or is possibly hidden and a snooper 122 affirms the global bus DClaim operation, the global bus DClaim operation is serviced in accordance with block 3516, which is described above.

Figure 64:
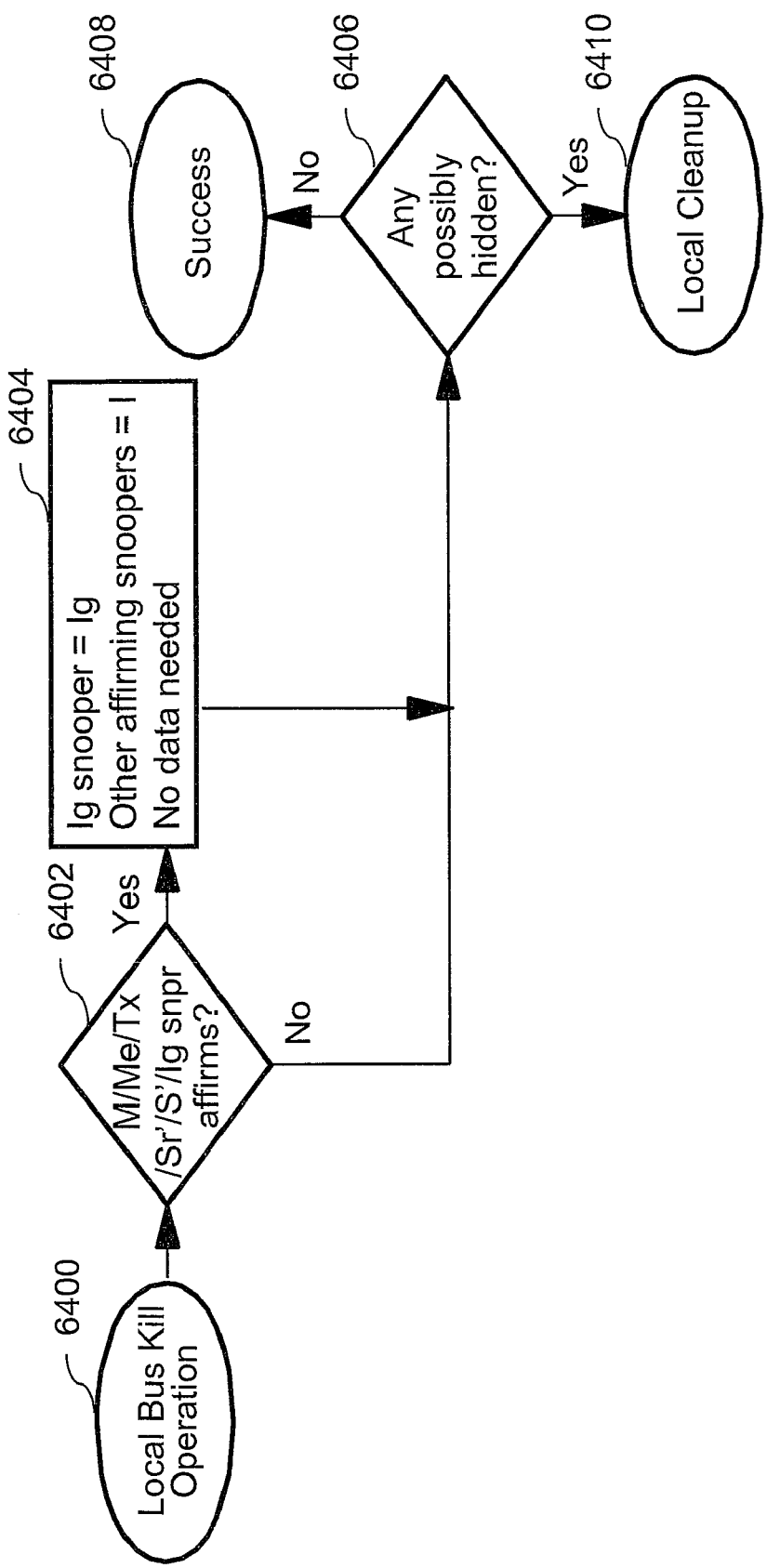
FIG. 64 is a high level logical flowchart of an exemplary method of performing a local bus kill operation in a data processing system implementing Tn and Ten coherency states in accordance with the present invention.

With reference now to FIG. 64, there is illustrated a high level logical flowchart of an exemplary method of performing a local bus kill operation in a data processing system implementing Tn and Ten coherency states in accordance with the present invention. As mentioned above, the limitation of scope of the local bus kill operation to one coherency domain is enabled by the additional information provided by the Tn and Ten coherency states, namely, that no shared copy of the memory block resides outside of the coherency domain.

As depicted, the process begins at block 6400, for example, with the master 232 of an L2 cache 230 issuing a local bus kill operation on its local interconnect 114, for example, at block 5508 of FIG. 55B, block 5608 of FIG. 56B or block 5704 of FIG. 57. The various partial responses that snoopers 122, 236 may provide to distributed response logic 210 in response to the bus kill operation are represented in FIG. 64 by the outcomes of decision blocks 6402 and 6406. These partial responses in turn determine what CR response logic 210 generates for the local bus kill operation.

In particular, as depicted at blocks 6402 and 6404, any snooper 236 affirming the bus kill operation in any of the M, Me, Tx, Sr' or S' states invalidates its copy of the requested memory block without any transmission of data in response to receipt of the CR. An affirming Ig snooper 236, if any, remains in the Ig state. As further shown at blocks 6406, 6408 and 6410, response logic 210 generates a CR indicating "local cleanup" if any snooper 236 provides a partial response not affirming the local bus kill operation and otherwise generates a CR indicating "success".

Figure 65:
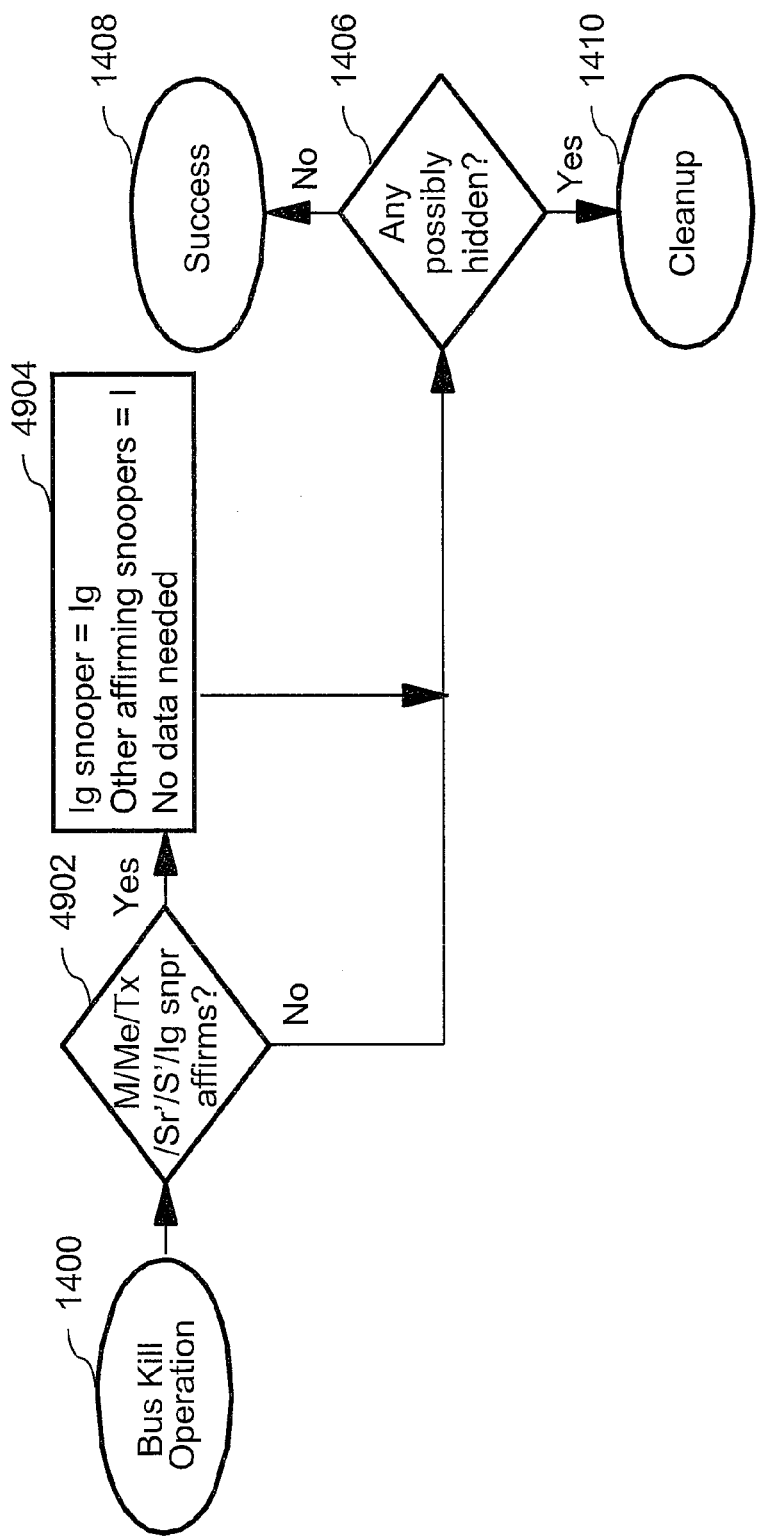
FIG. 65 is a high level logical flowchart of an exemplary method of performing a global bus kill operation in a data processing system implementing Tn and Ten coherency states in accordance with the present invention.

Referring now to FIG. 65, there is depicted a high level logical flowchart of an exemplary method of performing a global bus kill operation in a data processing system implementing Tn and Ten coherency states in accordance with the present invention. As indicated by the use of like reference numerals, the illustrated process is identical to that depicted in FIG. 49 and described above, except for the modification to block 4902' to indicate that memory blocks held in the Tn and Ten coherency states are handled like those held in any of the M, Me, T, Te, Sr, or S coherency states.

Figure 66:
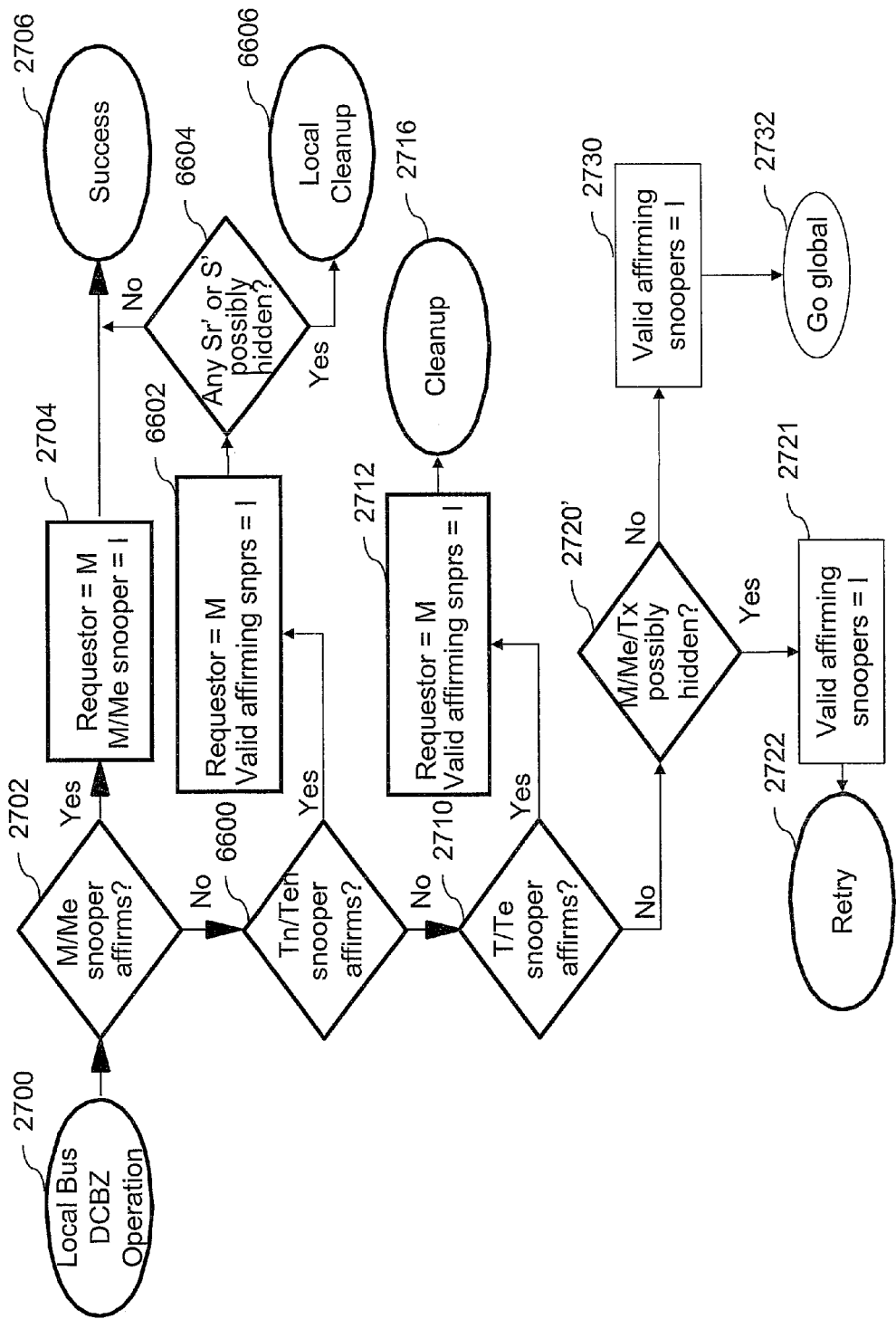
FIG. 66 is a high level logical flowchart of an exemplary method of performing a local bus DCBZ operation in a data processing system implementing Tn and Ten coherency states in accordance with the present invention.

With reference now to FIG. 66, there is depicted a high level logical flowchart of an exemplary method of performing a local bus DCBZ operation in a data processing system implementing Tn and Ten coherency states in accordance with preferred embodiments of the present invention. As indicated by like reference numerals, the illustrated method is substantially similar to FIG. 27.

The process begins at block 2700, for example, with the issuance of a local bus DCBZ operation on a local interconnect 114 at block 2052 of FIG. 56A. The various partial responses that snoopers 236 may provide to distributed response logic 210 are represented in FIG. 66 by the outcomes of decision blocks 2702, 6600, 6604, 2710, and 2720. These partial responses in turn determine the CR for the local bus DCBZ operation.

If a snooper 236 affirms the local bus DCBZ operation with a partial response indicating that the L2 cache 230 containing the snooper 236 holds the requested memory block in either the M or Me state as shown at block 2702, the process proceeds to block 2704. Block 2704 indicates the operations of the requesting L2 cache 230 and affirming L2 cache 230 in response to the request. In particular, the master 232 in the requesting L2 cache 230 updates the cache state of the requested memory block to the M state (no data is transferred), and the M or Me snooper 236 in the affirming L2 cache 230 updates the cache state of the requested memory block to the I state. The process then ends with distributed response logic 210 generating a CR indicating "success", as depicted at block 2706.

As depicted at blocks 6600 and 6602, if a Tn or Ten snooper 236 affirms the local bus DCBZ operation, the Tn or Ten snooper 236 and any other valid affirming snooper 236 (i.e., not Ig snooper(s) 236) invalidates its copy of the requested memory block, and the requesting L2 cache 230 updates its cache state for the requested memory block to the M state. If response logic 210 received a partial response indicating that an Sr' or S' snooper 236 is possibly hidden (block 6604), response logic 210 generates a CR indicating "local cleanup", as illustrated at block 6606. Thus, the existence of the Tn or Ten state enables the scope of cleanup operations to be restricted to the local coherency domain. If response logic 210 determines at block 6604 that no Sr' or S' snooper 236 is possibly hidden, response logic 210 generates a CR indicating "success", as shown at block 2706.

Referring now to block 2710, if a T or Te snooper 236 affirms the local bus DCBZ operation, the process passes to block 2712. Block 2712 represents the T or Te snooper 236 and any other valid affirming snooper(s) 236 invalidating its copy of the requested memory block and the master 232 in the requesting L2 cache 230 updating the cache state of the requested memory block to the M state. As further illustrated at block 2716, distributed response logic 210 generates a CR indicating "cleanup" in order to ensure the invalidation of copies of the requested memory block, if any, held in L2 caches 230 outside of the local coherency domain.

Turning now to block 2720', if no M, Me, or Tx snooper 236 affirms the local bus DCBZ operation (blocks 2702 and 2710), and further, a snooper 236 provides a partial response indicating that it may hold the requested memory block in the M, Me, or Tx state but cannot affirm the local bus DCBZ operation, each valid affirming snooper 236 invalidates its respective copy of the requested memory block, if any (block 2721), and response logic 210 generates a CR indicating "retry", as depicted at block 2722. In response to the "retry" CR, the requesting master 232 may reissue the bus DCBZ operation as either a local or global operation, as explained above with reference to block 2050 of FIG. 20. If, however, no M, Me, or Tx snooper 236 affirms the bus DClaim operation or is possibly hidden (blocks 2702, 2710, 2720'), response logic 210 provides a "go global" CR, as shown at block 2732, and all valid affirming snoopers, if any, having a valid copy of the requested memory block invalidate their respective copies of the requested memory block, as shown at block 2730. In response to the "go global" CR, the master 232 reissues the bus DCBZ operation as a global operation, as depicted at block 2060 of FIG. 56A.

Figure 67:
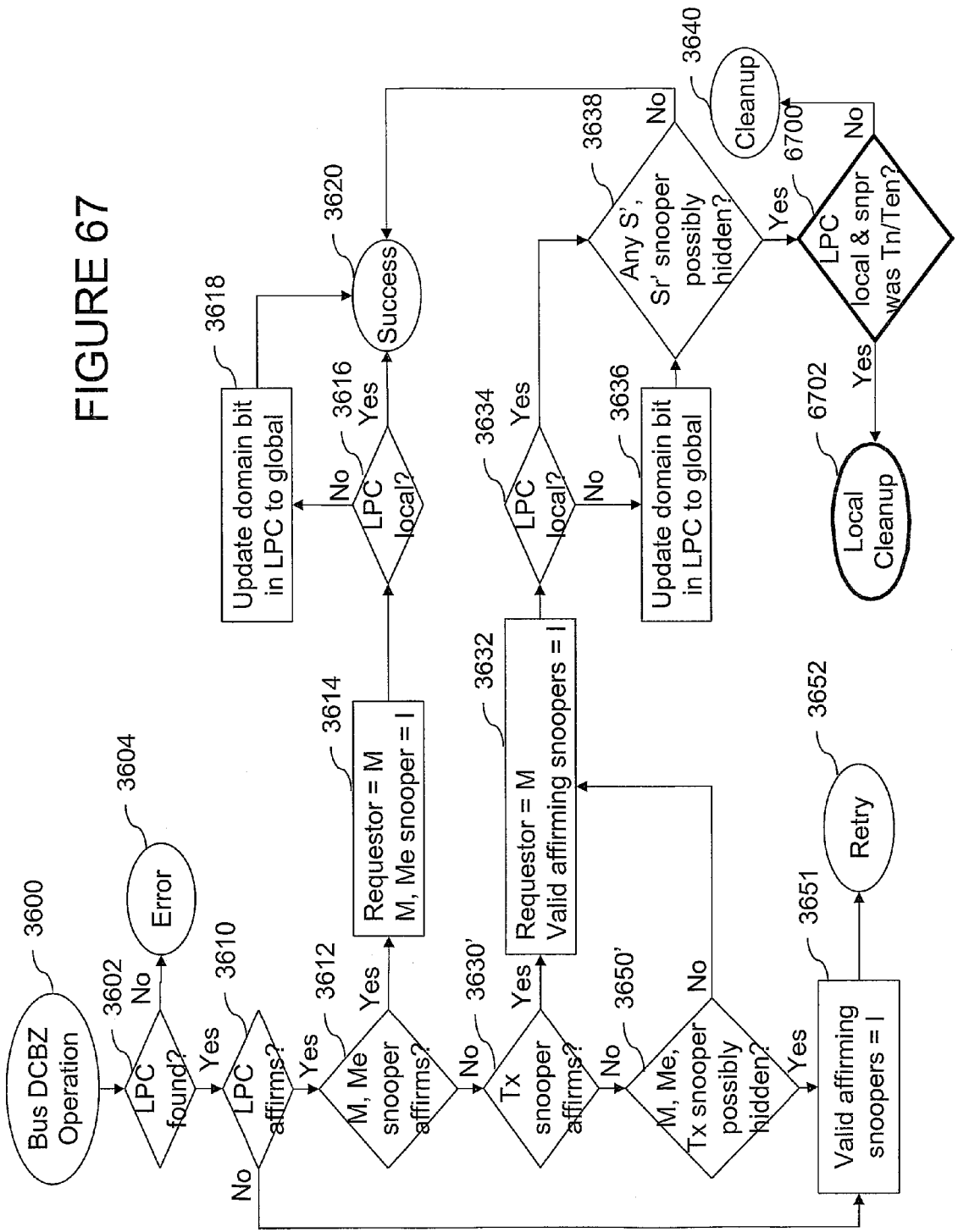
FIG. 67 is a high level logical flowchart of an exemplary method of performing a global bus DCBZ operation in a data processing system implementing Tn and Ten coherency states in accordance with the present invention.

Referring now to FIG. 67, there is depicted a high level logical flowchart of an exemplary method of performing a global bus DCBZ operation in a data processing system implementing Tn and Ten coherency states in accordance with the present invention. The process begins at block 3600, for example, with the master 232 of an L2 cache 230 issuing a global bus DCBZ operation on interconnects 110, 114 at block 2060 of FIG. 56A. The various partial responses that snoopers 122, 236 may provide to distributed response logic 210 are represented in FIG. 67 by the outcomes of decision blocks 3602, 3610, 3612, 3630', 3638, 6700 and 3650'. These partial responses in turn determine the CR for the global bus DCBZ operation.

As indicated at blocks 3602-3604, if no snooper 122 provides a partial response indicating that it is responsible (i.e., the LPC) for the requested memory block, an error halting processing occurs, since the no LPC was found. If a snooper 122 indicates that it is the LPC for the requested memory block, but does not affirm the global DCBZ operation, each valid affirming snooper 236 invalidates its respective copy of the requested memory block, if any (block 3651), and response logic 210 generates a CR indicating "retry", as depicted at block 3652. A "retry" CR is similarly generated by response logic 210 at block 3652 and each valid affirming snooper 236 invalidates its respective copy of the requested memory block, if any (block 3651) if a snooper 122 affirms the global bus DCBZ operation, no M, Me, or Tx snooper 236 affirms the global bus DCBZ operation, and an M, Me, or Tx snooper 236 is possibly hidden.

If a snooper 236 affirms the global bus DCBZ operation with a partial response indicating that the L2 cache 230 containing the snooper 236 holds the requested memory block in either the M or Me state as shown at block 3612, the process proceeds to block 3614. Block 3614 indicates the operations of the requesting L2 cache 230 and the affirming L2 cache 230 in response to the global bus DCBZ operation. In particular, the master 232 in the requesting L2 cache 230 updates the cache state of the requested memory block to the M state (no data is transferred), and the M or Me snooper 236 in the affirming L2 cache 230 updates the cache state of the requested memory block to the I state. As further shown at block 3616 and 3618, the LPC snooper 122 also resets the domain indicator 3004 associated with the requested memory block to "global" if the LPC snooper 122 is not within the same coherency domain as the requesting master 232. The process ends with distributed response logic 210 generating a CR indicating "success", as depicted at block 3620.

If a Tx snooper 236 affirms the global bus DCBZ operation as shown at block 3630', the process passes to block 3632. Block 3632 represents the Tx snooper 236 and any other valid affirming snooper 236 invalidating its copy of the requested memory block and the master 232 in the requesting L2 cache 230 updating the cache state of its copy of the requested memory block to the M state. As further shown at block 3634 and 3636, the LPC snooper 122 also resets the domain indicator 3004 associated with the requested memory block to "global" if the LPC snooper 122 is not within the same coherency domain as the requesting master 232.

If response logic 210 determines at block 3638 that the partial responses indicate that no S' or Sr' snooper 236 is possibly hidden, distributed response logic 210 provides a CR indicating "success" as shown at block 3606. If, on the other hand, at least one partial response indicating the presence of a possibly hidden S' or Sr' snooper 236 was given in response to the global bus DCBZ operation, cleanup operations are required. Accordingly, as shown at blocks 6700, 6702 and 3640, distributed response logic 210 generates a CR indicating "local cleanup" if the LPC snooper 122 is local to the requesting master 232 and the affirming snooper 236 held the requested memory block in one of the Tn or Ten coherency states, and otherwise generates a CR indicating global "cleanup".

As indicated by decision block 3650, if a memory controller snooper 122 affirms the global bus DCBZ operation (block 3610) and no M, Me, or Tx snooper 236 affirms the global bus DCBZ operation or is possibly hidden (blocks 3612, 3630' and 3650'), the global bus DCBZ operation is serviced as described above with reference to block 3632 and following blocks.

Figure 68:
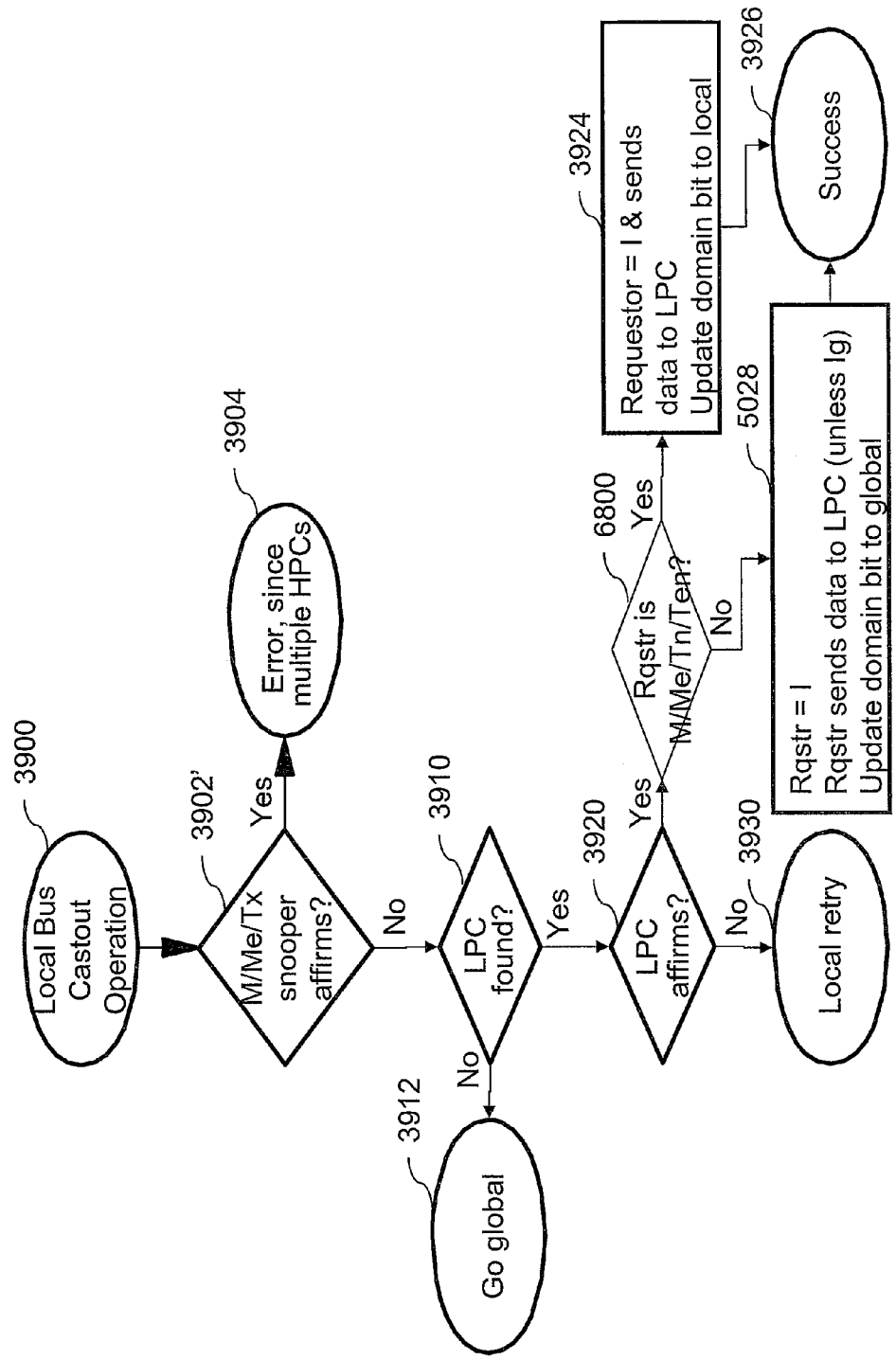
FIG. 68 is a high level logical flowchart of an exemplary method of performing a local bus castout operation in a data processing system implementing Tn and Ten coherency states in accordance with the present invention.

With reference now to FIG. 68, there is illustrated a high level logical flowchart of an exemplary method of performing a local bus castout operation in a data processing system implementing Tn and Ten coherency states in accordance with preferred embodiments of the present invention. As indicated by like reference numerals, the depicted process is substantially similar to that shown in FIG. 39 and described above.

The process begins at block 3900, for example, with the issuance of a local bus castout operation on a local interconnect 114 at block 4406 of FIG. 44. The various partial responses that snoopers 122, 236 may provide to distributed response logic 210 are represented in FIG. 68 by the outcomes of decision blocks 3902' and 3910. These partial responses in turn determine the CR for the local bus castout operation.

If a snooper 236 affirms the local bus castout operation with a partial response indicating that the L2 cache 230 containing the snooper 236 holds the requested memory block in any of the M, Me, or Tx states as shown at block 3902', an error halting processing occurs, as indicated at block 3904, because the memory block being castout can have only one HPC (i.e., the requesting L2 cache 230).

As depicted at block 3910, if no M, Me or Tx snooper 236 affirms the local bus castout operation (block 3902), and further, if no snooper 122 provides a partial response indicating that it is responsible (i.e., the LPC) for the requested memory block, response logic 210 provides a "go global" CR, as depicted at block 3912, because the LPC is a required participant to receive the castout memory block. If, however, no M, Me, or Tx snooper 236 affirms the bus castout operation (block 3902) and a snooper 122 provides a partial response indicating that it is responsible (i.e., the LPC) for the requested memory block but does not affirm the bus castout operation (blocks 3910 and 3920), response logic 210 generates a CR indicating "local retry", as depicted at block 3930, because the LPC is in the local coherency domain but must be available to receive the castout memory block. If a memory controller snooper 122 affirms the bus castout operation (block 3920) and no M, Me, or Tx snooper 236 affirms the bus castout operation (block 3902), the requesting L2 cache 230 invalidates the memory block within its cache directory 302 and transmits the memory block to the LPC (block 3924 or block 5028), unless the requesting L2 cache 230 is in the Ig state. In addition to updating the memory block, the LPC snooper 122 sets the associated domain indicator 3004 to "local" if the memory block is in the M, Me, Tn or Ten state (blocks 6800 and 3924), and resets the associated domain indicator 3004 to "global" if the memory block is in the T or Te state (blocks 6800 and 5028). The update of the domain indicator 3004 to local is possible because a castout of a memory block in either of the M, Me, Tn or Ten states guarantees that no remotely cached copy of the memory block exists. In response to an affirmative determination at block 3920, response logic 210 generates a CR indicating "success", as illustrated at block 3926.

Figure 69:
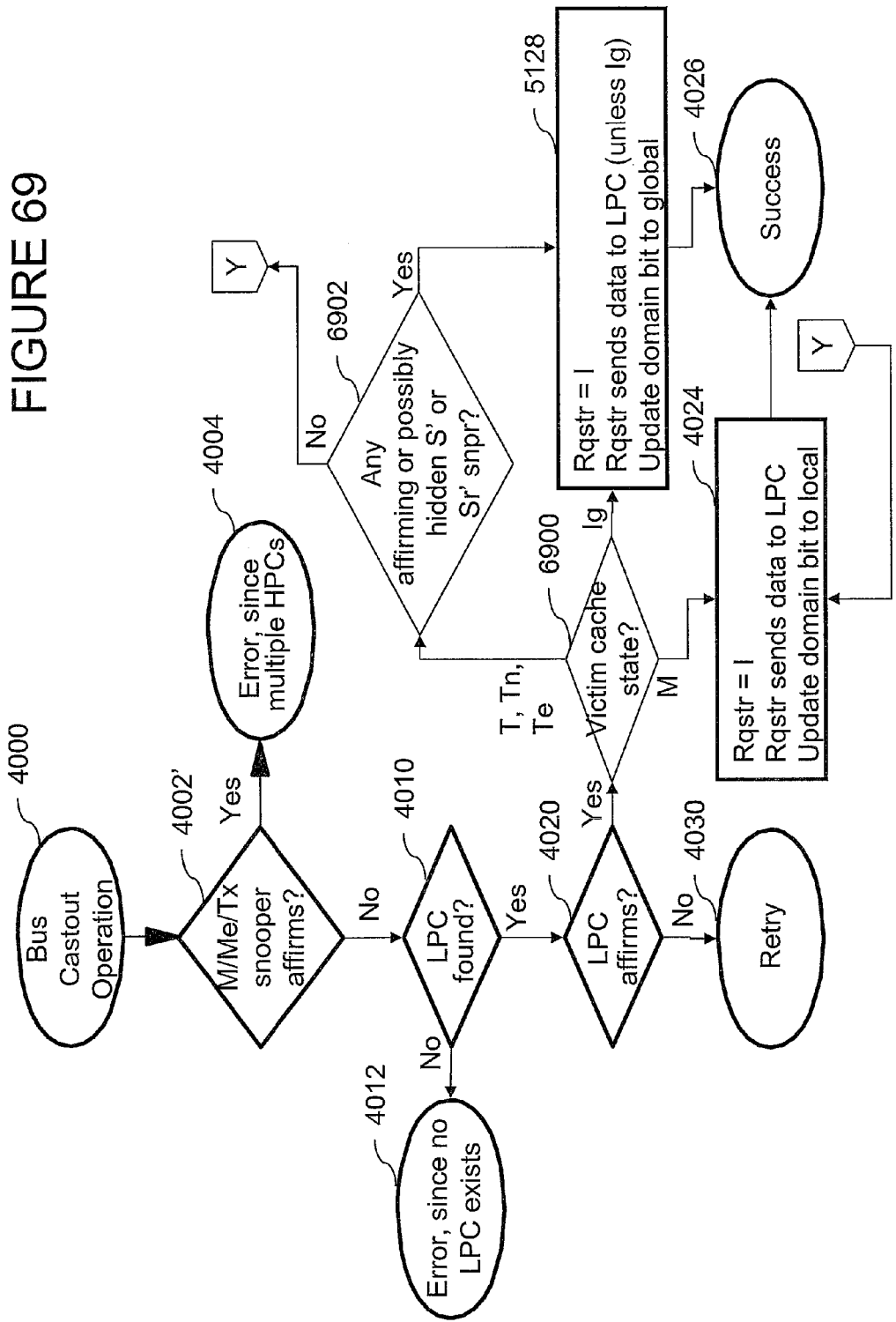
FIG. 69 is a high level logical flowchart of an exemplary method of performing a global bus castout operation in a data processing system implementing Tn and Ten coherency states in accordance with the present invention.

Referring now to FIG. 69, there is depicted a high level logical flowchart of an exemplary method of performing a global bus castout operation in a data processing system implementing the Tn and Ten coherency states in accordance with the present invention. As indicated by like reference numerals, the depicted process is substantially similar to that shown in FIG. 40 and described above.

The process begins at block 4000, for example, with a master 232 of an L2 cache 230 issuing a global bus castout operation on interconnects 110, 114 at block 4420 of FIG. 44. The various partial responses that snoopers 122, 236 may provide to distributed response logic 210 are represented in FIG. 69 by the outcomes of decision blocks 4002', 4010, 4020 and 6902. These partial responses in turn determine the CR for the global bus castout operation.

If a snooper 236 affirms the global bus castout operation with a partial response indicating that the L2 cache 230 containing the snooper 236 holds the requested memory block in any of the M, Me, or Tx states as shown at block 4002', an error halting processing occurs, as indicated at block 4004, because the memory block being castout can have only one HPC (i.e., the requesting L2 cache 230).

As depicted at block 4010, if no M, Me, or Tx snooper 236 affirms the global bus castout operation, and further, if no snooper 122 provides a partial response indicating that it is responsible (i.e., the LPC) for the requested memory block, an error occurs causing processing to halt, as depicted at block 4012. If, however, no M, Me, or Tx snooper 236 affirms the bus castout operation and a snooper 122 provides a partial response indicating that it is responsible (i.e., the LPC) for the requested memory block but does not affirm the global bus castout operation (block 4020), response logic 210 generates a CR indicating "retry", as depicted at block 4030, because the LPC must be available to receive the castout memory block.

If a memory controller snooper 122 affirms the bus castout operation (block 4020) and no M, Me, or Tx snooper 236 affirms the global bus castout operation (block 40021), the requesting L2 cache 230 invalidates the memory block within its cache directory 302 and, except for Ig castouts, transmits the memory block to the LPC (block 4024 or block 5128). In addition to updating the target memory block, the LPC snooper 122 sets the associated domain indicator 3004 to "local" if the castout memory block is in the M state (blocks 6900 and 4024) and resets the associated domain indicator 3004 to "global" if the memory block is in the Ig state (blocks 6900 and 5128). As further shown at block 6902, if the castout memory block is in one of the T, Tn or Te coherency states, the castout is handled in accordance with block 5128 if the partial responses and CR indicate that an S or Sr' snooper 236 affirms the castout operation or is possibly hidden, and is otherwise handled in accordance with block 4024. In response to an affirmative determination at block 4020, response logic 210 generates a CR indicating "success", as illustrated at block 4026.

The update of the domain indicator 3004 to "local" at block 4024 is possible because a castout of a memory block in the M state, or in the alternative, absence of an affirming or possibly hidden S' or Sr' snooper 236, guarantees that no remotely cached copy of the memory block exists.

Figure 70:
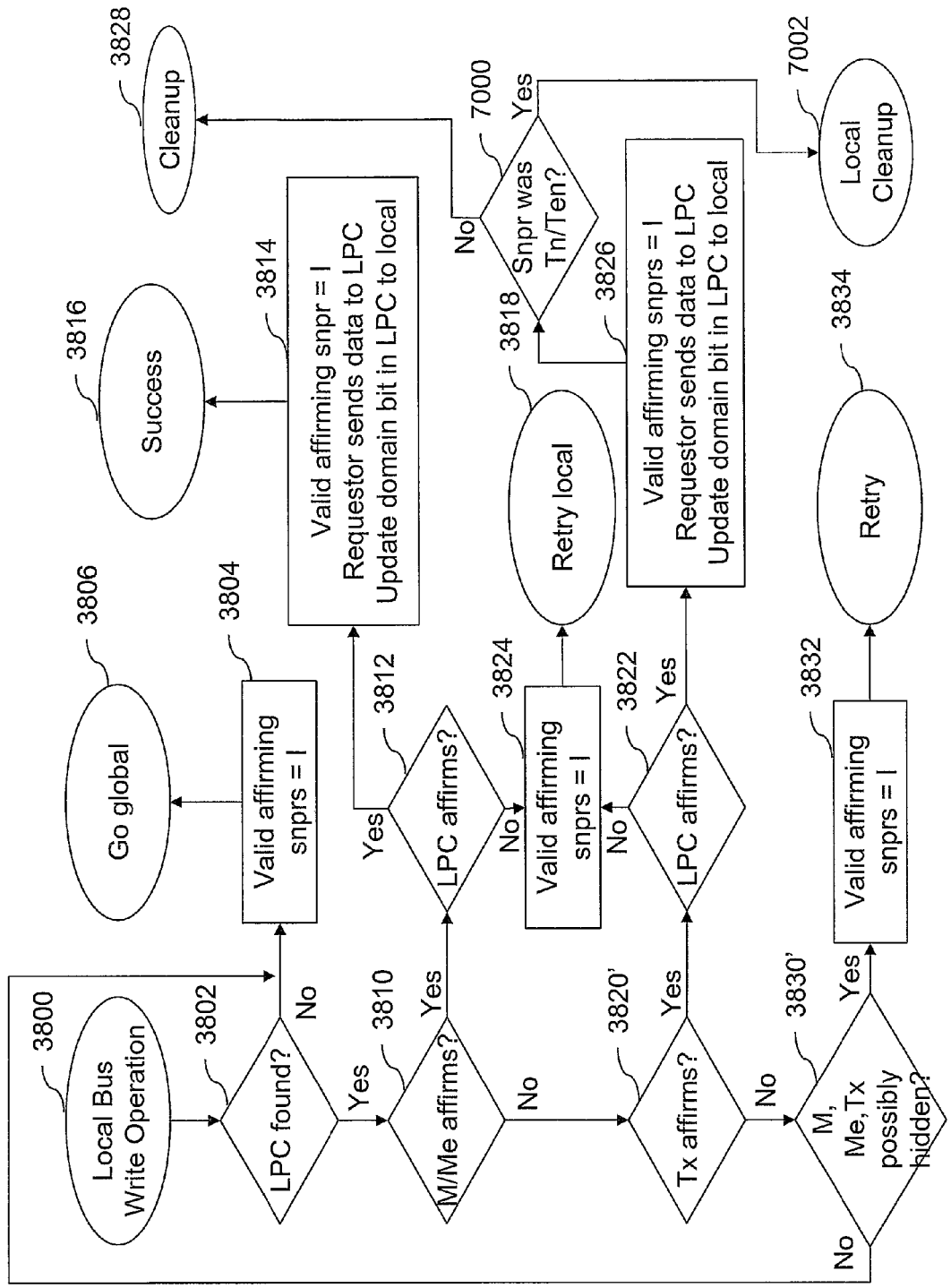
FIG. 70 is a high level logical flowchart of an exemplary method of performing a local bus write operation in a data processing system implementing Tn and Ten coherency states in accordance with the present invention.

With reference now to FIG. 70, there is illustrated a high level logical flowchart of an exemplary method of performing a local bus write operation in a data processing system implementing Tn and Ten coherency states in accordance with preferred embodiments of the present invention. As indicated by like reference numerals, the depicted process is substantially similar to that illustrated in FIG. 38 and described above.

The process begins at block 3800, for example, with the issuance by an I/O controller 214 of a local bus write operation on a local interconnect 114 at block 2204 of FIG. 57. The various partial responses that snoopers 122, 236 may provide to distributed response logic 210 are represented in FIG. 70 by the outcomes of decision blocks 3802, 3810, 3812, 3820', 3822 3830', and 7000. These partial responses in turn determine the CR for the local bus write operation.

If no snooper 122 provides a partial response indicating that is responsible (i.e., the LPC) for the target memory block (block 3802), each affirming snooper 236 invalidates its respective copy of the target memory block, as shown at block 3804, and response logic 210 provides a "go global" CR, as illustrated at block 3806, because the LPC is a necessary participant in the bus write operation. As depicted at block 3810, if a snooper 122 provides a partial response indicating that it is responsible (i.e., the LPC) for the requested memory block 3000 but does not affirm the local bus write operation (block 3812) and a M or Me snooper 236 affirms the local bus write operation (block 3810), each valid affirming snooper 236 invalidates its respective copy of the requested memory block, if any (block 3824), and response logic 210 generates a CR indicating "retry local", as depicted at block 3818. A "retry local" CR is generated because the LPC must be available to receive the target memory block. Response logic 210 similarly generates a "retry" CR at block 3834 if a memory controller snooper 122 indicates that it is the LPC for the target memory block, no M, Me, or Tx snooper 236 affirms the local bus write operation, and a partial response indicates that a M, Me, or Tx snooper 236 may be hidden (block 3830'). In this case, each valid affirming snooper 236 invalidates its copy of the target memory block, and response logic 210 generates a "retry" CR so that the local bus write operation only succeeds when no HPC copy of the requested memory block remains in the system.

Referring again to block 3812, assuming that a M or Me snooper 236 affirms the local bus write operation and a snooper 122 affirms the local bus write operation as the LPC, the requesting L2 cache 230 transmits the requested memory block to the LPC snooper 122 and the M or Me snooper 236 affirming the local bus write operation invalidates its copy of the requested memory block (block 3814). In addition, the LPC snooper 122 sets the domain indicator 3004 associated with the target memory block to "local". The process ends at block 3816 with distributed response logic 210 generating a CR indicating "success".

As depicted at block 3820' and following blocks, if a snooper 122 provides a partial response indicating that it is the LPC for the target memory block (block 3802) but cannot affirm the local bus write operation (block 3822), no M or Me snooper 236 affirms the local bus write operation (block 3810), and a Tx snooper 236 affirms the local bus write operation, distributed response logic 210 generates a CR indicating "retry local" (block 3818) to force the operation to be reissued locally, and valid snoopers 236 affirming the local bus write operation invalidate their respective copies of the requested memory block (block 3824). Assuming the same partial responses except for the LPC snooper 122 affirming the local bus write operation (block 3822), the requesting L2 cache 230 transmits the requested memory block to the LPC snooper 122, and each valid affirming snooper 236 invalidates its respective copy of the requested memory block (block 3826). In addition, the LPC snooper 122 sets the domain indicator 3004 associated with the target memory block to "local".

In response to the local bus write operation and partial responses by the Tx snooper 236 and the LPC snooper 122 affirming the local bus write operation, distributed response logic 210 generates a CR indicating "local cleanup" if the Tx snooper 236, prior to invalidation, held the target memory block in one of the Tn and Ten states (block 7002), and otherwise generates a CR indicating "cleanup" (block 3828). It should noted that the presence of a Tn or Ten coherency states enables the scope of bus kill operations during cleanup operations to be limited to the local coherency domain.

Figure 71:
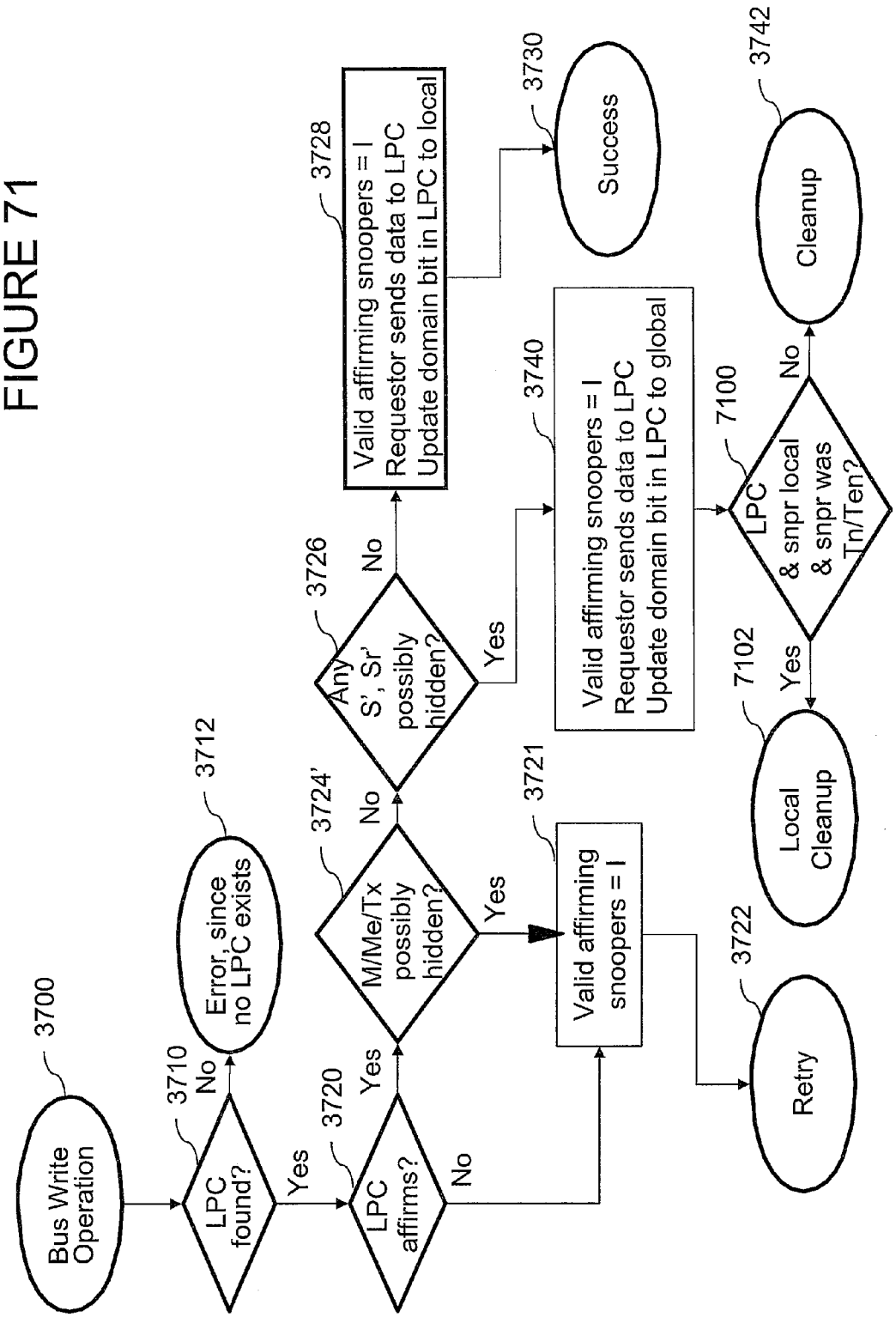
FIG. 71 is a high level logical flowchart of an exemplary method of performing a global bus write operation in a data processing system implementing Tn and Ten coherency states in accordance with the present invention.

Referring now to FIG. 71, there is depicted a high level logical flowchart of an exemplary method of performing a global bus write operation in a data processing system implementing Tn and Ten coherency states in accordance with the present invention. As indicated by like reference numerals, the process is substantially similar to that illustrated in FIG. 37 and described above.

As shown, the process begins at block 3700, for example, with an I/O controller 214 issuing a global bus write operation on interconnects 110, 114 at block 2220 of FIG. 57. The various partial responses that snoopers 122, 236 may provide to distributed response logic 210 are represented in FIG. 71 by the outcomes of decision blocks 3710, 3720, 3724', 3726 and 7100. These partial responses in turn determine the CR for the global bus write operation.

As depicted at block 3710, if no snooper 122 provides a partial response indicating that it is responsible (i.e., the LPC) for the requested memory block, an error occurs causing processing to halt, as depicted at block 3712. If, however, a snooper 122 provides a partial response indicating that it is responsible (i.e., the LPC) for the requested memory block but does not affirm the global bus write operation (block 3720), each valid affirming snooper 236 invalidates its respective copy of the requested memory block, if any (block 3721), and response logic 210 generates a CR indicating "retry", as depicted at block 3722. The "retry" CR is generated because the LPC must be available to receive the requested memory block. Response logic 210 similarly generates a "retry" CR at block 3722 and each valid affirming snooper 236 invalidates its respective copy of the requested memory block, if any (block 3721) if a memory controller snooper 122 affirms the global bus write operation but a partial response indicates that an M, Me, or Tx snooper 236 may be possibly hidden (blocks 3724'). In this case, a "retry" CR is generated so that the global bus write operation only succeeds when no HPC copy of the requested memory block remains in the system.

Referring again to block 3724', assuming that a snooper 122 affirms the global bus write operation as the LPC and no partial responses are generated that indicate that a M, Me, or Tx snooper 236 may be possibly hidden, the requesting L2 cache 230 transmits the requested memory block to the LPC snooper 122, and valid snoopers 236, if any, affirming the bus write operation invalidate their respective copies of the requested memory block (block 3728 or block 3740). As represented by blocks 3726 and 3730, if the partial responses indicate that no S' or Sr' snooper 236 is possibly hidden, the process ends with distributed response logic 210 generating a CR indicating "success". In addition, the LPC snooper 122 sets the domain indicator 3004 associated with the requested memory block to indicate "local" (block 3728). If, on the other hand, at least one partial response indicating the presence of a possibly hidden S' or Sr' snooper 236 was given in response to the global bus write operation (block 3726), distributed response logic 210 generates a CR indicating the need for cleanup operations. In particular, distributed response logic 210 generates a CR indicating "local cleanup" (block 7102) if the Tx snooper 236, prior to invalidation, held the target memory block in one of the Tn and Ten states and the LPC snooper 122 and Tx snooper 236 are both within the local coherency domain of the requesting I/O controller 214 (block 7100). Otherwise, response logic 210 generates a CR indicating "cleanup" (block 3742).

Figure 72:
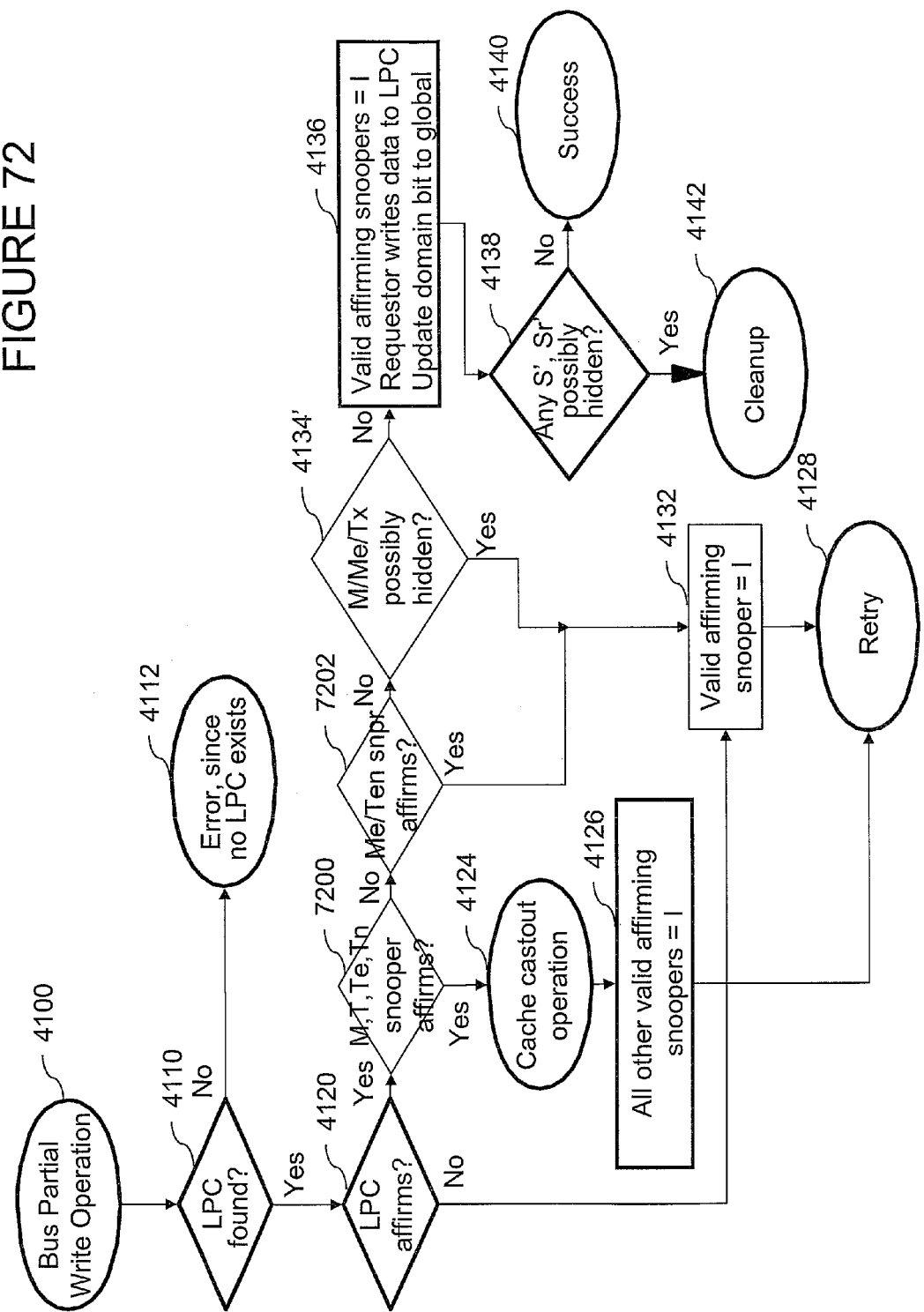
FIG. 72 is a high level logical flowchart of an exemplary method of performing a global bus partial write operation in a data processing system implementing Tn and Ten coherency states in accordance with the present invention.

With reference now to FIG. 72, there is depicted a high level logical flowchart of an exemplary method of performing a global bus partial write operation in a data processing system implementing Tn and Ten coherency states in accordance with the present invention. As indicated by like reference numerals, the illustrated process is substantially similar to that depicted in FIG. 41 and described above.

The process begins at block 4100, for example, with an I/O controller 214 issuing a global bus partial write operation on interconnects 110, 114 at block 922 of FIG. 9B. The various partial responses that snoopers 122, 236 may provide to distributed response logic 210 are represented in FIG. 72 by the outcomes of decision blocks 4110, 4120, 7200, 7202, 4134' and 4138. These partial responses in turn determine the CR for the global bus partial write operation.

As depicted at block 4110, if no snooper 122 provides a partial response indicating that it is responsible (i.e., the LPC) for the requested partial memory block, an error occurs causing processing to halt, as depicted at block 4112. An error condition arises because the specified target address has no LPC within data processing system 100.

Distributed response logic 210 generates a CR indicating "retry", as shown at block 4128, in response to four combinations of partial responses. First, response logic 210 generates a CR indicating "retry" if a snooper 122 provides a partial response indicating that it is responsible (i.e., the LPC) for the requested partial memory block but does not affirm the global bus partial write operation (block 4120). A "retry" CR is generated because the LPC must be available to receive the partial memory block from the I/O controller 214. As further shown at block 4132, each valid affirming snooper 236 (i.e., not an Ig snooper 236) invalidates its respective copy of the requested memory block, if any.

Second, response logic 210 similarly generates a "retry" CR as shown at block 4128 and each valid affirming snooper 236 invalidates its respective copy of the requested memory block, if any (block 4132) if a memory controller snooper 122 affirms the global bus partial write operation, no M, Me, or Tx snooper 236 affirms the global bus partial write operation (blocks 7200 and 7202), but a partial response indicates that a M, Me, or Tx snooper 236 may be possibly hidden (block 4134'). A "retry" CR is generated to avoid stale copies of the target memory block remaining in data processing system 100 following an update to system memory 108.

In the third and fourth cases, response logic 210 generates a "retry" CR, as illustrated at block 4128, if a memory controller snooper 122 affirms the global bus partial write operation, and an M, Me, or Tx snooper 236 affirms the global bus partial write operation (block 7200 or block 7202). In either of the third and fourth cases, each valid affirming snooper 236 invalidates its copy of the target memory block, as shown at blocks 4124, 4126 and 4132 (an affirming M, T, Te or Ten snooper 236 invalidates its copy of the target memory block during the cache castout operation at block 4124). In addition, as just noted, an M, T, Te or Tn snooper 236 initiates a cache castout operation of the cache line containing the partial memory block, as depicted at block 4124. Thus, a "retry" CR is generated, as depicted at block 4128, so that the global bus partial write operation only succeeds when no stale HPC copy of the requested partial memory block will remain in data processing system 100.

Referring again to block 4134', assuming that a snooper 122 affirms the global bus partial write operation as the LPC, no M, Me, or Tx snooper 236 affirms the global bus partial write operation or is possibly hidden, the requesting L2 cache 230 transmits the partial memory block to the LPC snooper 122, and valid snoopers 236, if any, affirming the global bus partial write operation invalidate their respective copies of the requested memory block (block 4136). In addition, the LPC snooper 122 updates the domain indicator 3004 for the updated memory block to "global". As shown at blocks 4138 and 4140, if the partial responses indicate that no hidden S' or Sr' snooper 236 exists, the process ends with distributed response logic 210 generating a CR indicating "success". If, on the other hand, at least one partial response indicating the presence of a possibly hidden S' or Sr' snooper 236 was given in response to the global bus partial write operation, distributed response logic 210 generates a CR indicating "cleanup" (block 4142), meaning that the requesting L2 cache 230 must issue one or more bus kill operations to invalidate the requested memory block in any such hidden S' or Sr' snooper 236.

While the invention has been particularly shown as described with reference to a preferred embodiment, it will be understood by those skilled in the art that various changes in form and detail may be made therein without departing from the spirit and scope of the invention.

What is claimed is:

1. A method of data processing in a cache coherent data processing system including at least first and second coherency domains, wherein the first coherency domain includes at least first and second cache memories and the second coherency domain includes at least a third cache memory, said method comprising:
   in the first cache memory within said first coherency domain of said data processing system, said first cache memory including a data array and a cache directory, holding a memory block in a storage location of the data array associated with both an address tag in the cache directory and a coherency state field in the cache directory, wherein said memory block held in the data array of the first cache memory is concurrently cacheable in both the first and second coherency domains; and
   setting said coherency state field of the cache directory to a state among a plurality of states that indicates that said memory block is possibly shared with the second cache memory in said first coherency domain and cached only within said first coherency domain.

2. The method of claim 1, wherein:
   said data processing system further includes a system memory; and
   said state further indicates that said memory block is modified with respect to a corresponding memory block in said system memory.

3. The method of claim 1, wherein:
   said data processing system further includes a system memory; and
   said state further indicates that said memory block is consistent with a corresponding memory block in said system memory.

4. The method of claim 1, wherein:
   said method further includes:
      in response to receipt of a read operation, said first cache memory providing a copy of said memory block to said second cache memory; and
      said first cache memory determining if said second cache memory is within said first coherency domain;
   said setting comprises setting said coherency state field to said state in response to said read operation and a determination that said second cache memory is within said first coherency domain.

5. The method of claim 1, said method further comprising:
   in response to an exclusive access operation originating within said first coherency domain while said coherency state field is set to said state, said exclusive access operation requesting exclusive access to the memory block, servicing said exclusive access operation within said first coherency domain without any communication to said second coherency domain.

6. The method of claim 5, wherein said servicing comprises a requestor within said first coherency domain issuing one or more broadcast kill operations limited in scope to said first coherency domain.

7. The method of claim 1, wherein:
   the state is a first state among the plurality of states; and
   in response to receipt by the first cache memory of an access operation originating within said second coherency domain while said coherency state field is set to said first state, said access operation requesting access to the memory block, providing a copy of the memory block to the third cache memory and updating the coherency state field to a second state among the plurality of states, wherein the second state indicates the memory block is possibly shared with a cache memory outside the first coherency domain.

* * * * *